US010529063B2

(12) United States Patent
Rodriguez et al.

(10) Patent No.: US 10,529,063 B2
(45) Date of Patent: Jan. 7, 2020

(54) VIRTUAL, AUGMENTED, AND MIXED REALITY SYSTEMS AND METHODS

(71) Applicant: MAGIC LEAP, INC., Plantation, FL (US)

(72) Inventors: Jose Felix Rodriguez, Plantation, FL (US); Ricardo Martinez Perez, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/683,677

(22) Filed: Aug. 22, 2017

(65) Prior Publication Data

US 2018/0053284 A1  Feb. 22, 2018

Related U.S. Application Data

(60) Provisional application No. 62/462,279, filed on Feb. 22, 2017, provisional application No. 62/377,829, filed on Aug. 22, 2016, provisional application No. 62/377,804, filed on Aug. 22, 2016.

(51) Int. Cl.
*G06T 5/00* (2006.01)
*G06T 3/00* (2006.01)
*G06T 3/40* (2006.01)

(52) U.S. Cl.
CPC ............ *G06T 5/006* (2013.01); *G06T 3/0093* (2013.01); *G06T 3/4007* (2013.01); *G06T 2207/10024* (2013.01); *G06T 2210/44* (2013.01)

(58) Field of Classification Search
CPC .............................. G06T 19/006; G06T 3/0093
See application file for complete search history.

(56) References Cited

U.S. PATENT DOCUMENTS

| 5,583,656 A | 12/1996 | Gandhi et al. |
|---|---|---|
| 9,791,700 B2 | 10/2017 | Schowengerdt |
| 2003/0193566 A1 | 10/2003 | Matsuda et al. |
| 2009/0179824 A1* | 7/2009 | Tsujimoto .......... G02B 27/0025 345/7 |
| 2011/0075257 A1 | 3/2011 | Hua et al. |
| 2015/0009416 A1 | 1/2015 | Tamayama et al. |

(Continued)

FOREIGN PATENT DOCUMENTS

WO    2016032973 A1    3/2016

OTHER PUBLICATIONS

PCT International Search Report and Written Opinion for PCT/US2017/048069, Applicant Magic Leap, Inc., dated Jan. 18, 2018, 21 pages.

(Continued)

*Primary Examiner* — Phi Hoang

(74) *Attorney, Agent, or Firm* — Vista IP Law Group LLP

(57) ABSTRACT

A virtual, augmented, or mixed reality display system includes a display configured to display virtual, augmented, or mixed reality image data, the display including one or more optical components which introduce optical distortions or aberrations to the image data. The system also includes a display controller configured to provide the image data to the display. The display controller includes memory for storing optical distortion correction information, and one or more processing elements to at least partially correct the image data for the optical distortions or aberrations using the optical distortion correction information.

18 Claims, 75 Drawing Sheets

| | |
|---|---|
| Frame Rate | 120Hz |
| ms | 8.333 |
| color on time | 0.926 |
| Blue On Time | 2.778 |
| Green On Time | 2.778 |
| Red on Time | 2.778 |
| Total | 8.333 |

(56) References Cited

U.S. PATENT DOCUMENTS

| | | |
|---|---|---|
| 2015/0237323 A1 | 8/2015 | Du et al. |
| 2016/0026253 A1 | 1/2016 | Bradski et al. |
| 2016/0037073 A1 | 2/2016 | Mills et al. |
| 2016/0191815 A1* | 6/2016 | Annau ................. H04N 13/111 348/38 |
| 2016/0314564 A1* | 10/2016 | Jones ...................... G06T 15/04 |
| 2016/0327789 A1 | 11/2016 | Klug et al. |
| 2017/0053450 A1 | 2/2017 | Rodriguez et al. |
| 2017/0115489 A1* | 4/2017 | Hu ...................... G02B 27/0172 |
| 2017/0206689 A1* | 7/2017 | Eo ........................ G06T 3/0093 |
| 2017/0329136 A1* | 11/2017 | Bates ................. G02B 27/0172 |

OTHER PUBLICATIONS

Extended European Search Report for EP Appln No. 17844304.0 dated Aug. 9, 2019 (7 pages).

Rolland, J., et al., "A Method of Computational Correction for Optical Distortion in Head-Mounted Displays," Dept of Computer Science, dated 1993 (14 pages).

\* cited by examiner

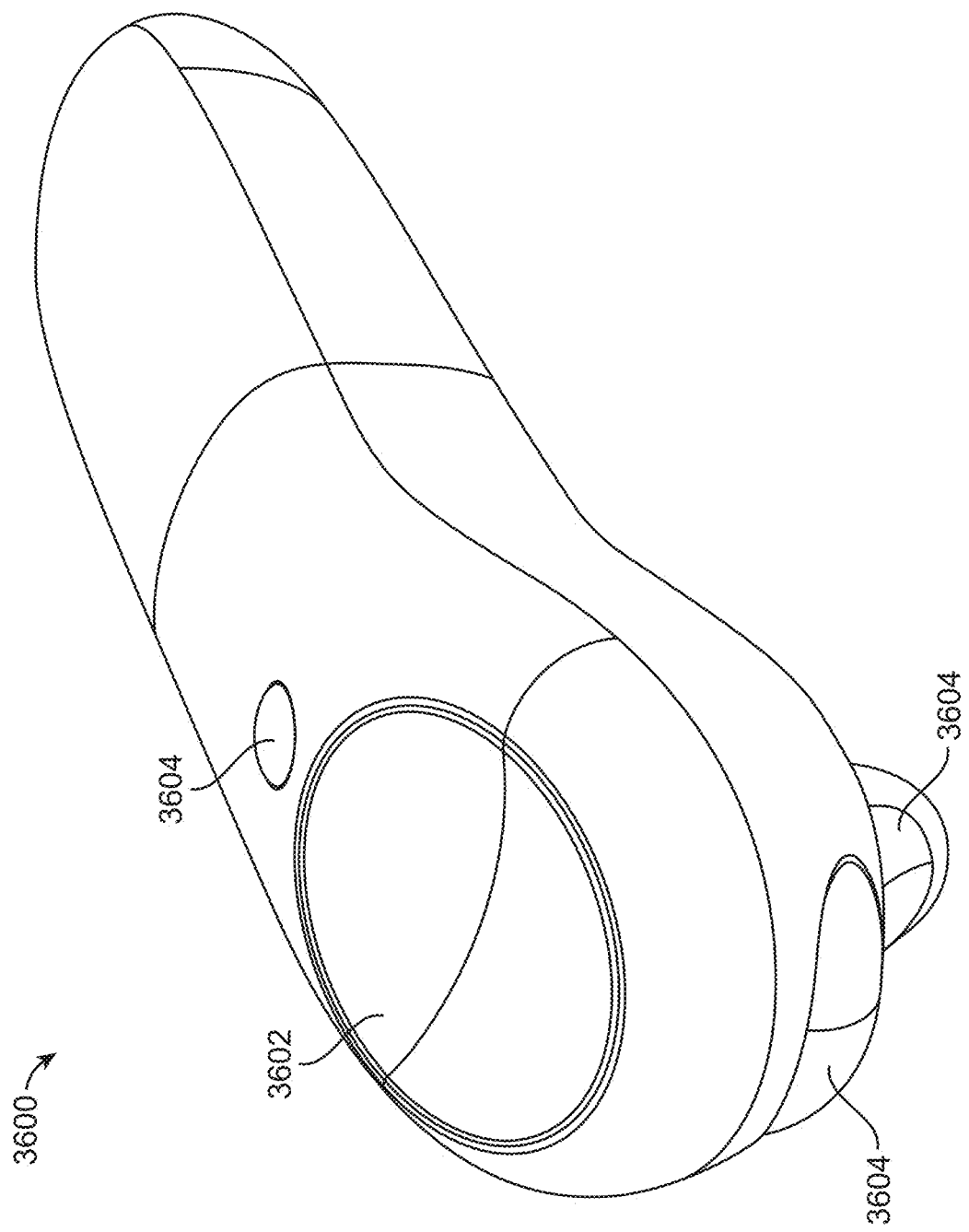

| G0 | R0 | B0 | G1 | R1 | B1 | G2 | R2 | B2 |
|---|---|---|---|---|---|---|---|---|
| 0.926 | 0.926 | 0.926 | 0.926 | 0.926 | 0.926 | 0.926 | 0.926 | 0.926 |

| Frame Rate | 120Hz |
|---|---|
| ms | 8.333 |
| color on time | 0.926 |
| Blue On Time | 2.778 |
| Green On Time | 2.778 |
| Red on Time | 2.778 |
| Total | 8.333 |

FIG. 9

3×11 Macroblock — 2220

| Pixel | 0 | 1 | 2 | 3 | 4 | 5 | 6 | 7 | 8 | 9 | 10 |
|---|---|---|---|---|---|---|---|---|---|---|---|
| Line 0 | P0 | P1 | P2 | P3 | P4 | P5 | P6 | P7 | P8 | P9 | P10 |
| Line 1 | Q0 | Q1 | Q2 | Q3 | Q4 | Q5 | Q6 | Q7 | Q8 | Q9 | Q10 |
| Line 2 | R0 | R1 | R2 | R3 | R4 | R5 | R6 | R7 | R8 | R9 | R10 |

2400

| | | | | | | | | | | | | | | | | | | | | | |
|---|---|---|---|---|---|---|---|---|---|---|---|---|---|---|---|---|---|---|---|---|---|
| bilerp 0 | P0 | P1 | Q0 | Q1 | R0 | R1 | | | | | | | | | | | | | | | |
| bilerp 1 | | P0 | P1 | Q0 | Q1 | R0 | R1 | | | | | | | | | | | | | | |
| bilerp 2 | | | P1 | P2 | Q1 | Q2 | R1 | R2 | | | | | | | | | | | | | |
| bilerp 3 | | | | P2 | P3 | Q2 | Q3 | R2 | R3 | P3 | Q3 | R3 | P3 | Q3 | R3 | P3 | Q3 | R3 | P3 | Q3 | R3 |
| bilerp 4 | | | | | P3 | P4 | Q3 | Q4 | R3 | R4 | P4 | Q4 | R4 | P4 | Q4 | R4 | P4 | Q4 | R4 | P4 | Q4 | R4 |
| bilerp 5 | | | | | | P4 | P5 | Q4 | Q5 | R4 | R5 | P5 | Q5 | R5 | P5 | Q5 | R5 | P5 | Q5 | R5 | P5 | Q5 | R5 |
| bilerp 6 | | | | | | | P5 | P6 | Q5 | Q6 | R5 | R6 | P6 | Q6 | R6 | P6 | Q6 | R6 | P6 | Q6 | R6 | P6 | Q6 | R6 |
| bilerp 7 | | | | | | | | P6 | P7 | Q6 | Q7 | R6 | R7 | P7 | Q7 | R7 | P7 | Q7 | R7 | P7 | Q7 | R7 | P7 | Q7 | R7 |

FIG. 24B

VIRTUAL, AUGMENTED, AND MIXED REALITY SYSTEMS AND METHODS

CROSS-REFERENCE TO RELATED APPLICATIONS

This application claims priority to U.S. Provisional Application Ser. No. 62/377,829, filed on Aug. 22, 2016 entitled "MIXED REALITY SYSTEMS AND METHODS," U.S. Provisional Application Ser. No. 62/377,804, filed on Aug. 22, 2016 entitled "MIXED REALITY SYSTEMS AND METHODS," and U.S. Provisional Application Ser. No. 62/462,279, filed on Feb. 22, 2017 entitled "VIRTUAL, AUGMENTED, AND MIXED REALITY SYSTEMS AND METHODS." The present application is related to U.S. Utility patent application Ser. No. 14/555,585 filed on Nov. 27, 2014 entitled "VIRTUAL AND AUGMENTED REALITY SYSTEMS AND METHODS." The contents of the aforementioned patent applications are hereby expressly and fully incorporated by reference in their entirety, as though set forth in full. Described in the aforementioned incorporated patent applications are various embodiments of virtual, augmented, and mixed reality systems and methods. Described herein are further embodiments of virtual, augmented, and mixed reality systems and methods.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present disclosure relates to virtual reality, augmented reality, and mixed reality imaging, visualization, and display systems and methods.

BACKGROUND

Modern computing and display technologies have facilitated the development of virtual reality ("VR"), augmented reality ("AR"), and mixed reality ("MR") systems. VR systems create a simulated environment for a user to experience. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time.

FIG. 1 depicts an example AR/MR scene 1 where a user sees a real-world park setting 6 featuring people, trees, buildings in the background, and a concrete platform 20. In addition to these items, computer-generated imagery is also presented to the user. The computer-generated imagery can include, for example, a robot statue 10 standing upon the real-world platform 20, and a cartoon-like avatar character 2 flying by which seems to be a personification of a bumble bee, even though these elements 2, 10 are not actually present in the real-world environment.

Various optical systems generate images at various depths for displaying VR, AR, or MR scenarios. Some such optical systems are described in U.S. Utility patent application Ser. No. 14/555,585 filed on Nov. 27, 2014, the contents of which have been previously incorporated by reference herein. Other such optical systems for displaying MR experiences are described in U.S. Utility patent application Ser. No. 14/738,877, the contents of which are hereby expressly and fully incorporated by reference in their entirety, as though set forth in full.

Because the human visual perception system is complex, it is challenging to produce a VR/AR/MR technology that facilitates a comfortable, natural-feeling, rich presentation of virtual image elements amongst other virtual or real-world imagery elements. Improved techniques are needed for processing image data in such systems, including, for example, techniques for providing control data to control how the image data is displayed, techniques for correcting optical distortions in the image data, techniques for displaying and blending image data from many depth planes, and techniques for warping image data based on the head pose of a user. VR/AR/MR technology also has size and portability issues, battery life issues, system over-heating issues, and other system and optical challenges. Improved techniques are needed for addressing these issues, including, for example, overheat cause identification, time domain power management, discrete imaging mode, and eye/gaze tracking based rendering modification. The systems and methods described herein are configured to address these and other challenges.

What is needed is a technique or techniques to improve over legacy techniques and/or over other considered approaches. Some of the approaches described in this background section are approaches that could be pursued, but not necessarily approaches that have been previously conceived or pursued.

SUMMARY

Lens Distortion Correction

In one embodiment, a virtual, augmented, or mixed reality display system includes a display configured to display virtual, augmented, or mixed reality image data, the display including one or more optical components which introduce optical distortions or aberrations to the image data. The system also includes a display controller configured to provide the image data to the display. The display controller includes memory for storing optical distortion correction information, and one or more processing elements to at least partially correct the image data for the optical distortions or aberrations using the optical distortion correction information.

In one or more embodiments, the optical distortion correction information is used by the display controller to pre-distort the image data in a way that is at least partially inversely related to the optical distortions or aberrations. The display controller may be configured to pre-distort the image data which it provides to the display by determining a distortion-corrected pixel at a first location (x, y) based on one or more non-distortion-corrected pixels near a different second location (x', y') in non-distortion-corrected image data received by the display controller. The optical distortion correction information may be used to determine the second location (x', y'). The (x', y') coordinates of the second location may be fractional numbers. The display controller may be configured to determine the distortion-corrected pixel at the first location (x, y) by interpolating between one or more non-distortion-corrected pixels surrounding the second location (x', y'). The display controller may use bilinear interpolation.

In one or more embodiments, the display includes one or more at least partially distinct optical paths corresponding to one or more colors of the image data, and the optical distortion correction information may include separate optical distortion correction information for each of the plurality of colors of the image data. The optical distortion correction information may be stored in the form of one or more lookup tables. The one or more lookup tables may be stored in a compressed format, and the display controller may be configured to expand the one or more lookup tables before correcting for the optical distortions or aberrations using the optical distortion correction information. The optical distortion correction information may also include information for performing one or more image warp operations, and where the display controller is further configured to perform the one or more image warp operations on the image data.

In another embodiment, a method in a virtual, augmented, or mixed reality display system includes providing virtual, augmented, or mixed reality image data to be shown on a display, the display including one or more optical components which introduce optical distortions or aberrations to the image data. The method also includes storing optical distortion correction information. The method further includes at least partially correcting the image data for the optical distortions or aberrations using the optical distortion correction information. Moreover, the method includes displaying the image data to the user with the display.

In one or more embodiments, the method also includes using the optical distortion correction information to pre-distort the image data in a way that is at least partially inversely related to the optical distortions or aberrations. The method may further include pre-distorting the image data provided to the display by determining a distortion-corrected pixel at a first location (x, y) based on one or more non-distortion-corrected pixels near a different second location (x', y') in undistorted image data. Moreover, the method may include using the optical distortion correction information to determine the second location (x', y'). In addition, the (x', y') coordinates of the second location may be fractional numbers. The method may also include determining the distortion-corrected pixel at the first location (x, y) by interpolating between one or more non-distortion-corrected pixels surrounding the second location (x', y'). The method may also include using bilinear interpolation.

In one or more embodiments, the display includes one or more at least partially distinct optical paths corresponding to one or more colors of the image data, and the optical distortion correction information includes separate optical distortion correction information for each of the plurality of colors of the image data. The method may also include storing the optical distortion correction information in the form of one or more lookup tables. The method of claim 20 may also include storing the one or more lookup tables in a compressed format, and expanding the one or more lookup tables before correcting for the optical distortions or aberrations using the optical distortion correction information. The optical distortion correction information may also include information for performing one or more image warp operations, and also includes performing the one or more image warp operations on the image data.

Color Blending (Virtual Depth Planes)

In still another embodiment, a virtual, augmented, or mixed reality display system includes a display configured to display digital image data for one or more depth planes, the display including a first optical path to display image data corresponding to a first depth plane and an at least partially distinct second optical path to display image data corresponding to a second depth plane. The system also includes a display controller configured to blend the image data corresponding to the first depth plane with the image data corresponding to the second depth plane such that when the blended image data is displayed by the display it appears to correspond to a virtual depth plane located between the first depth plane and the second depth plane.

In one or more embodiments, the display controller is configured to blend the image data corresponding to the first depth plane with the image data corresponding to the second depth plane by calculating a weighted combination of the image data corresponding to the first depth plane and the image data corresponding to the second depth plane. The display controller may be configured to determine the weighted combination based on virtual depth plane indicator information embedded in the digital image data, the virtual depth plane indicator data specifying one of one or more possible virtual depth planes. The virtual depth plane indicator data may be embedded in pixel values of the digital image data. The digital image data may include one or more color values for each pixel, the plurality of least significant bits of the color values being the virtual depth plane indicator data.

In one or more embodiments, the virtual depth plane indicator data is used to access a blending weight value associated with the virtual depth plane specified by the virtual depth plane indicator data. Blending weight values for each virtual depth plane may be stored in a lookup table. One or more lookup tables may be provided for each depth plane of the digital image data. The display controller may be configured to blend all pixels of image data corresponding to the first depth plane and all pixels of image data corresponding to the second depth plane to a same virtual depth plane. The display controller may be configured to blend different pixels of image data corresponding to the first depth plane to different virtual depth planes.

In yet another embodiment, a method in a virtual, augmented, or mixed reality display system includes providing digital image data for one or more depth planes to be shown on a display, the display including a first optical path to display image data corresponding to a first depth plane and an at least partially distinct second optical path to display image data corresponding to a second depth plane. The method also includes blending the image data corresponding to the first depth plane with the image data corresponding to the second depth plane such that when the blended image data is displayed by the display it appears to correspond to a virtual depth plane located between the first depth plane and the second depth plane.

In one or more embodiments, the method also includes blending the image data corresponding to the first depth plane with the image data corresponding to the second depth plane by calculating a weighted combination of the image data corresponding to the first depth plane and the image data corresponding to the second depth plane. The method may also include determining the weighted combination based on virtual depth plane indicator information embedded in the digital image data, the virtual depth plane indicator data specifying one of one or more possible virtual depth planes. The virtual depth plane indicator data may be embedded in pixel values of the digital image data. The digital image data may include one or more color values for each pixel, the plurality of least significant bits of the color values being the virtual depth plane indicator data.

In one or more embodiments, the method also includes using the virtual depth plane indicator data to access a blending weight value associated with the virtual depth plane specified by the virtual depth plane indicator data. The method may also include storing blending weight values for each virtual depth plane in a lookup table. The method may also include providing one or more lookup tables for each depth plane of the digital image data. The method may also include blending all pixels of image data corresponding to the first depth plane and all pixels of image data corresponding to the second depth plane to a same virtual depth plane. The method may also include blending different pixels of image data corresponding to the first depth plane to different virtual depth planes.

Late Image Warping

In another embodiment, a virtual, augmented, or mixed reality display system includes an inertial measurement unit configured to take measurements related to a position of a user's head. The system also includes a graphics processing unit configured to render virtual, augmented, or mixed reality image data. The system further includes a display configured to show transformed image data to the user. Moreover, the system includes a display driver configured to receive the rendered image data which has been scanned out and to cause the display to show the transformed image data. The display driver includes a head pose processor configured to receive the measurements from the inertial measurement unit and to determine head pose information, and an image warping processor configured to transform the rendered image data into the transformed image data based on the head pose information.

In one or more embodiments, the system also includes a display controller configured to receive the rendered image data from the graphics processing unit and to scan the rendered image data out to the display driver. At least one of the graphics processing unit and the display controller may be configured to perform a first transform on the rendered image data based on first head pose information determined using first measurements from the inertial measurement unit. The display driver may be configured to perform a second transform on the rendered image data based on second head pose information determined using updated second measurements from the inertial measurement unit, the second head pose information relating to a difference between the position of the user's head indicated by the first head pose information and the position of the user's head indicated by the second head pose information.

In one or more embodiments, the rendered image data includes one or more color components. The image warping processor may be configured to transform each color component of the rendered image data based on separate head pose information. The display may be configured to show one or more color components of the transformed image data sequentially.

In one or more embodiments, the display is configured to show a first color component of the transformed image data at a first time and a second color component of the transformed image data at a subsequent second time. The image warping processor may be configured to transform a second color component of the rendered image data based on head pose information determined after the first time. The transform may be performed by the image warping processor includes a rotation or a translational shift of each color component of the rendered image data.

In one or more embodiments, the rendered image data includes one or more depth planes. The image warping processor may be configured to transform each depth plane of the rendered image data based on separate head pose information. The display may be configured to show one or more depth planes of the transformed image data sequentially.

In one or more embodiments, the display is configured to show a first depth plane of the transformed image data at a first time and a second depth plane of the transformed image data at a subsequent second time. The image warping processor may be configured to transform a second depth plane of the rendered image data based on head pose information determined after the first time. The transform performed by the image warping processor may include a rotation or a translational shift of each depth plane of the rendered image data. The transform performed by the image warping processor may include an image rotation or a translational shift.

In one or more embodiments, the display is configured to show the transformed image data including a first number of columns of pixels and a second number of rows of pixels. The graphics processing unit may be configured to provide rendered image data to the display driver including more than the first number of columns of pixels or more than the second number of rows of pixels. The rendered image data provided to the display driver may include a central zone of rendered image data and a buffer zone of rendered image data, the central zone having the first number of columns of pixels and the second number of rows of pixels, and the buffer zone including pixels extending beyond the central zone. Transforming the rendered image data based on the head pose information may cause the rendered image data from the buffer zone to be brought into the central zone.

In one or more embodiments, the graphics processing unit is not configured to perform image warping based on head pose information. The graphics processing unit may be configured to add updated measurements from the inertial measurement unit or updated head pose information to the rendered image data. The graphics processing unit may be configured to add updated measurements from the inertial measurement unit or updated head pose information to the rendered image data after scanning out the last line of rendered image data. The system may also include a clock configured to provide a common clock signal to the inertial measurement unit, the graphics processing unit, and the display driver to provide a common reference for measurements related to the position of the user's head, head pose information, or transforms based on head pose information.

In still another embodiment, a method in a virtual, augmented, or mixed reality display system includes rendering virtual, augmented, or mixed reality image data using a graphics processing unit. The method also includes scanning the rendered image data out to a display to be shown to a user. The method further includes taking measurements related to the position of a user's head using an inertial measurement unit. Moreover, the method includes determining head pose information using the measurements from the inertial measurement unit. In addition, the method includes, after scanning out the rendered image data to the display, transforming the rendered image data based on the head pose information. The method also includes showing the transformed image data on the display.

In one or more embodiments, the method also includes performing a first transform on the rendered image data based on first head pose information determined using first measurements from the inertial measurement unit. The method may also include performing a second transform on the scanned out rendered image data based on second head pose information determined using updated second measurements from the inertial measurement unit, the second head pose information relating to a difference between the position of the user's head indicated by the first head pose information and the position of the user's head indicated by the second head pose information.

In one or more embodiments, determining head pose information using the measurements from the inertial measurement unit is done after scanning out the rendered image data to the display. The rendered image data may include one or more color components. The method may also include transforming each color component of the rendered image data based on separate head pose information. The method may also include showing the plurality of color components of the transformed image data sequentially.

In one or more embodiments, the method also includes showing a first color component of the transformed image data at a first time and a second color component of the transformed image data at a subsequent second time. The method may also include transforming a second color component of the rendered image data based on head pose information determined after the first time.

In one or more embodiments, transforming each color component of the rendered image data includes rotating or translationally shifting each color component of the rendered image data. The rendered image data may include one or more depth planes. The method may also include transforming each depth plane of the rendered image data based on separate head pose information. The method may also include showing one or more depth planes of the transformed image data sequentially.

In one or more embodiments, the method also includes showing a first depth plane of the transformed image data at a first time and a second depth plane of the transformed image data at a subsequent second time. The method may also include transforming a second depth plane of the rendered image data based on head pose information determined after the first time. Transforming each depth plane of the rendered image data may include rotating or translationally shifting each depth plane of the rendered image data.

In one or more embodiments, transforming the rendered image data based on the head pose information includes rotating or shifting the rendered image data. The transformed image data may include a first number of columns of pixels and a second number of rows of pixels on the display. The method may also include providing rendered image data to the display driver including more than the first number of columns of pixels or more than the second number of rows of pixels.

In one or more embodiments, the rendered image data provided to the display driver includes a central zone of rendered image data and a buffer zone of rendered image data, the central zone having the first number of columns of pixels and the second number of rows of pixels, and the buffer zone includes pixels extending beyond the central zone. The method may also include transforming the rendered image data based on the head pose information by bringing rendered image data from the buffer zone into the central zone.

In one or more embodiments, transforming the rendered image data based on the head pose information is not performed by the graphics processing unit which renders the virtual, augmented, or mixed reality image data. The method may also include adding updated measurements from the inertial measurement unit or updated head pose information to the rendered image data. The method may also include adding updated measurements from the inertial measurement unit or updated head pose information to the rendered image data after scanning out the last line of rendered image data. The method may also include providing a common clock signal to provide a common reference for measurements related to the position of the user's head, head pose information, or transforms based on head pose information.

Flat Field Correction

In yet another embodiment, a virtual, augmented, or mixed reality display system includes a display including one or more optical components which cause variations in brightness at different portions of the display. The system also includes a display controller configured to apply one or more different brightness correction values to one or more pixel values in image data to create corrected image data. The display is configured to show a user the corrected image data so as to reduce the brightness variations.

In one or more embodiments, the display controller is configured to apply a brightness correction value by multiplying a brightness correction value from among the plurality of different brightness correction values and a corresponding pixel value from among the plurality of pixel values in the image data. The plurality of different brightness correction values may be determined based on a calibration image shown on the display. The plurality of different brightness correction values may be stored in a lookup table. A resolution of the stored lookup table may be less than a resolution of the image data. The display controller may be configured to expand the lookup table to the match the resolution of the image data.

In one or more embodiments, the display includes one or more waveguides for guiding one or more color components of the corrected image data, and one or more light redirecting elements to re-direct light from the waveguides to a user's eye as one or more exit beams. There may be variations between the plurality of exit beams which cause the variations in the brightness of the displayed image data at different portions of the display. Different waveguides from among the plurality of waveguides may be associated with different optical powers so as to display different depth planes of the image data at different apparent depths.

In another embodiment, a method in a virtual, augmented, or mixed reality display system includes using a display including one or more optical components which cause variations in brightness at different portions of the display.

The method also includes applying one or more different brightness correction values to one or more pixel values in image data to create corrected image data. The method further includes showing a user the corrected image data on the display so as to reduce the brightness variations.

In one or more embodiments, applying a brightness correction value includes multiplying a brightness correction value from among the plurality of brightness correction values and a corresponding pixel value from among the plurality of pixel values in the image data. The method may also include determining the plurality of different brightness correction values based on a calibration image shown on the display. The method may also include storing the plurality of different brightness correction values in a lookup table. A resolution of the stored lookup table may be less than a resolution of the image data. The method may also include expanding the lookup table to the match the resolution of the image data.

In one or more embodiments, the method also includes guiding one or more color components of the corrected image data using one or more waveguides. The method may also include re-directing light from the waveguides to a user's eye as one or more exit beams using one or more light redirecting elements. There may be variations between the plurality of exit beams which cause the variations in the brightness of the displayed image data at different portions of the display. The method may also include displaying different depth planes of the image data at different apparent depths using different waveguides, from among the plurality of waveguides, associated with different optical powers.

Pixel Processing Pipeline

In still another embodiment, a virtual, augmented, or mixed reality display system includes a display configured to display virtual, augmented, or mixed reality image data for one or more depth planes. The display includes a first optical path to display image data corresponding to a first depth plane and an at least partially distinct second optical path to display image data corresponding to a second depth plane. The display also includes one or more optical components which introduce optical distortions or aberrations to the image data. The display further includes one or more optical components which cause variations in brightness at different portions of the display. The system also includes a controller. The controller is configured to at least partially correct the image data for the optical distortions or aberrations using optical distortion correction information. The controller is also configured to blend the image data corresponding to the first depth plane with the image data corresponding to the second depth plane such that the blended image data appears to correspond to a virtual depth plane located between the first depth plane and the second depth plane. The controller is further configured to apply one or more different brightness correction values to one or more pixel values in the image data so as to reduce the brightness variations. Moreover, the controller is configured to transform the image data with a rotation or pixel shift operation based on control data. In addition, the controller is configured to provide the image data to the display.

In one or more embodiments, the controller is a display controller. The controller may be a remote processing unit. The controller may be a DP to MPI Bridge.

In yet another embodiment, a method in a virtual, augmented, or mixed reality display system includes displaying virtual, augmented, or mixed reality image data for one or more depth planes, using a display. The display includes a first optical path to display image data corresponding to a first depth plane and an at least partially distinct second optical path to display image data corresponding to a second depth plane. The display also includes one or more optical components which introduce optical distortions or aberrations to the image data. The display further includes one or more optical components which cause variations in brightness at different portions of the display. The method also includes providing the image data to the display with a display controller. The display controller is configured to at least partially correct the image data for the optical distortions or aberrations using optical distortion correction information. The display controller is also configured to blend the image data corresponding to the first depth plane with the image data corresponding to the second depth plane such that the blended image data appears to correspond to a virtual depth plane located between the first depth plane and the second depth plane. The display controller is further configured to apply one or more different brightness correction values to one or more pixel values in the image data so as to reduce the brightness variations. Moreover, the display controller is configured to transform the image data with a rotation or pixel shift operation based on control data.

Time Domain Power Management

In another embodiment, a method in a virtual, augmented, or mixed reality system includes the system operating in a low power mode. The method also includes the system receiving a request for a normal processor mode. The method further includes the system switching to a normal power mode from the low power mode in response to receiving the request for the normal processor mode. Moreover, the method includes the system receiving an indicator of acceptability of a low processor mode. Moreover, the method includes the system switching to the lower power mode from the normal power mode in response to receiving the indicator of acceptability of the low processor mode.

In one or more embodiments, the low power mode includes a system component is switched off or in a standby mode with a fast wake-up function. The system switching to the normal power mode from the low power mode may include the system activating the system component that was previously switched off or in a standby mode. The system receiving the request for the normal processor mode may include receiving the request for the normal processor mode through a low latency communication channel. The request for the normal processor mode may be generated in response to a user's pose changing more than a predetermined threshold amount. The indicator of acceptability the low processor mode may be a user's pose changing less than a predetermined threshold amount in a predetermined time.

In still another embodiment, a method in a virtual, augmented, or mixed reality system includes the system operating in a normal power mode. The method also includes the system receiving a request for a high processor mode. The method further includes the system switching to a high power mode from the normal power mode in response to receiving the request for the high processor mode. Moreover, the method includes the system receiving an indicator of acceptability a normal processor mode. In addition, the method includes the system switching to the normal power mode from the high power mode in response to receiving the indicator of acceptability of the normal processor mode.

In one or more embodiments, the high power mode includes an increased amount of current available to the system. The system switching to the normal power mode from the high power mode may include the system reducing the amount of current available to the system. The request for the high processor mode may be generated in response to a request to render more than a predetermined threshold amount of virtual objects. The indicator of acceptability the normal processor mode may be a request to render less than a predetermined threshold amount of virtual objects for a predetermined time.

Discrete Imaging Mode

In yet another embodiment, a method in a virtual, augmented, or mixed reality system includes operating in a multiplane mode, in which the system renders and projects images on one or more depth planes. The method also includes receiving an indicator of single plane activity. The method further includes switching to a discrete imaging mode from the multiplane imaging mode in response to receiving the indicator of single plane activity, where in the discrete imaging mode, the system renders and projects images on a single depth plane. Moreover, the method includes receiving an indicator of multiplane activity. In addition, the method includes switching to the multiplane mode from the single plane mode in response to receiving the indicator of multiplane activity.

In one or more embodiments, the indicator of single plane activity includes a user requesting a movie to be displayed on a virtual screen, the user opening a 2D application, or sensor data indicating that the user's gaze is converging to a particular plane for a predetermined threshold amount of time. The method may also include switching between the discrete imaging mode and the multiplane imaging mode during a blink or an eye movement. The indicator of multiplane activity may include a user requesting that a movie currently displayed on a virtual screen be halted, or sensor data indicating that the user's gaze is converging away from a particular plane for a predetermined threshold amount of time.

In another embodiment, a method in a virtual, augmented, or mixed reality system includes operating in a multiplane mode, in which the system renders and projects images on one or more depth planes. The method also includes receiving an indicator of the system reaching a predetermined threshold. The method further includes switching to a discrete imaging mode from the multiplane imaging mode in response to receiving the indicator of the system reaching a predetermined threshold, where in the discrete imaging mode, the system renders and projects images on a single depth plane. Moreover, the method includes receiving an indicator of normal system operation. In addition, the method includes switching to the multiplane mode from the single plane mode in response to receiving the indicator of normal system operation.

In one or more embodiments, the predetermined threshold includes a temperature threshold or a battery power remaining threshold. The method may also include switching between the discrete imaging mode and the multiplane imaging mode during a blink or an eye movement. The indicator of normal system operation may include having no system characteristic within a predetermined amount of the predetermined threshold.

Light Map

In still another embodiment, a method in a virtual, augmented, or mixed reality system includes obtaining an image of a user's field of view. The method also includes determining that the image includes private information. The method further includes determining that a light map generated from the image will be public. Moreover, the method includes generating a proxy image including lighting information, but not the private information, in response to determining that the image includes private information and in response to determining that the light map will be public. In addition, the method includes sending the proxy image to a server. The method also includes generating a public light map using the proxy image.

In one or more embodiments, the private information is financial information or images of children. Determining that the light map generated from the image will be public may include detecting instructions to send image data to a server. A proxy image may include a replacement object for an original object in the user's field of view displaying the private information.

In yet another embodiment, a method in a virtual, augmented, or mixed reality system includes receiving lighting information for a real room. The method also includes generating a light map of the real room. The method further includes using the light map to generate a virtual object. Moreover, the method includes displaying the virtual object.

In one or more embodiments, the lighting information includes color information, an illumination level, or a light direction. The light map may include a model of a lighting source in the real room. The model may include light that is transmitted, diffuse, reflected, or diffracted.

Eye/Gaze Tracking Based Rendering Modification

In another embodiment, a method in a virtual, augmented, or mixed reality system includes tracking a user's eye position. The method also includes calculating a user's point of focus using the user's eye position. The method further includes identifying a foveated area centered on the user's point of focus. Moreover, the method includes rendering a first portion of an image in the foveated area more accurately relative to a second portion of the image outside of the foveated area. In addition, the method includes displaying the image include the first and second portions.

In one or more embodiments, the user's point of focus is determined in the X, Y, or Z directions. The user's point of focus may be a quadrant of the user's field of view. More accurately rendering the first portion of the image may include increasing the sharpness of the first portion of the image relative to the second portion of the image. The method may also include rendering a gradient of sharpness increasing a center of the foveated area to an outer edge of the foveated area. The method may also include modifying an amount of foveation based on an amount of user eye movement, system temperature, or user preference. The method may also include increasing an accuracy of eye position tracking in the foveated area.

Depth Plane Switching Based On Pupil Tracking

In still another embodiment, a method in a virtual, augmented, or mixed reality system includes obtaining first plane and second content for a first plane and a second plane, respectively. The method also includes determining a pupillary orientation. The method further includes combining the first content and the second content and the pupillary information to generate a switching pattern. Moreover, the method includes sending the switching pattern to a display of the system. In addition, the method includes the display performing switching using the switching pattern.

In one or more embodiments, here the switching is fast switching, at 30 or 60 frames per second for each of the first plane and the second planes. The switching may include blanking the first plane. The display may perform the switching using analog switches.

Low Power Depth Plane Switching

In yet another embodiment, a method in a virtual, augmented, or mixed reality system includes obtaining one or more content for a respective plurality of planes. The method also includes analyzing the plurality of content to generate a switching pattern. The method further includes sending the switching pattern to a display of the system. Moreover, the method includes the display performing switching using the switching pattern.

In one or more embodiments, the switching pattern includes at least one of reordering some of the plurality of planes, blanking one of the plurality of planes, skipping an image frames, swapping a pair of image frames, and performing color sequencing. The switching may be fast switching, at 30 or 60 frames per second for each plane of the plurality of planes. The display may perform the switching using analog switches.

In another embodiment, a method in a virtual, augmented, or mixed reality system includes obtaining respective pluralities of content corresponding to one or more frames. The method also includes analyzing the respective pluralities of content to generate one or more switching patterns corresponding to the plurality of frames. The method further includes sending the plurality of switching patterns to a display of the system. Moreover, the method includes the display performing switching using the switching pattern on a frame-by-frame basis.

In one or more embodiments, the method also includes storing the plurality of switching patterns in a memory buffer. The memory buffer may be one of a time-ordered first-in-first-out buffer, a circular buffer, and a series of memory locations or registers. The switching may be fast switching, at 30 or 60 frames per second. The display may perform the switching using analog switches.

In one or more embodiments, the method also includes detecting a user blink, and modifying the switching pattern to blank a frame for two displays coinciding with the user blink. The method may also include detecting a user wink, and modifying the switching pattern to blank a frame for one displays coinciding with the user blink.

Low Power Low Latency Headset

In still another embodiment, a virtual, augmented, or mixed reality system includes a headset, and a remote computing module. The headset is configured to receive user input, detect a keyword in the user input, and to send a wake-up code to the remote computing module in response to detecting the keyword in the user input, the remote computing module being in a low-power standby mode. The remote computing module is configured to exit the low-power standby mode in response to receiving the wake-up code.

In one or more embodiments, the user input is an audio input, and where receiving the user input includes detecting the audio input using a microphone on the headset. The headset detecting the keyword in the user input may include an audio processor in the headset communicating with the microphone to receive the audio input, and a perception processor in the headset communicating with the audio processor to receive audio data.

In one or more embodiments, the headset detecting the keyword in the user input also includes the perception processor accessing a keyword storage, and the perception processor comparing the audio data with one or more keywords in the keyword storage to detect the keyword. The system may also include the headset sending an interrupt code to the remote computing module in response to detecting the keyword in the user input.

Low Power Low Latency Movement Prediction

In yet another embodiment, a virtual, augmented, or mixed reality system includes a headset having a prediction engine in a perception processor, and a remote computing module. The headset is configured to detect initiation of a user movement and measure the user movement in response to detecting initiation of the user movement. The prediction engine in the perception processor in the headset generates a predicted user movement from the measured user movement. The perception processor in the headset performs a transformation on image data using the predicted user movement in response to the prediction engine generating the predicted user movement.

In one or more embodiments, the headset performs the transformation on the image data using the predicted user movement and a transformation parameter. The headset may perform the transformation on the image data using the predicted user movement and a predicted color change. The headset may perform the transformation on the image data using the predicted user movement and a predicted lighting change or a predicted contrast change.

In one or more embodiments, the system also includes the perception processor in the headset predicting user focus. The perception processor in the headset may perform the transformation on the image data using the predicted user movement and the predicted user focus in response to the prediction engine generating the predicted user movement. The user movement may be a head movement. The user movement may be an eye movement.

Low Power Side Channel

In another embodiment, a virtual, augmented, or mixed reality system includes a headset having a local processing module. The system also includes a remote processing module. The system further includes a first communication channel between the local processing module and the remote processing module. Moreover, the system includes a second communication channel between the local processing module and the remote processing module, where the second communication channel requires less power than the first communication channel.

In one or more embodiments, the first communication channel is a USB or PCIE connection and the second communication channel is an SPI or similar low power connection.

In still another embodiment, a method in the virtual, augmented, or mixed reality system having a remote processing module and a headset including a local processing module includes detecting a mode of operation. The method also includes determining that a first communication channel between the local processing module and the remote processing module can be disabled during the mode of operation. The method further includes identifying a component of the first communication channel that can be disabled during the mode of operation. Moreover, the method includes communicating over a second communication channel between the local processing module and the remote processing module, where the second communication channel requires less power than the first communication channel. In addition, the method includes disabling the component of the first communication channel based on successful communication over the second communication channel.

In one or more embodiments, the also includes remapping a connector of the second communication channel to facilitate communication over the second communication channel. The may also include providing mutually-exclusive access to a connector of the second communication channel to facilitate communication over the second communication channel.

Multiple Component Low Power Modes

In yet another embodiment, a method in a virtual, augmented, or mixed reality system includes detecting an indicator of low power requirement at a first component of the virtual, augmented, or mixed reality system. The method also includes identifying a local low power mode at the first component. The method further includes identifying a coordinated low power mode including a second component of the virtual, augmented, or mixed reality system. Moreover, the method includes sending an indicator of the coordinated low power mode to the second component. In addition, the method includes the first component entering the local low power mode. The method also includes the second component entering the coordinated low power mode.

In one or more embodiments, the indicator of low power requirement is activation of a mute button. The local low power mode may include deactivating a microphone. The coordinated low power mode may include deactivating a speech processor.

In another embodiment, a method in a virtual, augmented, or mixed reality system includes detecting an indicator of low power requirement at a first component of the virtual, augmented, or mixed reality system. The method also includes identifying first and second local low power modes at the first component. The method further includes identifying first and second coordinated low power modes each including a second component of the virtual, augmented, or mixed reality system. Moreover, the method includes comparing the first and second local low power modes to identify a preferred local low power mode. In addition, the method includes comparing the first and second coordinated low power modes to identify a preferred coordinated low power mode. The method also includes generating a combination low power mode from the preferred local low power mode and the preferred coordinated low power mode. The method further includes the first and second components entering the combination low power mode.

Multiple Component Low Power Mode Synchronization

In still another embodiment, a method in a virtual, augmented, or mixed reality system, the system having a headset and a remote computing module includes the headset sending a headset timecode to the remote computing module. The method also includes the remote computing module sending a remote computing module timecode to the headset. The method further includes the headset comparing the remote computing module timecode and the headset timecode to identify a first drift. Moreover, the method includes the remote computing module comparing the headset timecode and the remote computing module timecode to identify a second drift.

In one or more embodiments, the method also includes the headset resetting its clock based on the first drift to synchronize the headset and the remote computing module. The method may also include the remote computing module resetting its clock based on the second drift to synchronize the headset and the remote computing module.

In yet another embodiment, a method in a virtual, augmented, or mixed reality system, the system having a headset, a projector and a remote computing module includes the remote computing module sending low bandwidth constructs to the headset. The method also includes the projector sending low power options to the headset. The method further includes the headset sending a low power command from the low power options to the projector.

Time Division Multiplexing of Data

In another embodiment, a method in a virtual, augmented, or mixed reality system, the system having a headset and a remote computing module includes configuring a microphone in the headset. The method also includes configuring a communication path from the headset to the remote computing module. The method further includes a perception processor in the headset calculating the a first number of available sound channels and a second number of needed sound channels. Moreover, the method includes the perception processor determining that the second number is greater than the first number. In addition, the method includes the perception processor packing extra data into an unused sound channel.

In one or more embodiments, the extra data includes at least one of echo cancellation data, eye pose data, or and head pose data. The method may be performed dynamically.

BRIEF DESCRIPTION OF THE DRAWINGS

The drawings described below are for illustration purposes only. The drawings are not intended to limit the scope of the present disclosure.

The drawings illustrate the design and utility of various embodiments of the present disclosure. It should be noted that the figures are not drawn to scale and that elements of similar structures or functions are represented by like reference numerals throughout the figures. In order to better appreciate how to obtain the recited and other advantages and objects of various embodiments of the disclosure, a more detailed description of the present disclosure will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

FIG. 2F is a perspective view of a totem controller, according to one embodiment.

FIG. 9 illustrates an example timing scheme for a VR/AR/MR system which displays light field video data.

FIG. 24B illustrates example multiplexer logic for passing pixels from the macroblock to an interpolator.

DETAILED DESCRIPTION

Various embodiments of the disclosure are directed to systems, methods, and articles of manufacture for virtual reality (VR)/augmented reality (AR)/mixed reality (MR) in a single embodiment or in multiple embodiments. Other objects, features, and advantages of the disclosure are described in the detailed description, figures, and claims.

Various embodiments will now be described in detail with reference to the drawings, which are provided as illustrative examples so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Embodiments in accordance with the present disclosure address the problem of implementation of VR/AR/MR systems often rely on combinations of off-the-shelf-components and custom components. In some cases the off-the-shelf components do not possess all of the features or performance characteristics that are needed to implement certain desired aspects of the to-be-deployed VR/AR/MR system. Some embodiments are directed to approaches for adding capabilities and/or repurposing resources to accommodate the desired features or performance characteristics of the to-be-deployed VR/AR/MR system. The accompanying figures and discussions herein present example environments, systems, methods, and computer program products for VR/AR/MR systems.

Overview

Figure 2A:
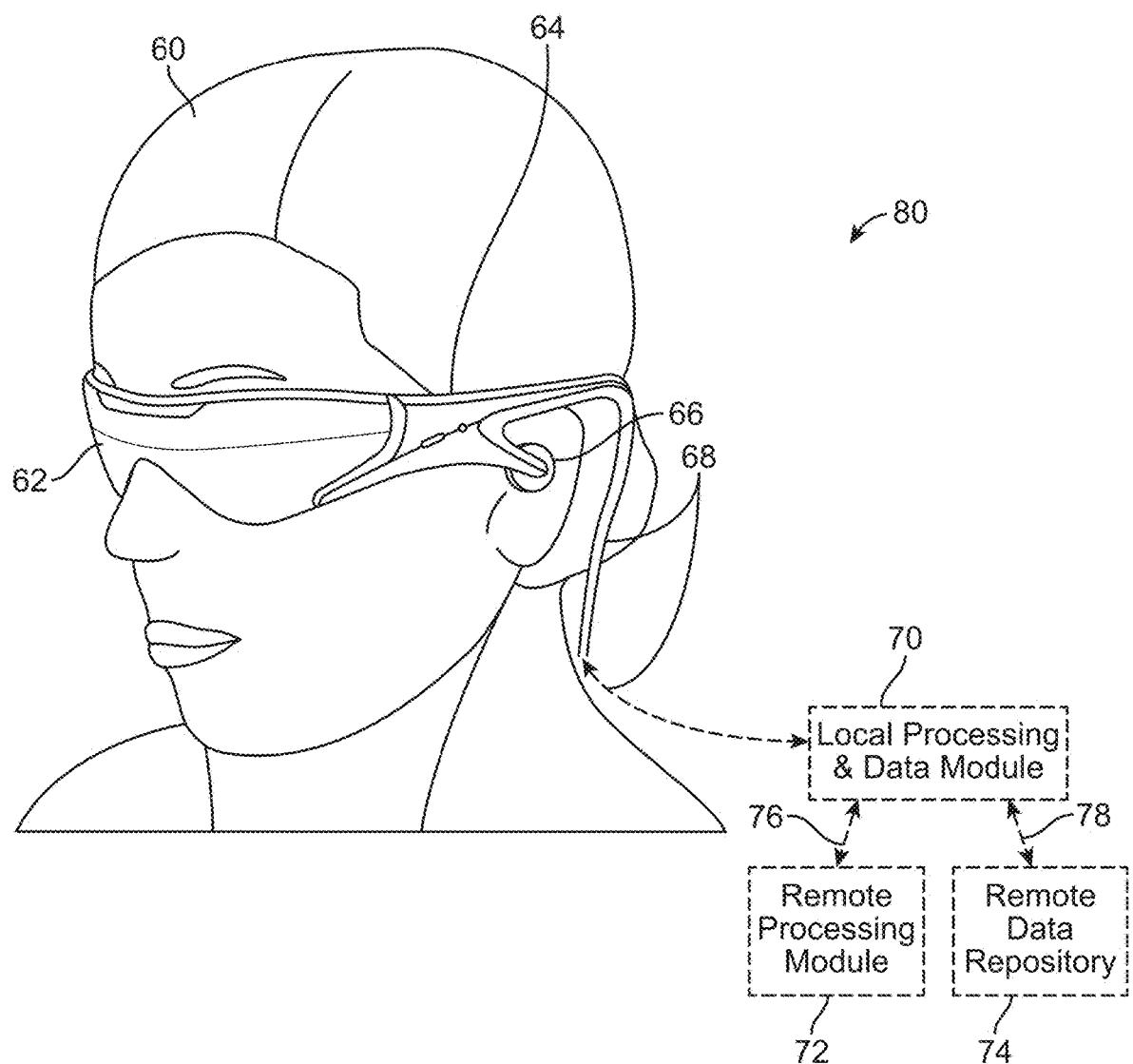
FIG. 2A illustrates an example of wearable display system.

Virtual reality ("VR"), augmented reality ("AR"), and mixed reality ("MR") systems disclosed herein can include a display which presents computer-generated imagery (video/image data) to a user. In some embodiments, the display systems are wearable, which may advantageously provide a more immersive VR/AR/MR experience. FIG. 2A illustrates an example of wearable VR/AR/MR display system 80 (hereinafter referred to as "system 80"). The system 80 includes a display 62, and various mechanical and electronic modules and systems to support the functioning of that display 62. The display 62 may be coupled to a frame 64, which is wearable by a display system user or viewer 60 (hereinafter referred to as "user 60") and which is configured to position the display 62 in front of the eyes of the user 60. In some embodiments, a speaker 66 is coupled to the frame 64 and positioned adjacent the ear canal of the user 60. In some embodiments, another speaker, not shown, is positioned adjacent the other ear canal of the user 60 to provide for stereo/shapeable sound control. The display 62 is operatively coupled, such as by a wired or wireless connection 68, to a local processing and data module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration, etc.).

The local processing and data module 70 may include a processor, as well as digital memory, such as non-volatile memory (e.g., flash memory), both of which may be utilized to assist in the processing and storing of data. This includes data captured from sensors, such as image capture devices (e.g., cameras), microphones, inertial measurement units, accelerometers, compasses, GPS units, radio devices, antenna arrays, depth sensors, and/or gyros. The sensors may be operatively coupled to the frame 64 or otherwise attached to the user 60. Alternatively, or additionally, sensor data may be acquired and/or processed using a remote processing module 72 and/or a remote data repository 74, possibly for passage to the display 62 after such processing or retrieval. The local processing and data module 70 may be operatively coupled by communication links (76, 78), such as via a wired or wireless communication links, to the remote processing module 72 and remote data repository 74 such that these remote modules (72, 74) are operatively coupled to each other and available as resources to the local processing and data module 70.

In some embodiments, the remote processing module 72 may include one or more processors configured to analyze and process data (e.g., sensor data and/or image information). In some embodiments, the remote data repository 74 may include a digital data storage facility, which may be available through the internet or other networking configuration in a "cloud" resource configuration. In some embodiments, all data is stored and all computations are performed in the local processing and data module, allowing fully autonomous use from a remote module.

In some embodiments, the computer-generated image data provided via the display 62 can create the impression of being three-dimensional. This can be done, for example, by presenting stereoscopic image data to the user 60. In some conventional systems, such image data can include separate images of a scene or object from slightly different perspectives. The separate images can be presented to the right eye and left eye of the user 60, respectively, thus simulating binocular vision and its associated depth perception.

Figure 2B:
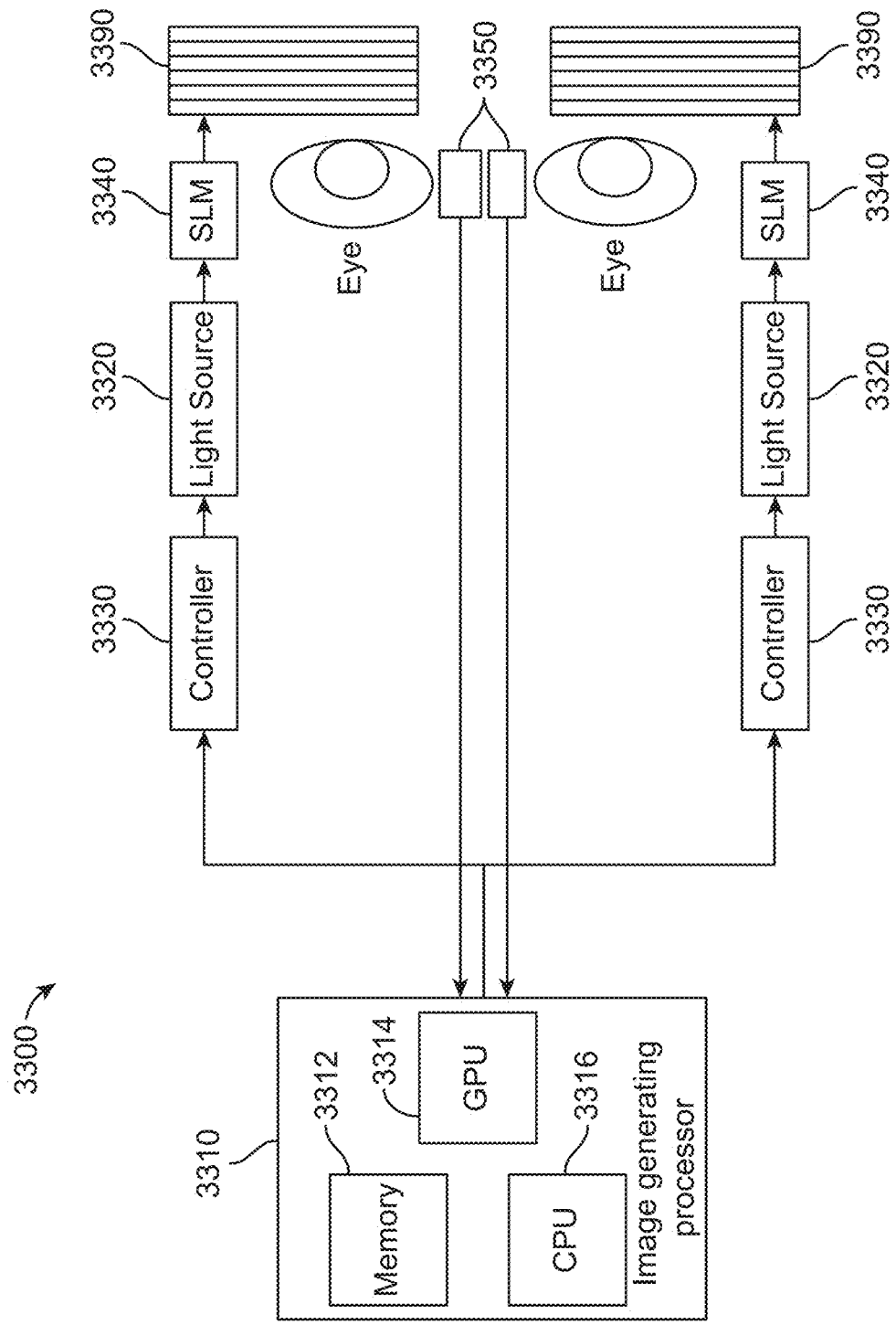
FIG. 2B is a block diagram depicting an AR/MR system, according to one embodiment.

Referring now to FIG. 2B, an exemplary embodiment of an AR or MR system 3300 (hereinafter referred to as "system 3300") is illustrated. The system 3300 uses stacked light guiding optical element (hereinafter referred to as ""LOEs 3390"). The system 3300 generally includes an image generating processor 3310, a light source 3320, a controller 3330, a spatial light modulator ("SLM") 3340, and at least one set of stacked LOEs 3390 that functions as a multiple plane focus system. The system 3300 may also include an eye-tracking subsystem 3350. It should be appreciated that other embodiments may have multiple sets of stacked LOEs 3390.

The image generating processor 3310 is configured to generate virtual content to be displayed to the user. The image generating processor 3310 may convert an image or video associated with the virtual content to a format that can be projected to the user in 3D. For example, in generating 3D content, the virtual content may need to be formatted such that portions of a particular image are displayed at a particular depth plane while others are displayed at other depth planes. In one embodiment, all of the image may be generated at a particular depth plane. In another embodiment, the image generating processor 3310 may be programmed to provide slightly different images to the right and left eyes such that when viewed together, the virtual content appears coherent and comfortable to the user's eyes.

The image generating processor 3310 may further include a memory 3312, a GPU 3314, a CPU 3316, and other circuitry for image generation and processing. The image generating processor 3310 may be programmed with the desired virtual content to be presented to the user of the system 3300. It should be appreciated that in some embodiments, the image generating processor 3310 may be housed in the system 3300. In other embodiments, the image generating processor 3310 and other circuitry may be housed in a belt pack that is coupled to the system 3300.

The image generating processor 3310 is operatively coupled to the light source 3320 which projects light associated with the desired virtual content and one or more spatial light modulators 3340. The light source 3320 is compact and has high resolution. The light source 3320 is operatively coupled to a controller 3330. The light source 3320 may be include color specific LEDs and lasers disposed in various geometric configurations. Alternatively, the light source 3320 may include LEDs or lasers of like color, each one linked to a specific region of the field of view of the display. In another embodiment, the light source 3320 may include a broad-area emitter such as an incandescent or fluorescent lamp with a mask overlay for segmentation of emission areas and positions. Although the light source 3320 is directly connected to the system 3300 in FIG. 2B, the light source 3320 may be connected to the system 3300 via optical fibers (not shown). The system 3300 may also include condenser (not shown) configured to collimate the light from the light source 3320.

The SLM 3340 may be reflective (e.g., an LCOS, an FLCOS, a DLP DMD, or a MEMS mirror system), transmissive (e.g., an LCD) or emissive (e.g. an FSD or an OLED) in various exemplary embodiments. The type of SLM 3340 (e.g., speed, size, etc.) can be selected to improve the creation of the 3D perception. While DLP DMDs operating at higher refresh rates may be easily incorporated into stationary systems 3300, wearable systems 3300 may use DLPs of smaller size and power. The power of the DLP changes how 3D depth planes/focal planes are created. The image generating processor 3310 is operatively coupled to the SLM 3340, which encodes the light from the light source 3320 with the desired virtual content. Light from the light source 3320 may be encoded with the image information when it reflects off of, emits from, or passes through the SLM 3340.

Light from the SLM 3340 is directed to the LOEs 3390 such that light beams encoded with image data for one depth plane and/or color by the SLM 3340 are effectively propagated along a single LOE 3390 for delivery to an eye of a user. Each LOE 3390 is configured to project an image or sub-image that appears to originate from a desired depth plane or FOV angular position onto a user's retina. The light source 3320 and LOEs 3390 can therefore selectively project images (synchronously encoded by the SLM 3340 under the control of controller 3330) that appear to originate from various depth planes or positions in space. By sequentially projecting images using each of the light source 3320 and LOEs 3390 at a sufficiently high frame rate (e.g., 360 Hz for six depth planes at an effective full-volume frame rate of 60 Hz), the system 3300 can generate a 3D image of virtual objects at various depth planes that appear to exist simultaneously in the 3D image.

The controller 3330 is in communication with and operatively coupled to the image generating processor 3310, the light source 3320 and the SLM 3340 to coordinate the synchronous display of images by instructing the SLM 3340 to encode the light beams from the light source 3320 with appropriate image information from the image generating processor 3310.

The system 3300 also includes an optional eye-tracking subsystem 3350 that is configured to track the user's eyes and determine the user's focus. In one embodiment, the system 3300 is configured to illuminate a subset of LOEs 3390, based on input from the eye-tracking subsystem 3350 such that the image is generated at a desired depth plane that coincides with the user's focus/accommodation. For example, if the user's eyes are parallel to each other, the system 3300 may illuminate the LOE 3390 that is configured to deliver collimated light to the user's eyes, such that the image appears to originate from optical infinity. In another example, if the eye-tracking subsystem 3350 determines that the user's focus is at 1 meter away, the LOE 3390 that is configured to focus approximately within that range may be illuminated instead.

Figure 2C:
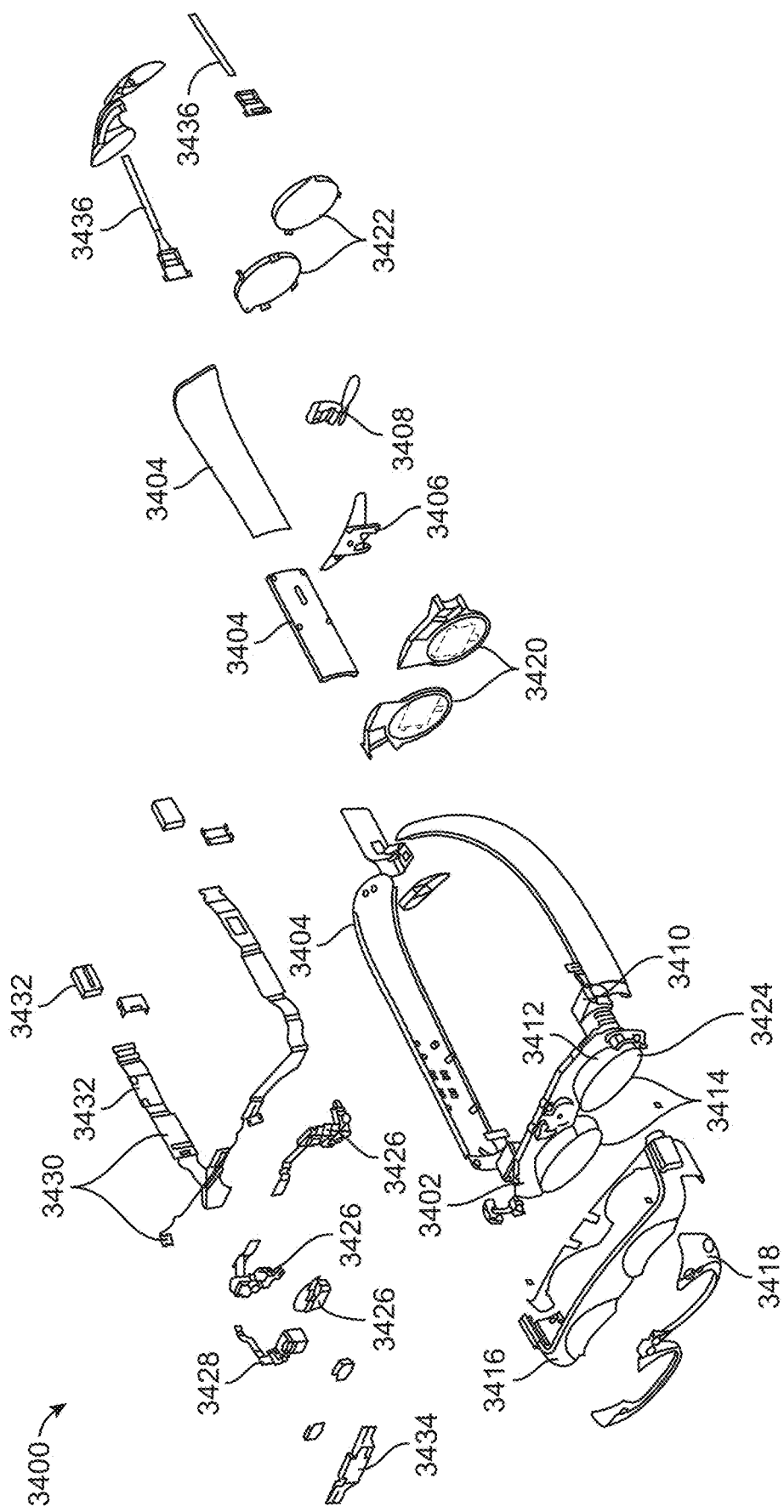
FIG. 2C is an exploded perspective view of an AR/MR head mounted display, according to one embodiment.

FIG. 2C depicts a mixed reality head mounted display 3400 according to one embodiment. The mixed reality head mounted display 3400 may form a part of a mixed reality system (e.g., the AR or MR systems depicted in FIGS. 2A and 2B). The mixed reality head mounted display 3400 includes a frame 3402 to which other components are secured, resulting in a form factor similar to a pair of glasses or goggles. The display 3400 also includes temple arms/pads 3404, forehead spacer 3406 and nose piece 3408, which are all function with the frame 3402 to comfortably maintain the display 3400 on the user's head. The frame 3402, temple arms/pads 3404, forehead spacer 3406 and nose piece 3408 are all modular and available in a variety of sizes such that the overall form factor of the display 3400 can be modified to conform to a user's had size and shape.

For instance, certain users may have longer and narrower heads while other users may have shorter and wider heads. For the former users, the temple arms/pads 3404 may taper more gently toward the user's head to accommodate the longer and narrower heads. For the latter users, the temple arms/pads 3404 may taper more sharply toward the user's head to accommodate the shorter and wider heads. Similarly, there may be a plurality (e.g., three) of forehead spacers 3406 and nose pieces 3408 to optimize the fit of the display 3400 on the user's head. The temple arms/pads 3404, forehead spacer 3406 and nose piece 3408 may include a controllable/malleable alloy inside of a silicone over mold to facilitate minor fit adjustments. The temple arms/pads 3404 may include a plastic padding with a silicone inside surface for comfortable contact with the side of the user's head.

The frame 3402 can also come in a variety of sizes to accommodate various user's heads. The frame 3402 may be made from aluminum, which facilitates various surface treatments to individualize the display 3400. Exemplary surface treatments include, but are not limited to, anodization, colorization, painting and printing. Using surface treatments, a display 3400 can be customized to suit a user's taste and aesthetic.

The display 3400 also includes a pair of projectors/SLMs 3410 to display light encoded with image data to the user. The display 3400 further includes a pair of optical assemblies 3412 to guide the light from respective projectors/SLMs 3410 to the user's eyes. Examples of projectors/SLM's 3410 and optical assemblies 3412 have been described above. Moreover, the display 3400 includes a pair of external lenses 3414, which may be cosmetic, tinted and/or impact resistant. From a cosmetic perspective, the external lenses 3414 can obscure the system components behind the external lenses 3414 for a cleaner look to the display 3400. As for tint, the external lenses 3414 may have a 50% to 70% transparency to optimize an AR experience involving light from both virtual objects and real-world physical objects.

The display 3400 also includes a front band 3416 and a sensor cover 3418 to protect the system components while forming a contiguous front of the display 3400 around the external lenses 3414. The display 3400 further includes a pair of inner covers 3422 protect the system components while forming a protective inner surface for the display 3400 adjacent the user's face. Moreover, the display 3400 may include one or more optional prescription lenses 3422 to accommodate users requiring corrective lenses.

The display 3400 includes a series of sensors disposed adjacent the frame 3402. A pair of eye tracking cameras 3424 are disposed adjacent the exterior lenses 3414. Three front facing cameras 3426 are disposed adjacent the top of the frame 3402. An inertial measurement unit ("IMU") 3428 is also disposed adjacent the top of the frame 3402. The IMU 3428 may include one or more accelerometers, gyroscopes, and magnetometers. The IMU 3428 may measure force, angular change, and/or magnetic field change in six degrees of freedom. A pair of microphones 3430 are disposed adjacent the temple arms/pads 3404.

The display 3400 also includes a pair of speakers 3432 disposed adjacent the temple arms/pads 3404. Exemplary speakers are described in U.S. Provisional Patent Application Ser. No. 62/369,561, the contents of which are hereby expressly and fully incorporated by reference in their entirety, as though set forth in full. As described in U.S. Provisional Patent Application Ser. No. 62/369,561, the speakers 3432 may be modular so that they can be replaced and/or modified to suit the user's preference. Further, the location of the speakers 3432 adjacent the temple arms/pads 3404 allows the display 3400 to be used with closed headphones (not shown) instead of or in addition to the speakers 3432.

The display 3400 further includes a center printed circuit board 3434 disposed adjacent the center of the front of the frame 3402. Moreover, the display 3400 includes a pair of cables 3436 to facilitate communication with a mobile computing support system (see FIG. 2D) the processor(s) contained therein. The cables 3436 can also deliver electrical power from the mobile computing support system to the display 3400. The cables 3436 can include integrated light sources (e.g., small LEDs or fiber optics) that enable the cables 3436 to emit light or glow in various colors and/or patterns to signify certain functions of the AR or MR system such as transmission of data, transmission of power and/or display of an AR experience.

Figure 2D:
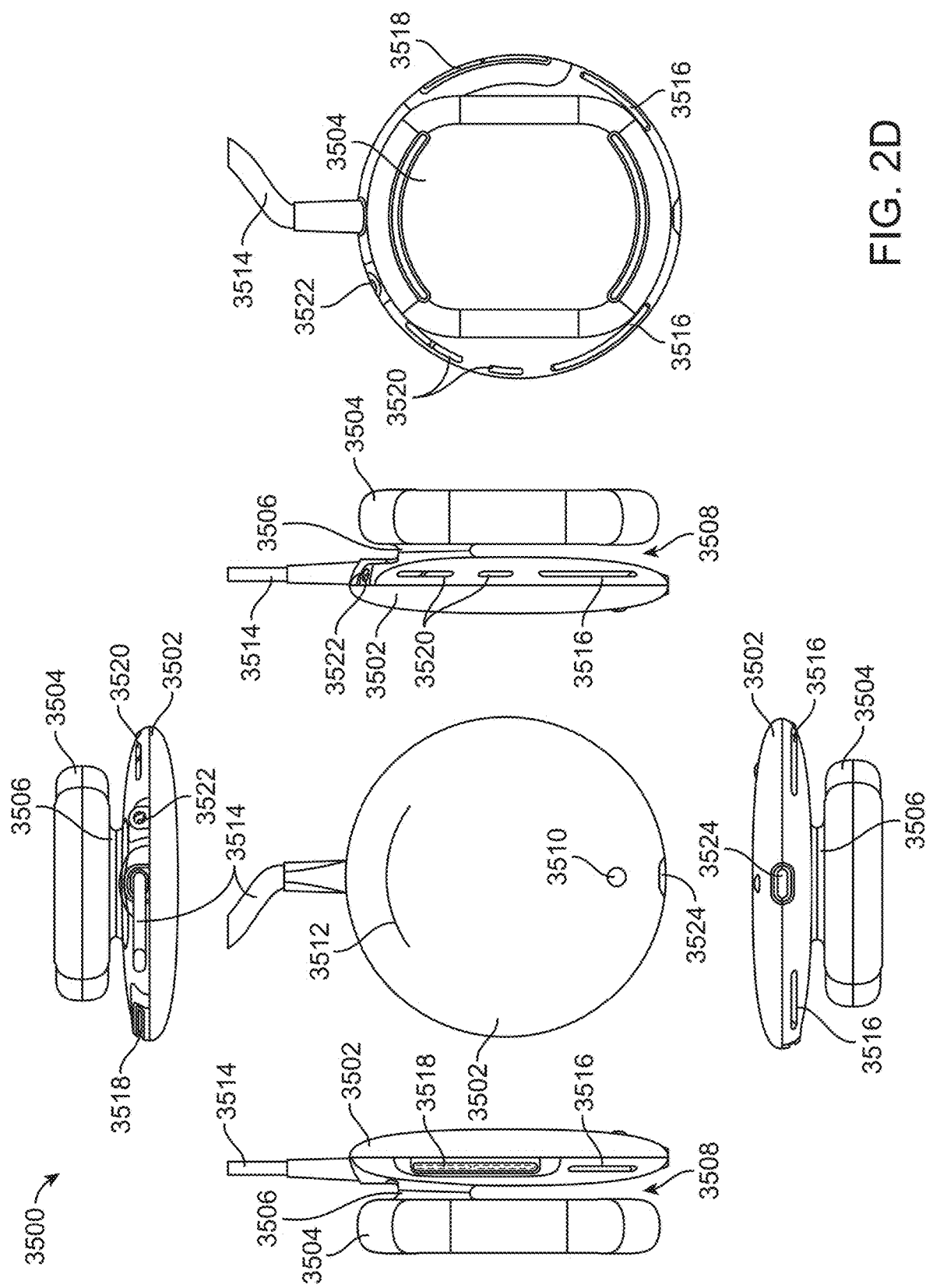
FIG. 2D includes various views of a mobile computing support system, according to one embodiment.

FIG. 2D depicts a mobile computing support system 3500 according to one embodiment. The mobile computing support system 3500 may form a part of a mixed reality system (e.g., the AR or MR systems depicted in FIG. 2A). For instance, in one embodiment, the mobile computing support system 3500 may be operatively coupled to the mixed reality head mounted display 3400 depicted in FIG. 2C. The mobile computing support system 3500 includes a circular portion 3502 connected to an obround (i.e., "pill shaped") portion 3504 by a connector 3506. The circular portion 3502 may house computing components such as processors. The obround portion 3504 houses a battery that powers the mobile computing support system 3500 and, in some embodiments, the entire mixed reality system, including the mixed reality head mounted display 3400. As such, the battery and the obround portion 3504 may generate a substantial amount of heat.

The connector 3506 separates the circular portion 3502 from the obround portion 3504 creating a space 3508 there between. The space 3508 thermally insulates the circular portion 3502 from the obround portion 3504. The space 3508 is also configured such that the mobile computing support system 3500 can be movably secured to a pocket on clothing (e.g., a hip pocket on a pair of pants) by inserting the obround portion 3504 into the pocket and leaving the circular portion 3502 outside of the pocket, thereby securing the fabric forming the pocket in the space 3508. Alternatively, the mobile computing support system 3500 can be worn around a user's neck on a lanyard.

The mobile computing support system 3500 includes a power button 3510 and an LED light 3512 disposed on a front surface of the disk portion 3502 thereof. The mobile computing support system 3500 also includes a data cable 3514 extending from a top surface of the disk portion 3502 thereof. In one embodiment, the data cable 3514 splits into two, forming the pair of cables 3436 attached to the mixed reality head mounted display 3400 depicted in FIG. 2C. As such, the data cable 3514 may emit light or glow in various colors and/or patterns to signify certain functions of the AR or MR system such as transmission of data, transmission of power and/or display of an AR experience. The shape of the circular portion 3502 facilitates storage of the data cable 3514 by wrapping the data cable 3514 around the circumference of the circular portion 3502. This can be further facilitated by the inclusion of a groove (not shown) around the circumference of the circular portion 3502.

The mobile computing support system 3500 also includes two air inlets 3516 and an air exhaust 3518 disposed on a left (air inlet 3516 and air exhaust 3518) and right (air inlet 3516) surfaces of the disk portion 3502 thereof. The mobile computing support system 3500 further includes control buttons 3520 (e.g., mute, volume up and volume down) disposed on a left surface of the disk portion 3502 thereof. Moreover, the mobile computing support system 3500 includes a headphone jack 3522 disposed on a left surface of the disk portion 3502 thereof. This jack 3522 facilitates connecting headphones to the AR or MR system that may be used with speakers 3432 on the mixed reality head mounted display 3400. In addition, the mobile computing support system 3500 includes a port 3524 disposed on a bottom surface thereof. In one embodiment, the port 3524 is a USB port for transmitting data and power.

Figure 2E:
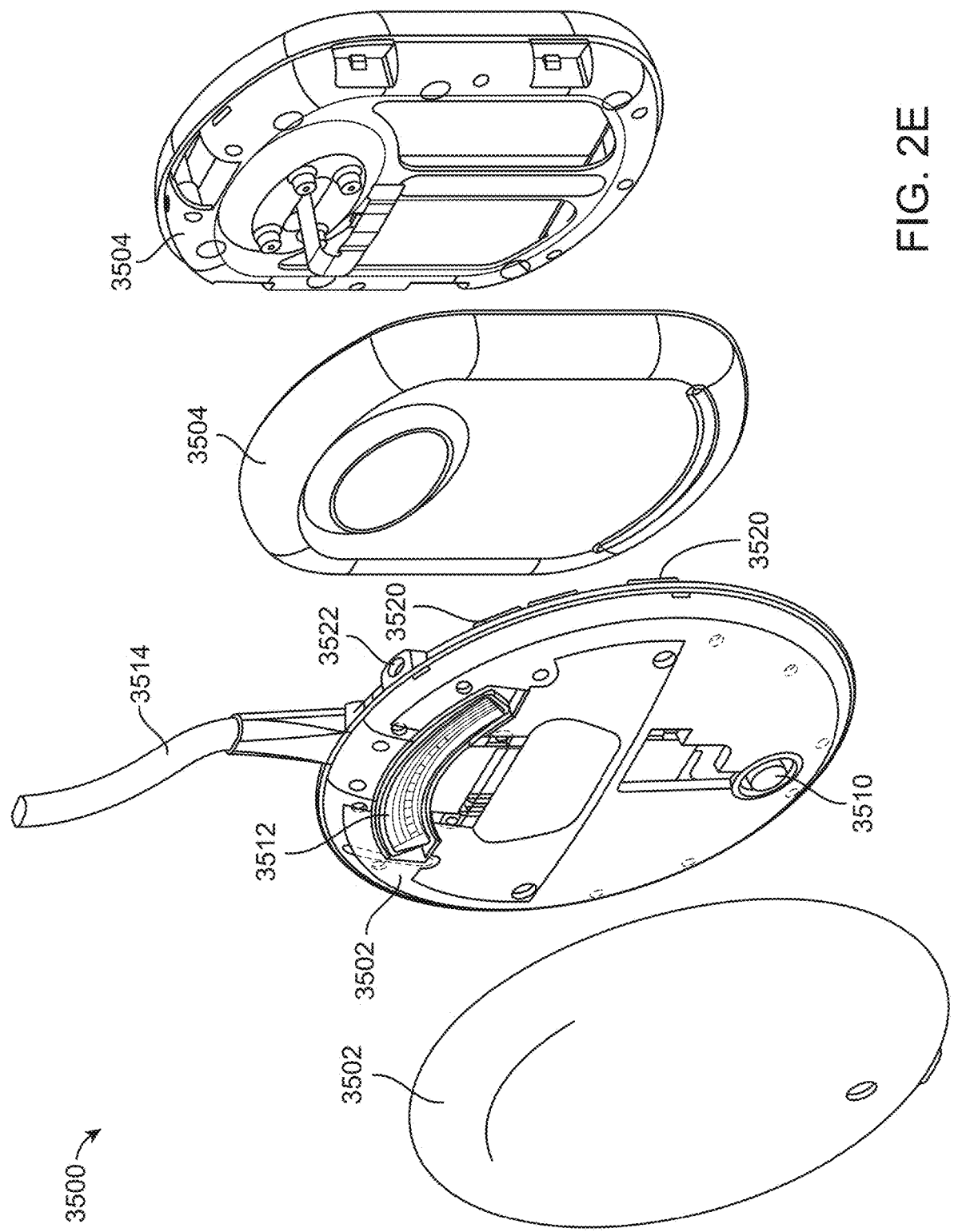
FIG. 2E is an exploded perspective view of the mobile computing support system depicted in FIG. 2D.

FIG. 2D depicts the mobile computing support system 3500 depicted in FIG. 2C in an exploded view. FIG. 2E shows that each of the circular portion 3502 and the obround portion 3504 include front facing cosmetic covers. The power button 3510 extends through the cosmetic cover of the circular portion 3502. The LED light 3512 is visible through the cosmetic cover of the circular portion 3502.

FIG. 2F depicts a totem controller 3600 according to one embodiment. The totem controller 3600 may form a part of a mixed reality system (e.g., the AR or MR systems depicted in FIGS. 2A and 2B). For instance, in one embodiment, the totem controller 3600 may be operatively coupled to the mixed reality head mounted display 3400 and the mobile computing support system 3500 depicted in FIGS. 2C to 2E. The totem controller 3600 includes a circular touchpad 3602, disposed on a top surface thereof and configured for manipulation by a user's thumb. The circular touchpad 3602 may be a capacitive touchpad, configured to record motion in the X and Y axes and a downward press of the touchpad 3602. The circular touchpad 3602 can include a polymer coating such that it is soft to the touch. The totem controller 3600 also includes various other control surfaces 3604 (e.g., buttons, triggers, etc.). The circular touchpad 3602 and control surfaces 3604 allow a user to interact with a variety of programs, including AR experiences, productivity applications and gaming applications. The totem controller 3600 may also include IMUs and LED lights (e.g., around the circular touchpad 3602).

In some embodiments, the mixed reality head mounted display 3400, the mobile computing support system 3500, and the totem controller 3600 depicted in FIGS. 2C to 2F form a mixed reality system for users to experience and interact with a mixed reality experience. In one such embodiment, the mixed reality head mounted display 3400, the mobile computing support system 3500, the totem controller 3600 and the cables connecting these components all include LED lights (e.g., 12 LED lights in RGB in the totem controller 3600) that are synchronized in terms of color, timing, and pattern to indicate various states of the mixed reality system and functions performed by the mixed reality system. Examples of states and functions that may be indicated by LED lights include notifications, calibration and power status.

While exemplary mixed reality systems have been described including the mixed reality head mounted display 3400, the mobile computing support system 3500, and the totem controller 3600 depicted in FIGS. 2C to 2F, other mixed reality systems may include fewer, more, different system components. For example, in one embodiment, when a user wearing a mixed reality system having a mixed reality head mounted display 3400 and, a mobile computing support system 3500, and a totem controller 3600 walks into a room including a compatible server or base station (not shown), the mixed reality system may automatically or upon user input connect to the server or base station such that it is added as a component of the mixed reality system.

In other embodiments, when a user wearing a mixed reality system having a mixed reality head mounted display 3400 and, a mobile computing support system 3500, and a totem controller 3600 walks into a room including a compatible server or base station (not shown), the mixed reality system may automatically or upon user input disconnect from and power down the mobile computing support system 3500, and connect to the server or base station. In such an embodiment, the server or base station replaces the mobile computing support system 3500 to conserve its power. In those embodiments, the mixed reality head mounted display 3400 and totem controller 3600 have individual power sources or cables that allow them to draw power from the server or base station.

In still other embodiments, a keyboard may be connected to the mixed reality head mounted display 3400, replacing both the mobile computing support system 3500 and the totem controller 3600. These and other system configurations are included within the scope of this disclosure.

Figure 2G:
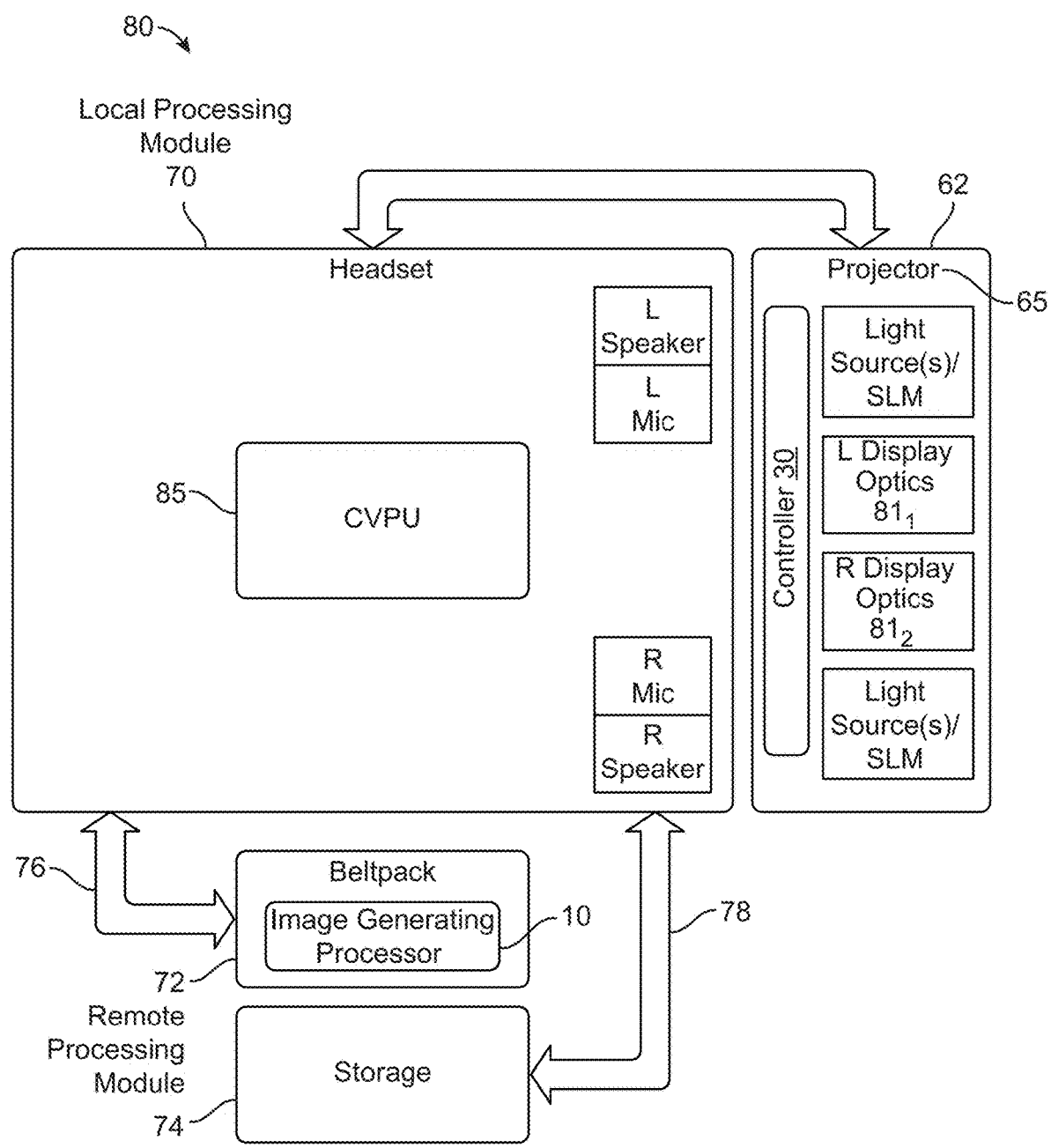
FIG. 2G is a VR/AR/MR system block diagram including distally-located components to implement a VR/AR/MR system, according to one embodiment.

FIG. 2G is a VR/AR/MR system 80 block diagram (e.g., for a system 80 similar to the one depicted in FIG. 2A) including distally-located components to implement a VR/AR/MR system. As an option, one or more variations of VR/AR/MR system 80 or any aspect thereof may be implemented in the context of the architecture and functionality of the embodiments described herein. The VR/AR/MR system 80 or any aspect thereof may be implemented in any environment.

The embodiment shown in FIG. 2G is merely one example. As shown, the VR/AR/MR system 80 block diagram depicts a specific implementation of a local processing module 70 in the form of an HMD or headset (as shown) that includes a built-in perception processor or Computer Vision processor ("CVPU") 85, a specific implementation of a remote processing module 72 in the form of a beltpack, and a specific implementation of a remote data repository 74 in the form of storage that is accessible over a path 78. The "CVPU" may be referred to as a "perception processor," and vice versa. Additionally a display system 62 includes a projector 65, which in turn might include light sources (e.g., LED/Laser modules), or spatial light modulators (SLM) (e.g., liquid crystal on silicon (LCOS) modules), and display optics (e.g., left display optics $81_1$ and right display optics $81_2$). Exemplary light sources include LEDs and laser modules (e.g., laser diode or "LD" modules).

The VR/AR/MR system 80 generally includes a beltpack (as shown), which in turn may include an image generating processor 10, a headset (as shown), and an eyepiece which in turn may include a projector 65.

The image generating processor 10 or any other constituent component of the beltpack is configured to generate virtual content to be displayed to the user. The image generating processor 10 may convert an image or video associated with the virtual content to a format that can be projected (e.g. using components of the projector 65) to the user in 3D. For example, in generating 3D content, the virtual content may need to be formatted such that portions of a particular image are displayed at a particular depth plane while others are displayed at other depth planes. In one embodiment, all of the image may be generated at a particular depth plane. In another embodiment, the image generating processor may be programmed to provide slightly different images to the right and left eyes such that when viewed together, the virtual content appears coherent and comfortable to the user's eyes.

The image generating processor 10 may further include a memory, a GPU, a CPU, and other circuitry for image generation and processing. In some cases, the GPU and CPU are embodied as a single chip (e.g., an off-the-shelf chip, or a custom system-on-chip (SOC) implementation). In other cases the GPU processor is split between the Beltpack and the perception processor/CVPU. The image generating processor 10 may be programmed with the desired virtual content to be presented to the user of the VR/AR/MR system 80. It should be appreciated that in some embodiments, the image generating processor 10 may be housed in a wearable component of the VR/AR/MR system 80 in a form other than a beltpack. In some embodiments, the image generating processor 10 and other circuitry are cable-connected or wirelessly-connected or coupled to the headset.

Light sources within the projector 65 can be formed of LED, laser components or SLM/LCOS components. The light sources may include color specific LEDs and/or lasers disposed in various geometric configurations. Alternatively, the light sources may include LEDs or lasers of like color, each one linked to a specific region of the field of view of the display. In another embodiment, the light sources may include a broad-area emitter such as an incandescent or fluorescent lamp with a mask overlay for segmentation of emission areas and positions. The light source may be connected to system via optical fibers. The system may also include light condensers (not shown) configured to collimate the light from a light source.

The controller 30 is in communication with and operatively coupled to the image generating processor 10, and the light sources within the projector 65 so as to coordinate the synchronous display of images by instructing the light sources to project appropriate image information from the image generating processor 10. In some cases, the VR/AR/MR system 80 also includes the aforementioned eye-tracking subsystem that is configured to track the user's eyes and determine the user's focus.

Referring now to the shown headset, a headset may include a CVPU 85 that is configured to interface to various transducers. For example, a CVPU 85 can receive audio or speech signals from a microphone or from a dedicated sound or speech processor. Further a CVPU 85 can produce audio or speech signals through the shown speakers (or earbuds). In some cases, a CVPU 85 is interfaced with the aforementioned eye-tracking subsystem and/or a CVPU 85 is interfaced with one or more accelerometers and or other forms of inertial measurement devices so as to track the users head and/or body movements. The CVPU 85 can combine simultaneously received transducer inputs to formulate an assessment of the user's pose (e.g., head pose, eye pose, torso pose, etc.). The CVPU 85 can combine simultaneously received transducer inputs to formulate an assessment of the user's pose that includes time-wise predictions as to changing characteristics of the user's pose (e.g., turning, standing-up, walking, running, hand signaling, etc.). The CVPU 85 is further able to perform (1) graphic/image processing, (2) speech processing (e.g., phoneme or word detection), (3) communications (e.g., signaling and/or packet-based communication, etc.), as well as (4) general computing such as calculating values based on given or measured inputs.

The headset can be implemented using various partitioning of constituent components. One such partitioning is given in the following figure that includes data flows between several of the constituent components.

Figure 2H:
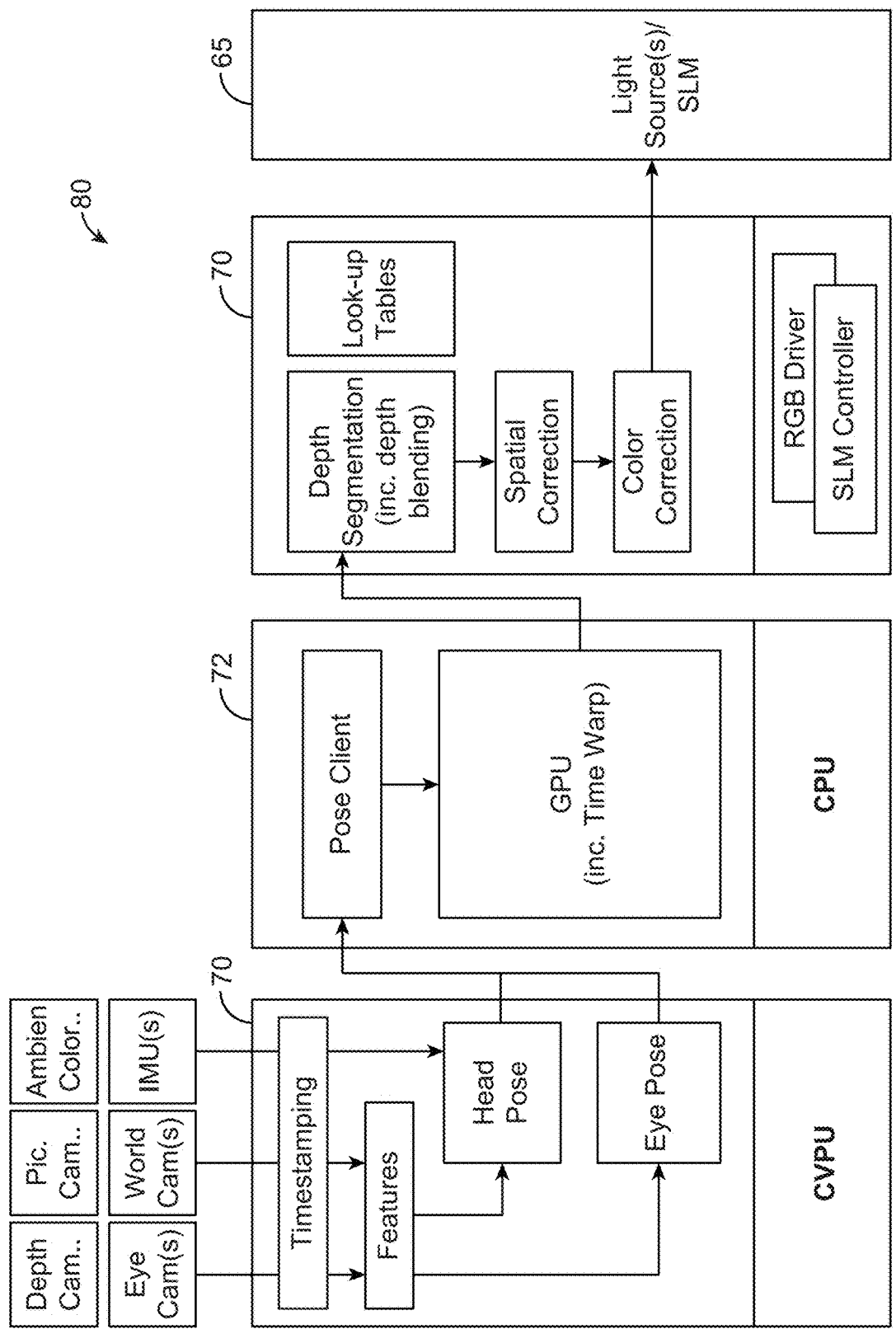
FIG. 2H depicts an arrangement of components used to implement a VR/AR/MR system, according to one embodiment.

FIG. 2H depicts an arrangement of components used to implement a headset in a VR/AR/MR system 80. As an option, one or more variations of the arrangement, or components, or any aspect thereof may be implemented in the context of the architecture and functionality of the embodiments described herein.

The embodiment shown in FIG. 2H is merely one example. As shown, the arrangement of components supports a data flow that includes sense data (e.g., from an accelerometer) that originates from a local processing module, and then is delivered to a remote processing module. After processing using a CPU and/or GPU of a remote processing module, VR/AR/MR data such as image information, including depth and other spatial information is delivered to constituent components of the local processing module for display to the user, possibly using a projector (e.g., the shown projector). The shown flow is further discussed herein as well as certain alternative flows and component arrangements that serve purposes pertaining to lowering power consumption, lowering latency, lowering communication overhead and so on.

Figure 3:
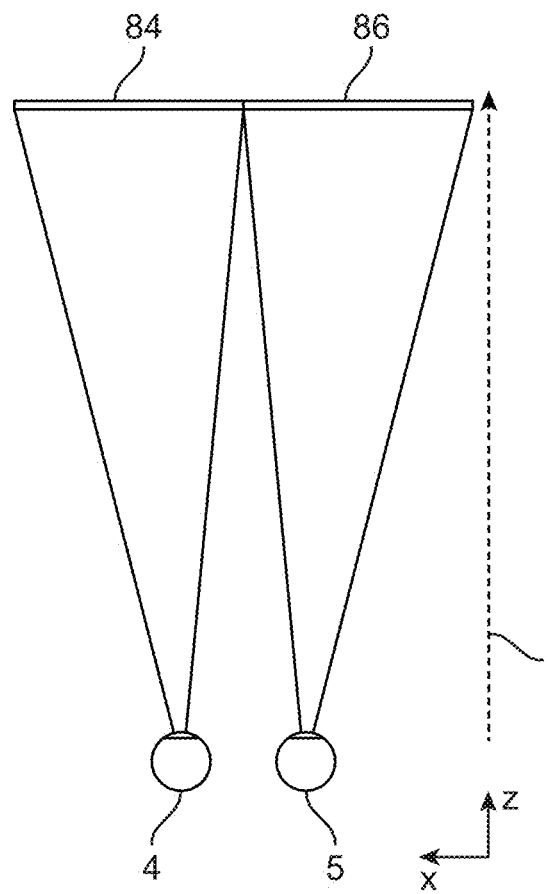
FIG. 3 illustrates a conventional display system for simulating three-dimensional imagery for a user.

FIG. 3 illustrates a conventional display system for simulating three-dimensional image data to a user (e.g., the user 60). Two distinct images 84 and 86, one for each eye 4 and 5, are outputted to the user. The images 84 and 86 are spaced from the eyes 4 and 5 by a distance 12 along an optical or z-axis parallel to the line of sight of the user 60. The images 84 and 86 are flat and the eyes 4 and 5 may focus on the images by assuming a single accommodated state. Such systems rely on the human visual system to combine the images 84 and 86 to provide a perception of depth for the combined image.

It will be appreciated, however, that the human visual system is more complicated and providing a realistic perception of depth is more challenging. For example, many users of conventional 3D display systems find such systems to be uncomfortable or may not perceive a sense of depth at all. Without being limited by theory, it is believed that users viewing an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. As noted herein, many stereoscopic display systems display a scene using slightly different presentations (and, so, slightly different images) to each eye such that a three-dimensional perspective is perceived by the human visual system. Such systems are uncomfortable for many users since they simply provide different presentations of a scene but with the eyes viewing all the image information at a single accommodated state, and thus work against the accommodation-vergence reflex. Systems that provide a better match between accommodation and vergence may form more realistic and comfortable simulations of three-dimensional image data.

For example, light field video data can be presented to the user to simulate a three-dimensional view. Light field video data can mimic the rays of light which enter the eyes of the user 60 in a real-world environment. For example, when displaying light field video data, light rays from objects that are simulated to be perceived at a distance are made to be more collimated when entering the eyes of the user, while light rays from objects that are simulated to be perceived nearby are made to be more divergent. Thus, the angles at which light rays from objects in a scene enter the eyes of the user are dependent upon the simulated distance of those objects from the viewer. Light field video data in a VR/AR/MR system can include multiple images of a scene or object from different depth planes. The images may be different for each depth plane (e.g., one depth plane may include imagery corresponding to the foreground of a scene, while another depth plane includes imagery corresponding to the background of the scene) and may be separately focused by the viewer's eyes, thereby helping to provide the user with a comfortable perception of depth.

When these multiple depth plane images are presented to the viewer simultaneously or in quick succession, the result is interpreted by the viewer as three-dimensional imagery. When the viewer experiences this type of light field video data, the eyes accommodate to focus the different depth planes in much the same way as they would do when experiencing a real-world scene. These focal cues can provide for a more realistic simulated three-dimensional environment.

In some configurations, at each depth plane, a full color image may be formed by overlaying component images that each have a particular component color. For example, red, green, and blue images may each be separately outputted to form each full color depth plane image. As a result, each depth plane may have multiple component color images associated with it.

Figure 4:
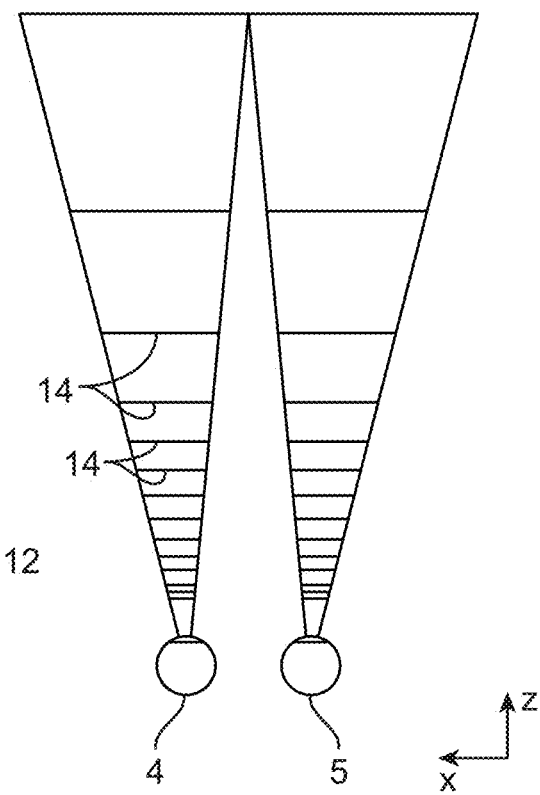
FIG. 4 illustrates aspects of an approach for simulating three-dimensional imagery using multiple depth planes.

FIG. 4 illustrates aspects of an approach for simulating three-dimensional imagery using multiple depth planes. Objects at various distances from eyes 4 and 5 on the z-axis are accommodated by the eyes (4, 5) so that those objects are in focus. The eyes 4 and 5 assume particular accommodated states to bring into focus objects at different distances along the z-axis. Consequently, a particular accommodated state may be said to be associated with a particular one of depth planes 14, such that objects or parts of objects in a particular depth plane are in focus when the eye is in the accommodated state for that depth plane. In some embodiments, three-dimensional image data may be simulated by providing different presentations of the image data for each of the eyes (4, 5), and also by providing different presentations of the image data corresponding to each of the depth planes.

Figure 5A:
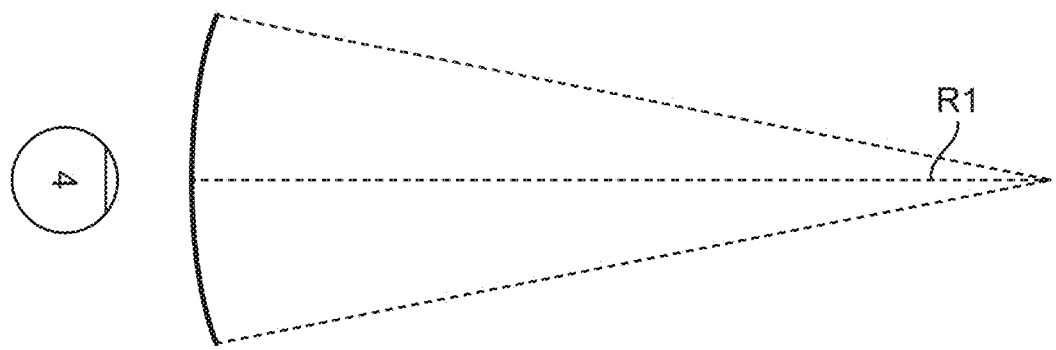
FIGS. 5A-5C illustrate relationships between radius of curvature and focal radius.
Figure 5B:
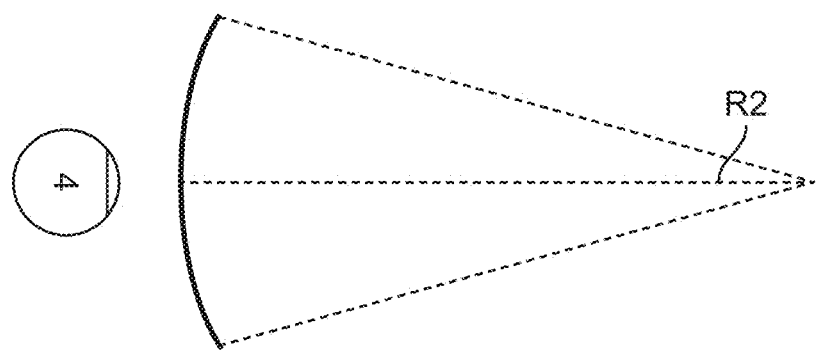
Figure 5C:
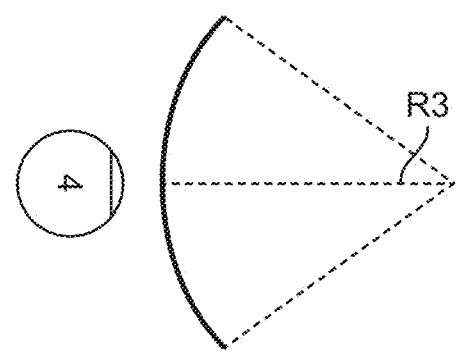

The distance between an object and the eye (4 or 5) can change the amount of divergence of light from that object, as viewed by that eye. FIGS. 5A-5C illustrate relationships between distance and the divergence of light rays. The distance between the object and the eye 4 is represented by, in order of decreasing distance, R1, R2, and R3. As shown in FIGS. 5A-5C, the light rays become more divergent as distance from the eye 4 to the object decreases. As distance from the eye 4 to the object increases, the light rays become more collimated. Stated another way, it may be said that the light field produced by a point (the object or a part of the object) has a spherical wavefront curvature, which is a function of how far away the point is from the eye 4 of the user. The curvature increases with decreasing distance between the object and the eye 4. Consequently, at different depth planes, the degree of divergence of light rays is also different, with the degree of divergence increasing with decreasing distance between depth planes and the eye 4. While only a single eye 4 is illustrated for clarity of illustration in FIGS. 5A-5C and other figures herein, it will be appreciated that the discussions regarding eye 4 may be applied to both eyes (4 and 6) of a viewer.

Without being limited by theory, it is believed that the human eye typically can interpret a finite number of depth planes to provide depth perception. Consequently, a highly believable simulation of perceived depth may be achieved by providing, to the eye, different presentations of image data corresponding to each of these limited number of depth planes.

Figure 6:
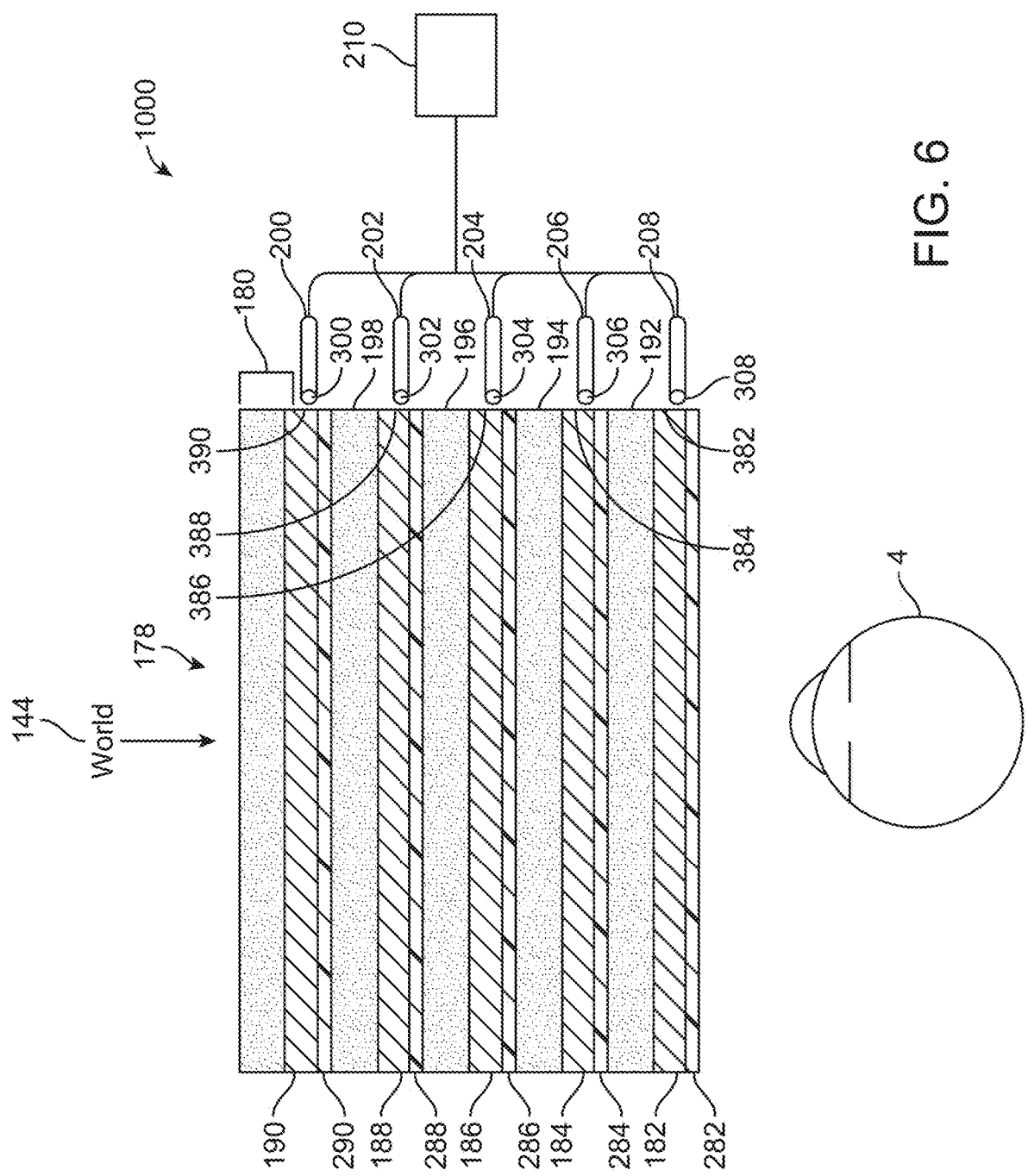
FIG. 6 illustrates an example of a waveguide stack for outputting image information to a user.

FIG. 6 illustrates an example of a waveguide stack for outputting image data to a user (e.g., the user 60). A display system 1000 includes a stack of waveguides, or stacked waveguide assembly 178, that may be utilized to provide three-dimensional perception to the eye/brain using one or more waveguides (182, 184, 186, 188, 190). In some embodiments, the display system 1000 is the system 80 of FIG. 2A, with FIG. 6 schematically showing some parts of the system 80 in greater detail. For example, the stacked waveguide assembly 178 may be integrated into the display 62 of FIG. 2A.

The stacked waveguide assembly 178 may also include one or more features (198, 196, 194, 192) between the waveguides. In some embodiments, the features (198, 196, 194, 192) may be lenses. The waveguides (182, 184, 186, 188, 190) and/or the lenses (198, 196, 194, 192) may be configured to send image data to the eye with various levels of wavefront curvature or light ray divergence. Each waveguide level may be associated with a particular depth plane and may be configured to output image data corresponding to that depth plane. Image injection devices (200, 202, 204, 206, 208) may be utilized to inject image data into the waveguides (182, 184, 186, 188, 190), each of which may be configured, as described herein, to distribute incoming light across each respective waveguide, for output toward the eye 4. Light exits an output surface (300, 302, 304, 306, 308) of the image injection devices (200, 202, 204, 206, 208) and is injected into a corresponding input edge (382, 384, 386, 388, 390) of the waveguides (182, 184, 186, 188, 190). In some embodiments, a single beam of light (e.g., a collimated beam) may be injected into each waveguide to output an entire field of cloned collimated beams that are directed toward the eye 4 at particular angles (and amounts of divergence) corresponding to the depth plane associated with a particular waveguide.

In some embodiments, the image injection devices (200, 202, 204, 206, 208) are discrete displays that each produce image data for injection into a corresponding waveguide (182, 184, 186, 188, 190, respectively). In some other embodiments, the image injection devices (200, 202, 204, 206, 208) are the output ends of a single multiplexed display which may pipe image data via one or more optical conduits (such as fiber optic cables) to each of the image injection devices (200, 202, 204, 206, 208).

A controller 210 controls the operation of the stacked waveguide assembly 178 and the image injection devices (200, 202, 204, 206, 208). In some embodiments, the controller 210 includes programming (e.g., instructions in a non-transitory computer-readable medium) that regulates the timing and provision of image data to the waveguides (182, 184, 186, 188, 190) according to any of the various schemes disclosed herein. In some embodiments, the controller 210 may be a single integral device, or a distributed system connected by wired or wireless communication channels. The controller 210 may be part of a processing module (e.g., the local processing and data module 70 and/or the remote processing module 72 of FIG. 2A) in some embodiments.

The waveguides (182, 184, 186, 188, 190) may be configured to propagate light within each respective waveguide by total internal reflection (TIR). The waveguides (182, 184, 186, 188, 190) may each be planar or curved, with major top and bottom surfaces and edges extending between those major top and bottom surfaces. In the illustrated configuration, the waveguides (182, 184, 186, 188, 190) may each include light redirecting elements (282, 284, 286, 288, 290) that are configured to redirect light, propagating within each respective waveguide, out of the waveguide to output image data to the eye 4. A beam of light is outputted by the waveguide at locations at which the light propagating in the waveguide strikes a light redirecting element. The light redirecting elements (282, 284, 286, 288, 290) may be reflective and/or diffractive optical features. While illustrated disposed at the bottom major surfaces of the waveguides (182, 184, 186, 188, 190) for ease of description and drawing clarity, in some embodiments, the light redirecting elements (282, 284, 286, 288, 290) may be disposed at the top and/or bottom major surfaces, and/or may be disposed directly in the volume of the waveguides (182, 184, 186, 188, 190). In some embodiments, the light redirecting elements (282, 284, 286, 288, 290) may be formed in a layer of material that is attached to a transparent substrate to form the waveguides (182, 184, 186, 188, 190). In some other embodiments, the waveguides (182, 184, 186, 188, 190) may be a monolithic piece of material and the light redirecting elements (282, 284, 286, 288, 290) may be formed on a surface and/or in the interior of that piece of material.

As discussed herein, each waveguide (182, 184, 186, 188, 190) is configured to output light to form an image corresponding to a particular depth plane. For example, the waveguide 182 nearest the eye 4 may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4. The first lens 192 may be configured to create a slight convex wavefront curvature so that the eye/brain interprets light coming from that next waveguide up 184 as coming from a first focal plane closer inward toward the eye 4 from optical infinity. Similarly, the third waveguide up 186 passes its output light through both the first lens 192 and second lens 194 before reaching the eye 4; the combined optical power of the first lens 192 and second lens 194 may be configured to create another incremental amount of wavefront curvature so that the eye/brain interprets light coming from the third waveguide 186 as coming from a second focal plane that is even closer inward toward the user from optical infinity than was light from the next waveguide up 184.

The other waveguides (188, 190) and lenses (196, 198) are similarly configured, with the highest waveguide 190 in the stack sending its output through all of the lenses between it and the eye for an aggregate focal power representative of the closest focal plane to the user. To compensate for the stack of lenses (198, 196, 194, 192) when viewing/interpreting light coming from world 144 on the other side of the stacked waveguide assembly 178, a compensating lens layer 180 may be disposed at the top of the stacked waveguide assembly 178 to compensate for the aggregate power of the lens stack (198, 196, 194, 192) below. Such a configuration provides as many perceived focal planes as there are available waveguide/lens pairings. Both the light redirecting elements of the waveguides and the focusing aspects of the lenses may be static (i.e., not dynamic or electro-active). In some alternative embodiments, they may be dynamic using electro-active features.

The light redirecting elements (282, 284, 286, 288, 290) may be configured to both redirect light out of their respective waveguides and to output this light with the appropriate amount of divergence or collimation for a particular depth plane associated with the waveguide. As a result, waveguides having different associated depth planes may have different configurations of light redirecting elements (282, 284, 286, 288, 290), which output light with a different amount of divergence depending on the associated depth plane. In some embodiments, as discussed herein, the light redirecting elements (282, 284, 286, 288, 290) may be volumetric or surface features, which may be configured to output light at specific angles. For example, the light redirecting elements (282, 284, 286, 288, 290) may be volume holograms, surface holograms, and/or diffraction gratings. Light redirecting elements, such as diffraction gratings, are described in U.S. patent application Ser. No. 14/641,376, filed Mar. 7, 2015, which is incorporated by reference herein in its entirety. In some embodiments, the features (198, 196, 194, 192) may not be lenses; rather, they may simply be spacers (e.g., cladding layers and/or structures for forming air gaps).

In some embodiments, the light redirecting elements (282, 284, 286, 288, 290) are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 4 with each intersection of the DOE, while the rest continues to move through a waveguide via total internal reflection. The light carrying the image data is thus divided into a number of related exit beams that exit the waveguide at a multiplicity of locations and the result is a fairly uniform pattern of exit emission toward the eye 4 for this particular collimated beam reflecting around within a waveguide.

In some embodiments, one or more DOEs may be switchable between "on" states in which they actively diffract, and "off" states in which they do not significantly diffract. For instance, a switchable DOE may include a layer of polymer dispersed liquid crystal, in which microdroplets include a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
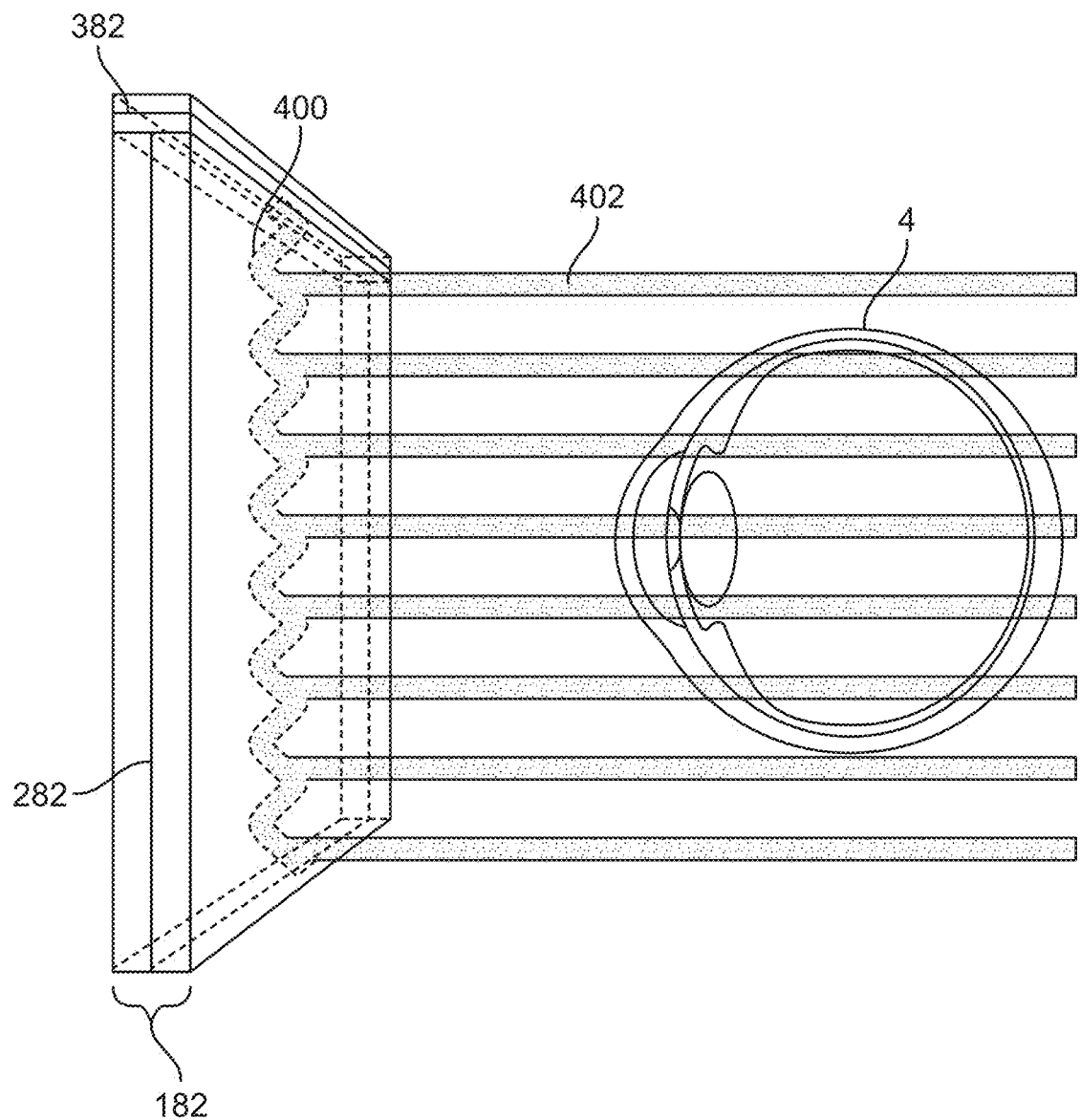
FIG. 7 shows an example of exit beams outputted by a waveguide.

FIG. 7 shows an example of exit beams outputted by a waveguide. One waveguide is illustrated, but it will be appreciated that other waveguides in the stacked waveguide assembly 178 may function similarly. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide that corresponds to a depth plane at a large simulated distance (e.g., optical infinity) from the eye 4. Other waveguides may output an exit beam pattern that is more divergent, which would require the eye 4 to accommodate to focus on a closer simulated distance and would be interpreted by the brain as light from a distance closer to the eye 4 than optical infinity.

Figure 8:
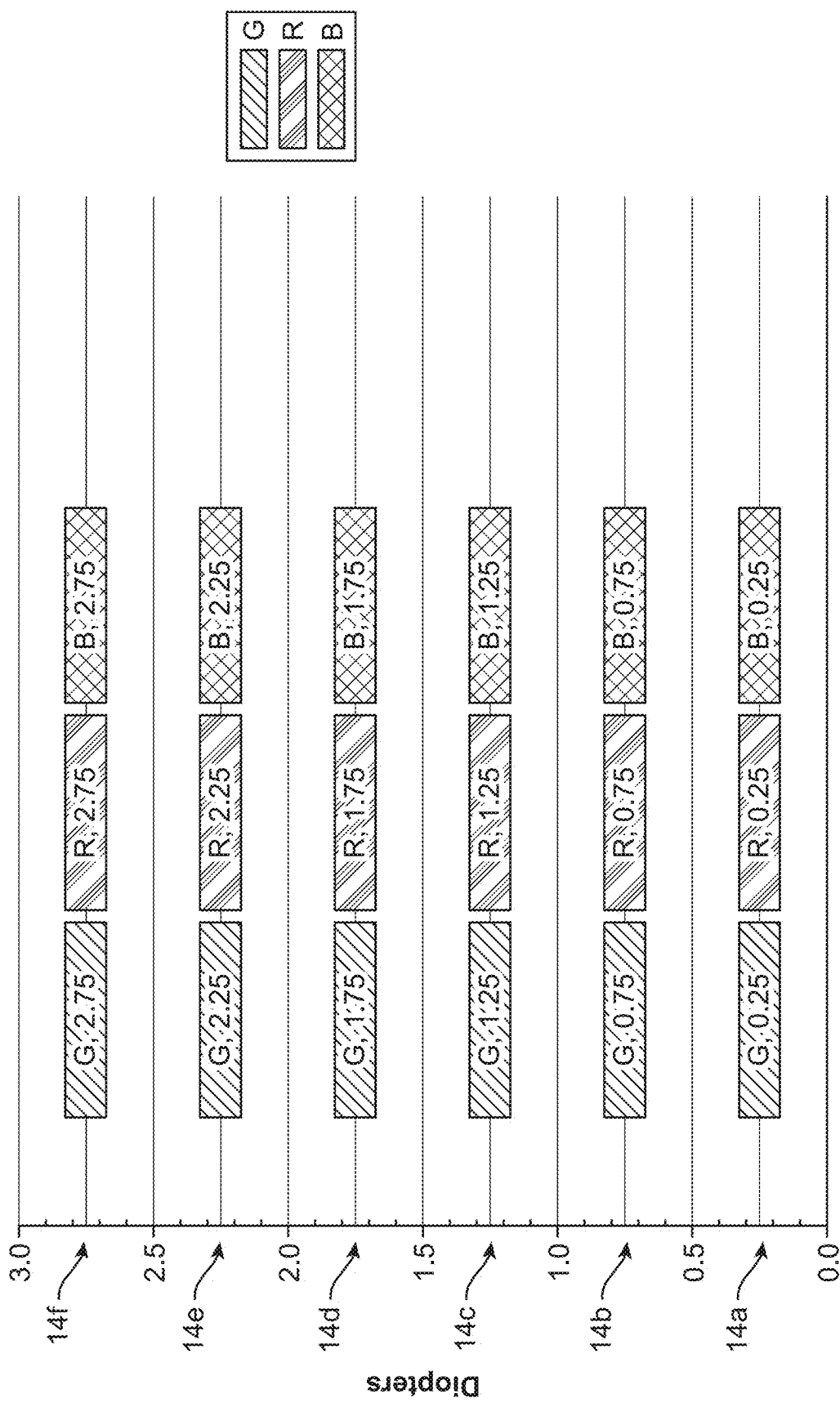
FIG. 8 illustrates an example design of a waveguide stack in which each depth plane has three associated waveguides that each output light of a different color.

FIG. 8 schematically illustrates an example design of a stacked waveguide assembly (e.g., the stacked waveguide assembly 178) in which each depth plane has three associated waveguides that each output light of a different color. A full color image may be formed at each depth plane by overlaying images in each of multiple component colors (e.g., three or more component colors). In some embodiments, the component colors include red, green, and blue. In some other embodiments, other colors, including magenta, yellow, and cyan, may be used in conjunction with or may replace one of red, green, or blue. Each waveguide may be configured to output a particular component color and, consequently, each depth plane may have multiple waveguides associated with it. Each depth plane may have three waveguides associated with it: a first for outputting red light, a second for outputting green light, and a third for outputting blue light.

Depth planes 14a-14f are shown in FIG. 8. In the illustrated embodiment, each depth plane has three component color images associated with it: a first image of a first color, G; a second image of a second color, R; and a third image of a third color, B. The numbers following each of these letters indicate diopters (1/m), or the reciprocal of the apparent distance of the depth plane from a viewer, and each box in the figures represents an individual component color image. In some embodiments, G is the color green, R is the color red, and B is the color blue. As discussed above, the perceived distance of the depth plane from the user may be established by the light redirecting elements (282, 284, 286, 288, 290) (e.g., diffractive optical element (DOE), and/or by lenses (198, 196, 194, 192)) which cause the light to diverge at an angle associated with the apparent distance.

In some arrangements, each component color image may be outputted by a different waveguide in a stack of waveguides. For example, each depth plane may have three component color images associated with it: a first waveguide to output a first color, G; a second waveguide to output a second color, R; and a third waveguide to output a third color, B. In arrangements in which waveguides are used to output component color images, each box in FIG. 8 may be understood to represent an individual waveguide.

While the waveguides associated with each depth plane are shown adjacent to one another in this schematic drawing for ease of description, it will be appreciated that, in a physical device, the waveguides may all be arranged in a stack with one waveguide per level. Different depth planes are indicated in the figure by different numbers for diopters following the letters G, R, and B.

Definitions and Use of Figures

Some of the terms used in this description are defined below for reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Display Timing Schemes

In some embodiments, a VR/AR/MR system (e.g., the system 80) provides light field video data by successively displaying multiple different depth planes for a given frame of video data. The system 80 then updates to the next frame of video data and successively displays multiple different depth planes for that frame. For example, the first frame of video data can actually include three separate sub-frames of video data: a far field frame D0, a midfield frame D1, and a near field frame D2. D0, D1, and D2 can be displayed in succession. Subsequently, the second frame of video data can be displayed. The second frame of video data can likewise include a far field frame, a midfield frame, and a near field frame, which are displayed successively, and so on. While this example uses three depth planes, light field video data is not so-limited. Rather, any plural number of depth planes can be used depending, for example, upon the desired video frame rates and the capabilities of the system 80.

Because each frame of light field video data includes multiple sub-frames for different depth planes, the system 80 which provides light field video data may benefit from display panels which are capable of high refresh rates. For example, if the system 80 displays video data with a frame rate of 120 Hz but includes image data from multiple different depth planes, then the display 62 will need to be capable of a refresh rate greater than 120 Hz in order to accommodate the multiple depth planes of image data for each frame of video data. In some embodiments, liquid crystal over silicon (LCOS) display panels are used, though other types of display panels can also be used (including color sequential displays and non-color sequential displays).

FIG. 9 illustrates an example timing scheme for a VR/AR/MR system (e.g., the system 80) which displays light field video data. In this example, the video frame rate is 120 Hz and the light field video data includes three depth planes. In some embodiments, the green, red, and blue components of each frame are displayed serially rather than at the same time. In some embodiments, the red, green, and blue components do not have the same active (i.e., "on") time. In some embodiments, one or more of the red, green, and blue components may be repeated within a frame several times.

A video frame rate of 120 Hz allows 8.333 ms in which to display all of the depth planes for a single frame of video data. As illustrated in FIG. 9, each frame of video data includes three depth planes and each depth plane includes green, red, and blue components. For example the depth plane D0 includes a green sub-frame, G0, a red sub-frame, R0, and a blue sub-frame, B0. Similarly, the depth plane D1 includes green, red, and blue sub-frames, G1, R1, and B1, respectively, and the depth plane D2 includes green, red, and blue sub-frames, G2, R2, and B2, respectively. Given that each video frame includes three depth planes, and each depth plane has three color components, the allotted 8.333 ms is divided into nine segments of 0.926 ms each. As illustrated in FIG. 9, the green sub-frame G0 for the first depth plane is displayed during the first time segment, the red sub-frame R0 for the first depth plane is displayed during the second time segment, and so on. The total green on-time for each frame of video is 2.778 ms. The same is true of the total red on-time and blue on-time for each frame. It should be understood, however, that other video frame rates can also be used, in which case the specific time intervals illustrated in FIG. 9 may be adjusted accordingly. While the individual color components are illustrated as having equal display times, this is not required and the ratios of the display times between the color components can be varied. Furthermore, the flashing order illustrated in FIG. 9 for the depth planes and color component sub-frames is but one example. Other flashing orders can also be used. Moreover, while FIG. 9 illustrates an embodiment which uses a color sequential display technology, the techniques described herein are not limited to color sequential displays.

Other display timing schemes are also possible. For example, the frame rate, number of depth planes, and color components can vary. In some embodiments, the frame rate of the system as described herein is 80 Hz and there are three depth planes. In some embodiments, different depth planes can be displayed in different frames. For example, light field video data with four depth planes can be displayed at an effective frame rate of 60 Hz by displaying two depth planes per frame at a frame rate of 120 Hz (depth planes D0 and D1 can be displayed in the first 8.33 ms and depth planes D2 and D3 can be displayed in the next 8.33 ms—full depth information is provided in 16.7 ms, for an effective frame rate of 60 Hz). In some embodiments, the number of depth planes which are shown can vary spatially on the display. For example, a larger number of depth planes can be shown in a sub-portion of the display in the line of sight of the user 60, and a smaller number of depth planes can be shown in sub-portions of the display 62 located in the peripheral vision of the user 60. In such embodiments, an eye tracker (e.g., a camera and eye tracking software) can be used to determine which portion of the display 62 the user 60 is looking at.

Control Data for Video Data

Figure 10:
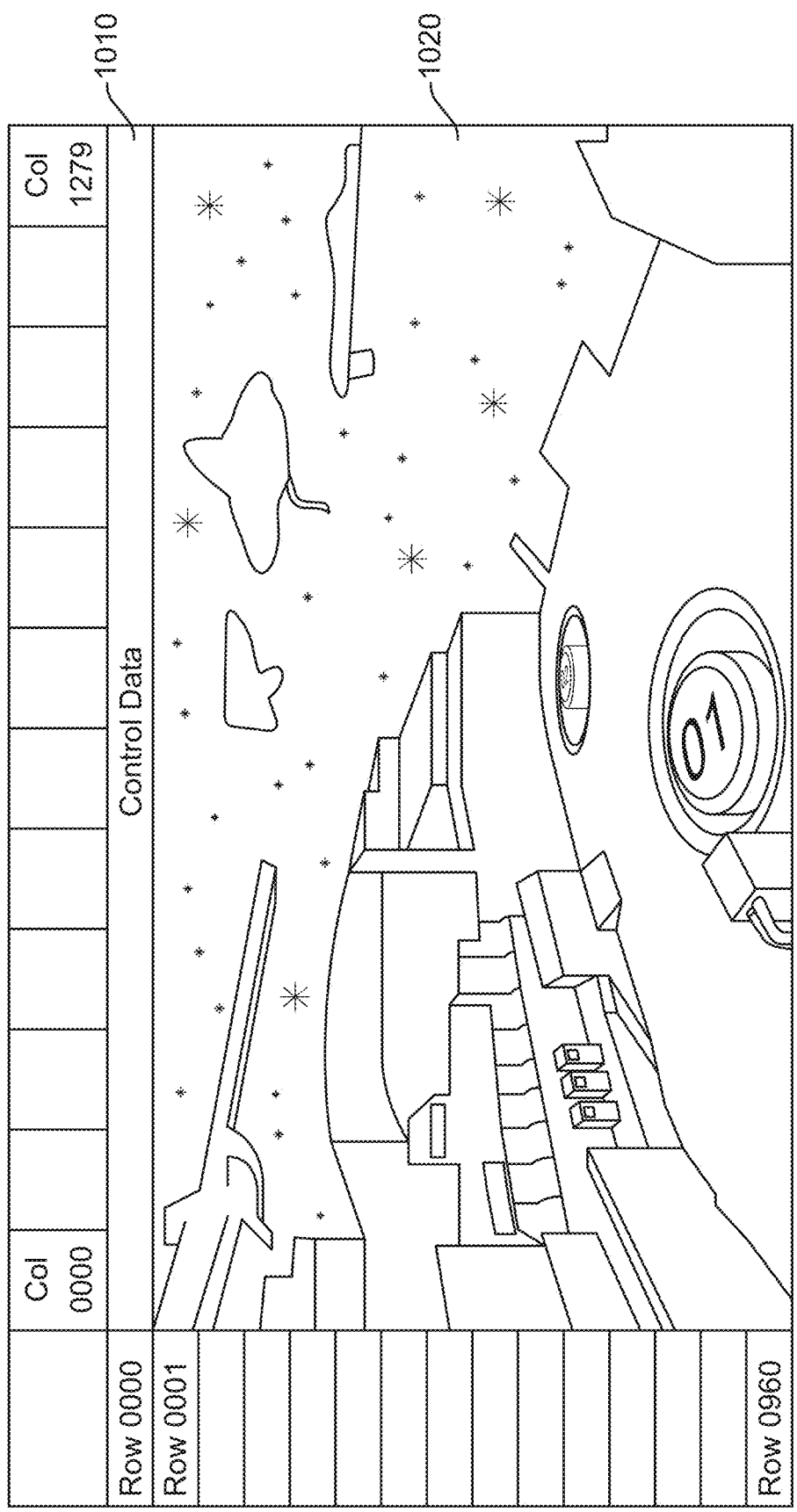
FIG. 10 illustrates an example format for a frame of video data which includes appended control data. Control data may be sent as metadata as well during blanking periods.

FIG. 10 illustrates an example format for a frame of video data which includes appended control data, according to one embodiment. As illustrated in FIG. 10, each frame includes control data 1010 and image data 1020. The image data 1020 may be an array of pixel data formatted into rows (row 0001 through row 0960) and columns (column 0000 through column 1279). In the illustrated example, there are 1280 columns and 960 rows of image data 1020 which form an image. FIG. 10 also illustrates that the control data 1010 can be appended to the image data 1020. The control data 1010 can be appended to image data 1020 as, for example, an extra row. In some configurations, the control data 1010 may be a control packet or metadata sent during horizontal or vertical blanking time. The first row (row 0000) includes the control data 1010, whereas the remaining rows (rows 0001-0960) include the image data 1020. Thus, in this embodiment, the host transmits a resolution of 1280×961 to the display controller, where the image data 1020 is 1280×960 and the control data is 1280×1.

The display controller reads the appended control data 1010 and uses it, for example, to configure the image data 1020 sent to one or more display panels (e.g., a left-eye and a right-eye display panel). In this example, the row of control data 1010 is not sent to the display panels. Thus, while the host transmits a stream of data including the control data 1010 and the image data 1020 to the display controller with a resolution of 1280×961, the display controller removes the control data 1010 from the stream of data and transmits only the image data 1020 to the display panel(s) with a resolution of 1280×960. Though in other embodiments, the control data 1010, too, may be transmitted to the display panel(s) to control how the image data 1020 is shown. In such embodiments, the control data 1010 may be removed by a display driver prior to the image data 1020 being shown on the display 62. The image data 1020 can be transmitted to a display panel (e.g., an LCOS display panel) in, for example, Display Serial Interface (DSI) format.

While FIG. 10 illustrates that the appended control data 1010 is a single row appended at the beginning of each frame of video data, other amounts of control data may alternatively be appended. For example, the control data 1010 may be multiple rows or partial rows. Further, the control data 1010 does not necessarily have to be appended at the beginning of each frame but may instead be inserted into the frame at other locations (e.g., during blanking times). For example, the control data 1010 may be inserted between rows of image data 1020, or it may be appended at the end of the image data 1020. In addition, the control data 1020 need not necessarily be provided as one or more rows (or partial rows) but can instead be provided as one or more columns (or partial columns) provided on the left side of the image data 1020 (e.g., column 0000), on the right side of the image data 1020 (e.g., column 1279), or between columns of image data 1020. Appending control data 1010 at the beginning of the frame may allow the controller to more readily act on the control data 110 at the beginning of the frame, whereas appending control data 1010 at the end of the frame may permit the control data 1010 to be more current. Either of these approaches can be beneficial, depending on the particular operation to which the control data 1010 is related.

Figure 11:
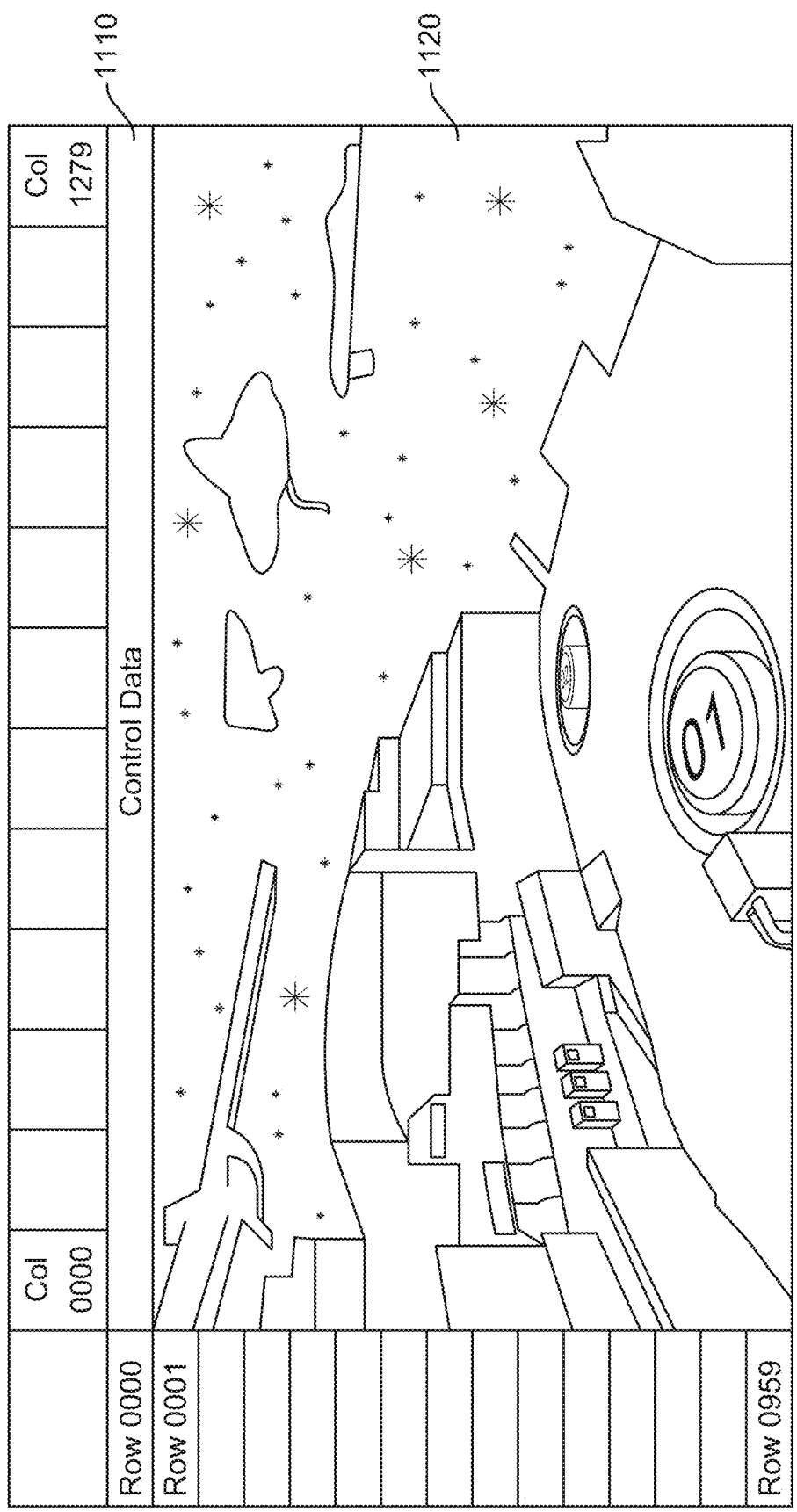
FIG. 11 illustrates another example format for a frame of video data which includes control data.

FIG. 11 illustrates another example format for a frame of video data which includes control data, according to another embodiment. FIG. 11 illustrates a frame of video data which includes control data 1110 and image data 1120. The frame of FIG. 11 is similar to the frame of FIG. 10, except that the control data 1110 of FIG. 11 is inserted in place of the first row of image data 1120 of FIG. 11, whereas the control data 1010 of FIG. 10 is appended before the first row of the image data 1020 of FIG. 10. Thus, the first row (row 0000) of the frame includes control data 1110, while the remaining rows (rows 0001-0959) include the image data 1120.

In this example, the host transmits information to the display controller with a resolution of 1280×960. The display controller can use the control data 1110 to configure the image data 1120 sent to the display panel(s). The display controller then transmits the frame illustrated in FIG. 11 to the display panel(s). However, in some embodiments, before transmitting the frame to the display panel(s), the display controller can remove the control data 1110 by, for example, setting that row of image data to zeros. This causes the first row of each frame to appear as a dark line on the display.

Using the scheme illustrated in FIG. 11, control data 1110 can be included with the frame without changing the resolution of the information sent to the display controller. However, the trade-off in this example is that the effective display resolution is decreased due to the fact that some image data is replaced by the control data 1110. While FIG. 11 shows that the control data 1110 is one row, other amounts of control data 1110 can also be used. For example, the control data 1110 may be multiple rows or partial rows. Further, while FIG. 11 illustrates that the control data 1110 is inserted in place of the first row of the image data, the control data 1110 may alternatively be inserted in place of another row in the frame. For example, the control data 1110 may be inserted in place of a row of image data 1120 between other rows of image data 1120, or it may be provided as a row at the end of the image data 1120. In addition, the control data 1110 need not necessarily be provided as one or more rows (or partial rows) but can instead be provided as one or more columns (or partial columns) provided on the left side of the image data 1120 (e.g., column 0000), on the right side of the image data 1120 (e.g., column 1279), or between columns of image data 1120.

The control data 1010 and 1110 illustrated in, for example, FIGS. 10 and 11, respectively, (and later in FIGS. 12A and 12B) can be used for a number of different purposes. For example, the control data can indicate whether a frame of video data should be displayed on the left-eye video panel or the right-eye video panel. The control data can indicate which of one or more depth planes (real or virtual) the image data corresponds to, as described further below. The control data can indicate the flashing order for the light field video data. For example, the control data can indicate the order in which to display each depth plane, as well as the order to display the color component sub-frames for each depth plane.

In addition, the control data 1010 and 1110 illustrated in, for example, FIGS. 10 and 11, respectively, can be used to indicate one or more image warping operations to be performed on the image data 1020 and 1120 illustrated in, for example, FIGS. 10 and 11, respectively. Image warping operations may include, for example, image rotations and/or pixel shifts (left/right or up/down). The need to perform such image warping operations may arise after the content for the display has already been generated by the GPU. This can be due to, for example, changes in the head pose of the user 60 or changes in the orientation of a tangible object (referred to as a "totem") which the user 60 uses to interact with a virtual object or scene. Rather than adjusting and re-rendering the image data 1020 and 1120 illustrated in FIGS. 10 and 11, respectively, the control data 1010 and 1110 can include image warping information which specifies the direction and magnitude of a pixel shift or image rotation which should be carried out by the display controller on the image data. In some embodiments, the control data may include head pose data and/or totem pose data which can be used to determine one or more image warping operations to perform. The control data 1010 and 1110 may further include time synchronization data which can be used to synchronize the head pose data and/or totem pose data with the image warping operations that are to be performed. Image warping based on embedded control data 1010 and 1110 is described further below.

The control data can also indicate whether a frame of video data for one of two stereo displays should be copied into the other. For example, in the case of the most distant simulated depth plane (e.g., background imagery), there may be relatively little difference (e.g., due to parallax shift) between the right and left eye images. In such cases, the control data can indicate that the imagery for one of the stereo displays be copied to the other display for one or more depth planes. This can be accomplished without re-rendering the image data at the GPU for both the right and left eye displays or re-transferring data to the display controller. If there are relatively small differences between the right and left eye images, pixel shifts can also be used to compensate without re-rendering or re-transferring image data for both eyes.

The control data illustrated in FIGS. 10 and 11 can also be used for other purposes besides those specifically enumerated here.

Figure 12A:
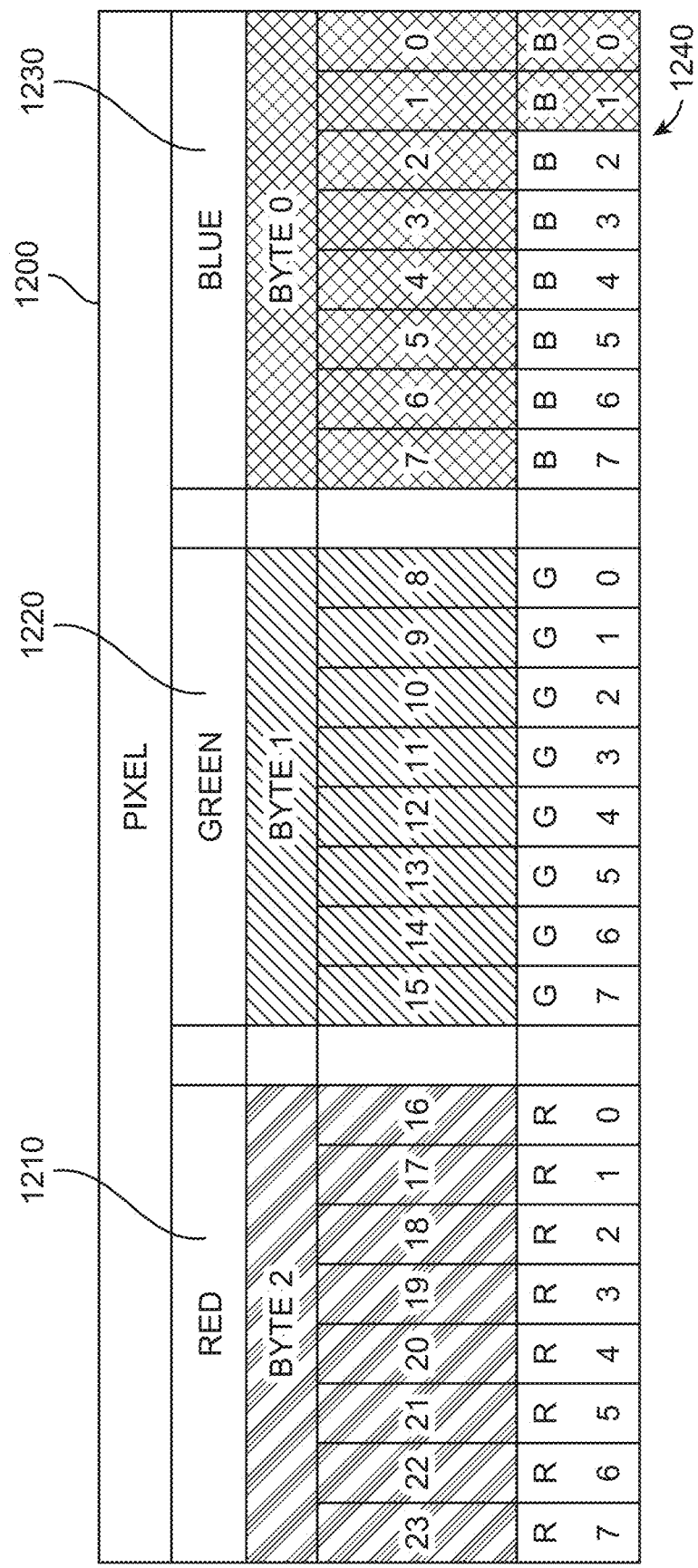
FIG. 12A illustrates an example format for a pixel of video data which includes embedded control data.

While FIGS. 10 and 11 illustrate that one or more rows of control data can be included with image data, control data can also (or alternatively) be embedded in individual pixels of the image data. FIG. 12A illustrates an example format for a pixel 1200 of image data which includes embedded control data 1240. FIG. 12A illustrates that the pixel 1200 includes a blue value 1230 (byte 0), a green value 1220 (byte 1), and a red value 1210 (byte 2). In this embodiment, each of the color values has a color depth of 8 bits. In some embodiments, one or more of the bits corresponding to one or more of the color values can be replaced by control data 1240 at the expense of the bit depth of the color value(s). Thus, control data can be embedded directly in the pixel 1200 at the expense of dynamic range of the color value(s) for the pixel 1200. For example, as illustrated in FIG. 12A, the highlighted two least significant bits of the blue value 1230 can be dedicated as control data 1240. Though not illustrated, bits of the other color values can also be dedicated as control data 1240. For example, bits from any combination of the red value 1210, the green value 1220, and the blue value 1230 can be used as control data 1240. Moreover, different numbers of pixel bits can be dedicated as control data 1240. For example, in one embodiment discussed below with respect to FIG. 18, a total of 6 bits (2 bits from each of the red value 1210, the green value 1220, and the blue value 1230) are used as control data 1240.

In some embodiments, the control data 1240 embedded in the pixel 1200 can be depth plane indicator data (though the control data 1240 embedded in the pixel 1200 can also be any other type of control data, including other types described herein). As discussed herein, light field video data can include a number of depth planes. Thus, the bit depth for one or more pixels in the frame can be reduced and the resulting available bit(s) can be used to indicate the depth plane to which a pixel corresponds.

As a concrete example, consider the 24-bit RGB pixel data illustrated in FIG. 12A. Each of the red, green, and blue color values has a bit depth of 8 bits. As already discussed, the bit depth of one or more of the color components can be sacrificed and replaced by depth plane indicator data. For example, since the eye is less sensitive to blue, the blue component can be represented by six bits (bits B2-B7 in FIG. 12A) instead of 8 bits. The resulting extra two bits (bits B0 and B1) can be used to specify which of up to four depth planes the pixel 1200 corresponds to. If there are more or fewer depth planes, then a greater or lesser number of color bits can be sacrificed and used as depth plane indicator data. For example if the bit depth is reduced by one bit (i.e., one bit of depth plane indicator data is provided), up to two depth planes can be specified. If the bit depth is reduced by three bits (i.e., three bits of depth plane indicator data are provided), up to eight depth planes can be specified, etc. In this way, the dynamic range of a color value can be traded off for the ability to encode depth plane indicator data directly within the image data itself.

Although color depth may be reduced by using some of the bits of the pixel 1200 as control data 1240, dithering can be used to create the perception that some or all of the sacrificed color depth remains. For example, dithering can be used to approximate colors which are no longer available in the color palette of the pixel 1200 (due to the control data 1240 having taken the place of some image data) by forming dithered patterns of colors that do remain in the available color palette. These patterns of colors are perceived by the user 60 as a color mixture which may approximate colors outside of the palette of the pixel 1200.

In some embodiments, the depth plane indicator data is encoded in every pixel 1200 of image data. In other embodiments, the depth plane indicator data may be encoded in one pixel 1200 per frame, or one pixel 1200 per line, one pixel 1200 per VR/AR/MR object, etc. In addition, the depth plane indicator data can be encoded in just a single color component, or in multiple color components. Similarly, the technique of encoding the depth plane indicator data directly within image data is not limited solely to color image data. The technique can be practiced in the same way for grayscale image data, etc.

Figure 12B:
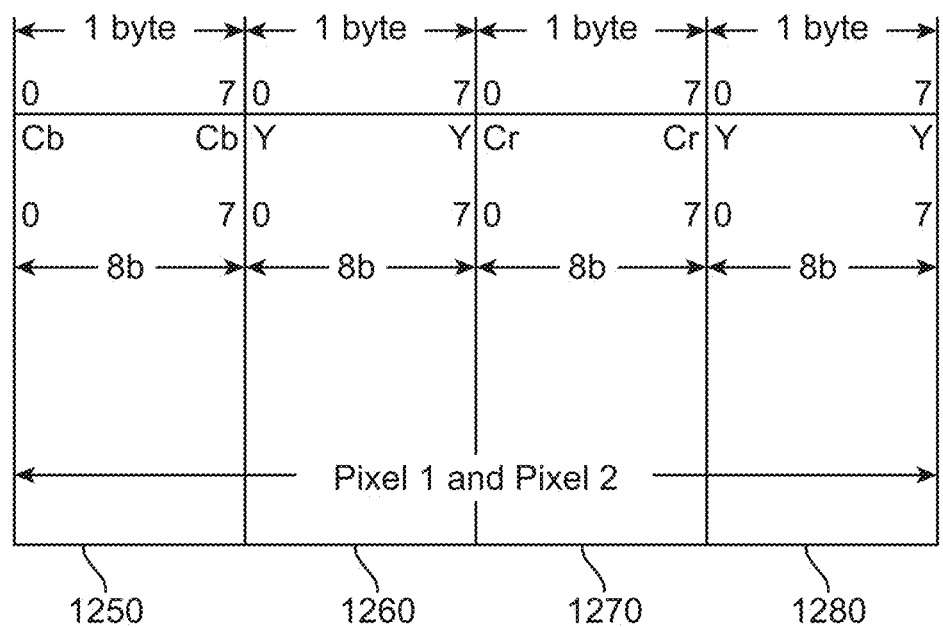
FIG. 12B illustrates another example format for pixels of video data which include embedded control data.

FIG. 12A illustrates one technique for encoding the depth plane indicator data in the image data. FIG. 12B illustrates another technique, which is to employ chroma subsampling and use the resulting available bits as the depth plane indicator data. For example, the image data can be represented in YCbCr format, where Y represents the luminance component (which may or may not be gamma corrected), Cb represents a blue-difference chroma component, and Cr represents a red-difference chroma component. Since the eye is less sensitive to chroma resolution than luminance resolution, chroma information can be provided with a lesser resolution than luminance information without unduly degrading image quality. In some embodiments, a YCbCr 4:2:2 format is used in which a Y value is provided for each pixel but Cb and Cr values are each only provided for every other pixel in alternating fashion. This is shown in FIG. 12B, where a first pixel is made up of a luminance byte 1260 and a blue-difference chroma byte 1250, while an adjacent second pixel is made up of a luminance byte 1280 and a red-difference chroma byte 1270. If a pixel (in the absence of chroma subsampling) normally consists of 24 bits of information (8-bit Y value, 8-bit Cb value, and 8-bit Cr value), then after employing chroma subsampling each pixel will only require 16 bits of information (8-bit Y value and 8-bit Cb or Cr value). The remaining 8 bits can be used as depth plane indicator data. According to this technique, in the case of 1280×960 image data, there would be 1280× 960×2 bytes of image data and 1280×960×1 bytes of depth plane indicator data (or other control data) for each subframe. The depth plane indicator data can be used to separate the pixels into the appropriate depth planes to be displayed at the appropriate times. In still other embodiments, any data compression technique can be used to compress the image data. The bandwidth which is freed up by the use of compression can be used to provide any of the control data discussed herein.

In both the RGB embodiment illustrated in FIG. 12A and the YCbCr 4:2:2 chroma subsampling embodiment illustrated in FIG. 12B, the depth plane indicator data can specify actual depth planes supported by the system 80 and/or virtual depth planes as discussed later herein. If the depth plane indicator data specifies a virtual depth plane, it can also specify the weightings of the depth planes to be blended so as to create the virtual depth plane, as discussed below.

Figure 13:
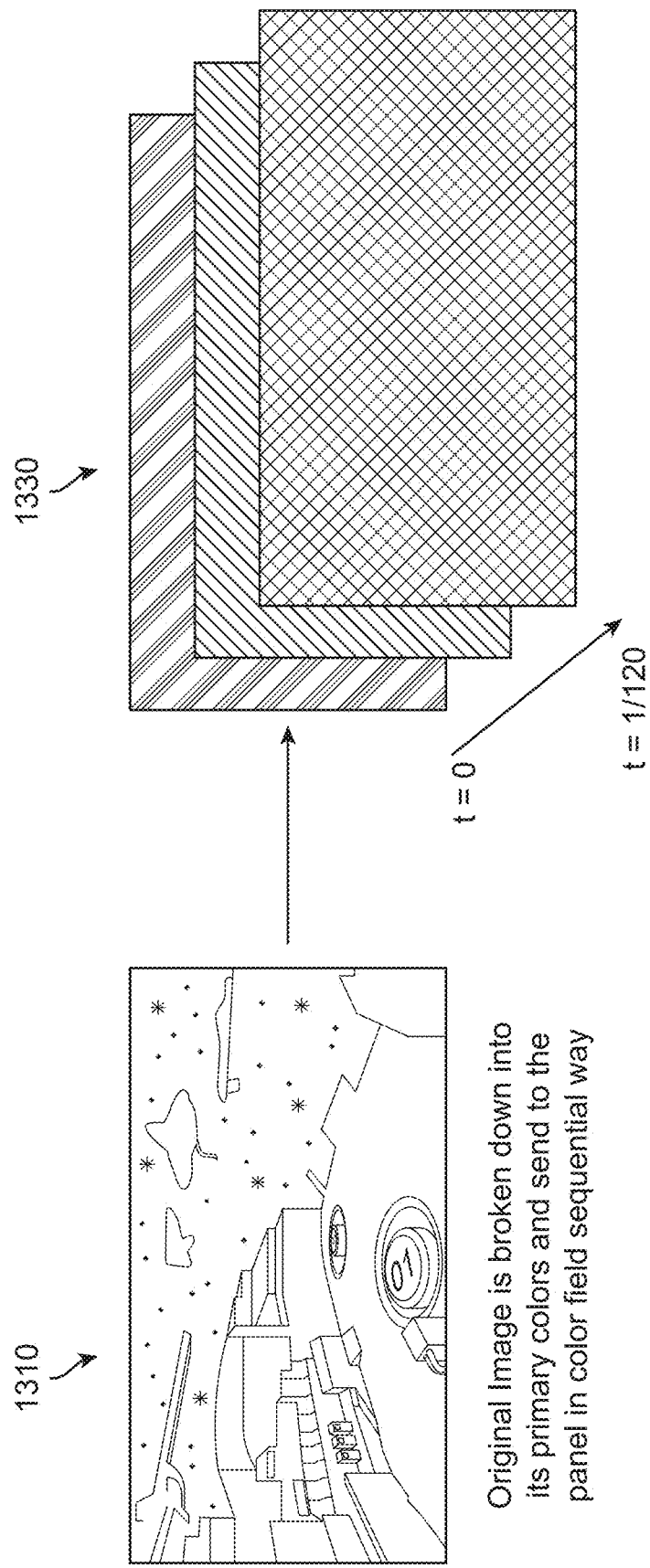
FIG. 13 illustrates how a frame of video can be separated into color components which can be displayed serially.
Figure 14:
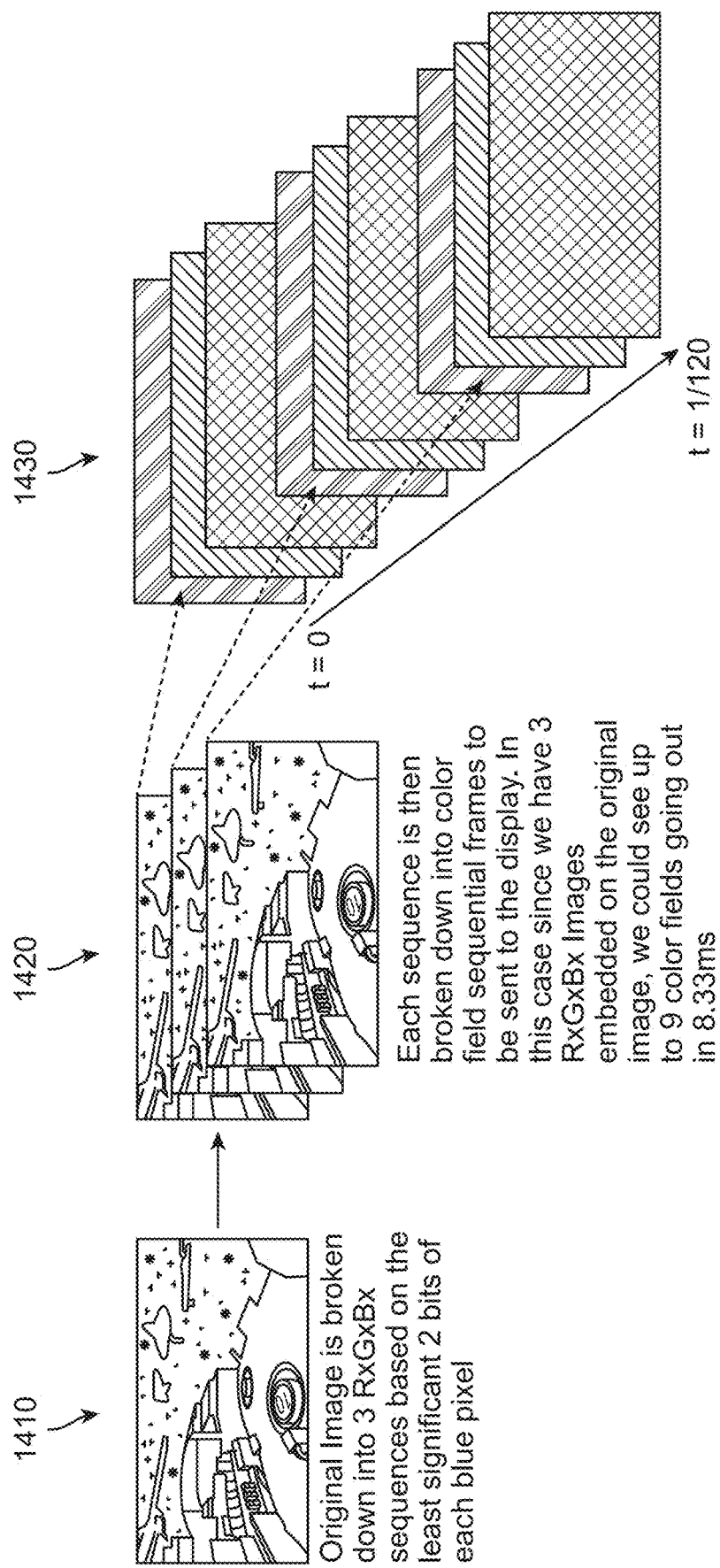
FIG. 14 illustrates how a frame of light field video data can be separated, using depth plane indicator data, into multiple depth planes which can each be split into color components sub-frames for display.

The usage of the embedded depth plane indicator data in the display controller is illustrated in FIG. 14. But first, FIG. 13 is provided by way of background to show the operation of the display controller when only a single depth plane is present. FIG. 13 illustrates how a frame of video can be separated into color components which can be displayed serially. The left-hand panel 1310 of FIG. 13 shows an image which includes one frame of a 120 frame per second (fps) video. As indicated by the right-hand panel 1330 of FIG. 13, the image is separated into red, green, and blue color components which are flashed sequentially on the display by the display controller over the course of 1/120 of a second (8.33 ms). For simplicity, FIG. 13 shows that each of the color components is flashed once and that each of the color components is active for the same amount of time. However, each of the color components may be flashed more than once to avoid flickering. The human vision system then fuses the individual color component sub-frames shown in the right-hand panel 1330 into the original color image shown in the left-hand panel 1310. FIG. 14 shows how this process can be adapted when each frame of video data includes multiple depth planes.

FIG. 14 illustrates how a frame of light field video data can be separated, using depth plane indicator data, into multiple depth planes which can each be split into color components sub-frames for display. In some embodiments, a host transmits a stream of light field video data to a display controller. This stream of light field video data is represented by the image in the left-hand panel 1410 of FIG. 14. The display controller can use the embedded depth plane indicator data (e.g., the depth plane indicator data of the control data 1240) to separate the stream of light field video data into one or more RxGxBx sequences, where a R0G0B0 sequence corresponds to a first depth plane, a R1G1B1 sequence corresponds to a second depth plane, and a R2G2B2 sequence corresponds to a third depth plane. This depth plane separation can be performed on the basis of the two least significant blue bits in each pixel (i.e., as shown in FIG. 12A), though bits from the red and/or green and/or blue values may also and/or alternatively be used. The result is shown in the middle panel 1420 of FIG. 14, which shows three separate depth plane images. Finally, each of the three separate depth plane images shown in the middle panel 1420 of FIG. 14 can be separated into its constituent color component sub-frames. The color component sub-frames of each depth plane can then be sequentially flashed to the display, as illustrated by the right-hand panel 1430 of FIG. 14. The sequence order can be, for example, R0G0B0-R1G1B1-R2G2B2 as illustrated in FIG. 14, or G0R0B0-G1R1B1-G2R2B2 as illustrated in FIG. 9.

The depth plane indicator data can be used by the display controller to determine the number of RxGxBx sequences to use and which pixels correspond to which sequence. The control data can also be provided to specify the order of RxGxBx color sequences that are flashed to the display. For example, in the case of image data which includes three depth planes (D0, D1, D2), there are six possible orders in which the individual RxGxBx sequences can be flashed to the display panel: D0, D1, D2; D0, D2, D1; D1, D0, D2; D1, D2, D0; D2, D0, D1; and D2, D1, D0. If the order specified by the control data is D0, D1, D2, then pixels with depth plane indicator data (e.g., the blue LSB bits) "0 0" corresponding to the first depth plane, D0, can be selected as the first RxGxBx color sequence image going out. Pixels with depth plane indicator data (e.g., the blue LSB bits) "0 1" corresponding to the second depth plane, D1, can be selected as the second RxGxBx color sequence image going out, and so on.

Figure 15:
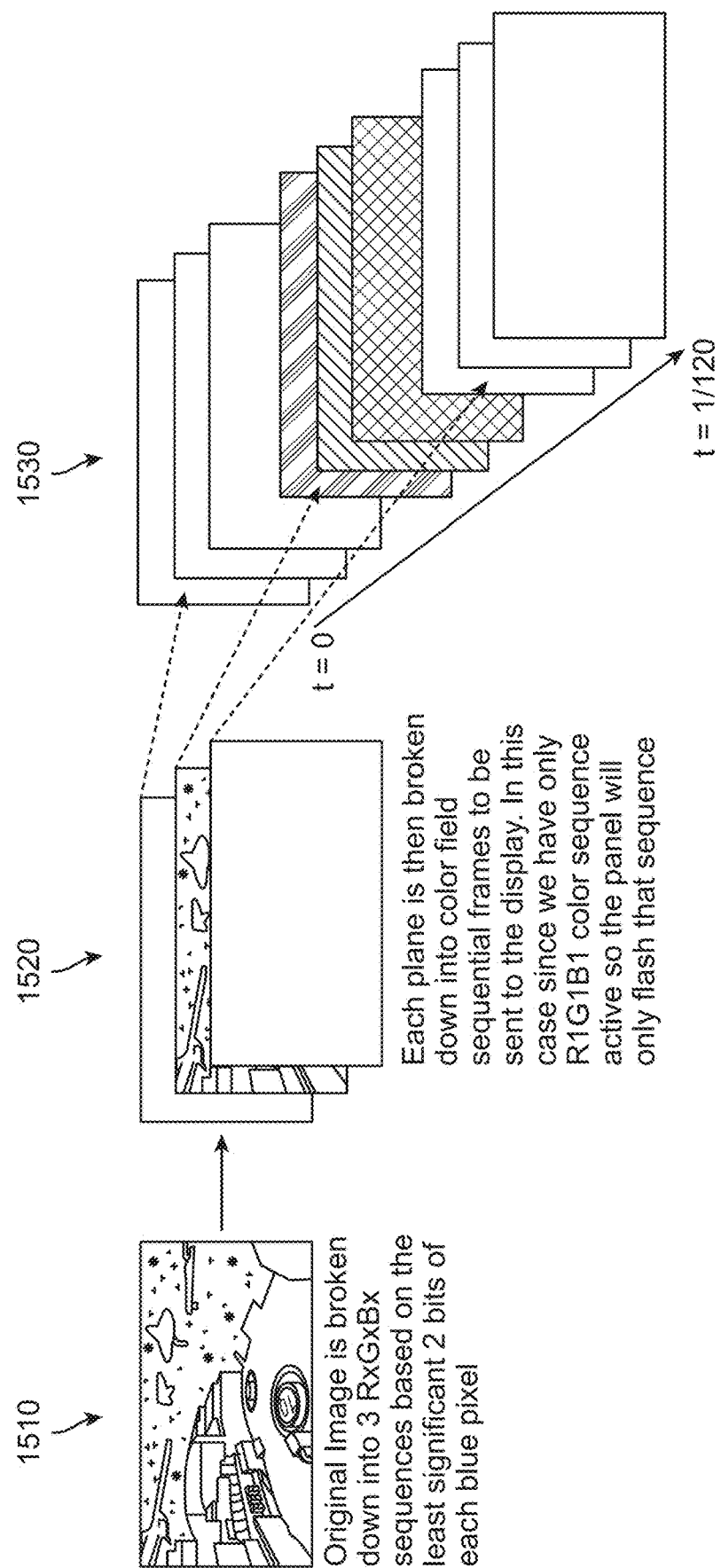
FIG. 15 illustrates an example where the depth plane indicator data of FIGS. 12A and 12B indicates that one or more depth planes of a frame of light field video data are inactive.

FIG. 15 illustrates an example where the depth plane indicator data of FIGS. 12A and 12B indicates that one or more depth planes of a frame of light field video data are inactive. FIG. 15 is similar to FIG. 14 in that it shows a stream of video data represented by the left-hand panel 1510 being separated into depth planes represented by the middle panel 1520, which are then each separated into color component sub-frames represented by the right-hand panel 1530. However, FIG. 15 is distinct from FIG. 14 in that only a single depth plane is shown as being active.

The depth plane indicator data in FIG. 12A is the two least significant bits of the blue value in each pixel. These two bits are capable of specifying up to four depth planes. However, light field video data may include fewer than four depth planes. For instance, in the preceding example, the light field video data includes only three depth planes. In such cases where the video data includes fewer than the maximum number of specifiable depth planes, the depth plane indicator data may specify that one or more depth planes are inactive. For example, continuing with the preceding example, if the depth plane indicator data (e.g., the two blue LSB bits) in a pixel is set to "1 1", then the pixel can be assigned to an inactive fourth depth plane D3. As shown in FIG. 15, only one of three RxGxBx color sequences is activated in the output sequence; the inactive depth planes are shown in FIG. 15 as blank white frames, and may be displayed by the system 80 as, for example, a black screen. As before, the control data can be provided to specify the order in which depth planes are displayed. As shown in the middle panel 1520 of FIG. 15, the control data has specified that the inactive depth plane D3 be shown first and last in the sequence. Thus, only the middle frame in the sequence includes actual image data which is flashed to the display. (Other sequences can also be used. For example, the active depth plane may be ordered first or last in the sequence, or it may be repeated in the sequence more than once.)

When the display controller determines that a pixel is assigned to an inactive depth plane, then the display controller can simply disregard the pixel and not flash it to the display. In addition, when the control data indicates that a depth plane is inactive, power to the light source(s) that provides light to the display for that particular depth plane can be reduced (e.g., shut off), thereby reducing power consumption. This can save switching power at the display driver. Thus, a power-saving mode can be implemented by designating one or more depth planes of the image data as inactive. Likewise, in some embodiments, the control data can indicate that one or more color fields within a depth plane are inactive, while one or more other color fields in the depth plane are active. Based on this control data, the display controller can control the display to disregard the color field or fields that are inactive and display the image data from the one or more active color fields without the inactive color field(s). For example, when the control data indicates that a color field is inactive, power to the light source(s) that provides light to the display for that particular color field can be reduced (e.g., shut off), thereby reducing power consumption. Accordingly, light sources, such as light emitting diodes (LEDs), lasers, etc., that provide illumination to the display can be shut off or have their power reduced for inactive depth planes and/or inactive color fields.

Control Packet

While the control packet described above is stored in the image data, in other embodiments, the control packet may be stored in a separate memory location, and the pixel processing pipeline may be paused to allow the control packet to be read (e.g., by the display). Portions of the control packet may be read separately without reading the entire control packet.

The control packet may include some or all of: a packet header block; a general purpose input/output ("GPIO") block; a magnification factor block (per color); a global pixel shift block (per color); a uniform blending factor block (per color); a rolling buffer starting row block; and a proprietary data block. If a display does detects that the packet header block does not match the expected header, the display can set an error flag and use a previous version of the control packet. The GPIO block instructs the display's GPIO to change to states with GPIO changes occurring at a controlled time and in full synchronization with the display/image data. The magnification factor block controls display magnification per color (e.g., RGB). The global pixel shift block controls positional shift of pixels in one or more directions per color (e.g., RGB). The uniform blending factor block includes factors controlling the blending of each color (e.g., RGB). The rolling buffer starting row block identifies a starting row for the rolling buffer (described below). The proprietary data block is optionally used to store other data.

Multi-Depth Plane Image Compression

In some embodiments, image compression techniques are applied across multiple depth planes in order to reduce the amount of image data by removing redundancy of information between depth planes. For example, rather than transmitting an entire frame of image data for each depth plane, some or all of the depth planes may instead be represented in terms of changes with respect to an adjacent depth plane. In some embodiments, this can be done on a temporal basis between frames at adjacent instants in time. The compression technique can be lossless or it can be lossy, such that changes between adjacent depth plane frames, or between temporally-adjacent frames, which are less than a given threshold can be ignored, thus resulting in a reduction in image data. In addition, the compression algorithms can encode motion of objects within a single depth plane (X-Y motion) and/or between depth planes (Z motion) using motion vectors. Rather than requiring that image data for a moving object be repeatedly transmitted over time, motion of the object can be achieved entirely or partially with pixel shift control information, as discussed herein.

Dynamically Configurable Display Drawing Areas

In systems that display light field video data, it can be challenging to achieve high video frame rates owing to the relatively large amount of information (e.g., multiple depth planes, each with multiple color components) included for each video frame. However, video frame rates can be improved, particularly in an AR mode, by recognizing that computer-generated light field video data may only occupy a fraction of the display at a time, as shown in FIG. 16.

Figure 1:
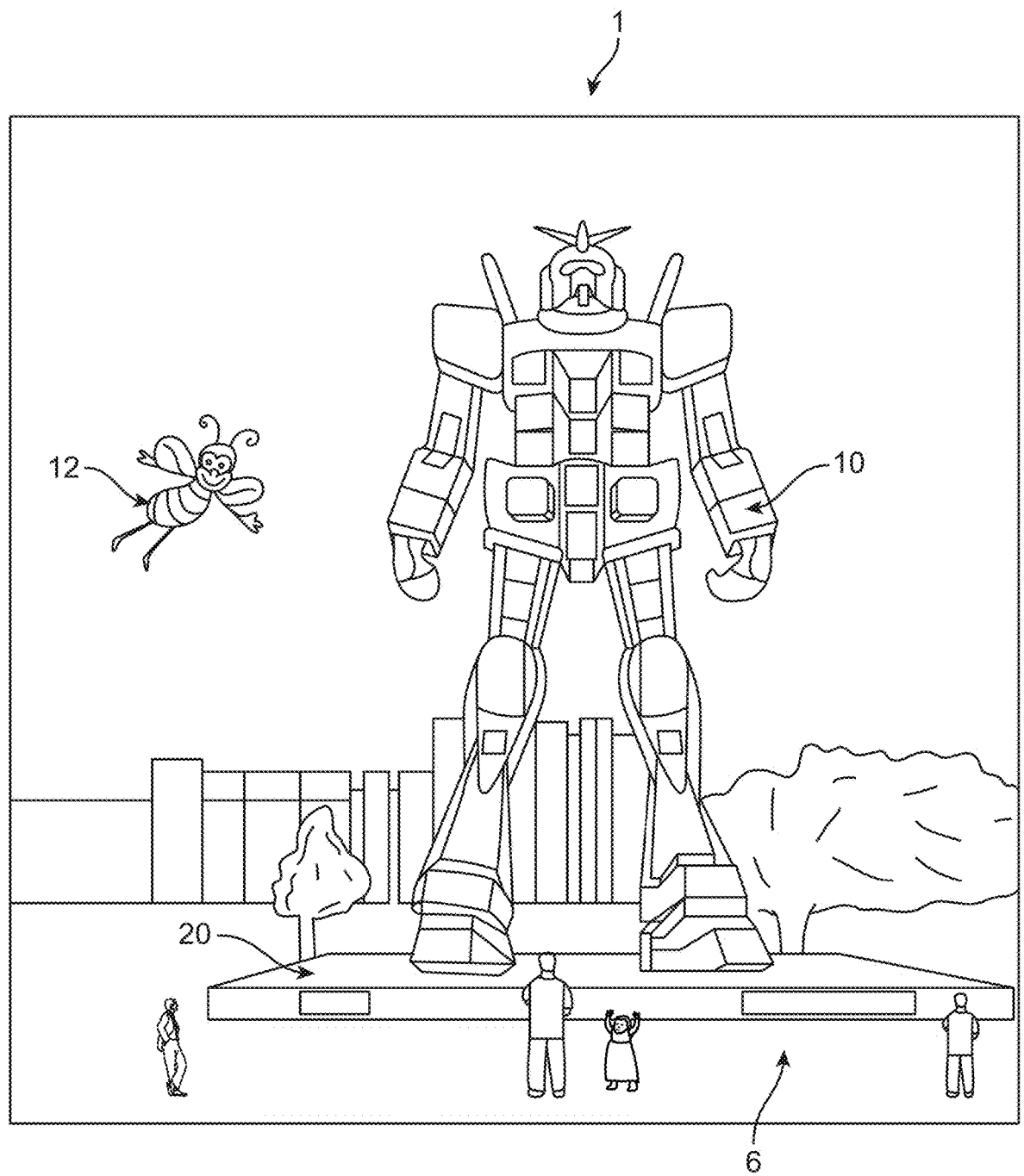
FIG. 1 illustrates a user's view of an AR/MR scene using an example AR system.
Figure 16:
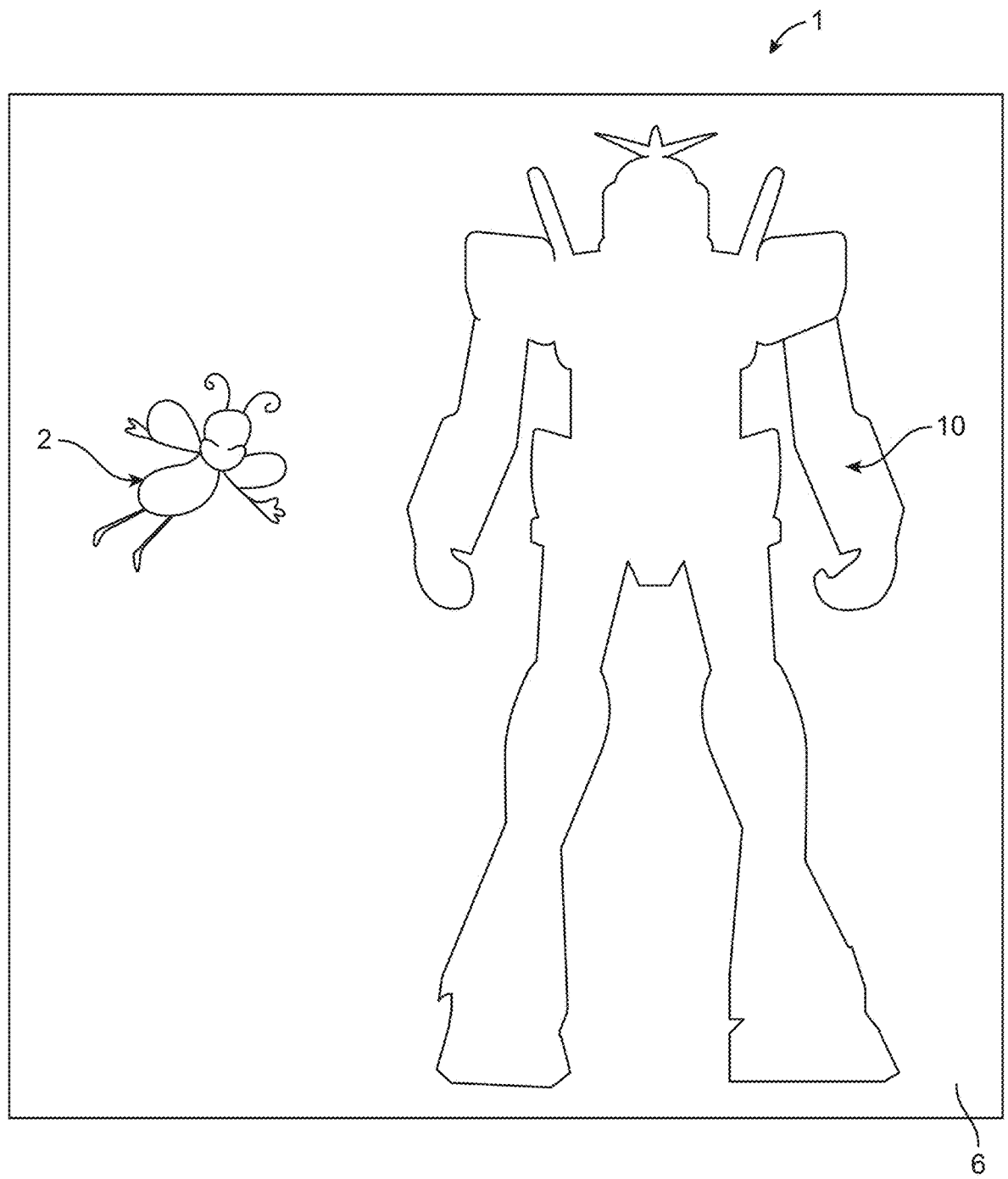
FIG. 16 illustrates example drawing areas for a frame of computer-generated imagery in an augmented reality system.

FIG. 16 illustrates example drawing areas for a frame of computer-generated imagery in an augmented reality system. FIG. 16 is similar to FIG. 1 except that it shows only the portions of the display where augmented reality imagery is to be drawn. In this case, the augmented reality imagery includes the robot statue 10 and the bumblebee character 2. The remaining area of the display in the AR mode may simply be a view of the real-world environment surrounding the user. As such, there may be no need to draw computer-generated imagery in those areas of the display. It may often be the case that the computer-generated imagery occupies only a relatively small fraction of the display area at a time. By dynamically re-configuring the specific drawing area(s) which are refreshed from frame-to-frame so as to exclude areas where no computer-generated imagery need be shown, video frame rates can be improved.

Computer-generated AR imagery may be represented as one or more pixels, each having, for example, an associated brightness and color. A frame of video data may include an M×N array of such pixels, where M represents a number of rows and N represents a number of columns. In some embodiments, the display of the system 80 is at least partially transparent so as to be capable of providing a view of the user's real-world surroundings in addition to showing the computer-generated imagery. If the brightness of a given pixel in the computer-generated imagery is set to zero or a relatively low value, then the user 60 will see the real-world environment at that pixel location. Alternatively, if the brightness of a given pixel is set to a higher value, then the user will see computer-generated imagery at that pixel location. For any given frame of AR imagery, the brightness of many of the pixels may fall below a specified threshold such that they need not be shown on the display. Rather than refresh the display for each of these below-threshold pixels, the display can be dynamically configured not to refresh those pixels.

In some embodiments, the system 80 includes a display controller for controlling the display. The display controller can dynamically configure the drawing area of the display. For example, the display controller can dynamically configure which of the pixels in a frame are refreshed during any given refresh cycle. In some embodiments, the display controller can receive computer-generated image data corresponding to a first frame of video. As discussed herein, the computer-generated image data may include several depth planes. Based on the image data for the first frame of video, the display controller can dynamically determine which of the display pixels to refresh for each of the depth planes. If, for example, the display 62 utilizes a scanning-type display technology, the controller can dynamically adjust the scanning pattern so as to skip areas where AR imagery need not be refreshed (e.g., areas of the frame where there is no AR imagery or the brightness of the AR imagery falls below a specified threshold).

In this way, based upon each frame that is received, the display controller can identify a sub-portion of the display where AR imagery should be shown. Each such sub-portion may include a single contiguous area or multiple non-contiguous areas (as shown in FIG. 16) on the display. Such sub-portions of the display can be determined for each of the depth planes in the light field video data. The display controller can then cause the display to only refresh the identified sub-portion(s) of the display for that particular frame. This process can be performed for each frame. In some embodiments, the display controller dynamically adjusts the areas of the display which will be refreshed at the beginning of each frame.

If the display controller determines that the area of the display which should be refreshed is becoming smaller over time, then the display controller may increase the video frame rate because less time will be needed to draw each frame of AR imagery. Alternatively, if the display controller determines that the area of the display which should be refreshed is becoming larger over time, then it can decrease the video frame rate to allow sufficient time to draw each frame of the AR imagery. The change in the video frame rate may be inversely proportional to the fraction of the display that needs to be filled with imagery. For example, the display controller can increase the frame rate by 10 times if only one tenth of the display needs to be filled.

Such video frame rate adjustments can be performed on a frame-by-frame basis. Alternatively, such video frame rate adjustments can be performed at specified time intervals or when the size of the sub-portion of the display to be refreshed increases or decreases by a specified amount. In some cases, depending upon the particular display technology, the display controller may also adjust the resolution of the AR imagery shown on the display. For example, if the size of the AR imagery on the display is relatively small, then the display controller can cause the imagery to be displayed with increased resolution. Conversely, if the size of the AR imagery on the display is relatively large, then the display controller can cause imagery to be displayed with decreased resolution.

Adjustment of Imagery Colors Based on Ambient Lighting

In some embodiments, the system 80 described herein includes one or more sensors (e.g., a camera) to detect the brightness and/or hue of the ambient lighting. Such sensors can be included, for example, in a display helmet of the system 80. The sensed information regarding the ambient lighting can then be used to adjust the brightness or hue of generated pixels for virtual objects (e.g., VR, AR, or MR imagery). For example, if the ambient lighting has a yellowish cast, computer-generated virtual objects can be altered to have yellowish color tones which more closely match those of the real objects in the room. Similarly, if the intensity of the light in the room is relatively high, then the current used to drive the light source(s) of the display 62 can be increased such that the brightness of the computer-generated virtual objects more closely matches the ambient lighting. Or, vice versa, the current used to drive the light source(s) of the display 62 can be decreased in response to dimmer ambient lighting. This also has the benefit of saving power. Such pixel adjustments can be made at the time an image is rendered by the GPU. Alternatively, and/or additionally, such pixel adjustments can be made after rendering by using the control data discussed herein.

Pixel Processing Pipeline

Figure 17:
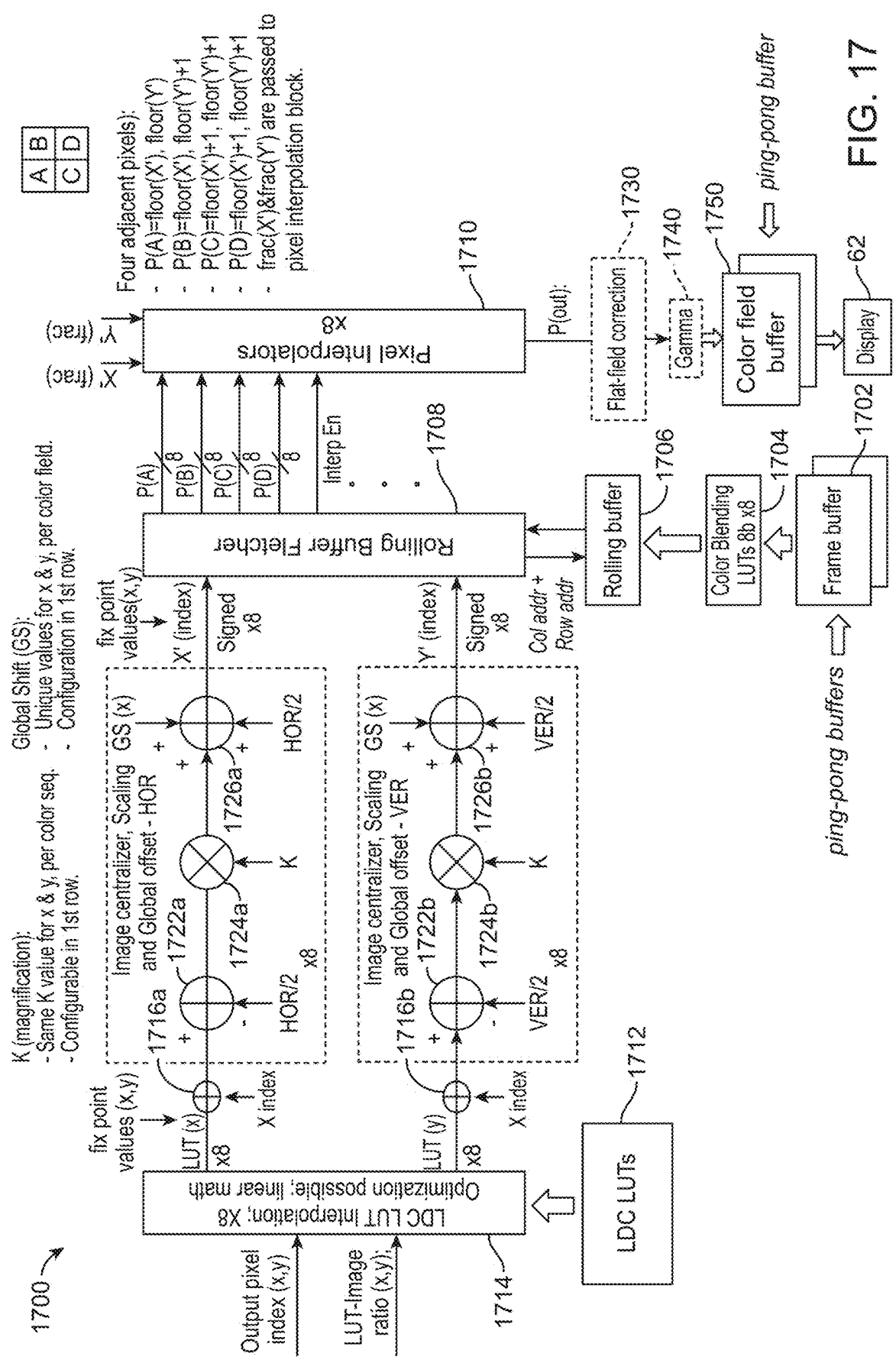
FIG. 17 is a block diagram of an example pixel processing pipeline implemented by a display controller of a system.

FIG. 17 is a block diagram of an example pixel processing pipeline 1700 implemented by the display controller of the system 80. In some embodiments, the pixel processing pipeline 1700 is implemented as dedicated hardware. The display controller receives rendered image data (at the frame buffer 1702) from the graphics processing unit (GPU) and then performs several functions, including lens distortion correction, resampling/image scaling, global shifting, color blending, flat-field correction, and gamma correction. After these functions are performed, the display controller outputs the processed image data (at the color field buffer 1750) to the display 62. Although an example set of functions is illustrated in FIG. 17, other embodiments of the pixel processing pipeline 1700 may omit an illustrated function or include other functions described herein.

In FIG. 17, rendered image data is input to the pixel processing pipeline 1700 from the GPU via a frame buffer 1702. The frame buffer 1702 can be, for example, a ping pong buffer (also known as a double buffer) which allows one frame to be processed while another is loaded into memory. As discussed herein, each frame can include one or more color component sub-frames for each of one or more depth planes of digital imagery. For example, each frame may consist of red, green, and blue color sub-frames for each of two or three depth planes. The functions performed by the pixel processing pipeline 1700 can be done for each color component sub-frame of each depth plane of image data to be displayed by the system 80. In some embodiments, each frame of image data may have a resolution of 1280 horizontal pixels by 960 vertical pixels and the frame rate may be 60, 80, or 120 frames per second, though many other resolutions and frame rates can be used depending on the capabilities of the hardware, the application, the number of color fields or depth planes, etc.

In some embodiments, the bit depth of the color image data is 24 bits, which includes 8 red bits, 8 blue bits, and 8 green bits per pixel. Thus, the amount of data input to the frame buffer 1702 for each depth plane of color image data is 1280×960×24 bits (30 Mb). If three depth planes of 1280×960 full color image data, each consisting of three color sub-frames (e.g., red, green, and blue sub-frames), are to be processed at a rate of 80 frames per second, then the pixel processing pipeline 1700 generally needs to have a processing bandwidth capability of about 885 MB/s (1280× 960×3×3×80). Alternatively, for generally the same computational cost the pixel processing pipeline 1700 can process full color image data for two depth planes at 120 frames per second (1280×960×3×2×120 is 885 MB/s). Other combinations of depth planes and frame rates are also possible and, in some embodiments, the pixel processing pipeline 1700 can dynamically switch between the various combinations. In any of these cases, due to the relatively large amount of image data to be processed in the pixel processing pipeline 1700, multiple parallel processing paths can be implemented in order to meet processing bandwidth requirements. For example, if the pixel processing pipeline 1700 hardware operates at 125 MHz, then 8 parallel pixel processing paths can be used in order to achieve the 885 MB/s bandwidth requirement of the foregoing example. The number of parallel processing paths can vary, however, based on many factors, including the resolution of the image data, the speed of the pixel processing pipeline 1700 hardware, etc.

As a stream of rendered image data is input to the frame buffer 1702 of the pixel processing pipeline 1700, the display controller may use embedded control data (as discussed herein) to determine which color component of which depth plane each pixel belongs to, as well as to determine the order in which the color components of each depth plane are to be flashed to the display 62. This can be done as described above with respect to FIGS. 13-15. For example, the display controller can use embedded depth plane indicator data to separate the stream of rendered image data into one or more RxGxBx sequences, where the R0G0B0 sequence corresponds to the red, green, and blue sub-frames of a first depth plane, the R1G1B1 sequence corresponds to the red, green, and blue sub-frames of a second depth plane, and the R2G2B2 sequence corresponds to the red, green, and blue sub-frames of a third depth plane. After processing in the pixel processing pipeline 1700, the color component sub-frames of each depth plane can be sequentially flashed to the display 62, as described with respect to FIG. 9.

One of the functions performed by the pixel processing pipeline 1700 in FIG. 17 is color blending, which is performed by the color blending block 1704. The color blending block 1704 receives rendered image data from the frame buffer 1702. The color blending block 1704 blends image data corresponding to different depth planes so as to create blended image data which, when displayed by the display 62 described herein, appears to be located at a virtual depth plane between the blended depth planes. For example, the color blending block 1704 may blend all or a portion of the R0G0B0 sequence with all or a portion of the R1G1B1 sequence (though any other pair of depth plane color sequences can also be blended by the color blending block 1704).

A virtual depth plane can be provided at a desired interval between two defined depth planes in the system 80 by blending the two depth plane images with appropriate weightings. For example, if a virtual depth plane is desired halfway between a far field depth plane D0 and a midfield depth plane D1, then the color blending block 1704 can weigh the pixel values of the D0 image data by 50% while also weighting the pixel values of the D1 image data by 50%. (So long as the weightings sum to 100%, then the apparent brightness of the image data can be maintained. But the weights need not necessarily sum to 100%; arbitrary weights can be used.) When both the far field image data and the midfield image data are displayed by the display 62 described herein, the result interpreted by the human visual system is a virtual depth plane that appears to be located between D0 and D1. The apparent depth of the virtual depth plane can be controlled by using different blending weights. For example, if it is desired that the virtual depth plane appear closer to D1 than D0, then the D1 image can be weighted more heavily.

The rendered image data provided at the frame buffer 1702 from the GPU can include control data which determines how the blending operation is carried out by the color blending block 1704. In some embodiments, the control data can cause uniform blending to be carried out for all of the pixels in a depth plane. In other embodiments, the control data can cause different amounts of blending (including no blending at all) to be carried out for different pixels in a given depth plane. In addition, the control data can cause different pixels in a given depth plane to be blended with pixels from different depth planes. In these cases, each pixel can be tagged with control data to specify the blending to be performed for that particular pixel, as illustrated in FIG. 18.

Figure 18:
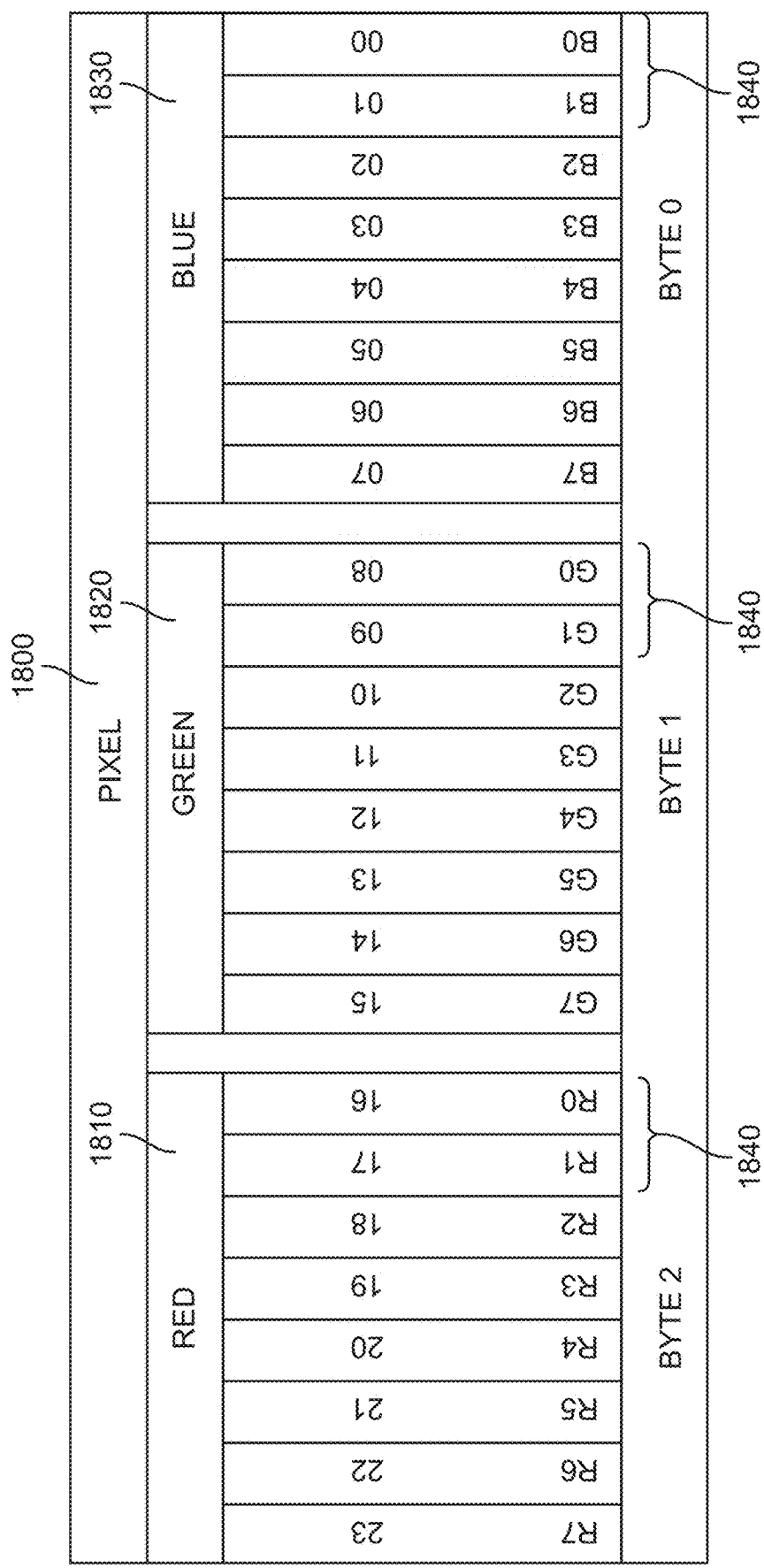
FIG. 18 illustrates an example format for a video pixel which is tagged with data for controlling a blending operation with a pixel corresponding to another depth plane.

FIG. 18 illustrates an example format for a pixel 1800 which is tagged with control data 1840 for controlling a blending operation with a pixel corresponding to another depth plane. In this example, the control data 1840 is virtual depth plane indicator data which specifies to which of one or more different virtual depth planes the pixel 1800 corresponds. The pixel 1800 includes a blue value 1830 (Byte 0), a green value 1820 (Byte 1), and a red value 1810 (Byte 2). In this embodiment, the virtual depth plane indicator data is embedded in the pixel 1800 as the two least significant bits of each color value (i.e., B0, B1, G0, G1, R0, and R1). Therefore, the bit depth of each color is reduced from 8 bits to 6 bits. Thus, the virtual depth plane indicator data can be embedded directly in pixels of image data at the expense of dynamic range of the color value(s) for the pixel. The total of six bits of virtual depth plane indicator data allows for the specification of 26=64 virtual depth planes. In the case where, for example, the image data includes three depth planes D0, D1, and D2, then one of the depth plane indicator bits can indicate whether the pixel 1800 should lie in a virtual depth plane in the range from D0 to D1 or in the range from D1 to D2, while the other five bits specify 32 virtual depth planes in the selected range. In some embodiments, the virtual depth plane indicator data is used to reference one or more lookup tables which output a blending multiplier value corresponding to the virtual depth plane specified by the virtual depth plane indicator bits 1840. While FIG. 18 illustrates a total of six bits of virtual depth plane indicator data, other embodiments may include a different number of bits. In addition, the virtual depth plane indicator data can be provided using other techniques than the one illustrated in FIG. 18. For example, virtual depth plane indicator data can be provided using the YCbCr 4:2:2 technique shown in FIG. 12B.

Figure 19:
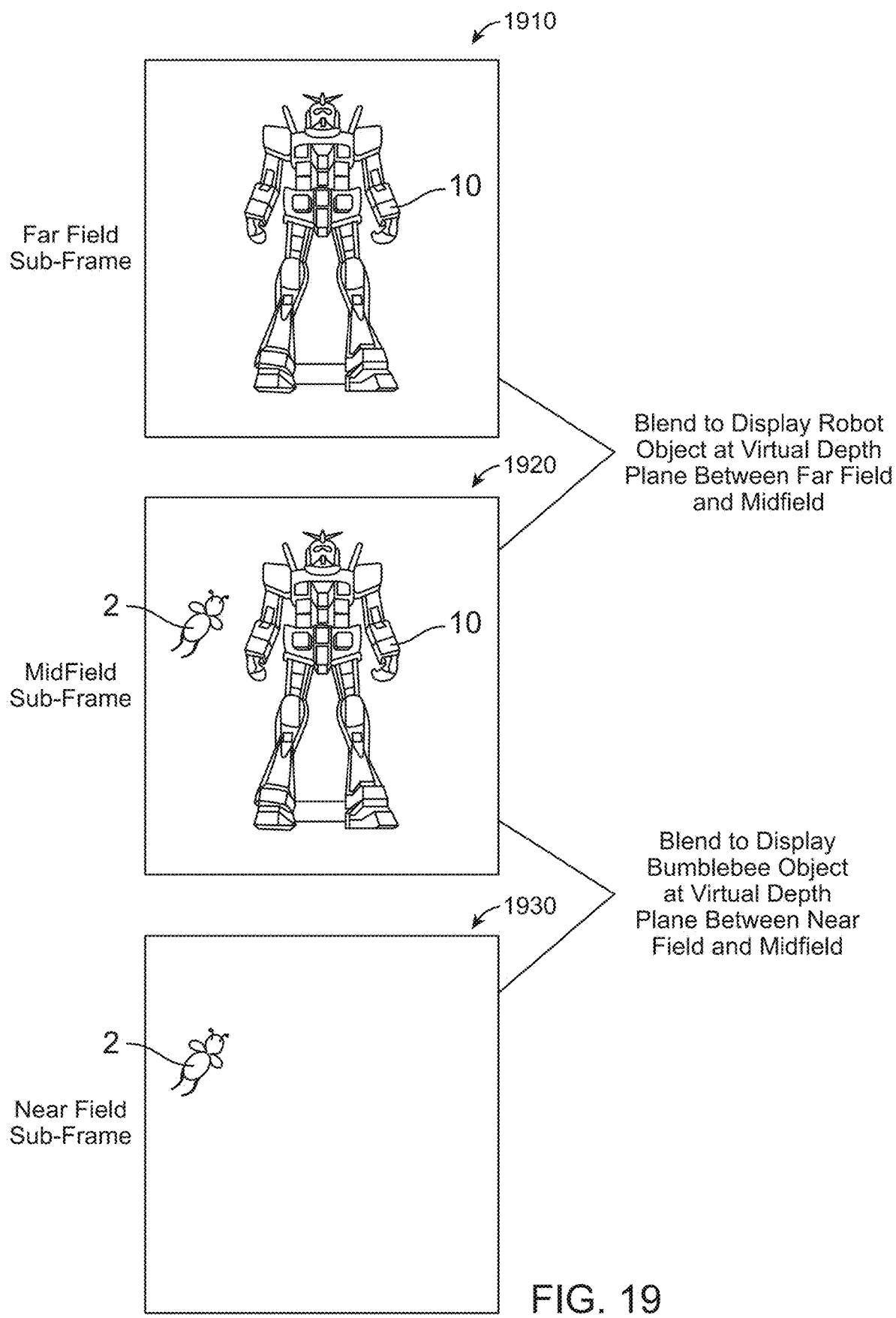
FIG. 19 illustrates an example blending operation which can be carried out by a color blending block of the pixel processing pipeline shown in FIG. 17.

FIG. 19 illustrates an example blending operation which can be carried out by the color blending block 1704. This blending operation is carried out by the example embodiment of the color blending block 1704 shown in FIG. 20, described below. FIG. 19 shows three depth planes of digital imagery to be displayed by the display 62 described herein. A far field sub-frame 1910 is associated with an optical power in the display 62 which makes the image data in this sub-frame appear to the user 60 to be located at a far field location. Similarly, a midfield sub-frame 1920 is associated with an optical power in the display 62 which makes the image data in this sub-frame appear to the user 60 to be located at a midfield location, while a near field sub-frame 1930 is associated with an optical power in the display 62 which makes the image data in this sub-frame appear to the user 60 to be located at a near field location.

In the illustrated embodiment of FIG. 19, the midfield sub-frame 1920 includes a robot virtual object 10 and a bumblebee virtual object 2. Meanwhile, the far field sub-frame 1910 only includes the robot virtual object 10 and the near field sub-frame 1930 only includes the bumblebee virtual object 2. The pixels for these three sub-frames are tagged with embedded virtual depth plane indicator data (e.g., the control data 1840 shown in FIG. 18), which controls the blending operations performed by the color blending block 1704 shown in FIG. 20.

The far field sub-frame 1910 and the midfield sub-frame 1920 can be blended, as shown in FIG. 19, so as to produce imagery which appears to the user 60 to originate from a virtual depth plane located between the far field and the midfield depths. This is accomplished by multiplying the pixels which correspond to the robot virtual object 10 in the far field sub-frame 1910 by a blending multiplier value, and by doing the same for the pixels in the midfield sub-frame 1920 which correspond to the robot virtual object 10. The respective blending multiplier values for the robot virtual object 10 in the far field and midfield sub-frames may sum to one so as to maintain the brightness of the robot virtual object 10, though this is not necessarily required. One or more scalers can be used to ensure that a virtual object is substantially the same size in both of the depth planes that are being blended so that like portions of the virtual object are combined during the blending operation.

Similarly, the midfield sub-frame 1920 and the near field sub-frame 1930 can be blended so as to produce imagery which appears to the user 60 to originate from a virtual depth plane located between the midfield and the near field depths. This is likewise accomplished by multiplying the pixels which correspond to the bumblebee virtual object 2 in the midfield sub-frame 1920 by a blending multiplier value, and by doing the same for the pixels in the near field sub-frame 1930 which correspond to the bumblebee virtual object 2.

Figure 20:
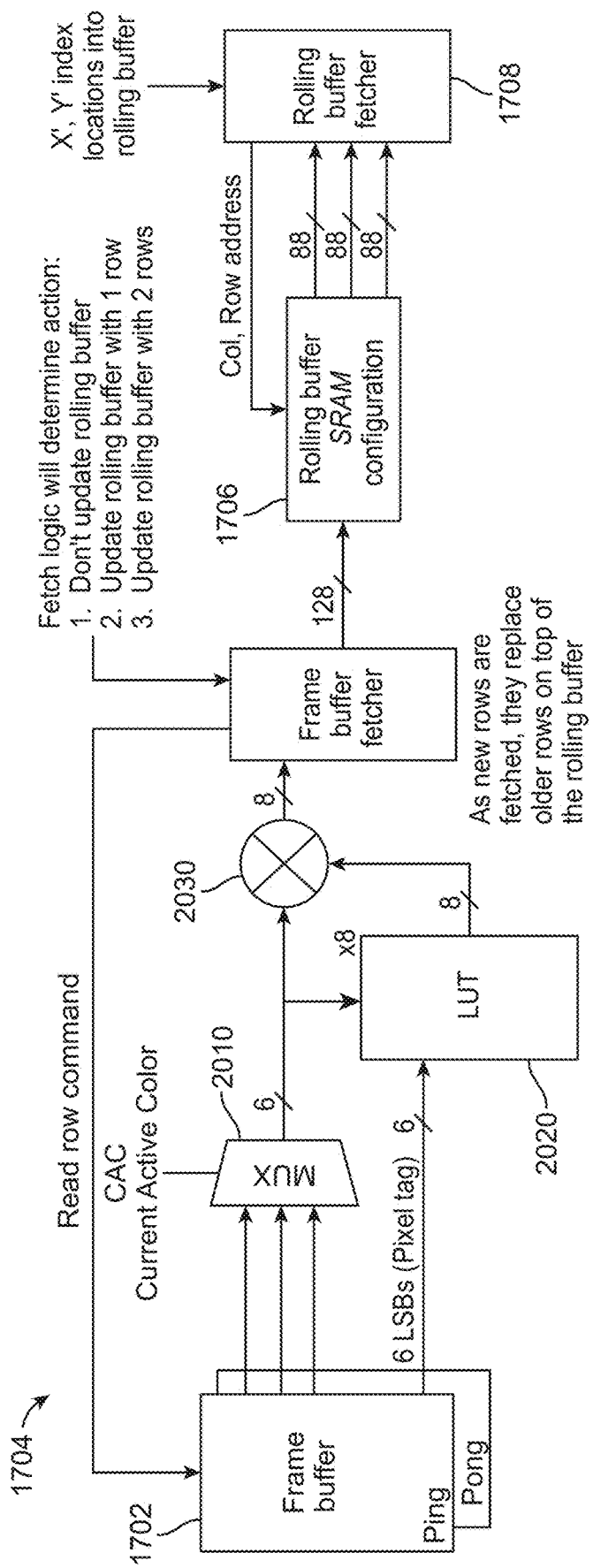
FIG. 20 illustrates an embodiment of a color blending block which performs blending operations between depth planes of image data on a pixel-by-pixel basis.

FIG. 20 illustrates an embodiment of the color blending block 1704 which performs blending operations between depth planes of image data on a pixel-by-pixel basis. The color blending block 1704 includes a multiplexer 2010, lookup tables 2020, and a multiplier 2030. As shown in FIG. 20, rendered image data from the frame buffer 1702 is provided to the multiplexer 2010. The rendered image data received at the frame buffer 1702 utilizes the pixel format shown in FIG. 18. Therefore, in this case, only the six most significant bits of each color value (R, G, and B) of the pixel 1800 represent actual image data. These are the bits which are input to the multiplexer 2010. The multiplexer 2010 in turn passes the six bits corresponding to one of the color values at a time to the multiplier 2030. Those six bits are selected by a control input to the multiplexer 2010, which specifies the current active color. Meanwhile, the six least significant bits of the color values (two for each of the three color values) of the pixel 1800 are input to the lookup tables 2020. As discussed with respect to FIG. 18, these bits are virtual depth plane indicator data which specify to which of 64 possible virtual depth planes the pixel 1800 belongs. A separate lookup table 2020 is provided for each color field of each depth plane. Thus, in the case of image data which includes three depth planes each having three color components, there are nine total lookup tables 2020.

In some embodiments, each lookup table 2020 holds 64 blending multiplier values, with each value defining a blending weight for one of the 64 virtual depth planes. Typically, the blending multiplier values in the lookup tables 2020 vary from zero (which results in a minimum contribution of the given pixel to the final displayed imagery) to one (which results in a maximum contribution of the given pixel to the final displayed imagery). The spacings between virtual depth planes are defined by the spacings between blending weights in the lookup tables 2020. While the spacings between the virtual depth planes can be linear, they need not necessarily be, as any custom spacings can be provided between the virtual depth planes, including exponential, logarithmic, etc.

In operation, the particular lookup table 2020 which corresponds to the color component and depth plane currently being processed is selected, and the virtual depth plane indicator data is used to output the associated blending multiplier value. The blending multiplier value is then passed to the multiplier 2030 where it scales the corresponding color value of the pixel 1800 so as to achieve the blending effect specified by the virtual depth plane indicator data. The blended image data is then provided to a rolling buffer 1706.

Figure 21:
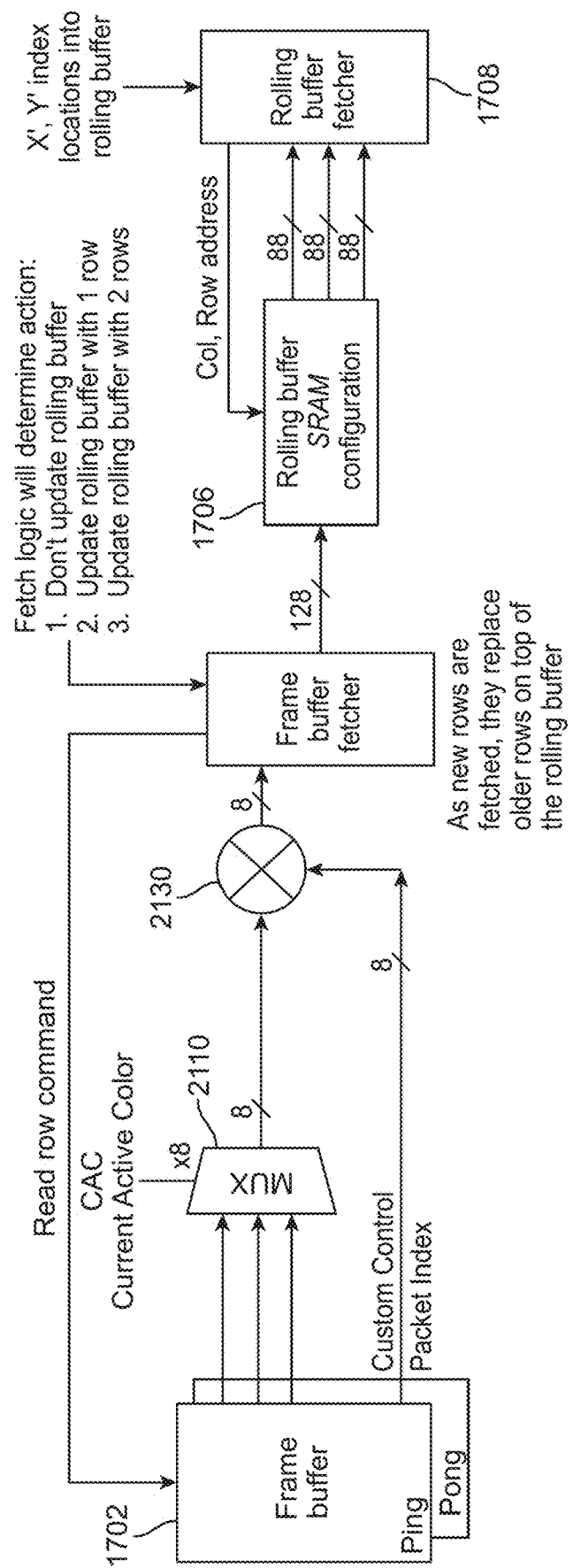
FIG. 21 illustrates an embodiment of a color blending block which performs blending operations between depth planes of image data on a uniform basis for an entire depth plane.

FIG. 21 illustrates an embodiment of the color blending block 1704 which performs blending operations between depth planes of imagery data on a uniform basis for an entire depth plane. Once again, the color blending block 1704 includes a multiplexer 2110 and a multiplier 2130. In this embodiment, since the blending operation is performed uniformly for every pixel in the depth plane, there is no need for the pixels to be individually tagged with embedded virtual depth plane indicator data. As a result, the full bit depth of eight bits can be maintained for each color value of each pixel. These 8-bit color values are passed to the multiplexer 2110, which in turn outputs the eight bits corresponding to one of the color values based on the control input to the multiplexer that indicates the current active color.

In this case, the virtual depth plane indicator data is common to all of the pixels in the depth plane. In other words, all of the pixels in the depth plane are designated to be blended to the same virtual depth plane. As a result, the same blending multiplier value is used to scale each of the pixels in the depth plane. In some embodiments, this common virtual depth plane indicator data, and/or the common blending multiplier value, can be provided in a custom packet before or in place of one of the lines of image data (as discussed with respect to FIGS. 10 and 11). Then, the blending multiplier value is used by the multiplier 2130 to scale the corresponding color value of the pixel being processed. Finally, the blended imagery is then provided to the rolling buffer 1706.

After the rolling buffer 1706 (discussed below) is filled with a portion of the blended image data from the color blending block 1704, a rolling buffer fetcher 1708 (also discussed below) selects and fetches a group of pixels from the rolling buffer 1706 for use in a pixel interpolator 1710. The pixel interpolator 1710 performs interpolation calculations which are part of the lens distortion correction function of the pixel processing pipeline 1700.

The lens distortion correction function of the pixel processing pipeline 1700 corrects for optical distortions and/or aberrations which are present in the optical path of the system 80. These optical distortions and/or optical aberrations can occur anywhere in the optical path between the point where the image data is converted from digital electronic data to light and the point where the light is output from the display 62 towards the eyes of the user 60. In some embodiments, the pixel processing pipeline 1700 corrects for optical distortions and/or aberrations by pre-distorting the image data that is to be displayed to the user 60. For example, the image data may be pre-distorted in a way that is at least partially, and preferably substantially, inversely related to the optical distortions and/or aberrations present in the system 80. In this way, the pre-distortions introduced by the pixel processing pipeline 1700 are at least partially, and preferably substantially, undone by the optical components of the system 80 as the optical imagery signals propagate through the optical path of the system 80.

Pixels which have not been pre-distorted to correct for lens distortion and/or aberration may be referred to herein as non-distortion-corrected pixels or image data, while pixels which have been pre-distorted may be referred to as distortion-corrected pixels or image data. The pixel interpolator 1710 calculates each distortion-corrected pixel based on one or more non-distortion-corrected pixels from the rolling buffer 1706 (e.g., pixels of the rendered image data received at the frame buffer 1702 from the GPU). The distortion-corrected image data which is output by the pixel interpolator 1710 can be pre-distorted by using distortion correction data to indicate which non-distortion-corrected pixel(s) (e.g., from the frame buffer 1702) should be used to calculate the value for any given distortion-corrected pixel (e.g., a pixel which is calculated by the pixel interpolator 1710 and ultimately sent to the display 62). For example, the value of a distortion-corrected pixel located at an indexed position (x, y) in the image data output to the display 62 may be calculated using one or more non-distortion-corrected pixels located at or near a different position (x', y') in the input image data (e.g., the pixels received at the frame buffer 1702 from the GPU). This can be done with the knowledge (based on experimentation or theory) that optical distortions and/or aberrations in the display 62 will cause the rays of light which are representative of the image data provided to the display 62 for the pixel at (x, y) to be distorted toward, near, or to the position (x', y'). Therefore, by preemptively calculating the distortion-corrected pixel value at (x, y) with the non-distortion-corrected data at (x', y'), the optical distortions and/or aberrations of the display 62 are at least partially compensated.

In some embodiments, the value (e.g., an RGB value, a YCbCr value, etc.) of each distortion-corrected pixel from the pixel interpolator 1710 is taken from an interpolated non-distortion-corrected pixel at another location, which itself depends on the interpolation of four adjacent non-distortion-corrected pixels. However, other embodiments may use a different number of non-distortion-corrected pixels in the pixel interpolator 1710. The location of the interpolated non-distortion-corrected pixel, and hence the locations of the four adjacent non-distortion-corrected pixels, is determined using one or more lens distortion correction lookup tables 1712 stored in a memory. A separate lens distortion correction lookup table may be stored for each color field of each depth plane of image data because each of these may have an at least partially unique optical path through the display 62 with unique distortions and/or aberrations. (For example, separate waveguides may be provided for each color component of each depth plane, as discussed with respect to FIGS. 6-8.) In the case where the image data consists of three depth planes of image data, each consisting of three color fields, there may be nine separate lens distortion correction lookup tables. Other embodiments with different numbers of depth planes and/or color fields may require more or fewer lens distortion correction lookup tables. Typically, the lens distortion correction lookup tables 1712 will be loaded into memory of the display controller from a host processor and will not change during a given usage of the system 80. But, in some embodiments, the lens distortion correction lookup tables 1712 may be dynamic if the optical distortions and/or aberrations in the system 80 change or if more information is learned about them, thus allowing improvements to the lens distortion correction lookup tables 1712.

Figure 22:
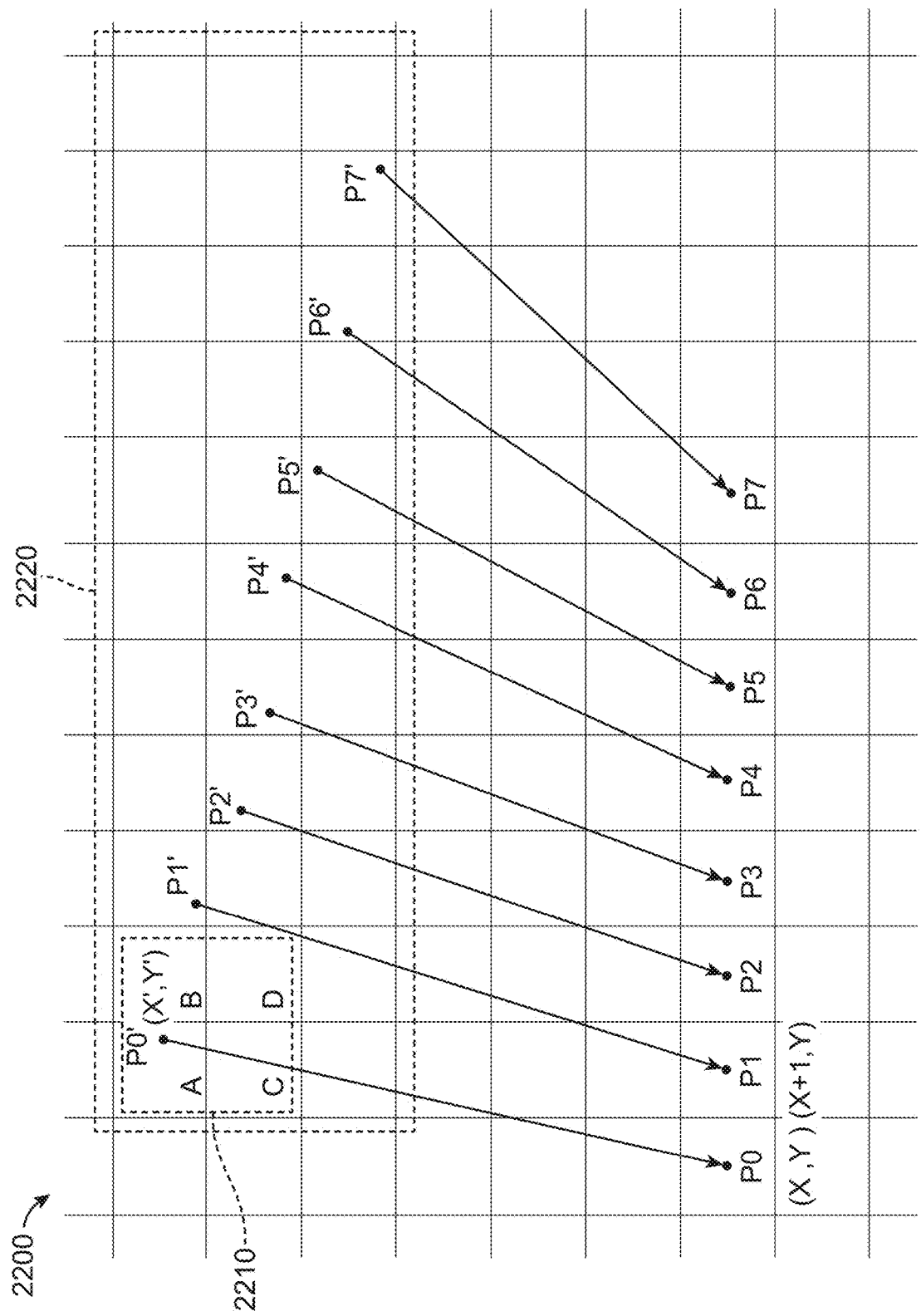
FIG. 22 is a schematic representation of a lens distortion correction functionality of the pixel processing pipeline shown in FIG. 17.

FIG. 22 is a schematic representation of the lens distortion correction functionality of the pixel processing pipeline 1700 of FIG. 17. FIG. 22 shows a grid 2200 of pixels of image data. The grid 2200 of pixels represents a portion of a frame of image data. The grid 2200 of pixels includes 8 labeled distortion-corrected pixels, P0, P1, P2, P3, P4, P5, P6, and P7, in a row of image data to be output to the display 62. Each of these distortion-corrected pixels may have, for example, associated red (R), green (G), and/or blue (B) values. Distortion-corrected pixel P0 is located at a grid point (x, y), while distortion-corrected pixel P1 is located at grid point (x+1, y), distortion-corrected pixel P2 is located at grid point (x+2, y), and so on.

In some embodiments, the group of 8 adjacent distortion-corrected pixels P0, P1, P2, P3, P4, P5, P6, and P7 are all processed simultaneously in parallel by dedicated hardware of the pixel processing pipeline 1700. Separate blocks of 8 pixels can each be processed in turn until an entire frame of image data has been completed. In other embodiments, the blocks of pixels which are processed together in parallel can have other sizes and/or dimensions. In addition, the blocks of pixels which collectively make up a frame of image data can be processed in any order or pattern.

Each lens distortion correction lookup table 1712 may include a set of distortion correction coordinates for each distortion-corrected pixel of image data. The distortion correction coordinates are used to determine the non-distortion-corrected pixels (e.g., the pixels received at the frame buffer 1702) which should be used to calculate the value of each distortion-corrected pixel (e.g., the pixels output from the pixel interpolator 1710 and ultimately shown on the display 62). Conceptually, this is illustrated in FIG. 22 by showing the respective interpolated non-distortion-corrected pixels P0', P1', P2', P3', P4', P5', P6', and P7' which are used to respectively provide the values of the distortion-corrected pixels P0, P1, P2, P3, P4, P5, P6, and P7. As shown in FIG. 22, the distortion-corrected pixel P0, located at (x, y) in the image data which is output from the pixel interpolator 1710 and is ultimately sent to the display 62, is determined from the interpolated non-distortion-corrected pixel P0' located at (x', y'). The (x', y') coordinates can be fractional, in which case they do not correspond to any actual non-distortion-corrected pixel of image data received at the frame buffer 1702. Accordingly, the value of the interpolated non-distortion-corrected pixel P0' can be calculated via interpolation from a group of pixels of non-distortion-corrected image data around (x', y'). In some embodiments, the value of P0' is calculated from a set 2210 of four adjacent non-distortion-corrected pixels A, B, C, and D. FIG. 22 illustrates an example set 2210 of non-distortion-corrected pixels which can be used to calculate the value of the interpolated non-distortion-corrected pixel P0'.

A set of distortion correction coordinates is provided for each distortion-corrected pixel (e.g., P0). The distortion correction coordinates indicate the location of the interpolated non-distortion-corrected pixel (e.g., P0') which should be used to determine the corresponding distortion-corrected pixel. The distortion correction coordinates can be represented in a relative sense with respect to the indices or coordinates of the distortion-corrected pixel to be determined. For example, in such a case, the distortion correction coordinates may indicate an amount by which to displace the x (horizontal) index or coordinate for a given distortion-corrected pixel in the +/−x-direction as well as an amount by which to displace the y (vertical) index or coordinate of that distortion-corrected pixel in the +/−y-direction. Alternatively, the lens distortion correction lookup tables 1712 may include absolute distortion correction coordinate values for each distortion-corrected pixel. For example, in such a case, the absolute coordinate values may indicate the specific coordinates of the interpolated non-distortion-corrected pixel (e.g., P0') that should be used to calculate a given distortion-corrected pixel (e.g., P0), without reference to that distortion-corrected pixel's location. The approach of using relative displacements may be advantageous, however, because it may require fewer bits to specify the location of each non-distortion-corrected pixel, thus reducing the size of the lens distortion correction lookup tables 1712. In either case, it is important to again note that the distortion correction coordinates need not be whole numbers. For example, the distortion correction coordinates can indicate that any given distortion-corrected pixel (e.g., P0) is to be determined using a fractional interpolated non-distortion-corrected pixel (e.g., P0').

The specific distortion correction coordinates in each lens distortion correction lookup table 1712 can be determined experimentally (e.g., by inputting a known calibration image to the system 80 and comparing the displayed image to the calibration image) or theoretically (e.g., by using ray tracing algorithms to determine the distortions and/or aberrations of the optical path of the system 80). The lens distortion correction lookup tables 1712 are advantageous because they can be used to correct linear, regular, irregular, complex, and/or non-linear distortions and/or aberrations which would be difficult or impossible to correct using, for example, mathematical formulae. This approach is particularly advantageous in the system 80 described herein because the display 62 can include a complicated set of optical components, including a stack of waveguides with irregular shapes and diffractive optical elements, which can result in complicated optical distortions and/or aberrations.

In some embodiments, each lens distortion correction lookup table 1712 consists of 22 bits for each of the 1280×960 pixels in a color sub-frame of image data, where the 22 bits represent two signed numbers—one for each of the horizontal and vertical distortion correction coordinates—formatted as seven integer bits and four fractional bits. Given the number of pixels in each frame, and the number of lens distortion correction lookup tables 1712, a relatively large amount of memory may be required to store the lens distortion correction lookup tables 1712. In order to alleviate the memory requirements, each lens distortion correction lookup table 1712 can be stored in memory of the display controller at a reduced resolution. For example, each lens distortion correction lookup table 1712 may be stored with an 80×60 resolution (or 81×61 to take into account the external grid of the lookup table) rather than 1280×960. In such embodiments, a lens distortion correction lookup table interpolator 1714 interpolates each lens distortion correction lookup table 1712 to its full 1280×960 resolution. This can be done, for example, using bilinear interpolation to fill in the values between the data points of the lens distortion correction lookup tables 1712. But other types of interpolation can also be used. In addition, other compression techniques can be used to reduce the size of the lens distortion correction lookup tables in memory and corresponding expansion techniques can be used in the pixel processing pipeline to expand the lens distortion correction lookup tables to full size.

In embodiments of the pixel processing pipeline 1700 where a lens distortion correction lookup table interpolator 1714 is used to expand the lens distortion correction lookup tables 1714 to full resolution, the lens distortion correction lookup table interpolator 1714 typically receives an expansion ratio input which indicates how much to expand each lens distortion correction lookup table 1712. For example, in the case of an 80×60 lens distortion correction lookup table and 1280×960 imagery, the expansion ratio would be $80/1280 = 60/960 = 0.0625$.

Using the (x, y) indices or coordinates of a distortion-corrected pixel (e.g., P0) to be determined, a lens distortion correction lookup table 1712 is used to output the corresponding distortion correction coordinates. Those distortion correction coordinates are used to determine the location of the interpolated non-distortion-corrected pixel (e.g., P0') whose value will determine the value of the distortion-corrected pixel (e.g., P0). In the case of lens distortion correction lookup tables 1712 which stores relative (rather than absolute) distortion correction coordinates, the pixel processing pipeline 1700 includes adders 1716a, 1716b which add the respective distortion correction coordinates, determined using the lens distortion correction lookup tables 1712, to the corresponding indices/coordinates of the distortion-corrected pixel to be determined. At adder 1716a, the horizontal lens distortion correction coordinate is added to the x index/coordinate of the distortion-corrected pixel. Similarly, at adder 1716b, the vertical lens distortion correction coordinate is added to the y index/coordinate of the distortion-corrected pixel. With reference to the diagram shown in FIG. 22, what is happening in the pixel processing pipeline 1700 is that the (x, y) coordinates of distortion-corrected pixel P0 are used to look up a set of corresponding relative distortion correction coordinates from a lens distortion correction lookup table 1712. These relative distortion correction coordinates are added to the (x, y) coordinates of P0 by the adders 1716a, 1716b in order to determine the (x', y') coordinates of the interpolated non-distortion-corrected pixel P0' whose value should be used as the value of the distortion-corrected pixel P0.

After the coordinates of the interpolated non-distortion-corrected pixel (e.g., P0') are calculated by the adders 1716a, 1716b, the next stage of the pixel processing pipeline 1700 performs resampling and image warping operations, such as image shifting. This may consist of vertical and horizontal image scaling and applying a global shift in the horizontal and/or vertical directions. Although not illustrated, this stage of the pixel processing pipeline 1700 can also perform image rotations. Image warping operations are discussed in more detail below.

The scaling factor, K, as well as the global shift values, GS(x) and GS(y), can be passed to the display controller via the control data described herein. Image rotation information may also be passed to the display controller via the control data. If the shifting or scaling procedures access image data outside the bounds (e.g., 1280×960 pixels) of the image frame, then pixels outside the frame can be assumed to be zero (black). No pixel wraparound is required in such embodiments. Also, each output frame of image data will generally consist of the same resolution as the input frame (e.g., 1280×960) even after applying the K scaling factor and/or global shifts.

The pixel processing pipeline 1700 includes image scaling/shifting blocks 1720a, 1720b, which receive the coordinates of the interpolated non-distortion-corrected pixel (e.g., P0') determined using the lens distortion correction lookup tables 1712 and adders 1716a, 1716b, and apply the pixel shifting and/or image resampling (magnification/minification). A benefit of this capability is that pixel shifts, image rotations, and/or image re-sizing operations can be performed by the display controller to make adjustments to the image data without requiring that it be re-rendered by the GPU.

The top image scaling/shifting block 1720a operates on the horizontal coordinate of the interpolated non-distortion-corrected pixel (e.g., P0'), while the bottom scaling/shifting block 1720b operates on the vertical coordinate of the interpolated non-distortion-corrected pixel. The image scaling/shifting blocks 1720a, 1720b include adders 1722a, 1722b which are used to centralize the interpolated non-distortion-corrected pixel coordinates about the point (0, 0) so that scaling and shifting can be applied. The first adder 1722a of the top block 1720a centralizes the horizontal coordinate of the interpolated non-distortion-corrected pixel by subtracting from it the value HOR/2, which equals the width of the image data divided by two. Similarly, the first adder 1722b of the bottom block 1722b centralizes the vertical coordinate of the interpolated non-distortion-corrected pixel by subtracting from it the value VER/2, which equals the height of the image data divided by two.

The centralized coordinates of the interpolated non-distortion-corrected pixel P0' are then passed to the scalers 1724a, 1724b. The scalers 1724a, 1724b perform image resampling (magnification or minification). This is done using the scaling factor K (provided in the control data discussed herein), which is multiplied times the centralized coordinates of the interpolated non-distortion-corrected pixel (e.g., P0'). In some embodiments, the scaling factor K is limited to a range from 0.9 to 1.1 so as to avoid image resizing operations which may cause noticeable image artifacts, though in other embodiments the scaling factor may be provided with a larger range. The scaler 1724a in the top block 1720a multiplies the scaling factor K times the horizontal coordinate of the interpolated non-distortion-corrected pixel, while the scaler 1724b in the bottom block 1720b does the same to the vertical coordinate of the interpolated non-distortion-corrected pixel. In some embodiments, the same scaling factor K will be used for both the horizontal and vertical coordinates in order to maintain the aspect ratio of the image data, but different scaling factors could be used in other embodiments.

The image scaling/shifting blocks 1720a, 1720b also include adders 1726a, 1726b which perform pixel shifting. As discussed further below, the control data can include pixel shift values which cause the image data to be shifted horizontally and/or vertically. The second adder 1726a in the top block 1720a sums the scaled horizontal coordinate of the interpolated non-distortion-corrected pixel (e.g., P0') with GS(x), which is the horizontal global shift value. It also adds HOR/2 to these values to undo the horizontal centralization operation performed earlier in the top image scaling/shifting block 1720a. Similarly, the second adder 1726b in the bottom block 1720*b* sums the scaled vertical coordinate of the interpolated non-distortion-corrected pixel with GS(y), which is the vertical global shift value. It likewise adds VER/2 to these values to undo the vertical centralization operation. In some embodiments, the global shift amounts for each color component of the image data may be a signed number of pixels up to, for example, +/−128 with four sub-pixel bits of precision. Hence GS(x) and GS(y) may be 12 bit quantities.

Although FIG. 17 shows that the image scaling and warping operations are performed after using the lens distortion lookup tables 1712, in other embodiments these operations can be performed in different orders. For example, image scaling and image warping could be applied before using the lens distortion lookup tables 1712 or at other locations within the pixel processing pipeline 1700. In still other embodiments, image warping operations may be incorporated directly into the lens distortion lookup tables 1712. For example, the pixel processing pipeline 1700 may receive head pose information which is used to determine appropriate image warping operations to perform on the image data. The pixel processing pipeline 1700 may then alter the lens distortion lookup tables 1712 so as to reflect one or more image warping operations to be imposed on the image data. This is possible because the lens distortion lookup tables 1712 map non-distortion-corrected pixels received at the frame buffer 1702 to new distortion-corrected pixel locations to be shown on the display 62. Similarly, image warping also involves mapping pixels to new locations. Thus, the lens distortion correction mappings can be combined with the image warping mappings in the same table. In this way, lens distortion correction and image warping can be performed simultaneously.

After being scaled and/or shifted, the coordinates (e.g., (x', y')) of the interpolated non-distortion-corrected pixel (e.g., P0') are then provided to the rolling buffer fetcher 1708. The rolling buffer fetcher 1708 (in conjunction with the rolling buffer 1706) supplies, to the pixel interpolator 1710, the particular non-distortion-corrected pixels which are needed in order to calculate each interpolated non-distortion-corrected pixel (e.g., P0'), and hence each distortion-corrected pixel (e.g., P0). Those particular non-distortion-corrected pixels are determined, from among all the input pixels received at the frame buffer 1702, based on the coordinates (e.g., (x', y')) of the interpolated non-distortion-corrected pixel (e.g., P0'). After using the coordinates (e.g., (x', y')) to identify and fetch the non-distortion-corrected pixels needed to calculate one or more interpolated non-distortion-corrected pixels (e.g., P0') from the rolling buffer 1706, the rolling buffer fetcher 1708 then passes the fetched pixels to the pixel interpolator 1710 for use in the determination of distortion-corrected pixels (e.g., P0) according to the lens distortion correction technique described herein.

Figure 23:
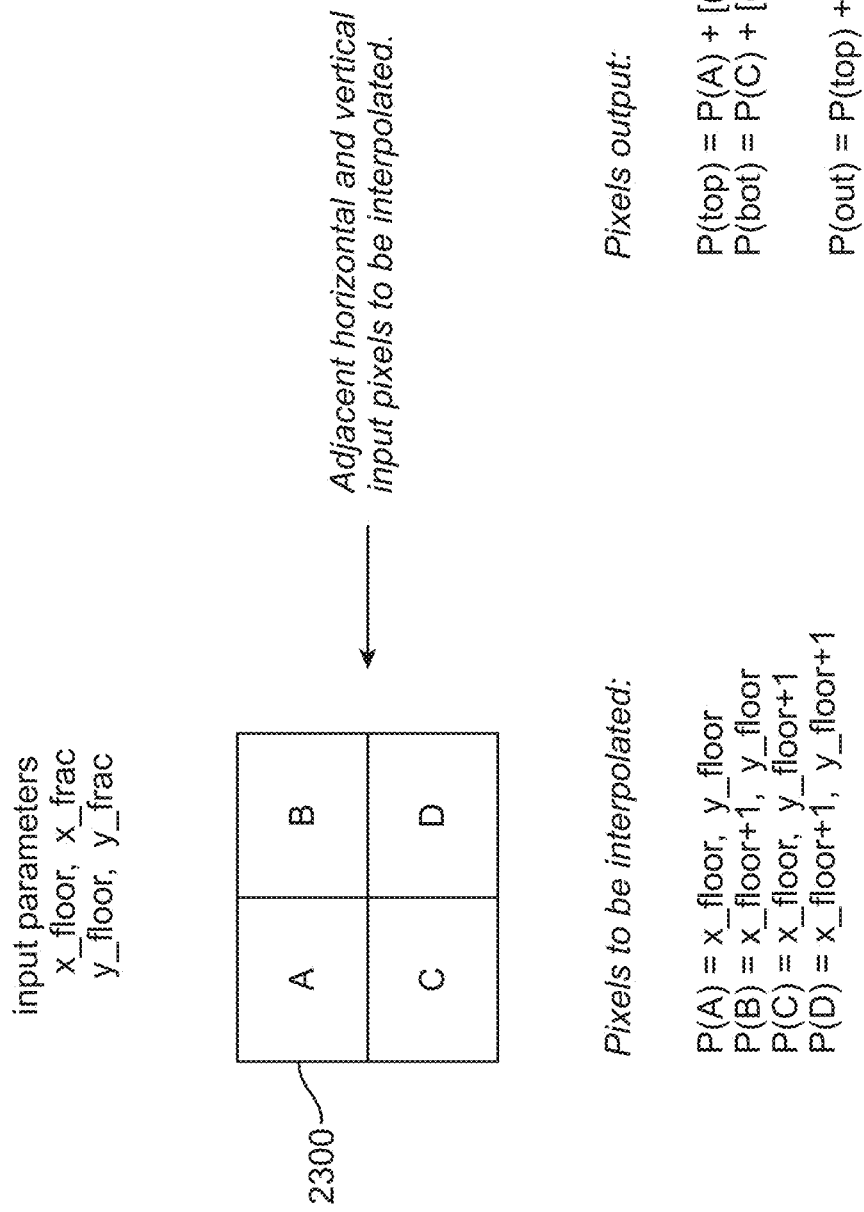
FIG. 23 illustrates the interpolation of four input pixels A, B, C, D by a pixel interpolator to calculate the value of a distortion-corrected output pixel.

FIG. 23 illustrates the interpolation of four non-distortion-corrected pixels A, B, C, D by the pixel interpolator 1710 to calculate the value of an interpolated non-distortion-corrected pixel P0', and hence to determine the value of a distortion-corrected pixel P0. The four non-distortion-corrected pixels A, B, C, and D can be specified based on the coordinates (x', y') for the interpolated non-distortion-corrected pixel P0' which are determined using the lens distortion correction lookup tables 1712. The (x', y') coordinates of the interpolated non-distortion-corrected pixel P0' can be used to determine the following four values: x_floor, which is the integer portion of the x-direction coordinate; x_fraction, which is the fractional portion of the x coordinate; y_floor, which is the integer portion of the y-direction coordinate; and y_fraction, which is the fractional portion of the y coordinate. As shown in FIG. 23, pixel A used in the interpolation process is specified by the coordinates (x_floor, y_floor). Pixel B is specified by the coordinates (x_floor+1, y_floor). Pixel C is specified by the coordinates (x_floor, y_floor+1). And pixel D is specified by the coordinates (x_floor+1, y_floor+1). These non-distortion-corrected pixels (A, B, C, D) are the ones which are supplied by the rolling buffer fetcher 1708 to the pixel interpolator 1710. As shown in FIG. 22, the non-distortion-corrected pixels A, B, C, and D are the ones which surround the location (x', y') of the interpolated non-distortion-corrected pixel P0'. Then, a bilinear interpolation process is carried out by the pixel interpolator 1710, according to the equations shown in FIG. 23 (where, in this example, P0=P0'=P(out) in the equations), to calculate the value of the interpolated pixel P0', which will in turn be used as the value for the distortion-corrected pixel P0.

It is possible, depending on the location of the interpolated non-distortion-corrected pixel P0' in a frame of image data, that one or more of pixels A, B, C, D will lie outside the bounds (e.g., 0-1279 and 0-959 or 1-960, depending on the embodiment) of the image data. In those limited cases, the out-of-bounds pixels in question can be considered black pixels. Although bilinear interpolation of four adjacent pixels is illustrated in FIG. 23, other types of interpolation can also be used. Further, a different number of non-distortion-corrected pixels can be used in the interpolation process to calculate the value of a distortion-corrected pixel. In addition, FIG. 23 illustrates but one way of selecting the group of pixels 2210 (e.g., pixels A, B, C, and D) used in the interpolation process from the coordinates of the interpolated non-distortion-corrected pixel P0'; other ways of selecting the pixels for interpolation can also be used.

The rolling buffer 1706 and the rolling buffer fetcher 1708 will now be discussed in detail. As already mentioned, the purpose of these components is to supply non-distortion-corrected pixels (e.g., from the frame buffer 1702) to the pixel interpolator 1710 for use in the lens distortion correction calculations. They achieve this purpose despite certain constraints which result from the fact that the pixel processing pipeline 1700 is typically implemented in dedicated hardware rather than software to achieve higher speeds and greater throughput. For example, the following constraints may be applicable: all pixels needed for the interpolation function performed by the pixel interpolator 1710 may need to be read together in one clock cycle (or some other limited number of clock cycles); available memory may be limited; and the pixel interpolator 1710 may be hardwired to operate on a group of pixels of a set size/shape.

The rolling buffer 1706 is advantageous because it reduces the amount of memory needed to store non-distortion-corrected pixels which may be needed by the pixel interpolator 1710. Specifically, the rolling buffer 1706 stores only a subset of a frame of video data at any given time and does so on a rolling basis. For example, in some embodiments, the rolling buffer 1706 stores a swath of 48 rows of non-distortion-corrected image data. Each row may consist of, for example, 1280 pixels. Although the rolling buffer 1706 will be described as storing 48 rows of non-distortion-corrected image data, it should be understood that in other embodiments the rolling buffer 1706 may store a different amount (e.g., number of rows) of non-distortion-corrected image data. As each new row of non-distortion-corrected image data is read into the rolling buffer 1706, it replaces a row that was previously stored in the rolling buffer 1706 on a first in, first out (FIFO) basis. For example, if the rolling buffer 1706 is currently storing rows 0-47, then when row 48 is read into the buffer, row 0 can be expelled. New rows of non-distortion-corrected image data can be read into the rolling buffer 1706 one at a time or multiple rows at a time.

The rolling buffer 1706 also helps to reduce power and improve throughput of the pixel processing pipeline 1700. This is so because any given row of non-distortion-corrected pixels from the frame buffer 1702 may be called for to be used in the pixel interpolator 1710 many different times for the calculation of various different distortion-corrected pixels (depending on the optical distortions/aberrations of the system 80). Without the rolling buffer 1706, a given row of non-distortion-corrected pixels may be read and discarded multiple times. But because the rolling buffer 1706 holds a swath of image data, it helps to avoid the need to perform repeated read operations from the frame buffer 1702 for the same pixels.

When the pixel processing pipeline 1700 begins performing lens distortion correction for a given frame of video data, the rolling buffer 1706 can be filled with 48 rows of non-distortion-corrected image data starting at, for example, a row which is specified in the control data described herein. In the case where the control data indicates that the lens distortion correction will begin with the first row of distortion-corrected image data (i.e., row 0), then rows 0-47 of the non-distortion-corrected image data are loaded into the rolling buffer 1706.

The pixel processing pipeline 1700 then begins calculating the values of distortion-corrected pixels according to the techniques described herein. In doing so, the first row (i.e., row 0) of distortion-corrected pixels can depend on any of the first 48 rows (i.e., rows 0-47) of non-distortion-corrected image data which are loaded into the rolling buffer 1706. In other words, the system 80 can handle optical distortions which cause image data to be distorted to a location as many as 48 rows away. The size of the rolling buffer 1706 can be selected based on the typical magnitude of optical distortions present in the system 80, where a larger rolling buffer allows for the correction of greater optical distortions but comes at the cost of requiring additional memory resources.

The pixel processing pipeline 1700 includes logic which, after the first row (i.e., row 0) of distortion-corrected pixels are calculated, determines whether to keep the rolling buffer 1706 where it is (i.e., not load any new non-distortion-corrected image data) or slide the rolling buffer 1706 down (e.g., load one or two new rows of non-distortion-corrected image data). This logic has the flexibility to position the 48 row rolling buffer 1706 with respect to the current row of distortion-corrected pixels being calculated in any way necessary so as to enhance the likelihood that the rolling buffer 1706 will include the requested non-distortion-corrected pixels. For example, when a distortion-corrected pixel near the top of a frame of image data is being computed, the rolling buffer 1706 may be positioned so as to allow any non-distortion-corrected pixel within the subsequent 47 rows of image data to be used in the calculation. When a distortion-corrected pixel near the middle of the frame of image data is being computed, the rolling buffer 1706 may be positioned so as to allow any non-distortion-corrected pixel approximately 24 rows above or below the position of the distortion-corrected pixel to be used in the computation. Finally, when a distortion-corrected pixel in the last row of image data is being computed, the rolling buffer 1706 can be positioned so as to permit access to any non-distortion-corrected pixel in the preceding 47 rows. In this way, the position of the rolling buffer 1706 can be altered with respect to the current row of distortion-corrected pixels being computed. In some configurations, the position of the rolling buffer 1706 may be altered smoothly between the first row and the last row of the non-distortion-corrected image data when computing distortion-corrected pixels.

In some embodiments, after finishing the computation of each row of distortion-corrected pixels, there are three possible options for updating the rolling buffer 1706: 1) no update to the rolling buffer 1706 (i.e., zero additional rows of non-distortion-corrected image data added); 2) update the rolling buffer 1706 by one additional row of non-distortion-corrected image data; or 3) update the rolling buffer 1706 by two additional rows of non-distortion-corrected image data. In other embodiments, the algorithm can allow for other numbers of additional rows of non-distortion-corrected image data to be read into the rolling buffer 1706.

An example algorithm for determining which of these three courses of action to take is outlined below. First, determine whether the last row of non-distortion-corrected image data (e.g., row 959 or 960 depending on the configuration of the control data) has already been loaded into the rolling buffer 1706 or whether there are additional rows of non-distortion-corrected image data available to be loaded. Second, determine a first variable defined as the minimum row of non-distortion-corrected image data needed for generating the current row of distortion-corrected image data. Third, determine a second variable defined as the minimum row of non-distortion-corrected image data needed for generating the previous row of distortion-corrected image data. If the difference between the two variables is zero, do not update the rolling buffer 1706. If the difference between the two variables is one, update the rolling buffer 1706 by adding one additional row of non-distortion-corrected image data. If the difference between the two variables is two or more, update the rolling buffer 1706 by adding two additional rows of non-distortion-corrected image data. Other algorithms can also be used for positioning the rolling buffer 1706.

The rolling buffer 1706 is performing well when it stores all of the non-distortion-corrected pixels which are needed by the pixel interpolator 1710 in order to determine the value of a given interpolated non-distortion-corrected pixel (e.g., P0'), and hence the corresponding distortion-corrected pixel (e.g., P0). But in some cases, a particular set of coordinates (x', y') may call for a non-distortion-corrected pixel which is not available in the rolling buffer 1706. This may occur in the event of an unusually large distortion. In such cases, the non-distortion-corrected pixel which is called for but not present in the rolling buffer 1706 can be treated as a black pixel, or the nearest pixel which is available in the rolling buffer 1706 can be used instead.

Figure 24A:
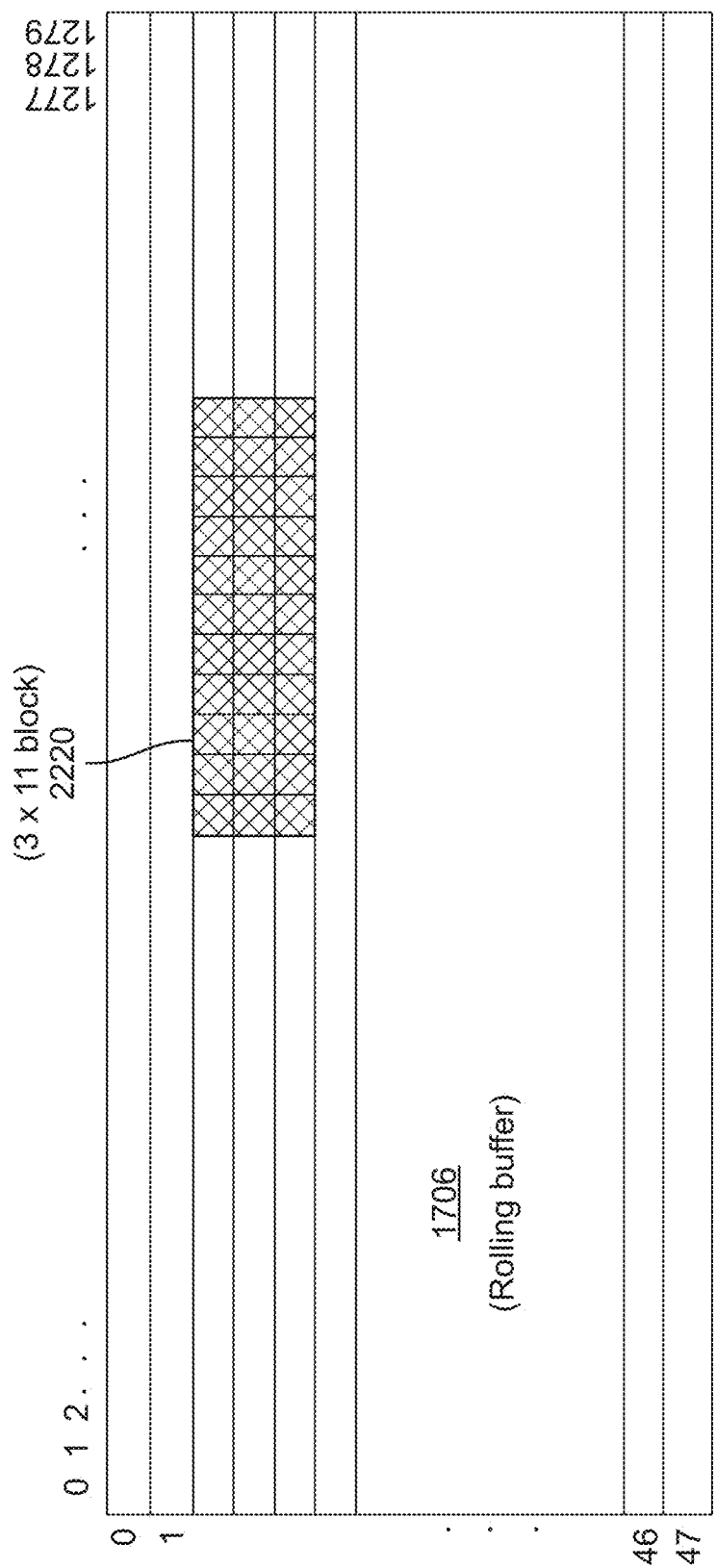
FIG. 24A illustrates a macroblock within a rolling buffer of the pixel processing pipeline shown in FIG. 17.

The rolling buffer fetcher 1708 receives the coordinates (e.g., (x', y')) for the interpolated non-distortion-corrected pixel (e.g., P0') needed to calculate the value of the current distortion-corrected pixel (e.g., P0) being determined, and then identifies and fetches the non-distortion-corrected pixels needed for the lens distortion correction calculation from the rolling buffer 1706. This process is complicated by the fact that the pixel processing pipeline 1700 may typically have multiple parallel processing paths in order to increase computational throughput. As discussed above, the need for multiple parallel paths arises due to the relatively large amount of image data (e.g., three depth planes, each including three color sub-frames) and the relatively high frame rates (e.g., 80 or 120 frames per second). In some embodiments, there are 8 parallel processing paths. This means that 8 distortion-corrected pixels are determined by the interpolator 1710 at the same time (e.g., in one clock cycle), which in turn requires that the rolling buffer fetcher 1708 provide, at the same time (e.g., in one clock cycle), all of the non-distortion-corrected pixels needed to determine those 8 distortion-corrected pixels. The job of the rolling buffer fetcher 1708 is further complicated by the fact that the pixel interpolator 1710 may be hardwired to accept a group of non-distortion-corrected pixels having a set size and shape. The rolling buffer fetcher 1708 therefore identifies within the rolling buffer 1706 a macroblock of non-distortion-corrected pixels which matches the set size and shape that the pixel interpolator 1710 is hardwired to accept. The rolling buffer fetcher 1708 reads the macroblock of non-distortion-corrected pixels from the rolling buffer 1706 together in one clock cycle and supplies the macroblock to the pixel interpolator 1710. An example of such a macroblock 2220 is shown in FIG. 22. In the illustrated embodiment, the macroblock 2220 is a 3×11 group of non-distortion-corrected pixels, though it may have different dimensions in other embodiments. For example, some embodiments may use a 6×4 macroblock FIG. 24A illustrates an example macroblock 2220 within the rolling buffer 1706. As already discussed, the rolling buffer 1706 includes 48 rows of non-distortion-corrected image data which are available to be used in the lens distortion correction calculations. Meanwhile, the macroblock 2220 illustrates those non-distortion-corrected pixels which are actually read from the rolling buffer 1706 and provided to the pixel interpolator 1710 during a given clock cycle in order to determine distortion-corrected pixels. In some embodiments, the fetching of a macroblock 2220 of non-distortion-corrected pixels together as a group helps to avoid the need to perform multiple read cycles to fetch the pixels needed in the pixel interpolator 1710, as performing multiple read cycles would likely slow down the pixel processing pipeline 1700. This means, however, that the rolling buffer fetcher 1708 must include logic for selecting a macroblock 2220 that has a likelihood of including all of the non-distortion-corrected pixels needed for determination of all 8 distortion-corrected pixels (e.g., P0, P1, P2, P3, P4, P5, P6, and P7)

As is evident in FIG. 22, whether or not the macroblock 2220 encompasses all of the non-distortion-corrected pixels needed for determination of the distortion-corrected pixels (i.e., P0, P1, P2, P3, P4, P5, P6, and P7) depends on the spread, or local distortion, of the interpolated non-distortion-corrected pixels (i.e., P0', P1', P2', P3', P4', P5', P6', and P7') needed to determine the distortion-corrected pixels. If there were no local distortion (that is, if the pixels P0', P1', P2', P3', P4', P5', P6', and P7' all fell in a row of 8 consecutive pixels, just as P0, P1, P2, P3, P4, P5, P6, and P7), then 8 distortion-corrected pixels would depend on a 2×9 block of non-distortion-corrected pixels due to the bilinear interpolation of overlapping groups of four pixels (i.e., A, B, C, and D) for each interpolated non-distortion-corrected pixel (i.e., P0', P1', P2', P3', P4', P5', P6', and P7'). In the illustrated embodiment, the 3×11 macroblock 2220 has one extra row and two extra columns to allow for some local distortion between the interpolated non-distortion-corrected pixels P0', P1', P2', P3', P4', P5', P6', and P7'. It should be understood, however, that the 3×11 macroblock 2220 is just one example, and other examples can use macroblocks with different dimensions. In other embodiments, the size of the macroblock 2220 may be determined based on the amount of local optical distortion which is typically present in the system 80. If the size of the macroblock 2220 is increased, then greater local distortions can be dealt with. However, increasing the size of the macroblock 2220 may also require that the size of the interpolator 1710 be increased to accommodate the input of a greater number of pixels.

With reference again to FIG. 22, a set of 8 coordinates for P0', P1', P2', P3', P4', P5', P6', and P7' are all provided to the rolling buffer fetcher 1708 together. The first task of the rolling buffer fetcher 1708 is to determine which non-distortion-corrected pixels are required in order to calculate the pixels P0', P1', P2', P3', P4', P5', P6', and P7'. In order to fetch the correct 3×11 macroblock 2220 from the rolling buffer 1706, the rolling buffer fetcher 1708 can analyze the coordinates of P0', P1', P2', P3', P4', P5', P6', and P7' by, for example, determining the minimum horizontal and vertical coordinates which are present and fetching a macroblock 2220 with matching minimum horizontal and vertical coordinates. Based on these minimum horizontal and vertical coordinates from the set of coordinates for the interpolated non-distortion-corrected pixels, the rolling buffer fetcher 1708 sends the address of the desired macroblock 2220 to the rolling buffer 1706. This is shown in FIGS. 20 and 21. The rolling buffer 1706 responds by providing the selected macroblock 2220 of non-distortion-corrected pixels to the rolling buffer fetcher 1708. As shown in FIGS. 20 and 21, in the case of a 3×11 macroblock 2220, the output from the rolling buffer 1706 consists of three signal lines (one for each row of the macroblock 2220), each providing 88 bits, or 11 bytes (one for each pixel). The rolling buffer fetcher 1708 then passes the pixels in the macroblock 2220 to the pixel interpolator 1710 to determine the distortion-corrected pixels.

The pixel interpolator 1710 may include, for example, 8 separate interpolating units so as to allow 8 distortion-corrected pixels to be determined simultaneously. There is one interpolating unit to calculate each of the interpolated non-distortion-corrected pixels P0', P1', P2', P3', P4', P5', P6', and P7', and hence to determine the values of the corresponding distortion-corrected pixels P0, P1, P2, P3, P4, P5, P6, and P7. As already discussed, each interpolated non-distortion-corrected pixel may be calculated by interpolating amongst a group 2210 of 4 adjacent pixels (e.g., A, B, C, D) which surround the location of the interpolated non-distortion-corrected pixel. As the macroblock 2220 includes multiple different possible groups 2210 of 4 adjacent pixels to choose from, each interpolating unit may have a corresponding multiplexer which is responsible for selecting the specific group 2210 of 4 adjacent pixels needed by the interpolating unit. Each of these multiplexers may be hard-wired to receive multiple groups 2210 of 4 adjacent pixels from the macroblock 2220. Each multiplexer selects one such group 2210 to pass through as inputs to the corresponding interpolator unit. Each multiplexer may also include logic for selecting which of the multiple groups 2210 of 4 adjacent pixels to pass through to the corresponding interpolator unit to calculate one of the interpolated non-distortion-corrected pixels, and hence to determine the corresponding distortion-corrected pixel.

FIG. 24B illustrates example multiplexer logic 2400 for passing pixels from the macroblock 2220 to the 8 interpolating units within the pixel interpolator 1710. The 8 interpolating units are labeled bilerp0, bilerp1, bilerp2, etc. FIG. 24B also shows the macroblock 2220 and labels each of its 33 pixels. The pixels in line 0 are labeled P0, P1, P2, etc. The pixels in line 1 are labeled Q0, Q1, Q2, etc. The pixels in line 2 are labeled R0, R1, R2, etc. The multiplexer logic 2400 shows the several candidate groups 2210 of 4 adjacent pixels which are provided to the multiplexer corresponding to each of the interpolating units. For example, the multiplexer for the first interpolating unit bilerp0 may select between a first group of 4 adjacent pixels in the macroblock 2220 made up of P0, P1, Q0, and Q1, and a second group of 4 adjacent pixels in the macroblock 2220 made up of Q0, Q1, R0, and R1. The coordinates of each interpolated non-distortion-corrected pixel (e.g., P0', P1', P2', P3', P4', P5', P6', and P7') to be calculated can be used to address the select lines of one of the multiplexers. In order to correctly address the select lines of the multiplexers, the coordinates of each interpolated non-distortion-corrected pixel can be mapped to the coordinate space of the 3×11 macroblock 2220 by subtracting the minimum horizontal and vertical coordinates of the macroblock 2220 (as determined previously by the rolling buffer fetcher 1708). Based on these inputs to the multiplexer select lines, the multiplexers in turn pass the correct non-distortion-corrected pixel data to the interpolating units to calculate the interpolated non-distortion-corrected pixels P0', P1', P2', P3', P4', P5', P6', and P7', and hence to determine the corresponding distortion-corrected pixels P0, P1, P2, P3, P4, P5, P6, and P7.

In some embodiments, all possible groups 2210 of 4 adjacent pixels in the macroblock 2220 are provided to each of the 8 multiplexers to serve as possible inputs to each of the 8 interpolating units. However, the size of the logic in the pixel interpolator 1710 can be reduced by recognizing that each distortion-corrected pixel is likely to only call for pixels from a sub-portion of the macroblock 2220. For example, with reference to FIG. 22, the distortion-corrected pixel P7 corresponds to an interpolated non-distortion-corrected pixel P7', which is likely to be located toward the right side of the macroblock 2220. Therefore, the interpolating unit which is responsible for determining P7 will not likely require non-distortion-corrected pixels located toward the left side of the macroblock 2220 in order to determine the value of P7. Similarly, the values of distortion-corrected pixels P3 and P4 correspond to non-distortion-corrected pixels P3' and P4' which are likely to be located near the middle of the macroblock 2220 and therefore are not likely to be reliant upon the values of non-distortion-corrected pixels located near the sides of the macroblock 2220. Accordingly, the multiplexer logic 2400 may be configured such that each multiplexer only receives non-distortion-corrected pixels from a relevant sub-portion of the macroblock 2220. The relevant sub-portion for each of the multiplexers may be selected to correspond to the likely portion of the macroblock 2220 which will be relied upon to calculate the corresponding distortion-corrected pixel. For example, as shown in FIG. 24B, the multiplexer for bilerp1 may only receive pixels from columns 0-4 of the macroblock 2220. The multiplexer for bilerp2 may only receive pixels from columns 1-5 of the macroblock 2220. The multiplexer for bilerp3 may only receive pixels from columns 2-4 of the macroblock 2220. And so on.

The rolling buffer fetcher 1708 is performing well when it reads all of the pixels from the rolling buffer 1706 which are needed in order to calculate the values of all eight interpolated non-distortion-corrected pixels (e.g., P0', P1', P2', P3', P4', P5', P6', and P7'), which will be used as the values of the corresponding 8 distortion-corrected pixels (e.g., P0, P1, P2, P3, P4, P5, P6, and P7). But in some cases a set of coordinates (x', y') may call for a non-distortion-corrected pixel which is not present in the macroblock 2220 read from the rolling buffer 17706. In such cases, the missing pixel can be treated as a black pixel, or the nearest pixel which is present in the macroblock 2220 can be used instead.

Once the distortion-corrected pixels (e.g., P0, P1, P2, P3, P4, P5, P6, and P7) are determined by the pixel interpolator 1710, they are passed to a flat field correction block 1730. The flat field correction block 1730 can at least partially correct for unwanted variations in brightness which may be present across the display 62 described herein. As discussed above, the display 62 may include a stack of waveguides (182, 184, 186, 188, 190) which distribute the light corresponding to the various color fields of the various depth planes of imagery to the eyes of the user 60. The display 62 can also include light redirecting elements (282, 284, 286, 288, 290), such as diffractive features with relatively low diffraction efficiency such that, at the intersection with each feature, only a portion of the light is directed toward the eye of the user 60 while the rest continues to move through a waveguide via total internal reflection. The light carrying the image data is thus divided into a number of related exit beams that exit the waveguides at a multiplicity of locations. Although the waveguides and diffractive features are typically designed to provide a relatively uniform pattern of exit beams toward the eye of the user 60, the optical complexity of the display 62 can result in some imbalances in the amount of light which is output at different locations. These imbalances can cause two pixels which may be intended to have the same color and/or brightness to appear differently if shown on different portions of the display 62. These imbalances can be corrected by the flat field correction block 1730.

In some embodiments, the flat field correction block 1730 applies a brightness correction value to each pixel of the image data. The brightness correction values can be factors which are respectively multiplied times the corresponding pixel values. For example, in some embodiments, the brightness correction values range from zero to two, though other ranges can also be used. The range for the brightness correction values can be selected to provide flexibility for dynamically increasing or decreasing the brightness of any given pixel to the extent necessary to compensate for brightness imbalances which may be inherent in the display 62. The brightness factors can be determined experimentally (e.g., by inputting a known calibration image to the system 70 and comparing the displayed image to the calibration image) or theoretically (e.g., by using ray tracing algorithms) so as to reduce unwanted brightness variations once the image data is shown on the display 62.

The brightness correction values can be stored in lookup tables uploaded to the display controller. Each color field of each depth plane of image data can have a unique set of brightness correction values. Therefore, in image data consisting of three depth planes each having three color fields, a total of nine lookup tables can be provided during configuration. For high-resolution image data, the amount of memory required to store nine full-resolution lookup tables may be significant. Accordingly, the lookup tables for the brightness correction values can be stored at a reduced resolution. In the case of image data with a resolution of 1280×960, for example, the lookup tables can have a reduced resolution of 80×60 (or 81×61 to take into account the external grid of the lookup table). The reduced resolution tables can be expanded to full size during operation using, for example, bilinear interpolation.

The output pixels from the flat field correction block 1730 can be passed to the gamma correction block 1740, which applies conventional gamma correction. Finally, the output pixels from the gamma correction block 1740 can be passed to color field buffers 1750 for color sequential output to the display 62, as described with respect to FIG. 9.

Figure 61:
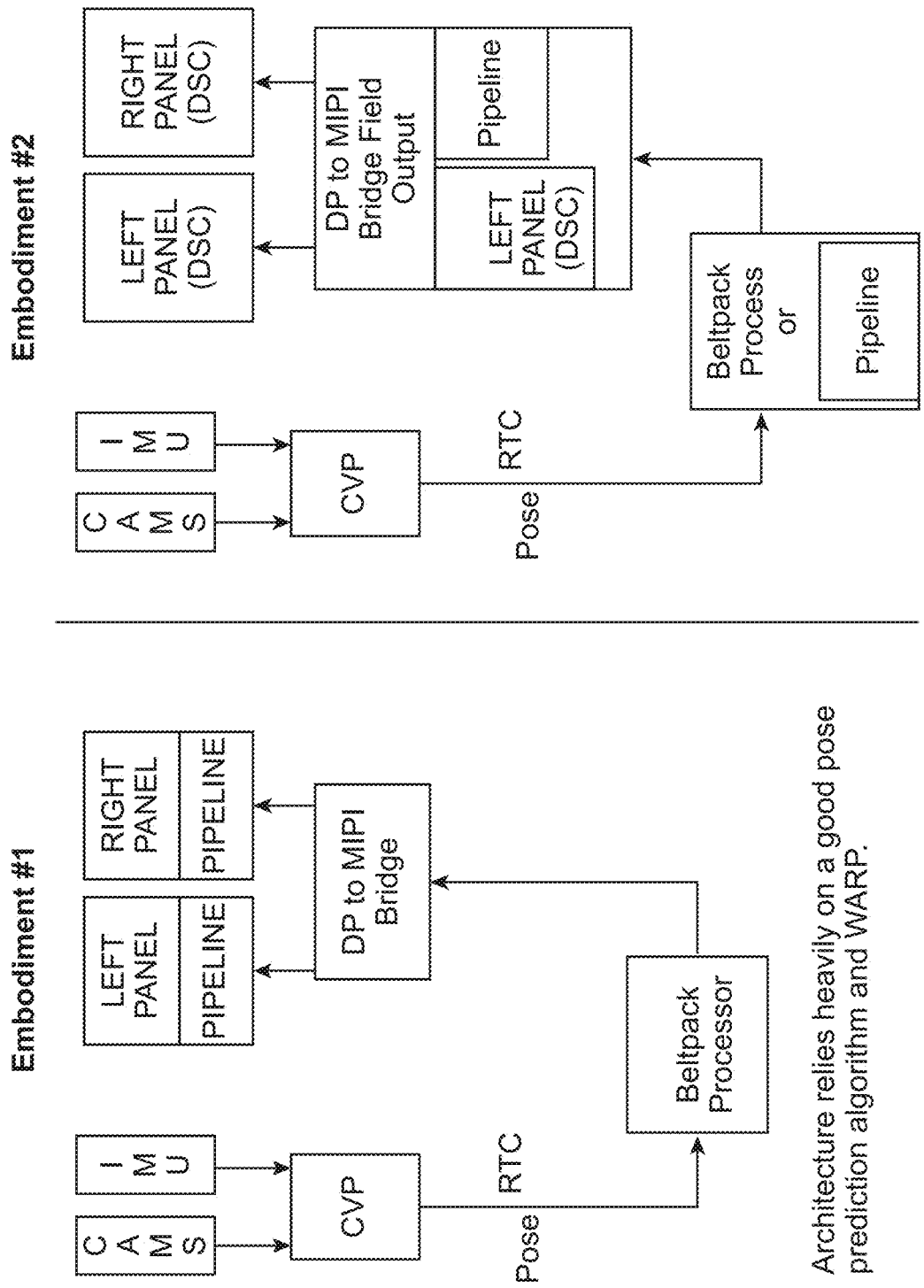
FIG. 61 schematically depicts system component partitioning including multiple cooperating components of a VR/AR/MR systems according to two embodiments.

FIG. 61 depicts system arrangements, according to two embodiments. The first embodiment depicts a pixel processing pipeline implemented by a display controller of a VR/AR/MR system that receives image data from an image generator, manipulates the image data (e.g., removes control data), and transmits only the image data to display panels. However, as shown in FIG. 61, the pixel processing pipeline can also be implemented by a remote processor ("beltpack processor") and/or the DP to MPI Bridge (second embodiment). These pixel processing pipeline locations are only exemplary, and the pixel processing pipeline can be implemented by various other components of the VR/AR/MR system.

Late Image Warping Based on Head Pose Data

As discussed herein, the system 80 can include body-mounted displays, such as a helmet, glasses, goggles, etc. In addition, the system 80 can include sensors such as gyroscopes, accelerometers, etc. which perform measurements that can be used to estimate and track the position, orientation, velocity, and/or acceleration of the head of the user 60 in three dimensions. The sensors can be provided in an inertial measurement unit worn by the user 60 on his or her head. In this way, the head pose of the user 60 can be estimated as, for example, a vector which indicates the orientation of the head. Head pose information such as this can be used as a means of allowing the user 60 to interact with the VR/AR/MR scene. For example, if the user 60 turns or tilts his or her head, then the scene can be warped, or adjusted, in a corresponding manner (e.g., the field of view of the scene can be shifted or tilted).

Figure 25A:
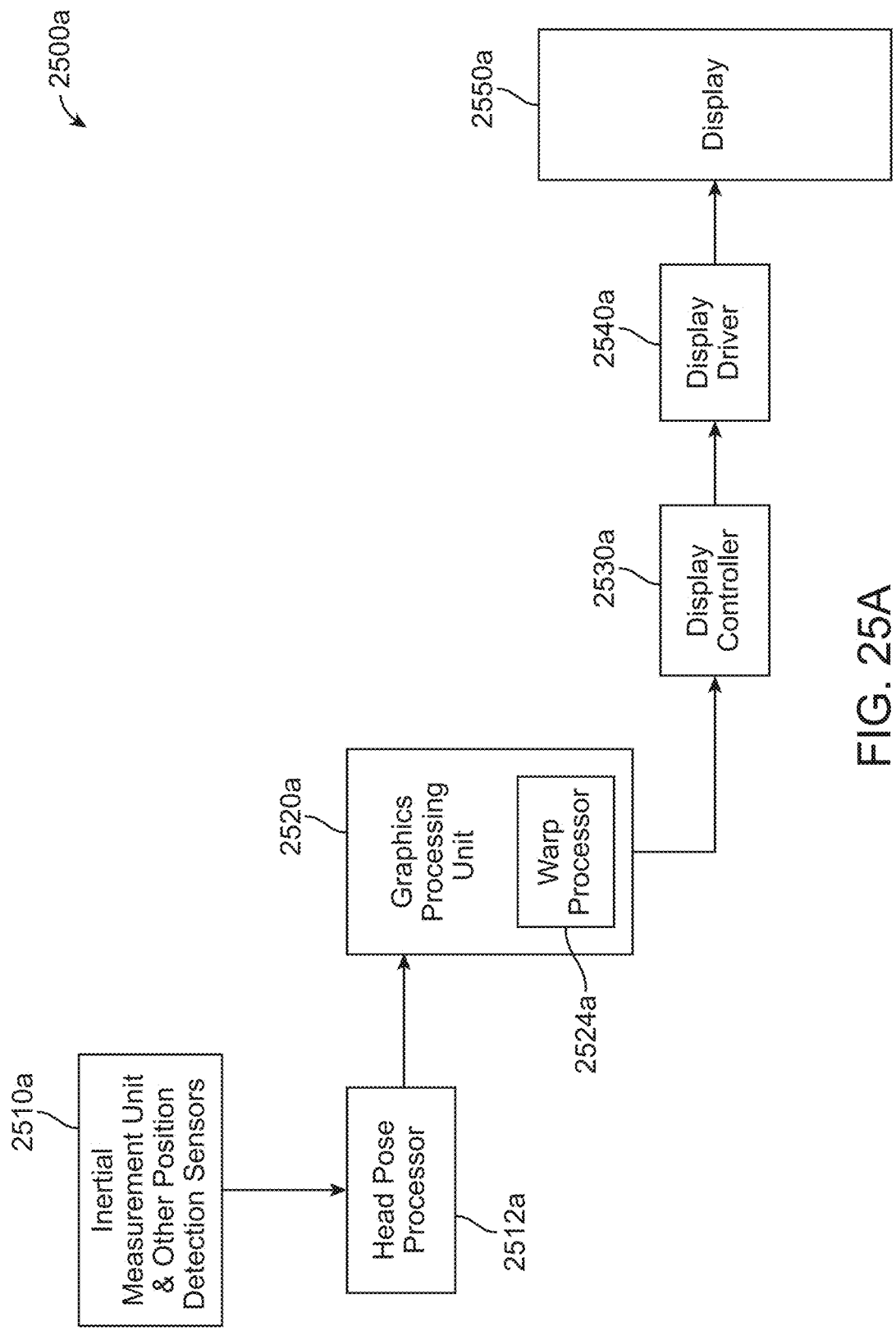
FIG. 25A illustrates an example system for warping VR/AR/MR image data based on head pose information.

FIG. 25A illustrates an example system 2500a for warping image data based on head pose information. The system 2500a includes an inertial measurement unit 2510a which takes and tracks measurements which can be used to calculate the head pose of the user 60. It can also include other types of sensors which can be used for detecting the position and orientation of the head of the user 60. These can include, for example, outward facing video cameras. The data from the inertial measurement unit 2510a and other sensors is passed to a head pose processor 2512a. The head pose processor 2512a analyzes the head pose measurement data from all sources to determine the current head pose of the user 60. Alternatively and/or additionally, the head pose processor 2512a can use current and past head pose measurement data to predict the head pose of the user 60 at one or more instants in the future.

The system 2500a also includes a GPU 2520a. The GPU 2520a is responsible for rendering virtual, augmented, and/or mixed reality image data to be displayed to the user 60. The current and/or predicted head pose of the user 60, as determined by the head pose processor 2512a, can be input to the GPU 2520a. This head pose information can be used by the GPU 2520a to determine a viewing frustum for the image data to be rendered. In addition, the GPU 2520a includes a warp processor 2524a which uses the head pose information to perform appropriate image warping operations based on the position, orientation, and/or movement of the head of the user 60. The image warping operations can include, for example, rotations, translational shifts, and any other transformation which compensates for changes in the head pose of the user 60.

The rendered image data from the GPU 2520a is then passed to the display controller 2530a. As discussed herein, the display controller 2530a can process the rendered image data with functions, such as blending depth planes and correcting for optical distortions. The display controller 2530a then scans the image data out to a display driver 2540a, which then causes the image data to be shown on the display 2550a.

Although the type of system 2500a shown in FIG. 25A can warp the image data based on head pose, it does have some limitations in doing so. For example, there is processing delay in the GPU 2520a and in the display controller 2530a. Plus, there is delay associated with the scan out time to provide image data to the display driver 2550a. The scan out time typically depends on the frame rate of the system 2500a. For example, a frame rate of 60 fps typically involves a scan out time of about $1/60=16$ ms, while a frame rate of 120 fps typically involves a scan out time of about $1/120=8$ ms, and a frame rate of 240 fps typically involves a scan out time of about $1/240=4$ ms. Thus, if the GPU 2520a performs image warping based on the then-current head pose of the user 60, the head pose is liable to change before the image data is actually shown on the display 2550a. Alternatively, the GPU 2520a can perform image warping based on the predicted future head pose of the user 60, but the accuracy of the predicted future head pose may be inadequate as the prediction error can increase with the time to the predicted head pose. VR systems can tolerate some delay and/or inaccuracy in this regard because the user 60 typically can only see the virtual image data which is presented to him or her. But AR and MR systems are typically more sensitive to delay and/or inaccuracy in head pose-based image data warping. This is due to the fact that the user 60 sees the virtual image data together with his or her real world surroundings.

Some of the problems associated with performing head pose-based image warping with a GPU can be alleviated by performing some or all of the image warping with a display controller instead.

Figure 25B:
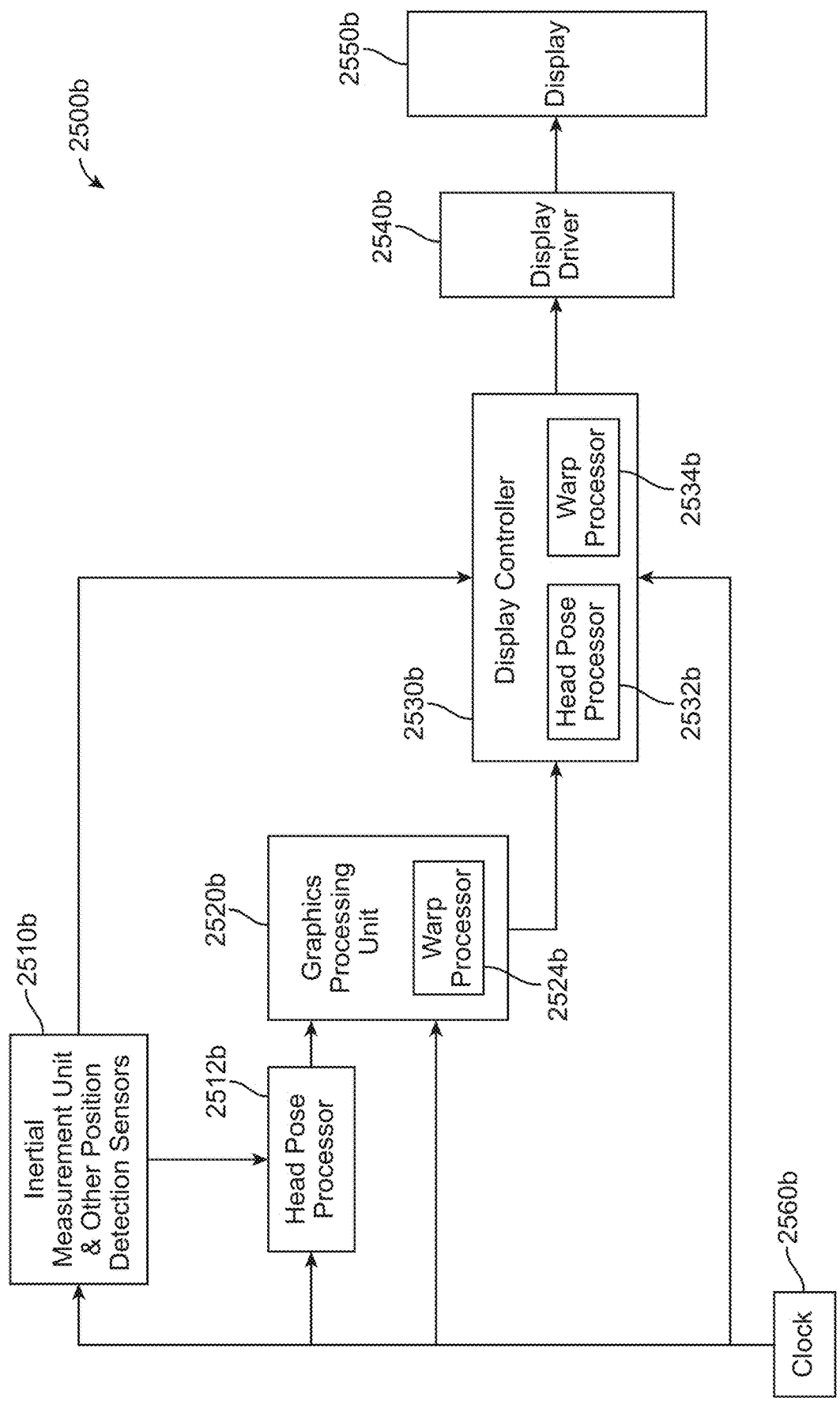
FIG. 25B illustrates an improved system for warping VR/AR/MR image data based on head pose information.

FIG. 25B illustrates an improved system 2500b for warping image data based on head pose information. The improved system 2500b includes an inertial measurement unit 2510b, which, along with other optional position detection sensors, captures head pose measurement data. The head pose measurement data is provided by the inertial measurement unit 2510b to a head pose processor 2512b. The head pose processor 2512b uses the head pose measurement data to determine the current and/or predicted head pose of the user 60. The head pose information calculated by the head pose processor 2512b is input to a GPU 2520b. The GPU 2520b uses this head pose information to determine a viewing frustum for rendering virtual image data to be displayed to the user 60. The GPU 2520b also includes a warp processor 2524b for performing one or more image warping operations on the image data based on the head pose information provided from the head pose processor 2512b. The GPU 2520b then provides the rendered image data to a display controller 2530b.

As discussed herein, image warping operations, such as image rotations and pixel shifts, can be carried out by the display controller 2530b for a number of reasons. Pixel shifts and image rotations can be performed in cases in which the image data needs to be moved on the display 2550b due to, for example, head movements by the user 60. In such cases, the content of the image data may be the same but its location within the viewing area on the display 62 may need to be shifted. Rather than re-rendering the image data at the GPU 2520b and sending the whole set of pixels to the display controller 2530b again, the pixel shift and/or image rotation can be applied to the image data using image warping control data. As illustrated in FIGS. 10 and 11, control data including the image warping control data can be included at the beginning of a frame. Alternatively, and/or additionally, image warping control data can be sent within a frame (e.g., after the first row) or at the end of the frame. This can be done using, for example, a Mobile Industry Processor Interface (MIPI) Display Serial Interface (DSI) virtual channel.

Pixel shifts and/or image rotations can also be performed in cases in which the user 60 is moving their head and a more accurate representation of the pixels is wanted. Rather than having the GPU 2520b re-render the image, a late image warping operation can be applied by the display controller 2530b with significant less delay. Any pixel shift and/or image rotation described herein may impact a single depth plane or multiple depth planes. As already discussed herein, in some embodiments, there are differences in time between when various depth planes are displayed. During these time differences, the user 60 may shift his or her eyes such that the viewing frustum may need to be shifted. This can be accomplished using a pixel shift for any of the depth planes.

The image warping control data can indicate a pixel shift in the X-Y direction within a frame of a single depth plane. Alternately, and/or additionally, the pixel shift control data can indicate a shift in the Z direction between depth plane buffers. For example, an object that was previously displayed in one or more depth planes may move to another depth plane set with a Z-pixel shift. This type of shift can also include a scaler to enlarge or reduce the partial image for each depth. Assume, for example, that a displayed character is floating between two depth planes and there is no occlusion of that character by another object. Apparent movement of the character in the depth direction can be accomplished by re-drawing the character forward or backward one or more depth planes using the Z-pixel shift and scaler. This can be accomplished without re-rendering the character and sending a frame update to the display controller 2530b, resulting in a smoother motion performance at much lower computational cost.

The scaler can also be used to compensate for magnification effects that occur within the display as a result of, for example, the lenses 192, 194, 196, 198. Such lenses may create virtual images which are observable by the user. When a virtual object moves from one depth plane to another, the optical magnification of the virtual image can actually be opposite of what would be expected in the physical world. For example, in the physical world when an object is located at a further depth plane from the viewer, the object appears smaller than it would if located at a closer depth plane. However, when the virtual object moves from a nearer depth plan to a further depth plane in the display, the lenses may actually magnify the virtual image of the object. Thus, in some embodiments, a scaler is used to compensate for optical magnification effects in the display. A scaler can be provided for each depth plane to correct magnification effects caused by the optics. In addition, a scaler can be provided for each color if there are any scaling issues to be addressed on a per color basis.

In some embodiments, a maximum horizontal pixel shift can correspond to the entire panel width, while a maximum vertical pixel shift can correspond to the entire panel height. Both positive and negative shifts can be indicated by the control data. Using this pixel shift information, the display controller can shift a frame of video data left or right, up or down, and forward or backward between depth planes. The pixel shift information can also cause a frame of video data to be completely or partially shifted from a left-eye display panel to a right-eye display panel, or vice versa. Pixel shift information can be included for each of the depth planes in the light field video data.

In some embodiments, such as those where scanning-based displays are used, incremental distributed image warping operations (e.g., pixel shifts and/or image rotations) can be performed. For example, different image warping operations can be performed on the different color component sub-frame image data for a frame of video data (e.g., based on the current head pose information available when each sub-frame image is being processed). For example, the pixels which are processed and/or displayed first can be shifted more or less than later-processed/displayed pixels within a frame in order to compensate for mid-frame head movement or in order to simulate motion of a virtual object. Similarly, different image warping operations can be performed on the different depth planes (e.g., based on the current head pose information available when each depth plane is being processed). For example, pixels in one depth plane can be shifted more or less than pixels in another depth plane. In some embodiments, eye tracking technology is used to determine which portion of a display screen the user 60 is fixated on. Virtual objects in different depth planes, or even at different locations within a single depth plane, can be pixel shifted (or not shifted) and/or rotated depending on whether or not the user 60 is looking at that portion of the display. If there are objects that the user is not fixating on, image warping control data for those objects may be disregarded in order to improve performance for warping the image data that the user is fixating on. Again, an eye tracker can be used to determine where on the display 62 the user 60 is looking.

With reference back to FIG. 25B, the rendered image data from the GPU 2520b can be provided to the display controller 2530b along with control data. In the embodiment of the improved system 2500b, the control data provided with the rendered image data may include the head pose information which was used by the GPU 2520b to perform the image warping operations. The control data can also include a timestamp which indicates the moment in time corresponding to the head pose information which the GPU 2520b used to perform image warping operations (e.g., the moment in time when the measurements which were used to determine the head pose information were captured). The timestamp can be generated using a clock signal from a clock 2560b.

The display controller 2530b receives the rendered image data from the GPU 2520b and may perform any of the processing tasks discussed herein, including optical distortion correction, depth plane blending, etc. In addition, in the improved system 2500b, the inertial measurement unit 2510b can provide updated head pose measurement data to the display controller 2530b directly during and after the period of time the image data is processed by the GPU 2520b. This may be done using a dedicated channel, as shown in FIG. 25B. Or the updated head pose measurement data can be provided to the display controller 2530b as control data which is inserted with the rendered image data just prior to the rendered image data being provided from the GPU 2520b to the display controller 2530b. This control data may be added by dedicated hardware in the event that software cannot guarantee that the most current head pose measurement data is written to the buffer right after the last row of image data is sent out. In either the case of delivering updated head pose measurement data via a dedicated channel or appended control data, the updated head pose measurement data provided to the display controller 2530b can be timestamped. The timestamp can be generated using the clock signal from the clock 2560b. As illustrated, the clock 2560b can provide the same clock signal to the inertial measurement unit 2510b, the head pose processor 2512b, the GPU 2520b, and the display controller 2530b. Using this common clock signal, each of these devices can have a common frame of reference for performing time-based head pose-related image warping operations.

The display controller 2530b includes a head pose processor 2532b and a warp processor 2534b. The head pose processor 2532b may use the updated head pose measurements provided by the inertial measurement unit 2510b to determine current head pose information. Typically, the head pose information generated by the head pose processor 2532b inside the display controller 2530b is more current than the head pose information used by the GPU 2520b to conduct image warping operations. This is because the inertial measurement unit 2510b typically can capture head pose measurements at a rate that is faster than the time required by the GPU 2520b to render the image data. In other words, while the image data is rendered by the GPU 2520b and then passed to the display controller 2530b, the inertial measurement unit 2510b continues to collect updated head pose measurement data. It is this updated head pose measurement data which is provided to the display controller 2530b.

The updated head pose measurements provided from the inertial measurement unit 2510b are used by the head pose processor 2532b within the display controller 2530b to generate current head pose information (e.g., a current head pose vector). This current head pose information can then be compared to the head pose information used by the GPU 2520b to perform image warping. In addition, the timestamps for each of these sets of head pose information can be compared. The differences between these respective sets of head pose information, along with the differences between the respective timestamps, can be used to determine delta head pose information. The delta head pose information may be, for example, a delta head pose vector which represents the change in the head pose of the user 60 from the time head pose information was determined for use in image warping operations by the GPU 2520b until the time more current head pose information was determined for use in image warping operations to be performed by the display controller 2530b.

The display controller 2530b includes a warp processor 2534b which may then perform one or more image warping operations based on the delta head pose information. As an alternative to performing image warping operations in the display controller 2530b using delta head pose information, the GPU 2520b may forgo performing any image warping operations and the warp processor 2534b may instead conduct image warping operations based only on the current head pose information determined by the head pose processor 2532b inside the display controller 2530b. However, the approach of performing initial image warping operations with the GPU 2520b and then performing additional image warping operations with the display controller 2530b using delta head pose information may be advantageous because it may cause the image warping operations performed by the display controller 2530b to have smaller magnitudes.

In some embodiments, the image data provided to the display controller 2530b by the GPU 2520b can be oversized with respect to the display resolution of the display 2550b. For example, if the display 2550b is designed to show 1280×960 image data, then the display controller 2530b can be provided with image data having a larger number of rows and/or columns. These excess rows and/or columns of image data can serve as buffer zones on all four sides of the image data. The buffer zones allow the display controller 2530b to perform head pose-based image warping (e.g., rotations and/or translational shifts) without running out of image data at the edges. For example, if the head pose of the user 60 calls for shifting the image data X columns to the right, then X columns of image data in the left hand buffer zone can be moved into the image which will be displayed. In this way, the over-size image provided to the display controller 2530b avoids or reduces the risk of not being able to complete an image warping operation due to a lack of image data or having to insert black pixels in place of missing image data.

As discussed herein, the display controller 2530b can execute image warping operations, such as image scaling, translational shifts, and image rotations based on head pose information which is current at the time the display controller 2530b is processing the image data. This allows the display controller 2530b in the improved system 2500b to better compensate for changes in the head pose of the user 60. The image data is then read out from the display controller 2530b to the display driver 2540b, which ultimately shows the image data on the display 2550b. But even in the improved system 2500b, there still remains a potentially-significant amount of delay—due to the scan out time—between when the head pose-based image warping is applied by the display controller 2530b and when the user 60 actually sees the imagery. The scan out delay can be reduced by operating the system 2500b at relatively high frame rates (e.g., 240 fps or higher), but this involves significant computational cost and associated power increases. However, some or all of these problems are solved in the improved system shown in FIG. 25C.

Figure 25C:
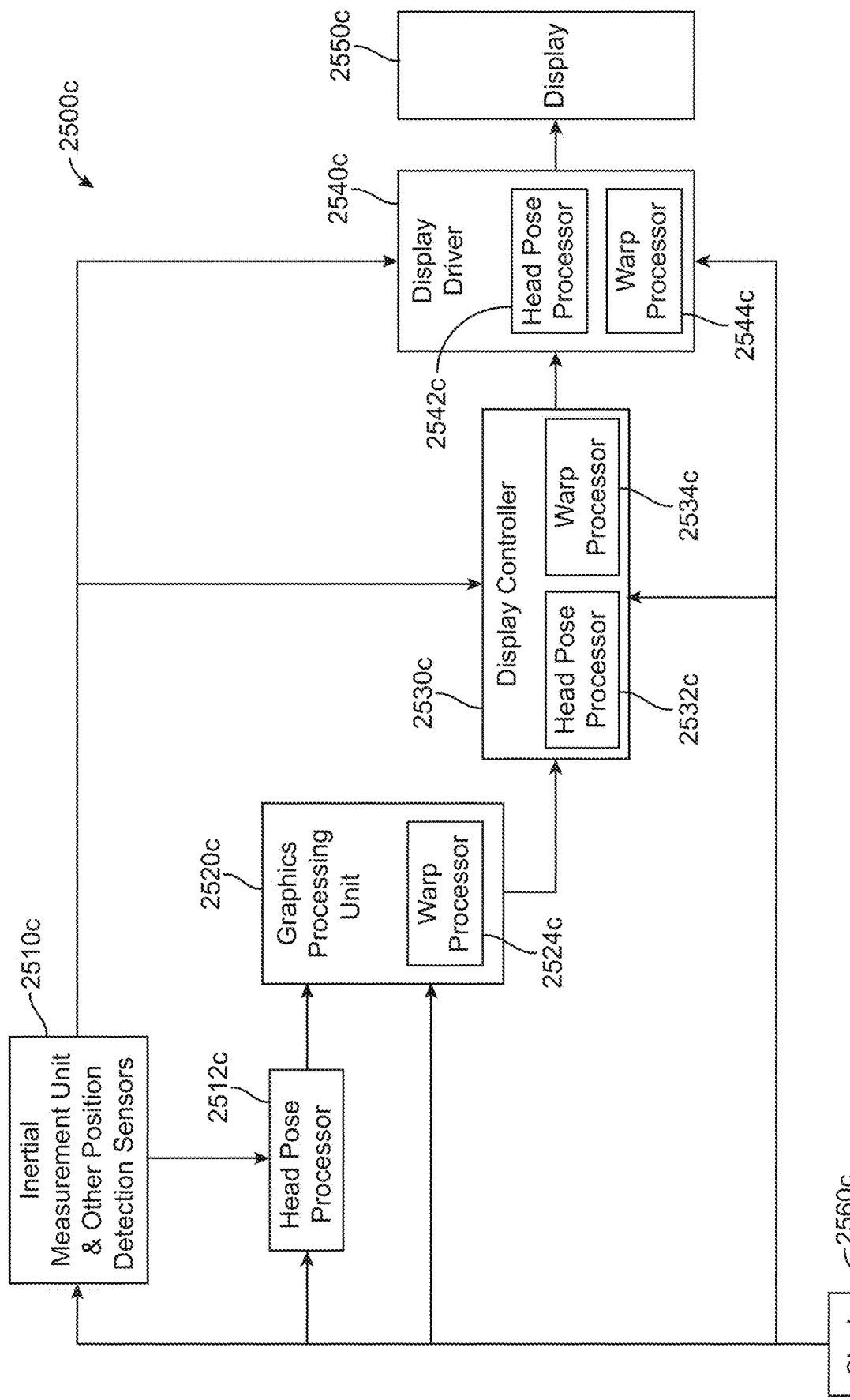
FIG. 25C illustrates another improved system for warping VR/AR/MR image data based on head pose information.

FIG. 25C illustrates another improved system 2500c for warping image data based on head pose information. Like the system 2500b of FIG. 25B, the improved system 2500c of FIG. 25C can include an inertial measurement unit 2510c, a head pose processor 2512c, a GPU 2520c (with a warp processor 2524c), a display controller 2530c (with a head pose processor 2532c and a warp processor 2534c), a display driver 2540c, and a display 2550c. Each of these components can operate as discussed above with respect to the system 2500b of FIG. 25B. However, in the improved system 2500c, the display driver 2540c is customized to include a head pose processor 2542c and a warp processor 2544c. The head pose processor 2542c and/or the warp processor 2544c of the display driver 2540c may reside on a display bridge chip (not shown), such as a display port to a Mobile Industry Processor Interface (MIPI) bridge.

Head pose measurement data from the inertial measurement unit 2510c (and possibly other position detection sensors) is provided to the display driver 2540c. The clock signal from the clock 2560c is also provided to the display driver 2540c. Based on this architecture, one or more head pose-based image warping operations can be performed after image scan out from the display controller 2530c based on more current head pose information. For example, in some embodiments, the display driver 2540c performs one or more image warping operations based on head pose information which is no more than 1 ms old.

In the improved system 2500c, the display controller 2530c scans image data out to the display driver 2540c just as has already been discussed, but in this embodiment the scanned out image data includes control data. The control data provided with the scanned out image data may include the head pose information which was used by the display controller 2530c to perform image warping operations. In addition, the control data can also include a timestamp which indicates the moment in time corresponding to that head pose information (e.g., the moment in time the head pose measurements used by the display controller 2530c to perform image warping were captured). The timestamp can be generated using the clock signal from the clock 2560c.

Meanwhile, during and after the period of time the image data is processed by the display controller 2530c, the inertial measurement unit 2510c can continue to provide updated head pose measurement data to the display driver 2540c. This head pose measurement data can be provided with a timestamp. The updated head pose measurement data can be provided from the inertial measurement unit 2510c to the display driver 2540c using a dedicated channel, as shown in FIG. 25C. Or the updated head pose measurement data can be provided to the display driver 2540c as control data which is inserted at the end of a frame just prior to being scanned out to the display controller 2530b. This control data may be added by dedicated hardware in the event that software cannot guarantee that the most current head pose measurement data is written to the buffer right after the last row of image data is sent out. In either the case of delivering updated head pose measurement data via a dedicated channel or appended control data, the display driver 2540c may use the head pose processor 2542c to determine head pose information based on the updated head pose measurements provided by the inertial measurement unit 2510c. Typically, the head pose information generated by the head pose processor 2542c inside the display driver 2540c is more current than the head pose information provided by the display controller 2530c. This is because the inertial measurement unit 2510c continues to collect updated head pose measurement data while the image data is processed by the display controller 2530c. It is this more updated head pose measurement data which is provided to the display driver 2530c.

The more current head pose information generated by the head pose processor 2542c within the display driver 2540c can then be compared to the head pose information used by the display controller 2530c to perform image warping operations. In addition, the timestamps for each of these sets of head pose information can be compared. The differences between these respective sets of head pose information, along with the differences between the respective timestamps, can be used to determine delta head pose information. The delta head pose information may be, for example, a delta head pose vector which represents the change in the head pose of the user 60 from the time head pose information was determined for use in image warping operations by the display controller 2530c until the time more current head pose information was determined for use in image warping operations to be performed by the display driver 2540c.

The display driver 2540c includes a warp processor 2544c which may then perform one or more image warping operations based on the delta head pose information. As an alternative to performing image warping operations in the display driver 2540c using delta head pose information, the GPU 2520c and/or the display controller 2530c may forgo performing any image warping operations and the warp processor 2544c may instead conduct image warping operations based only on the current head pose information determined by the head pose processor 2542c inside the display driver 2540c. However, the approach of performing initial image warping operations with the GPU 2520c and/or the display controller 2530c and then performing additional image warping operations with the display driver 2540c using delta head pose information may be advantageous because it may cause the image warping operations performed by the display driver 2540c to have smaller magnitudes.

Since the image warping operations performed by the display driver 2540c are closer in time to when the user 60 actually sees the image data, and since those operations are based on more current head pose information, the user 60 enjoys a better experience with less head pose-related latency.

In some embodiments, the image data provided to the display driver 2540c by the GPU 2520c and the display controller 2530c can be over-sized with respect to the display resolution of the display 2550c. For example, if the display 2550c is designed to show 1280×960 image data, then the display driver 2540c can be provided with image data having a larger number of rows and/or columns. These excess rows and/or columns of image data can serve as buffer zones on all four sides of the image data. The buffer zones allow the display driver 2540c to perform head pose-based image warping (e.g., rotations and/or translational shifts) without running out of image data at the edges. For example, if the head pose of the user 60 calls for shifting the image data X columns to the right, then X columns of image data in the left hand buffer zone can be moved into the image which will be displayed. In this way, the over-size image provided to the display driver 2540c avoids or reduces the risk of not being able to complete an image warping operation due to a lack of image data or having to insert black pixels in place of missing image data.

In some embodiments of the improved systems 2500b and 2500c shown in FIGS. 25B and 25C, one or more image warp operations can be performed by the display controller (2530b, 2530c) and/or the display driver (2540c) based on the same head pose measurements and/or other head pose information for all of the color fields and/or depth planes of the image data together. Or, in some embodiments, the display controller (2530b, 2530c) and/or the display driver (2540c) can perform one or more image warp operations for different ones of the color fields and/or depth planes of the image data based on different head pose measurements and/or other head pose information. For example, a first image warp operation can be performed on a first color field and/or depth plane of the image data using first head pose measurements and/or other head pose information corresponding to a first time. Then, a second image warp operation can be performed on a second color field and/or depth plane of the image data using updated second head pose measurements and/or other head pose information corresponding to a subsequent second time. This can be repeated for each color field and/or depth plane of the image data based on updated head pose measurements and/or other head pose information each time.

In addition, in some embodiments, the display controller (2530b, 2530c) and/or the display driver (2540c) can perform one or more image warp operations for different portions of a color field or other sub-frame of the image data based on different head pose information. For example, a first image warp operation can be performed on a first portion of a color field or other sub-frame of the image data using first head pose information corresponding to head pose measurements at a first time. Then, a second image warp operation can be performed on a second portion of a color field or other sub-frame of the image data using updated second head pose information corresponding to head pose measurements at a subsequent second time. This can be repeated for each portion of the color field or other sub-frame of the image data based on updated head pose information each time. In these embodiments, the image data can be broken into blocks and control data which includes head pose measurements and/or other head pose information can be provided in various rows and/or columns interspersed with the image data between the blocks. The head pose measurements and/or other head pose information for each block can be updated with respect to the previous block. The updated head pose measurements and/or other head pose information for each block can be used to perform one or more image warp operations for the corresponding block.

The improved systems 2500b and 2500c shown in FIGS. 25B and 25C are particularly advantageous for color sequential display technologies—which display different color fields successively (as shown in FIG. 9) rather than concurrently. This is due to the fact that in color sequential displays there is some delay between the times when the respective color fields of each frame of imagery are processed or displayed. Movement of the head of the user 60 during this delay can result in errors, such as color breakup, where different colors of image data which were intended to be superimposed are instead spatially separated. Accordingly, in some embodiments, the display controller 2530b in the improved system 2500b and/or the display driver 2540c in the improved system 2500c can perform head pose-based image warping on a per color field basis. For example, the display controller 2530b and/or the display driver 2540c can continuously receive head pose measurements from the inertial measurement unit 2510c and can continuously calculate updated head pose information. The display controller 2530b and/or the display driver 2540c can then use updated head pose information to warp the image data for each color field of the imagery just prior to each respective color field being processed or shown on the display.

The improved systems 2500b and 2500c shown in FIGS. 25B and 25C are also particularly advantageous for systems 80 which use multi-depth plane imagery, such as the sort described herein. This is because there is typically some delay between the times when different depth planes for a given frame of image data are processed or displayed. For example, image data associated with a far field depth plane can be processed or displayed at a first time, while image data associated with a near field depth plane can be processed or displayed at a subsequent second time. Movement of the head of the user 60 during this delay can result in errors such as depth plane breakup, where, for example, a virtual object located in the far field depth plane which was intended to be obscured by another virtual object located in the near field depth plane becomes shifted such that the near object no longer appropriately obscures the distant object. Accordingly, in some embodiments, the display controller 2530b in the improved system 2500b and/or the display driver 2540c in the improved system 2500c can perform head pose-based image warping on a per depth plane basis. For example, the display controller 2530b and/or the display driver 2540c can continuously receive head pose measurements from the inertial measurement unit 2510c and can continuously calculate updated head pose information. The display controller 2530b and/or the display driver 2540c can then use updated head pose information to warp the image data for each depth plane of the image data just prior to each respective depth plane being processed or shown on the display 2550c.

In another example, the display controller 2530b and/or the display driver 2540c can perform head pose-based image warping on both a per color field and a per depth plane basis. For example, with reference to the color sequential display scheme shown in FIG. 9, the display controller 2530b and/or the display driver 2540c can calculate first head pose information for the G0 field, which is the green color field of the D0 depth plane. The display driver 2540c can then warp the G0 field just prior (e.g., within 1 ms) to processing it or showing it on the display 2550c. Subsequently, the display controller 2530b and/or the display driver 2540c can calculate second head pose information for the R0 field, which is the red color field of the D0 depth plane. The display controller 2530b and/or the display driver 2540c can then warp the R0 field just prior to processing it or showing it on the display 2550c. This same procedure can then be sequentially repeated for the B0, G1, R1, B1, G2, R2, and B2 color fields.

Figure 62:
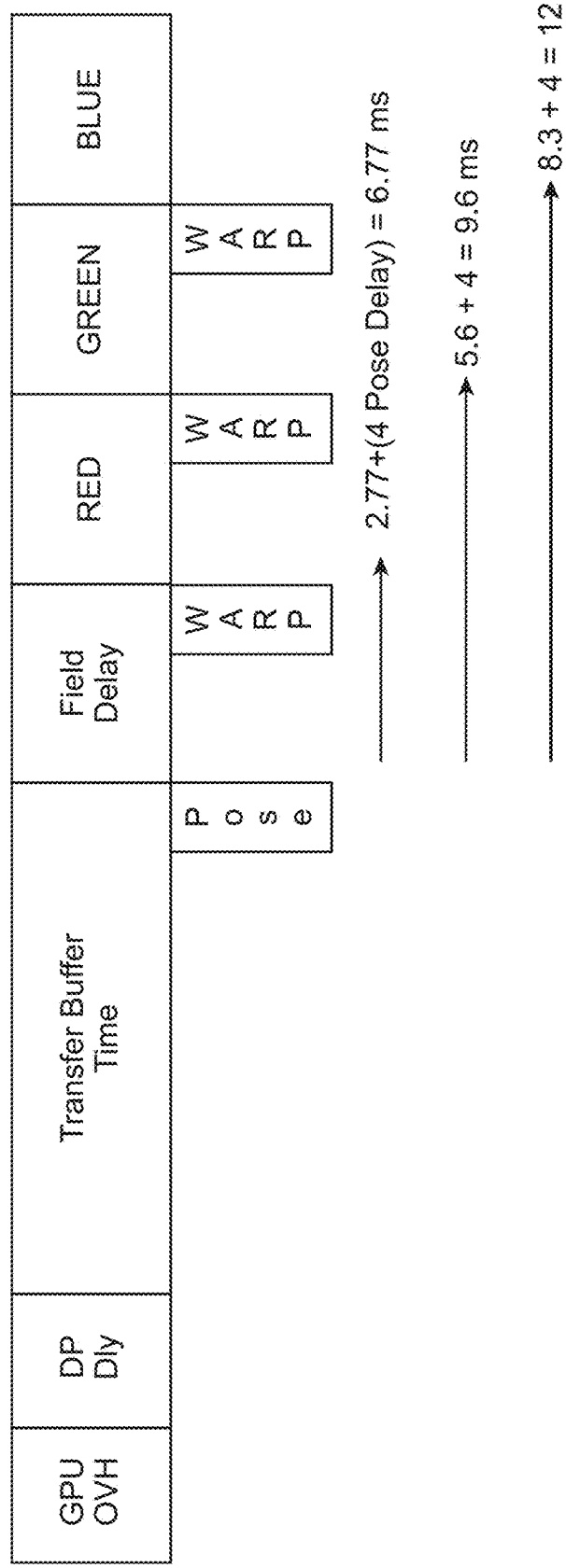
FIG. 62 illustrates a WARP operation in a GPU, according to a first embodiment.
Figure 63:
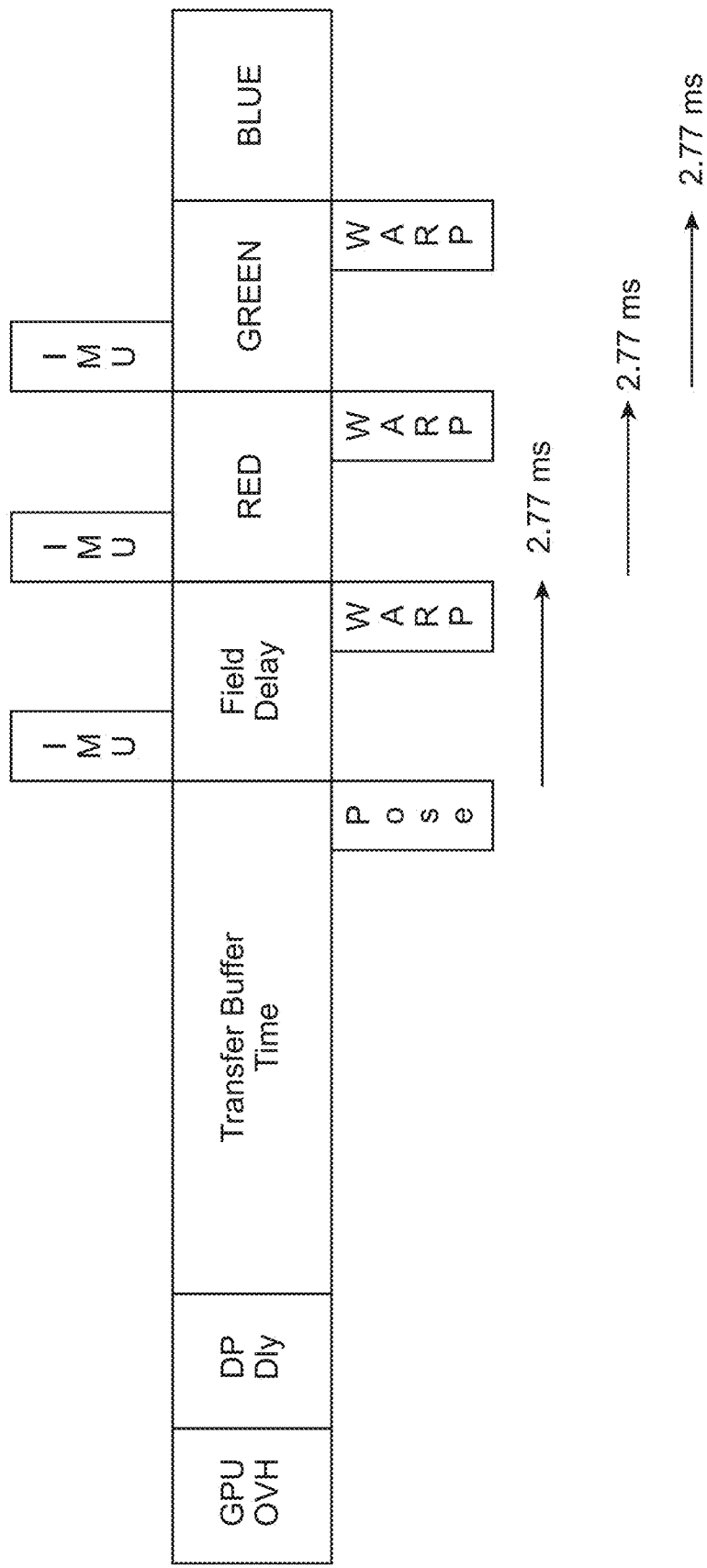
FIG. 63 illustrates a WARP operation in a GPU, according to a second embodiment.
Figure 64:
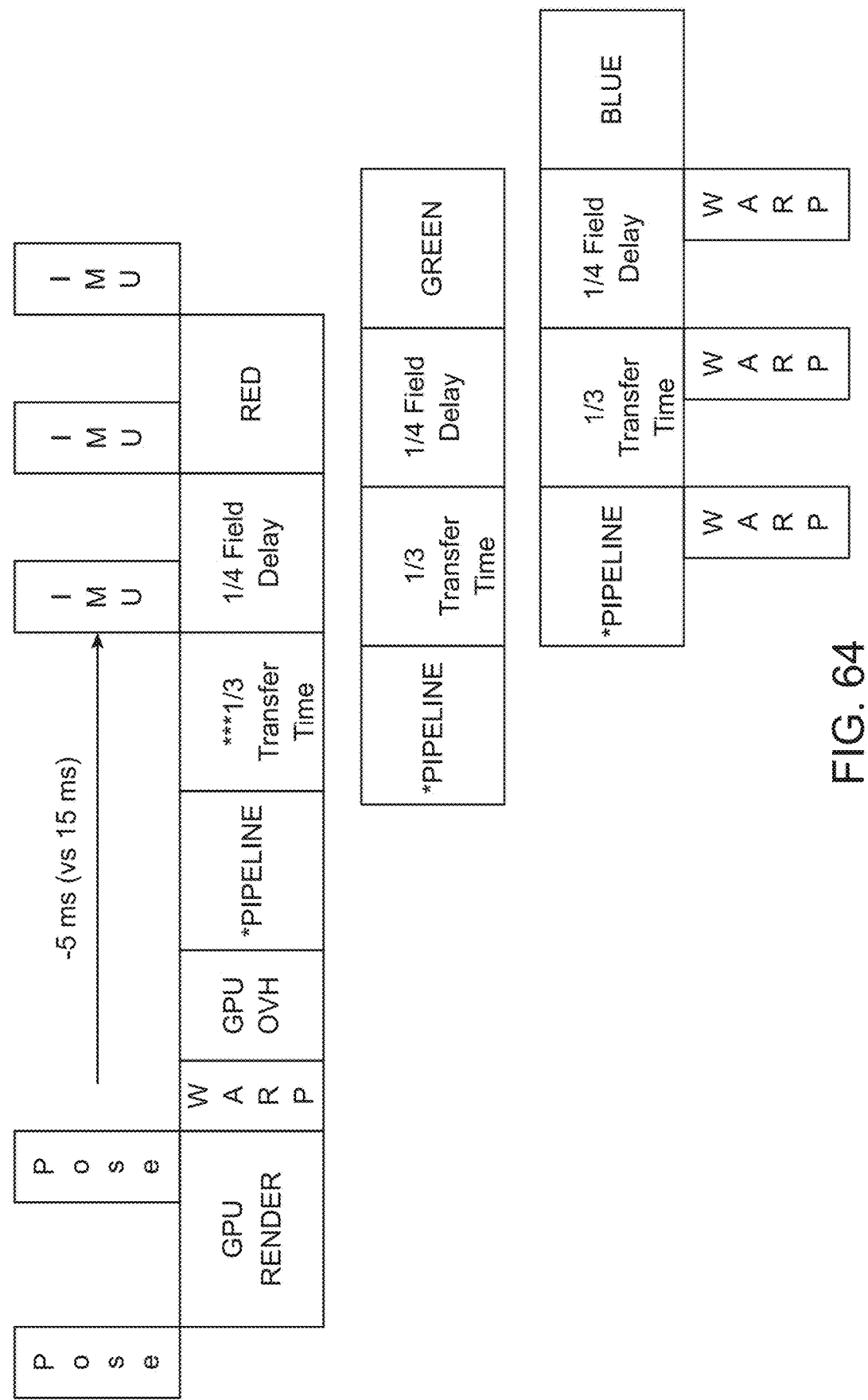
FIG. 64 illustrates a WARP operation in a GPU, according to a third embodiment.

FIGS. 62-64 depict various methods according to various embodiments for performing the WARP operation in a GPU. This pushes the WARP operation down the Pixel Processing/Display Pipeline. First the latest head pose estimate is sent to the display controller (e.g., in the last row of the image data in the display buffer). The latest head pose estimate may be 4 ms old, but given the 8.33 ms available to display the depth planes for a single frame, that cuts the pose prediction delay to about 50% of the display time. This reduces the prediction error. When the WARP operation is performed on the display pipeline, it occurs in parallel with image processing, thereby making more GPU cycles available for other image processing function.

FIG. 62 illustrates a first embodiment (relative to the FIGS. 63 and 64). In the first embodiment, performing the WARP operation on the display pipeline occurs in parallel on the previous field frees up the GPU from that operation as well as reduces the latency of the operation because it is not in series as shown in the second embodiment.

FIG. 63 depicts a second embodiment where the IMU update rate is increased to approximately 300 Hz and the data is shared directly with the Display Pipeline. In this embodiment, new IMU data can be used for each WARP (e.g., per color field). This reduced the time between pose determination and WARPing (e.g., from 6.77-12.3 ms to 2.77 ms). Consequently, this reduces WARP errors and color breakup.

In this embodiment, the display pipeline analyzes the latest pose provided on the last row of the system, the pose that was used when the GPU content was generated and the latest IMU sample to perform the WARP. This significantly reduces the prediction time since the field will be rendered within 3 ms of the IMU sample rather than up to 21 ms as in the first embodiment. A lower prediction time directly translates to a significantly smaller error as well as lower color breakup.

FIG. 64 depicts a third embodiment, wherein a large WARP is performed at the GPU, followed by subsequent IMU measurements and smaller and faster WARPs farther down the Display Pipeline (e.g., per color field). Using an updated IMU sample for each color field (as in the second embodiment depicted in FIG. 63) still leaves a non-zero amount of time between the render event in the GPU using a given head pose and the actual photon hitting the display. In the third embodiment, the Pixel Pipeline resides on the Bridge or the GPU as a custom block. This embodiment may use a large display buffer on the Processor Controller to avoid having to read the frame buffer out of DRAM 3 times per screen update, which could consume bandwidth. This embodiment may also use data compression to reduce buffer sizes. The WARP operation may also be part of Distortion Compensation if Pixel Pipeline is on the Bridge.

Color Lookup Table Blending Mode

Figure 26:
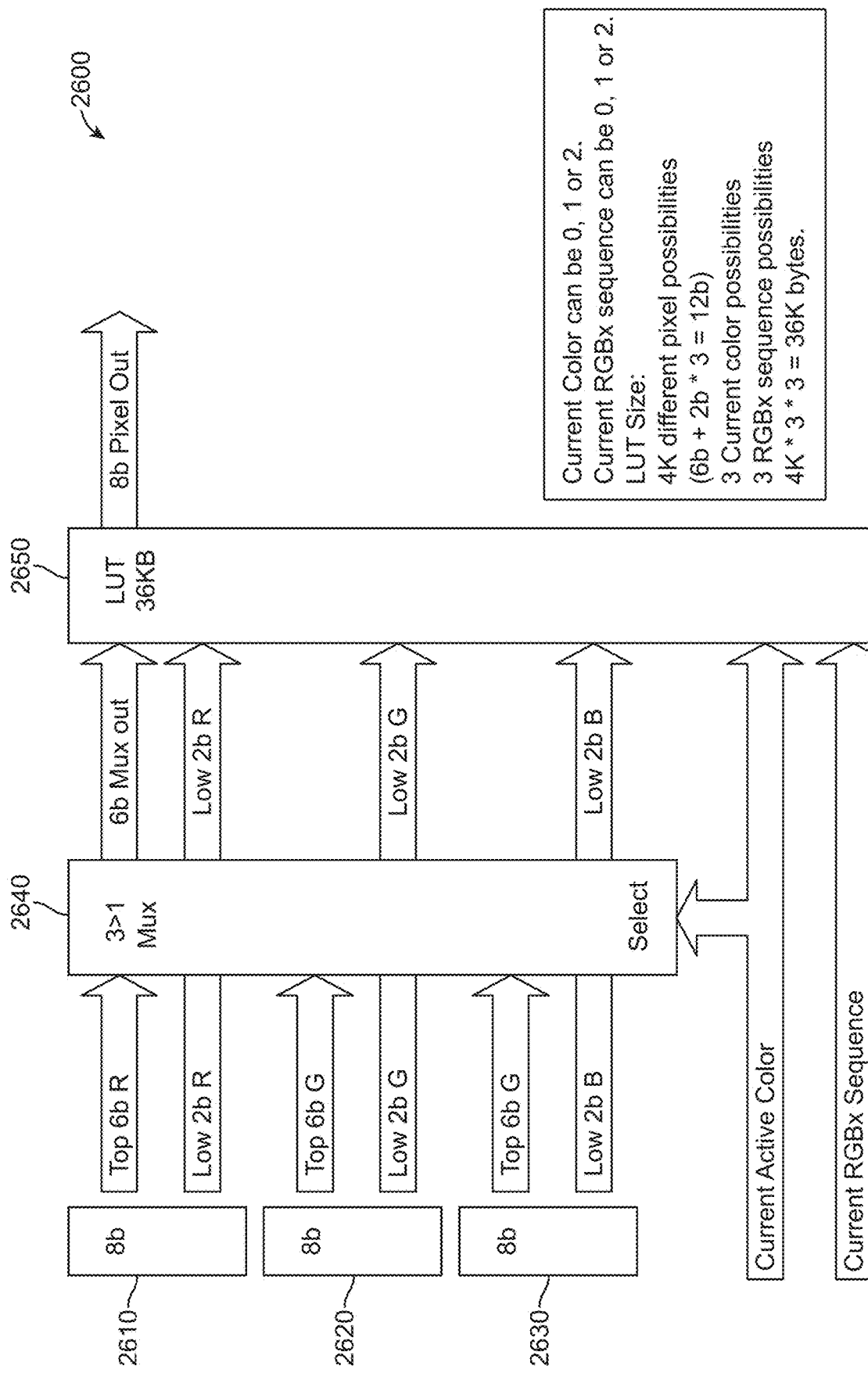
FIG. 26 illustrates an example embodiment of a system for implementing a color lookup table blending mode of operation.

FIG. 26 illustrates an example embodiment of a system 2600 for implementing a color lookup table blending mode of operation. The system 2600 includes a 3-to-1 multiplexer 2640 and one or more lookup tables 2650. The input to the multiplexer 2640 is image data which includes red, green, and blue color fields. Each pixel of image data has an 8 bit red value 2610, an 8 bit green value 2620, and an 8 bit blue value 2630. Some of the bits for these color values can include control data, as discussed elsewhere herein. For example, in the illustrated embodiment, the pixel values for each color field include 8 bits, the 6 most significant bits of which are used to specify a color while the 2 least significant bits are set aside as control data. In some embodiments, the control data may specify the depth plane (referred to as an RGBx sequence in FIG. 26) to which each pixel of image data corresponds.

As shown in FIG. 26, the multiplexer 2640 receives 3 inputs: the most significant 6 bits of the red value 2610, the most significant 6 bits of the green value 2620, and the most significant 6 bits of the blue value 2630. The multiplexer 2640 has a current active color control line which is used to select one of these inputs to pass to the lookup table(s) 2650. In some embodiments, the current active color control line may have a value of 0, 1, or 2, with each of these values corresponding to one of the three color fields. In the illustrated embodiment, the current active color is red. Therefore, the multiplexer 2640 passes the most significant 6 bits of the red value 2610 to the lookup table(s) 2650.

In addition to receiving the 6 most significant bits of the current active color, the lookup table(s) 2650 also receives control data from one or more of the color fields. In the illustrated embodiment, the two least significant bits of each color value serve as control data, and all of these bits are passed as additional inputs to the lookup table(s) 2650. The lookup table(s) 2650 also receives the current active color as an input. Finally, the lookup table(s) 2650 receives the current depth plane as an input. In some embodiments, the current depth plane is one of three depth planes specified by the control data.

The lookup table(s) 2650 is used to specify the final color value for the current active color based on all of the aforementioned inputs. In the illustrated embodiment, the current active color is red and the 6 most significant bits of the red value 2610, the 2 least significant bits of the red value 2610, the 2 least significant bits of the green value 2620, and the two least significant bits of the blue value 2630 (i.e., 12 bits total) are used to index into a 4 kilobyte lookup table 2650. There are 9 such lookup tables 2650 that may be indexed. The table selection is based on the current active color (3 options) and the current active depth plane (3 options). This approach allows for linear, custom, and non-linear blending of pixel colors across several depth planes, thus providing a large amount of flexibility in the output of the display 62.

Passable World

Figure 27:
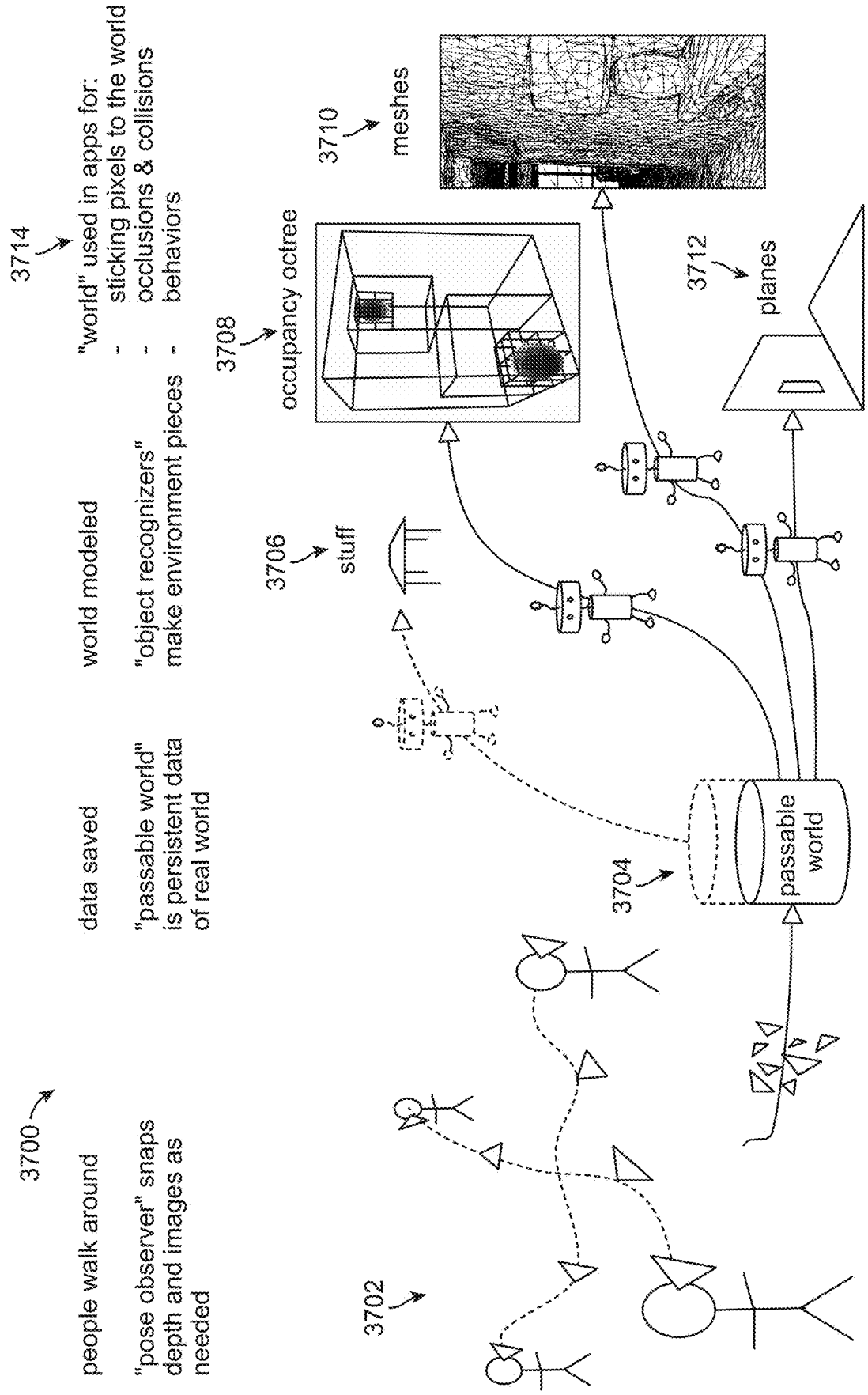
FIG. 27 is a diagrammatic view of a method for generating an MR experience, according to one embodiment.

FIG. 27 diagrammatically illustrates a method 3700 for generating a MR experience, according to one embodiment. At step 3702, users wearing MR systems move about the real physical world. As they do so, their respective MR systems capture images and depth information. Optionally, the captured images and depth information may be tagged with pose information describing the position and orientation of the MR system at the time it captured the images and depth information. Because the various users have different positions and orientations relative to the real physical world, the captured images and depth information from the various users can be used to build a more complete representation of the real physical world that is more accurate from multiple positions and orientations.

At step 3704, a "passable world," which is generated from the captured images and depth information represent the real physical world, is stored in persistent data. In one embodiment, the passable world is stored on a server operatively coupled to the MR systems worn by the users.

At step 3706, "object recognizers," which are software and/or applications configured to analyze image data and identify objects therefrom, analyze the passable world. Objects, such as tables, are identified by the object recognizers. The object recognizers may run on the MR systems and/or the servers connected thereto.

At step 3708, the MR system and/or the servers connected thereto determines portions of the passable world that are occupied. For instance, the portion of the passable world in which a table is disposed is determined to be occupied such that virtual objects are not spawned or moved into that portion of the passable world, which would degrade the MR experience.

At step 3710, the MR system and/or the servers connected thereto generates one or more meshes to define the surfaces of objects in the passable world. At step 3712, the MR system and/or the servers connected thereto form one or more planes to define the surfaces of objects in the passable world. These meshes and planes both facilitate a more realistic MR experience and simplify application development (e.g., game development).

At step 3714, the MR system and/or the servers connected thereto transmit the passable world (including recognized objects, occupancy octrees, meshes and planes) to various MR applications. These applications may use the passable world for various functions including placing or "sticking" virtual objects or pixels in the passable world. The applications may also use the passable world to determine occlusions, collisions, and behavior of surfaces and objects in the passable world.

Wireless Data Transfer

Wireless connection between a MR head mounted display, a mobile computing support system, and a totem controller would result in a more readily and naturally usable MR system. However, the user's body attenuates wireless signals, such that signal loss is too high and/or bandwidth too low for current wireless connectivity to effectively transmit the amount of data required to generate a MR experience of acceptable quality.

In some embodiments for transmitting data at higher bandwidths (e.g., to meet MR bandwidth requirements), MR systems include antennas, receivers and transmitters to increase bandwidth. In some embodiments; MR systems utilize data compression to reduce the bandwidth demand. In some embodiments, MR systems include GPUs distributed on each major component (e.g., the MR head mounted display, the mobile computing support system, and/or the totem controller). In such embodiments, minimal, low bit rate graphics data (e.g., OpenGL) is transmitted (with or without compression). Then, the receiving component renders images based on the received minimal, low bit rate graphics data.

Figure 28:
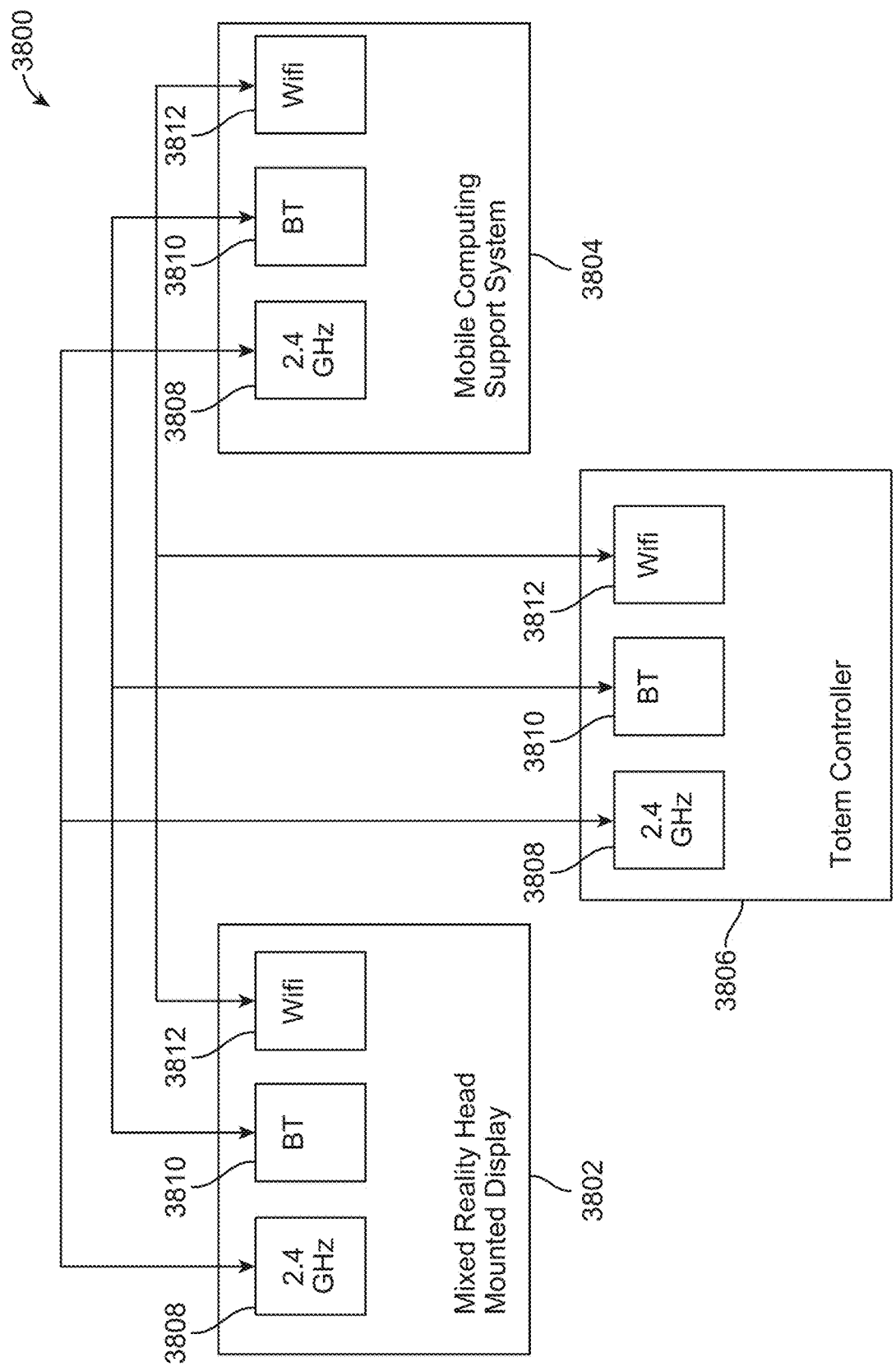
FIG. 28 is a schematic view of an AR/MR system, according to one embodiment.

In the embodiment depicted in FIG. 28, a MR system 3800 includes a 2.4 GHz high speed wireless link to transmit data between various components of a MR system (e.g., a MR head mounted display 3802, a mobile computing support system 3804, and a totem controller 3806). The 2.4 GHz high speed wireless link transmits data (e.g., between and IMU in the totem controller 3806 and the mobile computing support system 3804) with relatively low latency compared to other wireless communication links. The MR system 3800 also includes a Bluetooth (IEEE 802.15.1) and a WiFi (IEEE 802.11) wireless link, resulting in three wireless links transferring data between various MR system components.

The 2.4 GHz high speed wireless link is implemented with 2.4 GHz high-speed wireless link transceivers 3808 in each of the MR head mounted display 3802, mobile computing support system 3804, and totem controller 3806. The Bluetooth wireless link is implemented with Bluetooth transceivers 3808 in each of the MR head mounted display 3802, mobile computing support system 3804, and totem controller 3806. The WiFi wireless link is implemented with WiFi transceivers 3812 in each of the MR head mounted display 3802, mobile computing support system 3804, and totem controller 3806.

Increasing the number of wireless transceivers increases the number of antennas. In some embodiments, the antennas for the various wireless transceivers (2.4 GHz high speed, Bluetooth, WiFi) on each MR system component are physically separated from each other to minimize interference between the various wireless transceivers 3808, 3810, 3812. In one embodiment, an antenna is added to the mobile computing support system 3804 by adding a lead to a flex circuit, which may insulate that particular antenna from interference.

Increasing the number of wireless transceivers also increases the likelihood of interference (e.g., from frequency overlap) when multiple MR systems are operating in proximity to each other. In one embodiment for addressing this issue, each wireless transceiver of each MR system is configured to scan the frequencies in which it operates at start up to choose an open frequency. In another embodiment, each wireless transceiver of each MR system is configured to negotiate with other MR systems (e.g., using Near Field Communications) to choose an open frequency. In still another embodiment, the frequencies for the wireless transceiver on each MR system are slightly modified based on the unique identification numbers of the MR system such that the frequencies are themselves unique to the MR system.

The methods for reducing frequency overlap and the likelihood of interference with multiple MR systems can also be applied to wireless communications between MR systems and shared resources that have a physical location (e.g., a wireless base station in a room). For instance, each wireless transceiver of each MR system may be configured to scan the frequencies in which it operates at start up to choose an open frequency for communication with the wireless base station. In another embodiment, each wireless transceiver of each MR system is configured to negotiate with the wireless base station and/or the other MR systems (e.g., using Near Field Communications) to choose an open frequency. In still another embodiment, the frequencies for the wireless transceiver on each MR system are slightly modified based on the unique identification numbers of the MR system.

Time Domain Power Management

Still another embodiment addresses the related problems of system power consumption and system heating with increased power consumption and processor cycles.

Figure 29:
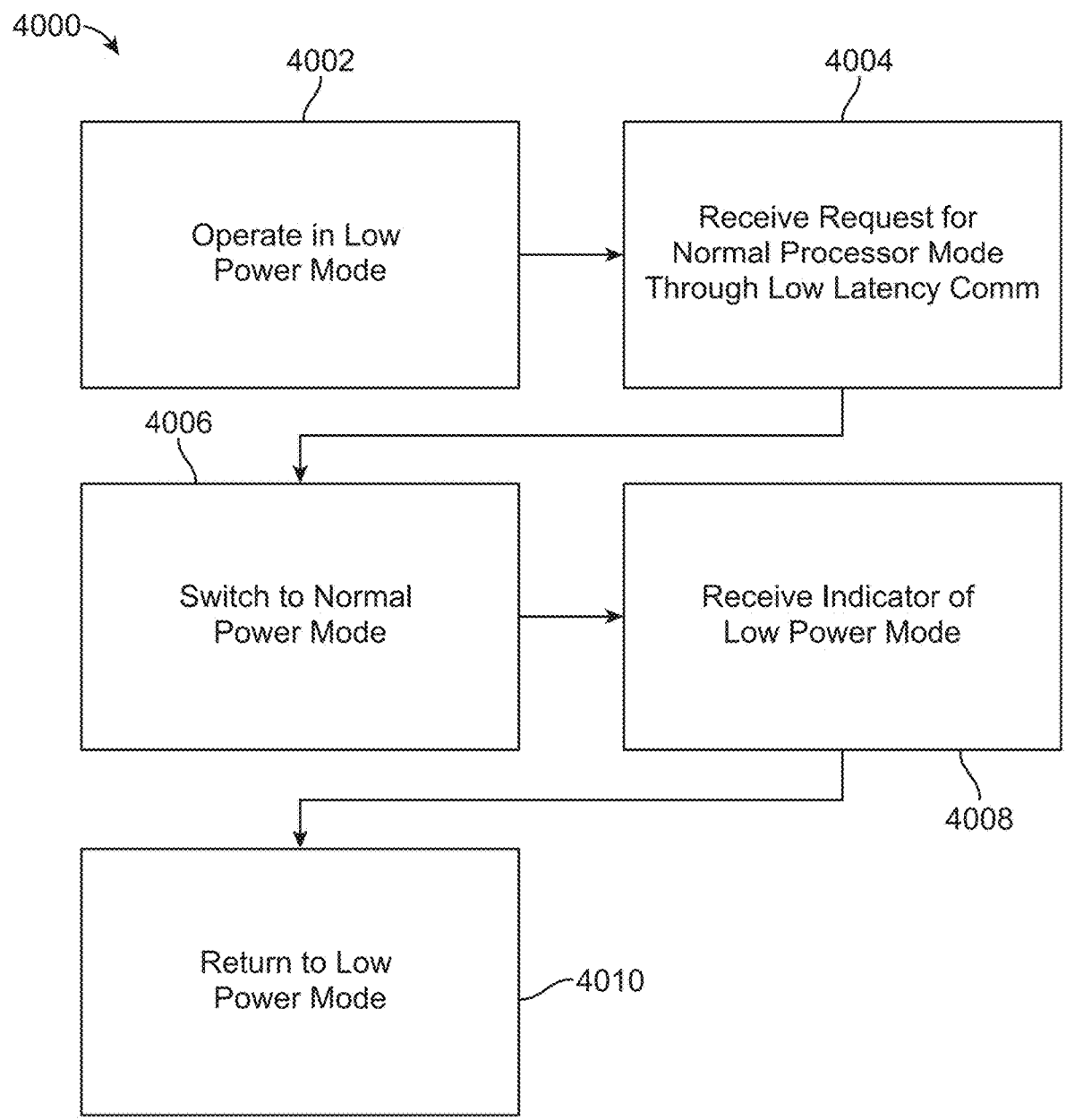
FIG. 29 is a flowchart illustrating a method of switching between a low-power mode and a normal power mode, according to one embodiment.

FIG. 29 is a flowchart illustrating a method 4000 of switching between a low-power mode and a normal power mode while providing processor cycles required for a MR system to generate a high-quality MR experience, according to one embodiment. At step 4002, the MR system operates in low-power mode. In this mode, many components that consume large amounts of battery power are either switched off or place in a standby mode with a fast wake-up option. In one embodiment, the MR system is in low-power mode when the user is sitting at a desk without changing their pose.

At step 4004, the MR system in low-power mode receives a request for normal processor mode through a low latency communication channel. For instance, the MR system may detect using a low power sensor that the user's pose has changed beyond a certain threshold level.

At step 4006, the MR system switches to a normal power mode by powering up the system components that were previously switched off or in standby mode. The MR system manages the powering up of the system components based on the particular request for normal processor mode to control the amount of total current drawn from the battery and heat generated by system components powering up.

At step 4008, the MR system receives an indicator that the system can function in low processor power mode. For instance, the MR system may detect that the user's pose has remained relatively constant for a certain threshold amount of time.

At step 4010, the MR system returns to low-power mode. Increasing the amount of time that the MR system operates in low-power mode both reduces battery power consumption and heat generated by system components such as processors.

Figure 30:
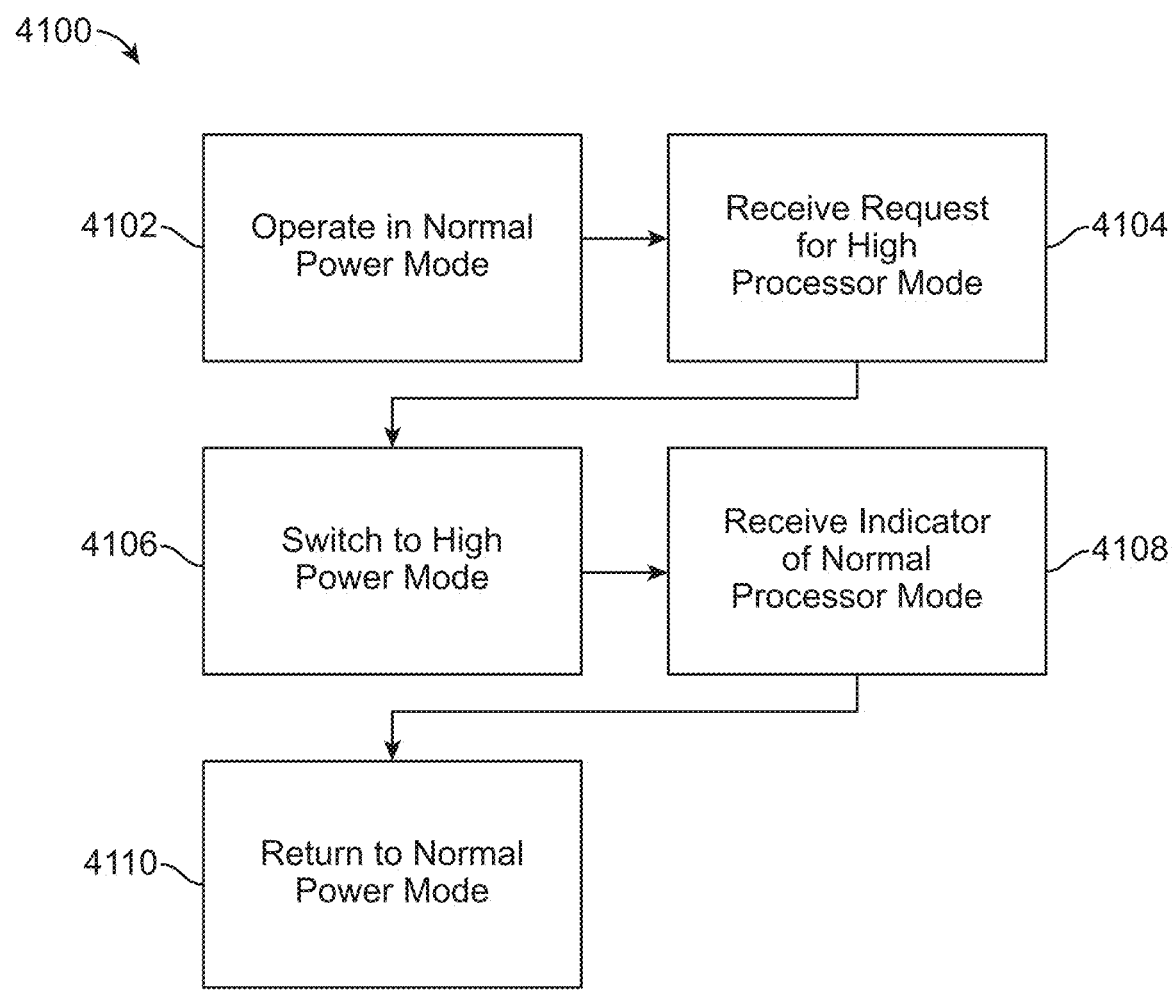
FIG. 30 is a flowchart illustrating a method of switching between a normal-power mode and a burst or high power mode, according to one embodiment.

FIG. 30 is a flowchart illustrating a method 4100 of switching between a normal-power mode and a burst or high power mode while providing processor cycles required for a MR system to generate a high-quality MR experience, according to one embodiment. At step 4102, the MR system operates in normal-power mode. In one embodiment, the MR system is in normal-power mode when the user is shifting their body and gaze without other MR system functions such as rendering and displaying virtual objects.

At step 4104, the MR system in normal-power mode receives a request for high processor mode. For instance, the MR system may receive a request for rendering and displaying virtual objects.

At step 4106, the MR system switches to a burst or high power mode by operating certain system components that require large amounts of power. The MR system manages the first mode of the system components based on the particular request for high processor mode to control the amount of total current drawn from the battery and heat generated by system components operating in burst mode.

At step 4108, the MR system receives an indicator that the system can function in the normal processor mode. For instance, the MR system may detect that it no longer needs to render and display virtual objects.

At step 4110, the MR system returns to normal-power mode. Decreasing the amount of time that the MR system operates in burst mode both reduces battery power consumption and heat generated by system components such as processors.

Discrete Imaging Mode

The discrete imaging mode is a specific power saving and heat reducing mode for a MR system having multiple planes. In a discrete imaging mode all or most of the content is on one plane. A MR system in discrete imaging mode saves power and reduces heat by directing its resources to rendering and projecting images in one plane. Images in other planes are presented with much less processing (e.g., by blurring, by reducing the update frequency, and the like) Presenting images on a single depth plane reduces blending issues, which may require many processor cycles.

Figure 31A:
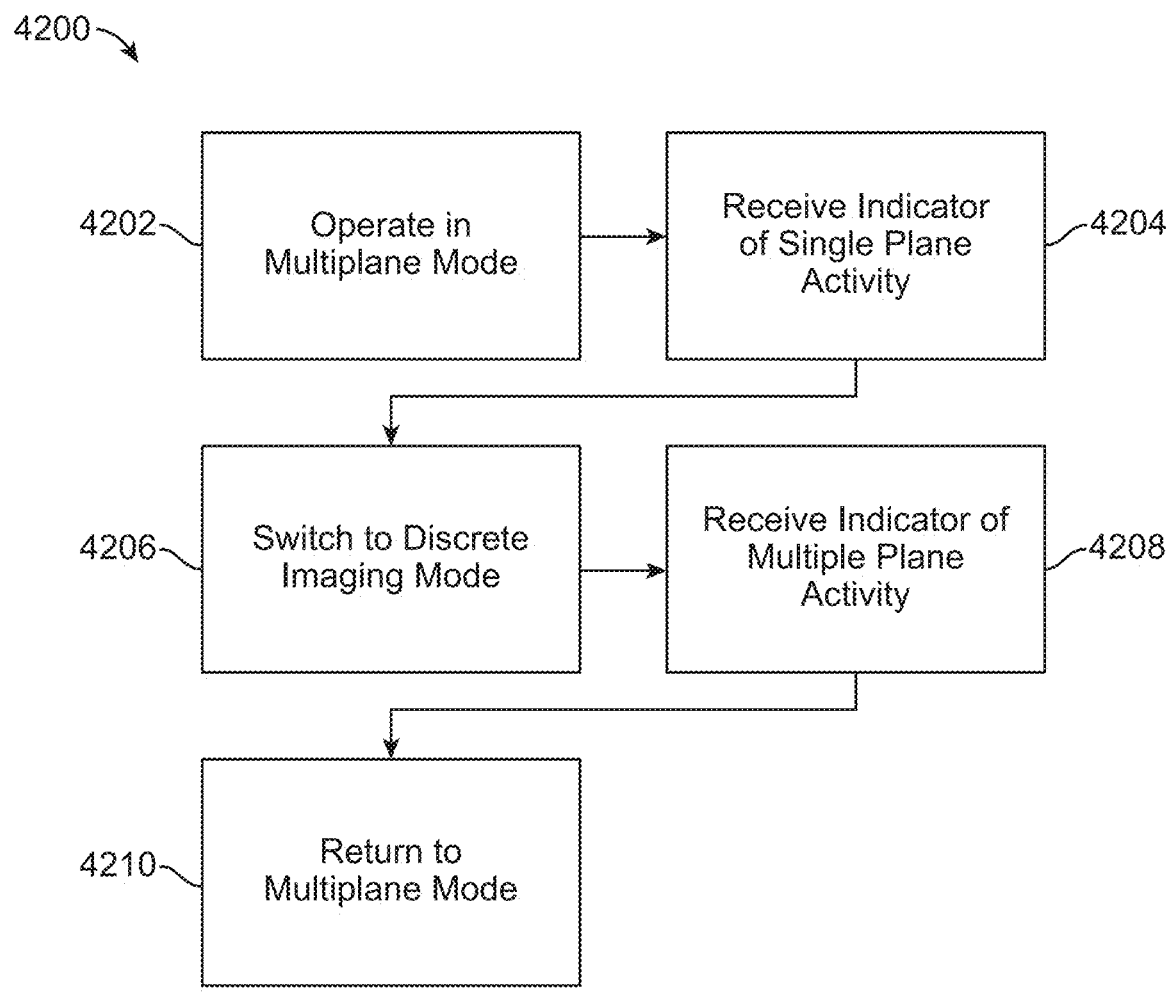
FIGS. 31A and 31B are flowcharts illustrating methods of switching between a multiplane display mode and a discrete imaging mode, according to two embodiments.

FIG. 31A is a flowchart illustrating a method 4200 of switching between a multiplane display mode and a discrete imaging mode while maintaining a high-quality MR experience, according to one embodiment. At step 4202, the MR system is operating in a multiplane mode. In the multiplane mode, the MR system is rendering and projecting images on multiple depth planes. Rendering and projecting images requires a significant amount of processor cycles and battery power, thereby generating significant amounts of heat.

At step 4204, the MR system receives an indicator of single plane activity. Indicators of single plane activity include, but are not limited to, a user requesting a movie to be displayed on a virtual screen using the MR system, and a user opening a 2D application using the MR system. Other indicators of single plane activity include, but are not limited to, eye or gaze tracking results that indicate a user's gaze is converging to a particular plane for a threshold amount of time.

At step 4206, the MR system switches to a discrete imaging mode in response to receiving the indicator of single plane activity. In order to prevent sudden mode switching artifacts, the user's eyes can be tracked to detect and/or predict a blink, and the MR system can be configured to change from multiplane mode to discrete imaging mode during a blink. The MR system can be configured to change modes during a detected or predicted eye movement (e.g., a saccade) to generate a non-jarring transition. The MR system may detect or predict an eye movement when a virtual object is presented on a different plane than the one on which the system is currently rendering.

At step 4208, the system receives an indicator of multiple plane activity. Indicators of multiple plane activity include, but not limited to, a user looking away from the plane of the discrete imaging mode for more than a threshold amount of time. Other indicators of multiple plane activity include, but are not limited to, a user requesting that the movie or an application being displayed on the plane of the discrete imaging mode be halted.

At step 4210, the system returns to multiplane mode in response to receiving the indicator of multiple plane activity. As in step 4206, the MR system can be configured to switch modes during a detected or predicted blink or saccade to generate a non-jarring transition.

Figure 31B:
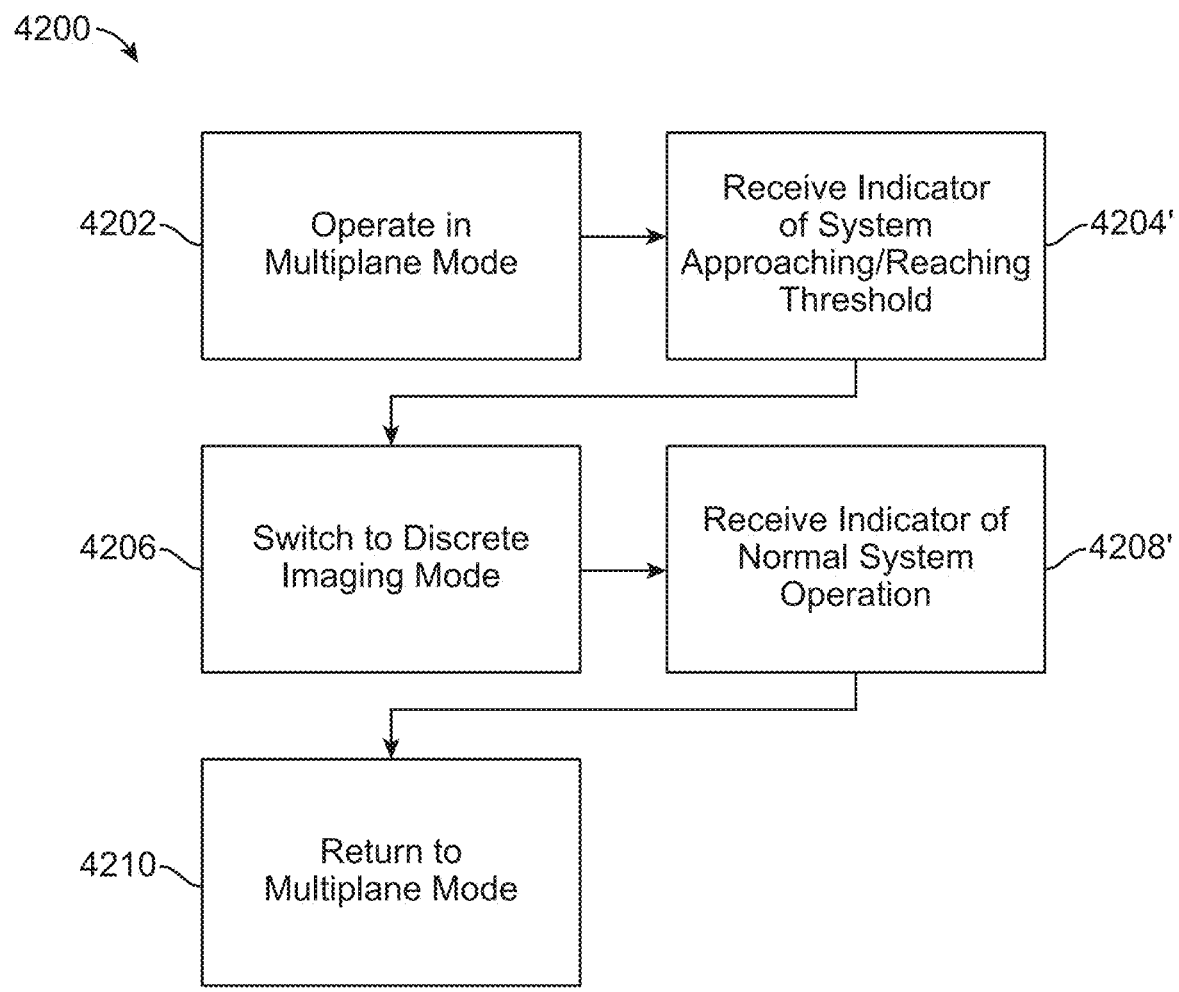

FIG. 31B is a flowchart illustrating a method 4200 of switching between a multiplane display mode and a discrete imaging mode while maintaining a high-quality MR experience, according to another embodiment. At step 4202, the MR system is operating in a multiplane mode. In the multiplane mode, the MR system is rendering and projecting images on multiple depth planes. Rendering and projecting images requires a significant amount of processor cycles and battery power, thereby generating significant amounts of heat.

At step 4204', the MR system receives an indicator of the MR system approaching a predetermined threshold. As used in this application, "approaching" a numerical threshold includes, but is not limited to, a system characteristic/statistic being within a predetermined amount or percentage of the numerical threshold. Predetermined thresholds include, but are not limited to, system temperature limits and battery power limits. For instance, the MR system may receive an indicator when the system approaches or reaches a predetermined maximum temperature threshold. In another embodiment, the MR system may receive an indicator when the system approaches or reaches a predetermined minimum battery power threshold. A threshold may be critical to system function such that reaching or passing these thresholds may cause the system to shut down. Alternatively, a threshold may be set or predetermined to indicate a status that may cause the system to function at a sub-optimal level.

At step 4206, the MR system switches to a discrete imaging mode in response to receiving the indicator of the MR system approaching a predetermined threshold. In order to prevent sudden mode switching artifacts, the user's eyes can be tracked to detect and/or predict a blink, and the MR system can be configured to change from multiplane mode to discrete imaging mode during a blink. The MR system can be configured to change modes during a detected or predicted eye movement (e.g., a saccade) to generate a non-jarring transition. The MR system may detect or predict an eye movement when a virtual object is presented on a different plane than the one on which the system is currently rendering.

At step 4208', the system receives an indicator of normal system operation. Indicators of normal system operation include, but are not limited to, the system having no system characteristics/statistics within a predetermined amount or percentage of a numerical threshold. Other indicators of normal system operation include, but are not limited to, the system being connected to a source of charging power.

At step 4210, the system returns to multiplane mode in response to receiving the indicator of normal system operation. As in step 4206, the MR system can be configured to switch modes during a detected or predicted blink or saccade to generate a non-jarring transition.

Eye/Gaze Tracking Based Rendering Modification

Eye and gaze tracking can be used to modify rendering of objects to reduce processor cycles and battery power consumption, and generation of heat. For instance, eye and/or gaze tracking indicates that a user is focused/looking at a particular area in their FOV, rendering of images can be concentrated/foveated centered on the user's point of focus. This can be done in the X and Y directions, as well as in the Z direction along the optical axis (e.g., a particular depth plane). The user's point of focus can also be predicted by predicting the user's eye movements (e.g., using a deep learning network). The user's eye movements can also be predicted using sensor fusion of various sensors operatively coupled to the MR system (e.g., IMUs, microphones, cameras, etc.)

In one embodiment, a MR system is configured to foveate images to a particular quadrant of the users FOV. This reduces the demands on accuracy of eye and gaze tracking/prediction. As discussed above, images outside of the particular quadrants in which the user is focusing their gaze may be rendered using methods requiring fewer processor cycles.

In one embodiment, the area of sharp rendering during foveation may be increased/widened when more power and/or processor capacity is available (e.g., when the MR system is connected to a power source and processor usage is under a threshold level). This embodiment both conserves power, and ensures that objects at the user's point of focus are rendered at the highest level achievable by the MR system. Increasing the area of sharp rendering during foveation also results in a more natural transition for the user. The MR system may modify the area of sharp rendering during foveation based on other factors, including but not limited to, amount of eye movements, system temperature, user preferences, and the like.

In another embodiment, the model used to predict the position of the user's eyes may be modified so that the model is more accurate in a foveated area centered on the user's current point of focus. For areas outside of the foveated area, the model may be less accurate and even wrong.

The user's eyes can be tracked based on a calculated location of the center of rotation of the eyes rather than a viewing vector. The center of rotation of the eye doesn't change significantly over time. Therefore, rendering images based on the center of rotation of the user's eyes may be less processor intensive.

Figure 32:
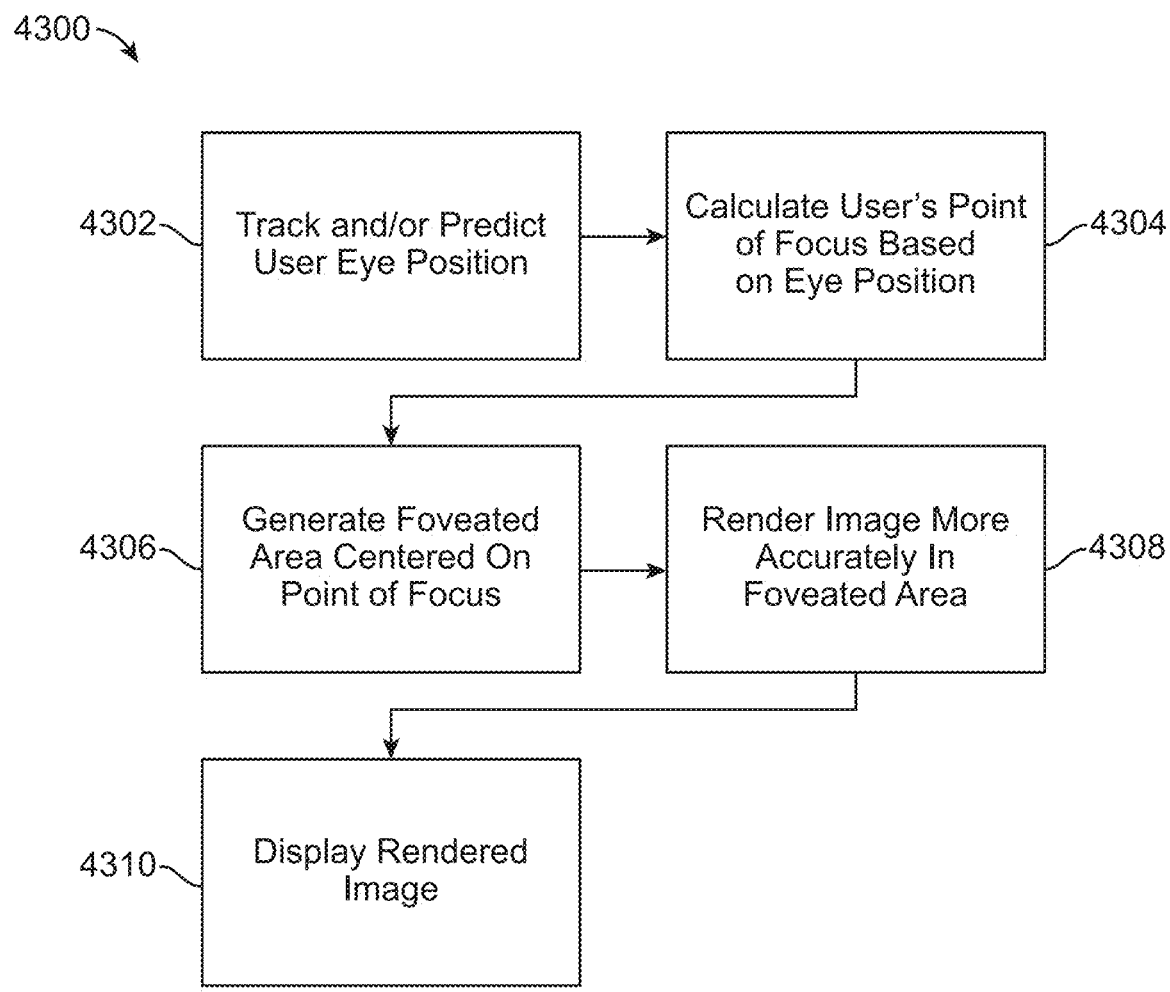
FIG. 32 is a flowchart illustrating a method of using tracked and/or predicted eye or gaze position to reduce rendering processor requirements, according to one embodiment.

FIG. 32 is a flowchart illustrating a method 4300 of using tracked and/or predicted eye or gaze position to reduce rendering processor requirements according to one embodiment.

At step 4302, a MR system tracks and/or predicts an eye position of its user.

At step 4304, the MR system calculates the user's current point of focus based on the tracked or predicted eye position.

At step 4306, the MR system generates a foveated area centered on the user's current point of focus. The MR system may generate the foveated area based on current system status and/or user preferences.

At step 4308, the MR system renders one or more virtual images such that portions of those images in the foveated area are rendered more accurately (at a higher processor cost) and portions of those images outside of the foveated area are rendered less accurately (at a lower processor cost).

At step 4310, the MR system displays the rendered virtual images to the user.

Scene Augmentation

Figure 33:
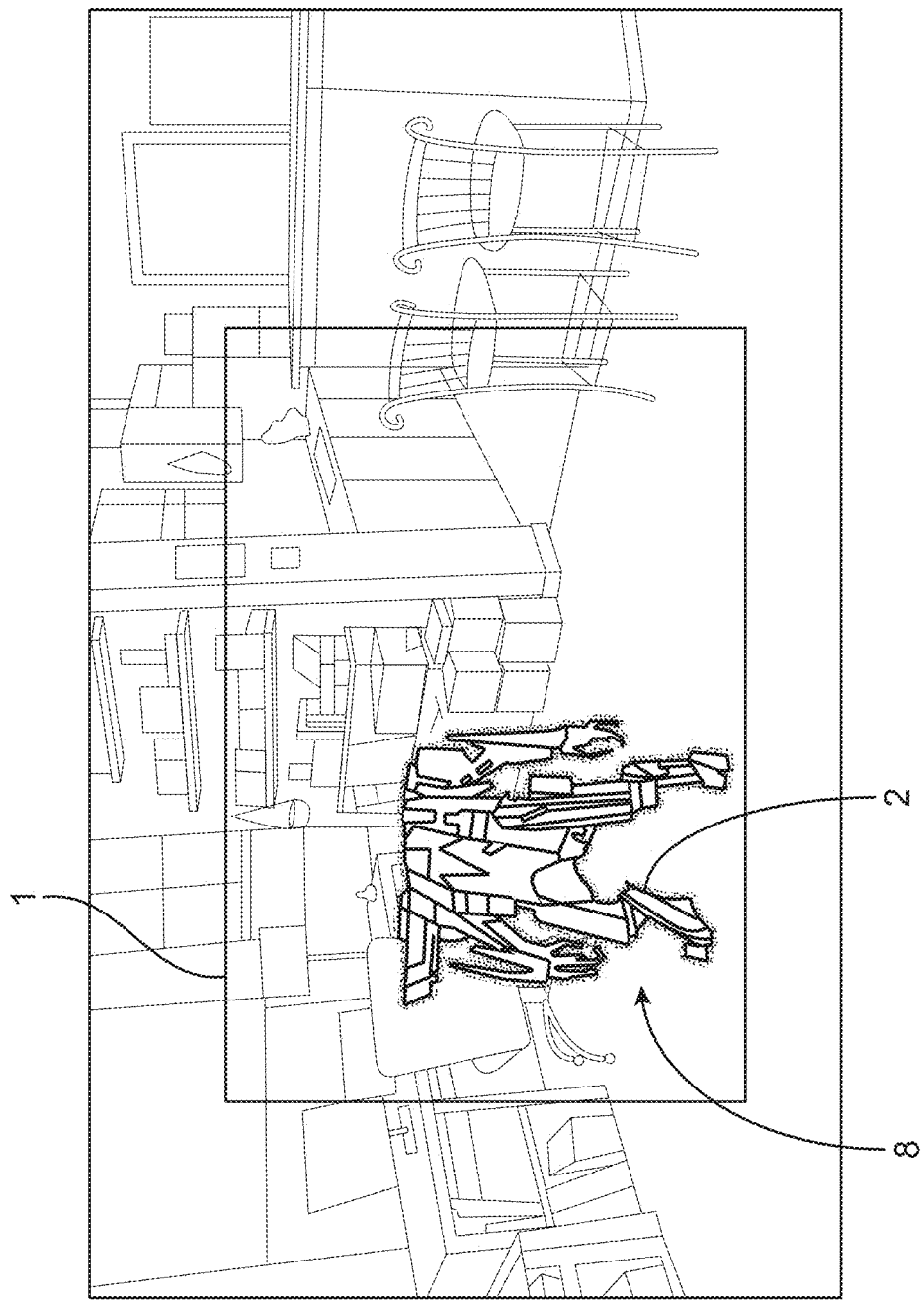
FIG. 33 illustrates a 3D scene showing scene augmentation in conjunction with a real-world scene as used in AR/MR systems, according to one embodiment.

FIG. 33 depicts a 3D scene 1 showing scene augmentation in conjunction with a real-world scene as used in AR/MR systems. As an option, one or more variations of 3D scene 1 or any aspect thereof may be implemented in the context of the architecture and functionality of the embodiments described herein.

Figure 35:
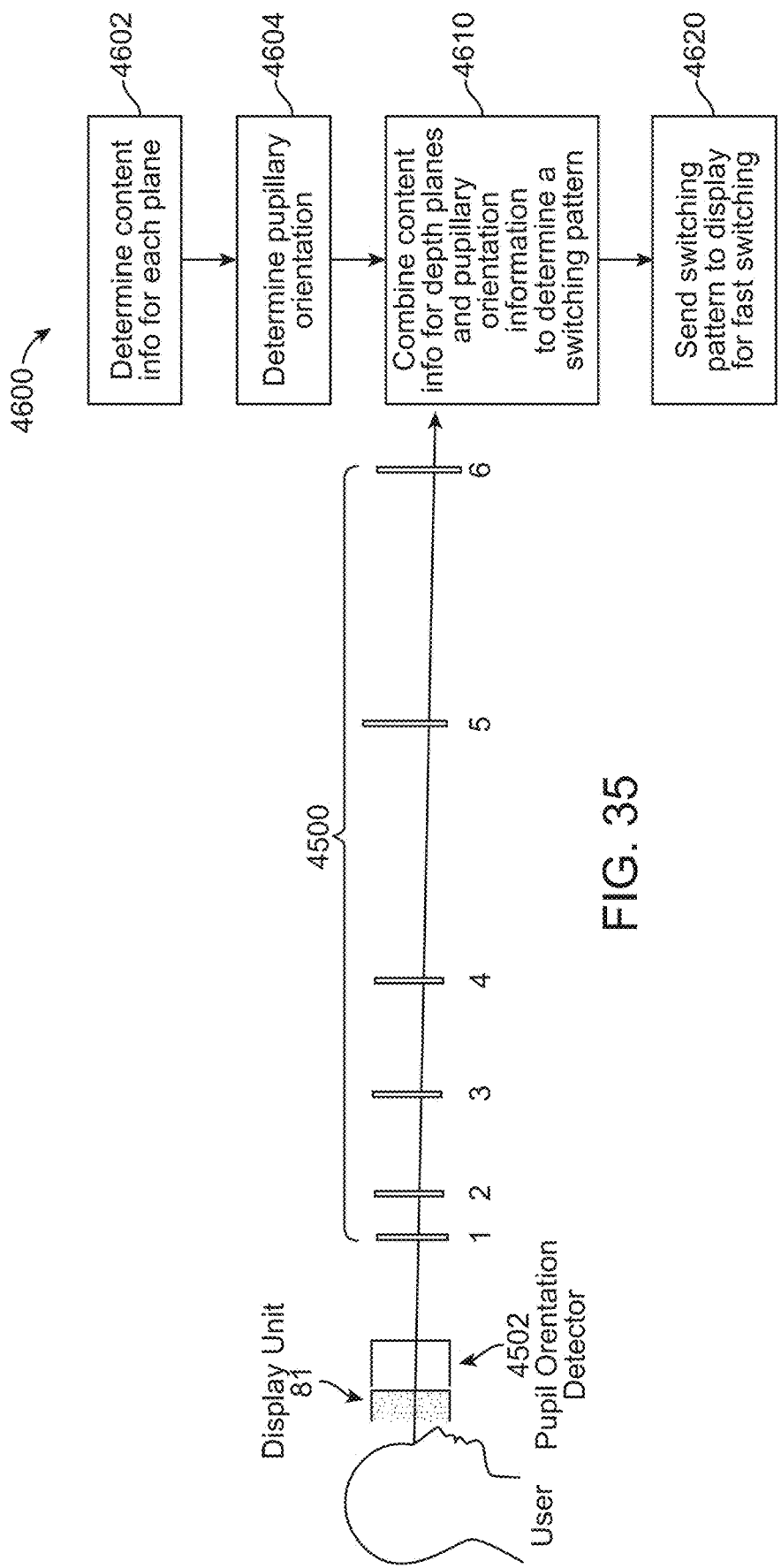
FIG. 35 includes the plurality of successively more distant depth planes depicted in FIG. 34 and a flowchart illustrating a method of switching depth planes used to implement low power VR/AR/MR systems, according to various embodiments.

The embodiment shown in FIG. 35 is merely one example. As shown, the 3D scene 1 includes scene augmentation 8 in the form of a character 2. The character 2 is depicted as having three dimensions, including depth (i.e., the character 2 is oriented so that it passes through multiple depth planes). Some of the techniques discussed herein include use of a perception processor/CVPU in conjunction with a graphics processor to simulate perception of depth. Some of the embodiments discussed herein involve high speed and low power management of depth planes used in displaying or simulating aspects pertaining to depth. More particularly, scene augmentation, including displaying or simulating aspects pertaining to depth can be implemented by a head mounted display (HMD), possibly including additional modules, as is depicted in the following figures.

In some implementations, the aforementioned projector is formed of multiple planes, each of which is associated with a corresponding depth plane. Depth planes can be organized in various configurations, one of which is shown and discussed as pertains to FIG. 34.

Depth Plane Switching Based on Pupil Tracking

Figure 34:
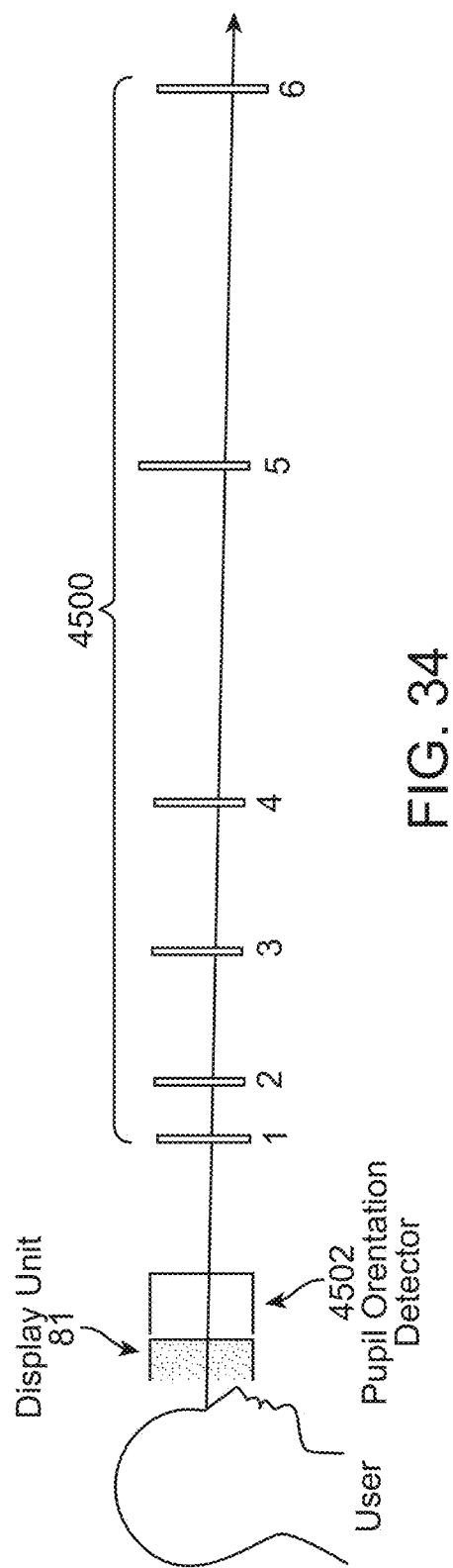
FIG. 34 illustrates one or more successively more distant depth planes as used in components that implement VR/AR/MR systems, according to one embodiment.

FIG. 34 depicts an organization of successively more distant depth planes 4500 (from 1 diopter to 6 diopters distant from user) as used in components that implement VR/AR/MR systems. As an option, one or more variations of depth planes 4500 or any aspect thereof may be implemented in the context of the architecture and functionality of the embodiments described herein.

A display unit 81 is used to present imagery to a user. The imagery might include scene augmentation, which in turn might present one or more characters or objects in what appears to be in three dimensions. During any session with VR/AR/MR, a user might be relatively more or relatively less interested in one or another depth plane. For example, a user might be interested in fine features in foreground imagery, and possibly disinterested in background imagery. In some cases a user's interest level pertaining to a particular depth plane can be detected (e.g., by a pupil orientation detector 4502, as shown). Interest can be purposefully maintained to the foreground (or any other depth plane) and/or a depth plane can be purposefully processed (e.g., blanked, blurred, color de-saturated, etc.) so as to accommodate pupillary movement and/or inferences therefrom. In some cases, detection of interest/disinterest and/or inference of interest/disinterest and/or by explicit commands, one or more depth planes can be disabled or otherwise controlled in a pattern spanning many frames. One example of a depth plane switching technique is given as follows.

FIG. 35 depicts a depth plane switching technique 4600 used to implement low power VR/AR/MR systems. As an option, one or more variations of depth plane switching technique 4600, or any aspect thereof may be implemented in the context of the architecture and functionality of the embodiments described herein. The depth plane switching technique 4600 for switching between two or more depth planes, or any aspect thereof may be implemented in any environment.

As shown, the flow commences from step 4602 to determine content (if any) of each plane. Step 4604 determines pupillary orientation, after which a display application or service combines depth plane information with pupillary information to automatically determine a switching pattern (at step 4606) before applying the switching pattern to the planes of the display (step 4608). Strictly as one example, one depth plane can be blanked. As another example multiple depth planes can be blanked. As yet another example, display or blanking of a sequence of displayed frames can be individually controlled by an automatic switching pattern.

Often switching patterns operate at a high rate of speed, such as 30 frames per second, or 60 frames per second, or 60 frames per second for each of six planes, which comes to an aggregate rate of 360 individually-controllable frames per second. Accordingly certain techniques for implementing switching patterns are relatively more felicitous, and other are less so. At least for purposes of fast switching and low power consumption, a bank of analog switches can serve to individually switch on or off individual depth planes in a fast switching sequence.

Further details regarding general approaches to depth plane switching are described in U.S. application Ser. No. 15/146,296 titled, "SEPARATED PUPIL OPTICAL SYSTEMS FOR VIRTUAL AND AUGMENTED REALITY AND METHODS FOR DISPLAYING IMAGES USING SAME" filed on May 4, 2016, which is hereby incorporated by reference in its entirety.

Low Power Depth Plane Switching

Figure 36:
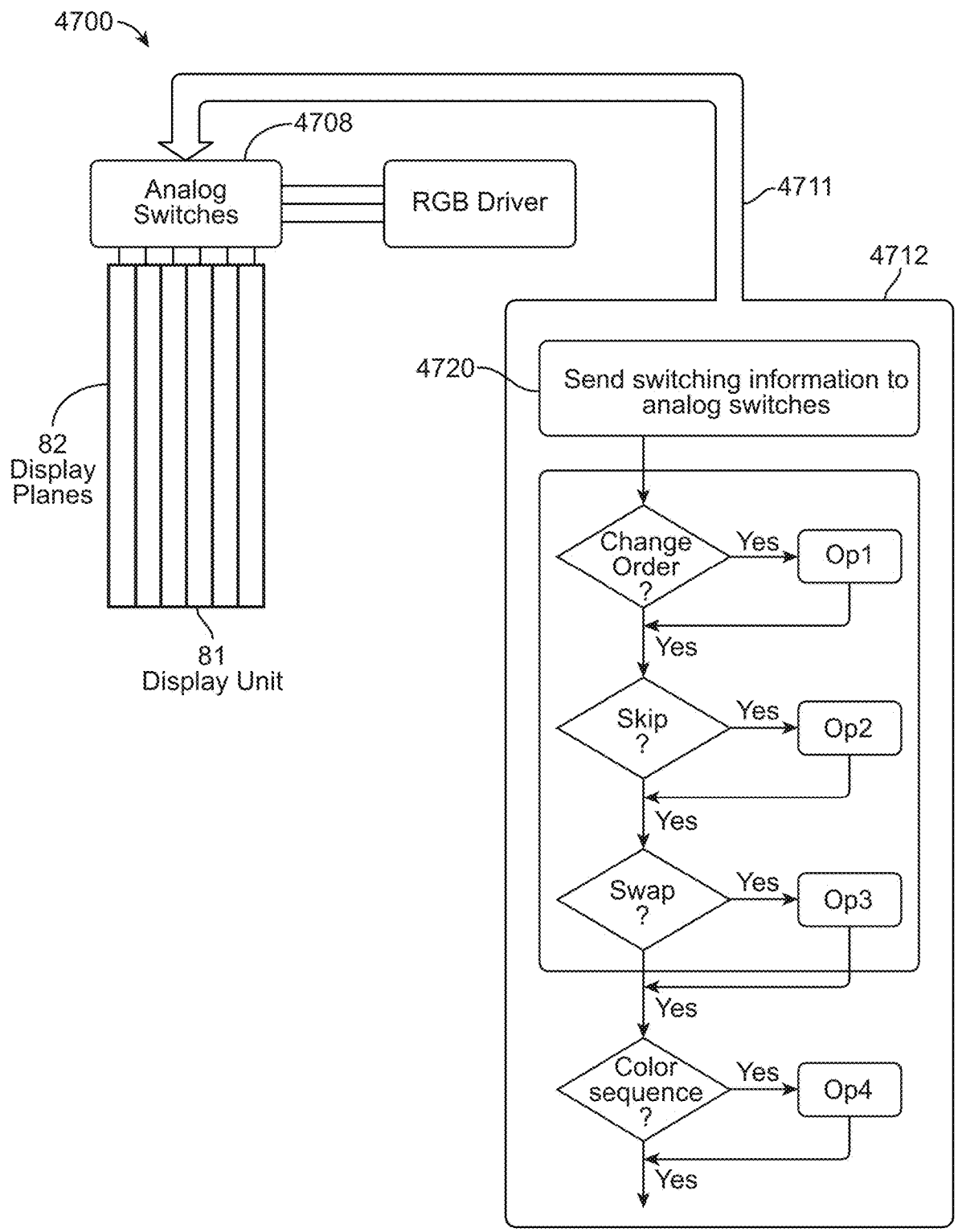
FIG. 36 schematically depicts a VR/AR/MR system including distally-located components, according to one embodiment.

FIG. 36 depicts use of analog switches 4708 to implement a low power depth plane switching technique 4700 in VR/AR/MR systems. As an option, one or more variations of low power depth plane switching technique 4700 or any aspect thereof may be implemented in the context of the architecture and functionality of the embodiments described herein. The low power depth plane switching technique 4700, or any aspect thereof, may be implemented in any environment.

As shown, a display unit 81 is composed of one or more display planes 82. Each individual one of the one or more display planes 82 can be individually controlled so as to individually blank (e.g., turn off) or de-saturate or dim (e.g., reduce power) any individual depth plane. A time-variant set of switch settings can be determined by an application or service 4712. The application or service 4712 in turn can implement formation of dynamically-determined switch patterns to be delivered to the analog switches 4708 (via path 4711).

The switching pattern can be defined at least in part by a series of decisions. As shown, such decisions might include reordering depth planes, blanking depth planes, skipping one or more frames, swapping one or more frames, and/or performing color sequencing when forming the dynamically-determined switch patterns. Such blanking or skipping or swapping or re-ordering or color-wise sequencing can serve to deliver a more pleasing and more realistic scene augmentation (e.g., without breaks or with attenuated breaks visible in the visual sequence). Skipping one or more planes for a frame sequence can also be used to deliver a more pleasing and more realistic scene augmentation.

Multiple Implementation Configurations

One way to take advantage of multiplexing ("MUXing") of the LEDs is to use one RBG driver and time domain MUX using the aforementioned analog switches to switch between the two depth planes. This supports a very high rate of switching and can also automatically disable the lasers if there is no data at a particular plane. Another way is to implement a "color sequential" pattern. It is possible to flash R, G, and then B rather than to display RGB plane 1, then display RGB plane 2, etc. It is possible to swap and do color sequential operations using the time MUXing approach. This technique reduces color separation between (for example) plane 1 and plane 2 as the user moves his/her head. It is possible to code swapping instructions into the frame data so as to facilitate color sequential color swapping on a frame by frame basis.

Some embodiments shut off the LEDs on empty planes. This can serve to improve contrast and save power. These techniques can be used in conjunction: (1) shut of LEDs selectively, and (2) sequence frames.

As an example, consider a frame having 3 depth planes and a next frame having only 1 depth plane. This situation can be controlled by shutting off unneeded functionality (e.g., power, contrast loss, etc.). This can be controlled in a frame-by-frame basis using a "first row packet", wherein 80 or 90 bytes of control information are encoded into the packet, and used to synchronize the displays.

In one implementation, a management processor is used to serialize control data so as to reduce the number of pins going through the headset to the beltpack connection. Such serialization supports a longer cable delivers increased noise immunity and signal integrity when using low voltage differential signaling (LVDS).

Additional Depth Plane Processing

Time-MUXing of imagery data enables interesting effects. It is possible to create a "lightfield in time" composed of short bursts that occur when sending one depth plane, then another, then another, etc. Still more interestingly, when using a color sequential display (R, G, then B for first plane; then R, G, then B for second plane) the faster the switching, the less that frame-to-frame breakups are going to be noticed by the user.

To accomplish superfast switching, the head position data can be updated in real-time in the GPU as the depth plane info being provided. For example, pose information can be encoded into frame row data (e.g., in the last row of data). As such, the display controller can process the warping locally. Furthermore, the GPU can be configured to send display data (1) one color at a time, and (2) one depth plane at a time. Latency is significantly reduced or eliminated beyond human perception. As such the real-time pose data can be used to command the display controller to adjust in real-time. For example, when processing one particular plane of RGB data, a transformation adjustment can perform warping on that data independently from other planes. It is also possible re-order the incoming data so that it comes out heading toward the display pixels in a field sequential order. Fitting two or more depth planes can be accomplished efficiently using the foregoing. In some cases image and control data is compressed so as to reduce temporary storage and bandwidth needed for reordering.

Figure 37:
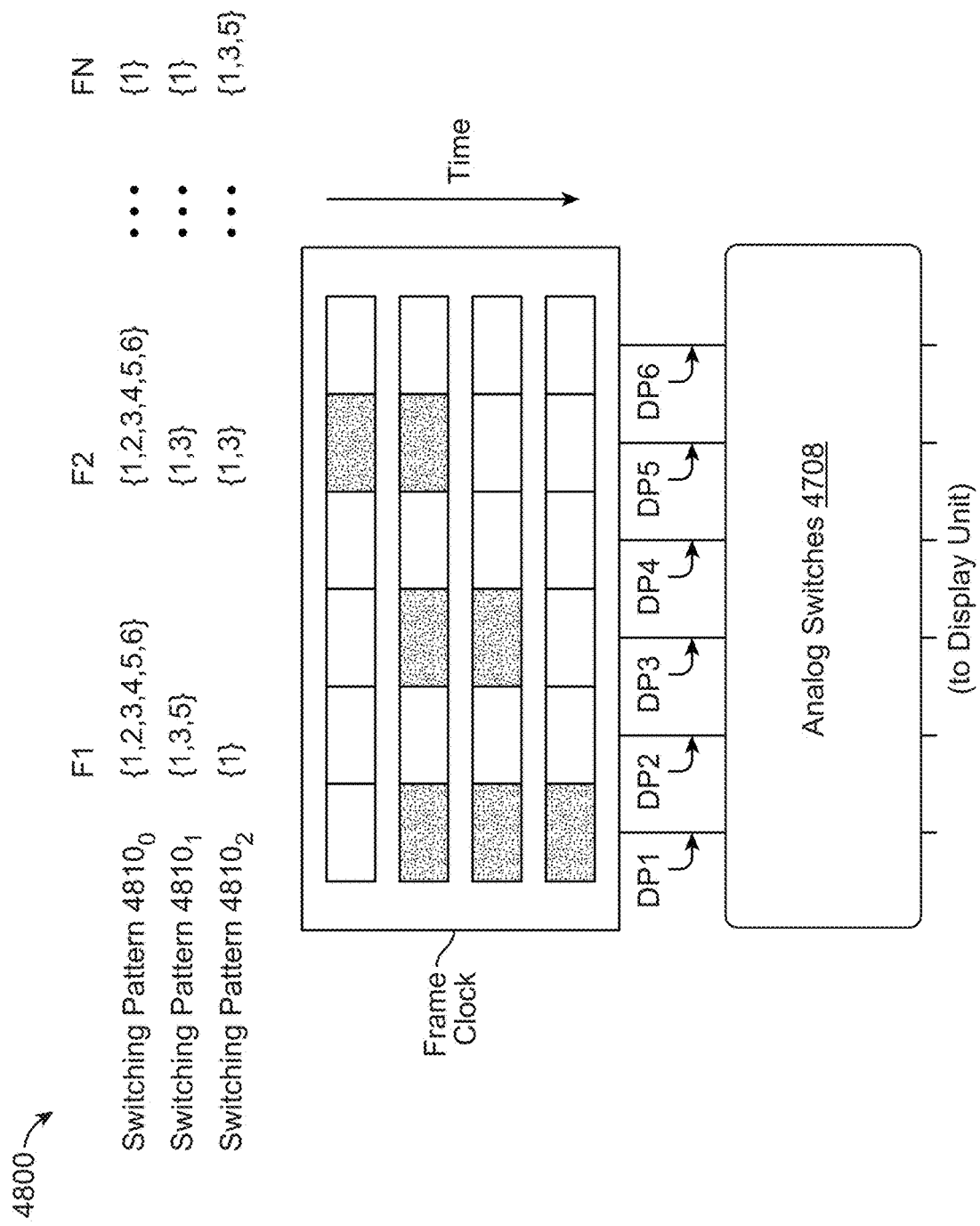
FIG. 37 illustrates frame-by-frame low power depth plane switching using analog switches in a VR/AR/MR system, according to one embodiment.

FIG. 37 depicts use of analog switches to implement a frame-by-frame low power depth plane switching technique 4800 as used in VR/AR/MR systems. As an option, one or more variations of the technique 4800 or any aspect thereof may be implemented in the context of the architecture and functionality of the embodiments described herein. The technique 4800 or any aspect thereof may be implemented in any environment.

Fast switching can be implemented using analog switches 4708. A frame-by-frame buffer to hold a sequence of depth plane blanking instructions can be implemented as a time-ordered first-in-first out (FIFO) buffer or as a circular buffer or as a series of memory locations or registers. Accordingly, and as shown, a switching pattern (e.g., switching pattern $4810_0$, switching pattern $4810_1$, and switching pattern $4810_2$) can be applied over a series of frames. Moreover, any given frame can have an associated set of blanking instructions pertaining to each individual depth plane.

As shown, values (e.g., blanking bit values, color or luminance bit field values, etc.) are used to implement switching patterns for six depth planes (e.g., DP1, DP2, DP3, DP4, DP5, and DP6). More specifically, with each frame clock (e.g., on a positive edge of a frame clock, or on a negative edge of a frame clock) the next set of values can be loaded onto the control terminal of the analog switches so as to produce the desired blanking and/or color or luminance changes, etc.

In some situations, an application or service (e.g., the application or service 4712) can implement blanking on the basis of wink or blink detection.

Figure 38:
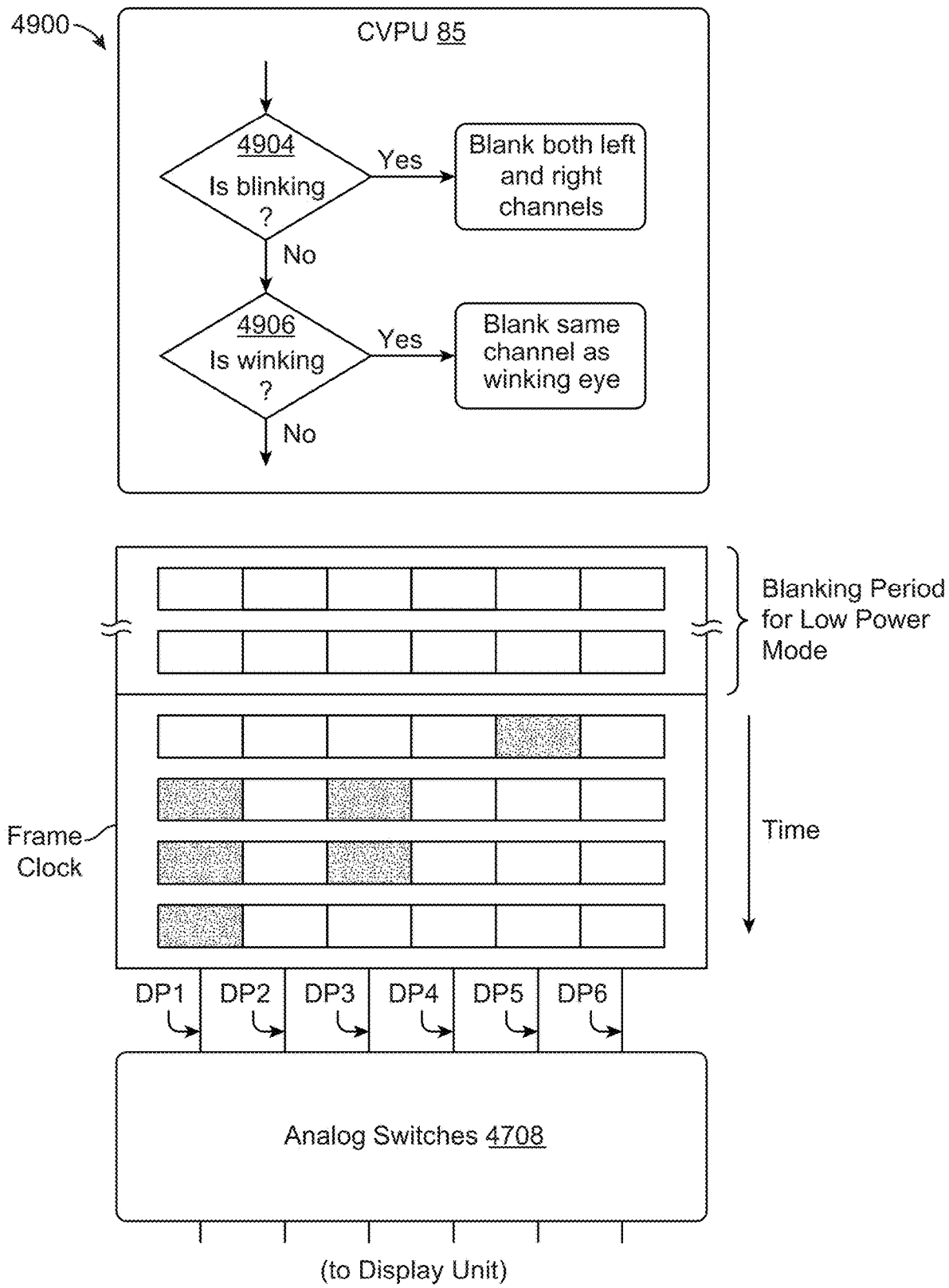
FIG. 38 illustrates frame-by-frame winking or blinking event depth plane switching using analog switches in a low power VR/AR/MR system, according to one embodiment.

FIG. 38 depicts use of analog switches to implement a frame-by-frame winking or blinking event depth plane switching technique 4900 in low power VR/AR/MR systems. As an option, one or more variations of the technique 4900 or any aspect thereof may be implemented in the context of the architecture and functionality of the embodiments described herein. The technique 4900 or any aspect thereof may be implemented in any environment.

A perception processor/CVPU 85 can determine the beginning and ends of winking events (at 4906) and/or the beginning and ends of blinking events (at 4904). During the winking or blinking events, a switching pattern can be established (e.g., by setting or clearing values) such that either the left side of the display or the right side of the display or both is blanked (e.g., turned off) during the respective event. A series of individual switching values can be established for form a switching pattern that spans multiple frames. Since, for example, when a user's eye is closed, he/she is not perceiving visual information, the display can be turned off without detracting from the AR experience. Turning off the display during this period can save power. In some cases, a display unit can be partitioned into two components: (1) a first component that performs actual generation of light, and (2) a second component that controls on/off states of the first component.

Six-Shooter Embodiments

Figure 39:
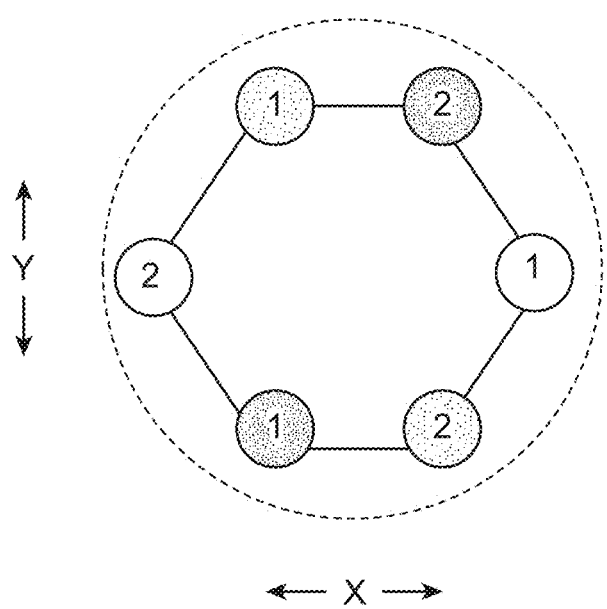
FIG. 39 schematically depicts a six-shooter architecture to implement low power display techniques in a VR/AR/MR system, according to one embodiment.

FIG. 39 depicts uses of a six-shooter architecture to implement display techniques in low power VR/AR/MR systems. A six-shooter architecture can be used in combination with three emitters of three different colors (e.g., R, G, B) and a sequence of two frames. Frames can be sequenced such that any particular pixel in a first frame can be associated with an element of the six-shooter and any particular pixel in a second frame can be associated with a different element of the six-shooter. Accordingly, the six shooter controls six independently-controllable emitters.

Some embodiments relying on an organization of the emitters such that there are 2×R, 2×G, and 2×B emitters (e.g., 6 LED emitters that are bouncing off a panel in different directions). When performing a blended varifocal technique, the successive frame order is {RGB, RGB} that goes out to depth plane 1 and then depth plane 2. In some embodiments, there is isolate control of the emitters over those two planes. As such it is possible to deliver the same frame buffer to each depth plane having all the same pixels {RGB, RGB}, and then modulate the brightness of the foundation field. As such, with isolated control of the emitters, it follows that, for example, when flashing both R emitters in time, a dim reflection is rendered one way and a bright reflection is rendered the other way. In many cases, the 6-shooter fires sequentially and we use the ejection angle off of the panel to send it into the waveguide. In an improved approach, (e.g., in the blended varifocal mode), the same RGB is sent into to both planes—the pixel array is still the same, and the brightness of the LEDs (differential illumination) is adjusted so that the display is dimmer (or not). For example, using the aforementioned technique 50% bright is sent to the front, and 50% bright is sent to the back (using the same frame data). Depth blending is accomplished by varying LED intensity. When using discrete varifocal, all of the pixels are the same on plane 1 and plane 2, the entire frame buffer is blended across those two planes, so there is no need to warp separate fields with such a technique. This can be implemented in hardware to cover many variations or situations (e.g., for nonsequential display, variations where R1 and R2 are not the same and/or are shifted, etc.).

Further details regarding general approaches to making and using a six-shooter are described in U.S. application Ser. No. 15/146,296 titled, "SEPARATED PUPIL OPTICAL SYSTEMS FOR VIRTUAL AND AUGMENTED REALITY AND METHODS FOR DISPLAYING IMAGES USING SAME" filed on May 4, 2016, which is hereby incorporated by reference in its entirety.

Low Power Low Latency Headset

Figure 40:
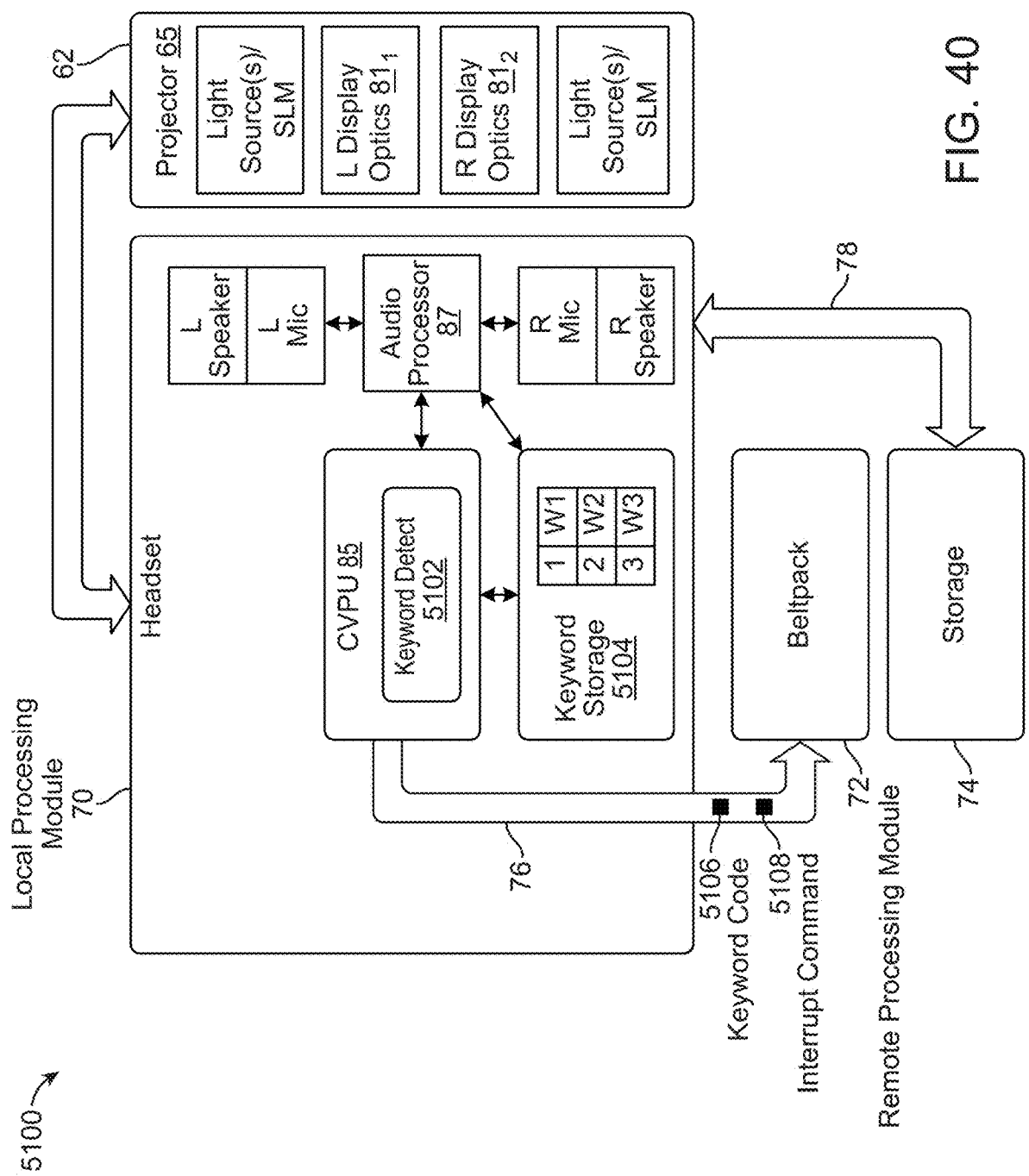
FIG. 40 schematically depicts a low power, low latency headset architecture in a VR/AR/MR system, according to one embodiment.

FIG. 40 depicts a low power low latency headset architecture 5100 as used in VR/AR/MR systems. As an option, one or more variations of the low power low latency headset architecture 5100, or any aspect thereof, may be implemented in the context of the architecture and functionality of the embodiments described herein. The low power low latency headset 5100, or any aspect thereof, may be implemented in any environment.

The shown low power low latency headset architecture 5100 can be used to implement a wake-on-command capability. Specifically, and as shown, the perception processor or CVPU 85 can access a set of stored keywords, which keywords are mapped to a wake-on-command capability. When a user utters one of the wake-on-command keywords (e.g., "Wake-up, "Hey Computer", etc.), the CVPU 85 can detect the utterance, classify it as a wake-on-command keyword, and send a wake-on-command keyword code, possibly with an interrupt command 5108 to the beltpack. If the beltpack had been in a sleep-state or dormant-state or other low-power standby mode, the occurrence of the aforementioned interrupt in combination with the keyword code would cause the beltpack to wake up.

One way to accomplish this power low latency data flow is to situate the keyword detection (e.g., via keyword detect 5102) and classification in the headset, rather than in the beltpack. This way, functions (e.g., software) in the beltpack can enter a low power mode (e.g., sleep or quiesce, but not OFF mode) that can be exited upon receipt (e.g., by the beltpack) of a wake-up command. Such a low-power or very low power sleep or dormancy mode can be entered with the expectation that it can be awakened at any moment in time subsequent to headset detection of a wake-up command.

In one implementation, the CVPU 85 communicates with an audio processor 87, which in turn is connected to one or more microphones, as shown. The CVPU 85, and/or the audio processor 87 can access keyword storage 5104 so as to compare an utterance (e.g., as received through the microphones and processed by the audio processor) with entries in the keyword storage 5104. As shown, the keyword storage 5104 includes entries in the form of a single word, however keywords can be key phrases. The keyword storage 5104 can include sampled data, and/or phoneme data, and/or any encoded data so as to facilitate a match between an utterance and one or more of the keyword entries. Upon a match, the keyword code 5106 (e.g., 1, 2, 3, etc.) can be sent to the beltpack to wake it up from its dormant or other low power state. In this embodiment, a match on a key word or key phrase can be made within a very short time (e.g., within a hundred milliseconds for some keywords, or within a few hundred milliseconds for other keywords or key phrases).

Figure 41:
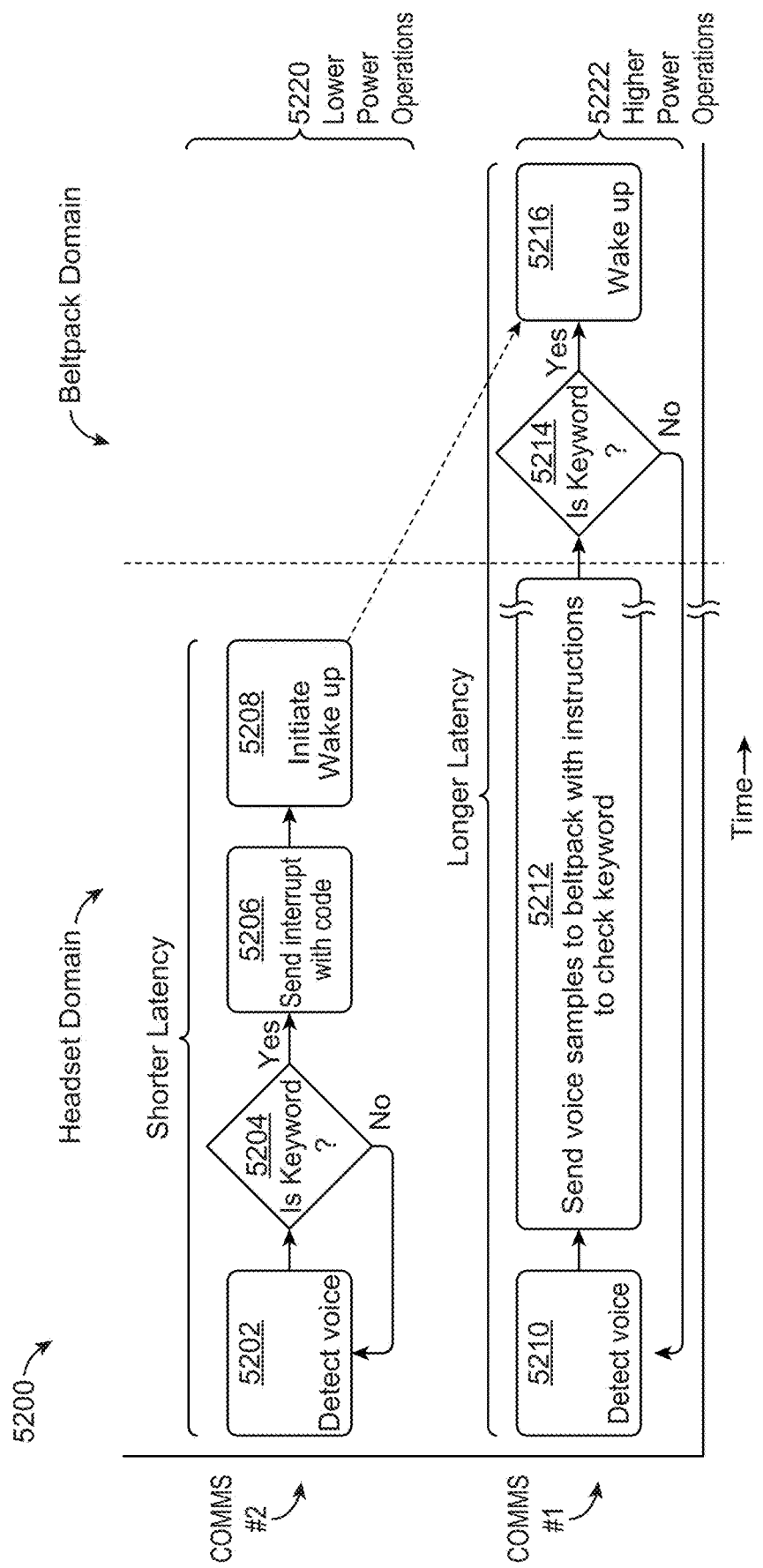
FIG. 41 is a chart comparing a low latency low power flow and a longer latency power flow both in VR/AR/MR systems, according to one embodiment.

FIG. 41 is a comparison chart 5200 depicting two sequences of low latency low power flow as used in VR/AR/MR systems. As an option, one or more variations of the comparison chart 5200, or any aspect thereof, may be implemented in the context of the architecture and functionality of the embodiments described herein. The comparison chart 5200, or any aspect thereof, may be implemented in any environment.

As depicted in FIG. 41, a first sequence (e.g., COMMS#1) of operations and decisions exhibits a relatively longer latency and higher power operations as compared to a second sequence (e.g., COMMS#2) of operations and decisions. The first sequence begins by detecting (at step 5210) an utterance (e.g., using any of the aforementioned microphones). Then, samples of the sounds of the utterance are sent to the beltpack (at step 5212) for processing (e.g., to detect if the utterance was a keyword or not). If the processor on the beltpack determines (at decision 5214) that the utterance was a keyword, then wake-up operations are initiated (at step 5216). Packaging the samples of the sounds of the utterance and then communicating the packed samples of the sounds from the headset to the beltpack takes time as well as power.

Figure 42:
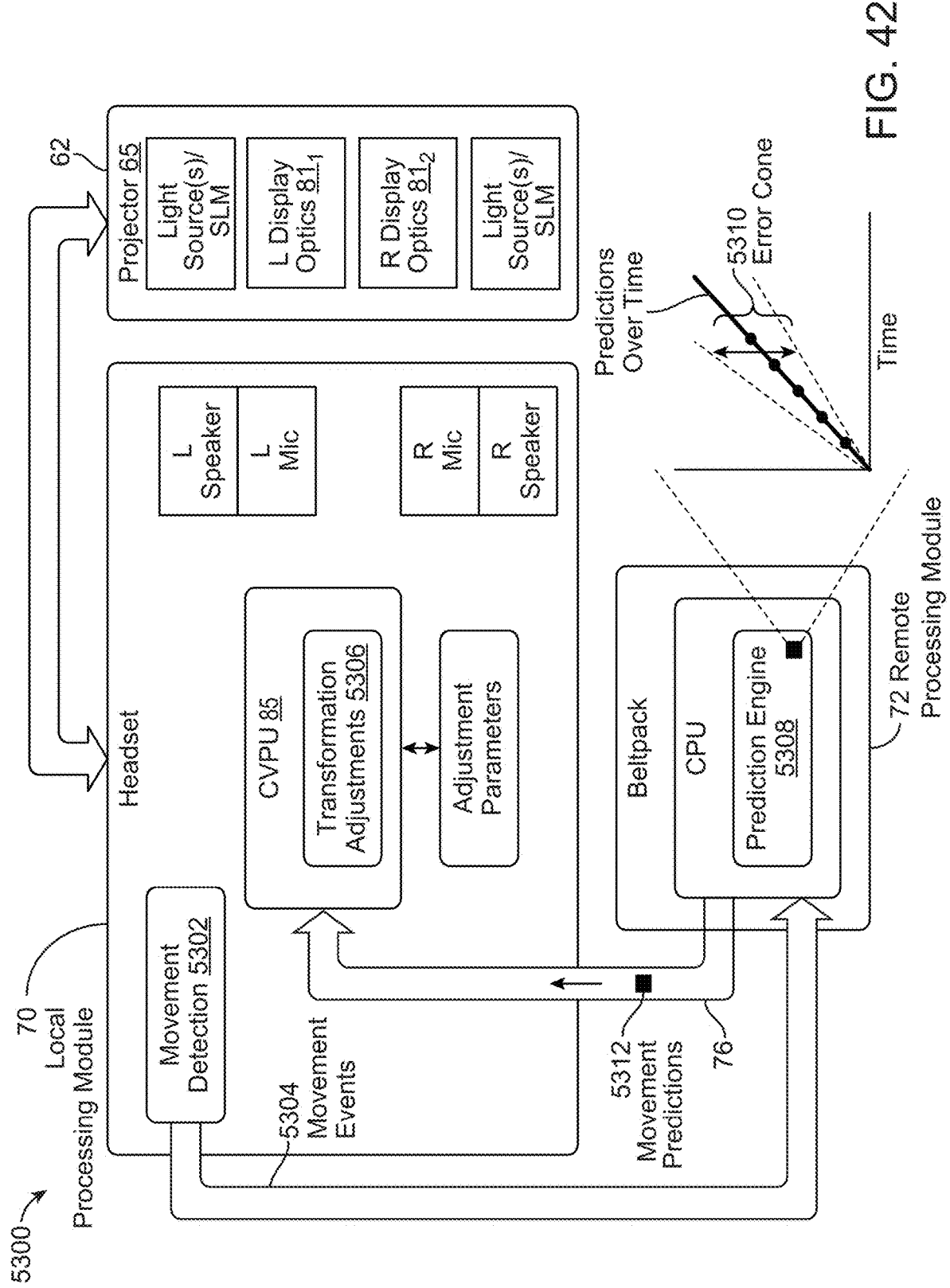
FIG. 42 schematically depicts a VR/AR/MR system for delivering movement predictions to a headset component, according to one embodiment.

Processing the utterance and initiating wake-up operations can be done exclusively in a headset domain (as shown in COMMS#2 of FIG. 41 and FIG. 40). More specifically, the second sequence begins by detecting (at step 5202) an utterance (e.g., using any of the aforementioned microphones). Then, samples of the sounds of the utterance locally processed at the headset to detect if the utterance was a keyword or not (at step 5204), without sending the sounds of the utterance to the beltpack. If the processor on the headset determines that the utterance was a keyword, an interrupt command is sent (at step 5206) to cause wake-up operations to be initiated (at step 5208) at the beltpack. As such, this results in a relatively lower latency between the moment of the utterance and the moment of initiating wake-up commands. Also, the second sequence results in lower power operations 5220 as compared to higher power operations 5222 of the first sequence Low Power Low Latency Movement Prediction FIG. 42 is a VR/AR/MR system block diagram 5300 for delivering movement predictions to a headset component of a VR/AR/MR system. As an option, one or more variations of VR/AR/MR system block diagram 5300, or any aspect thereof, may be implemented in the context of the architecture and functionality of the embodiments described herein. The VR/AR/MR system block diagram 5300 or any aspect thereof may be implemented in any environment.

In many VR/AR/MR systems, user movement, especially head movement of the user is detected (e.g., using an accelerometer). Changes in the scene augmentation are scheduled based on the nature of the movement. In some cases, the aforementioned scene augmentation change scheduling covers a relatively long period of time (e.g., large fractions of a second to many seconds). To improve smooth display and realism, movements, including initiation of head movements detected (at step 5302) and used in aforementioned scene augmentation, change scheduling. In some cases initial measurement of head (or eye) movement (e.g., movement events 5304) can be used in conjunction with a predictor (e.g., prediction engine 5308) to generate a series of predictions (e.g., a series of movement predictions 5312) of where the head or eye would be at some future moment. Often the very near-term predictions are quite accurate with respect to actual movements (e.g., within just a few milliseconds of error), however as time progresses, the error tends to get larger and larger, resulting in an expanding error cone 5310. At some point the error becomes large enough that the prediction can be deemed "wrong" or "useless" and new predictions need to me made based on then-current hear movement events. The time between detection of a movement event and the time that a movement prediction can be delivered to the headset for corresponding image transformation can be long enough that the image transformation is deemed to be "to late" or "out of synch". Another way to handle head movements for synchronized image transformations is given in the following paragraphs.

Figure 43:
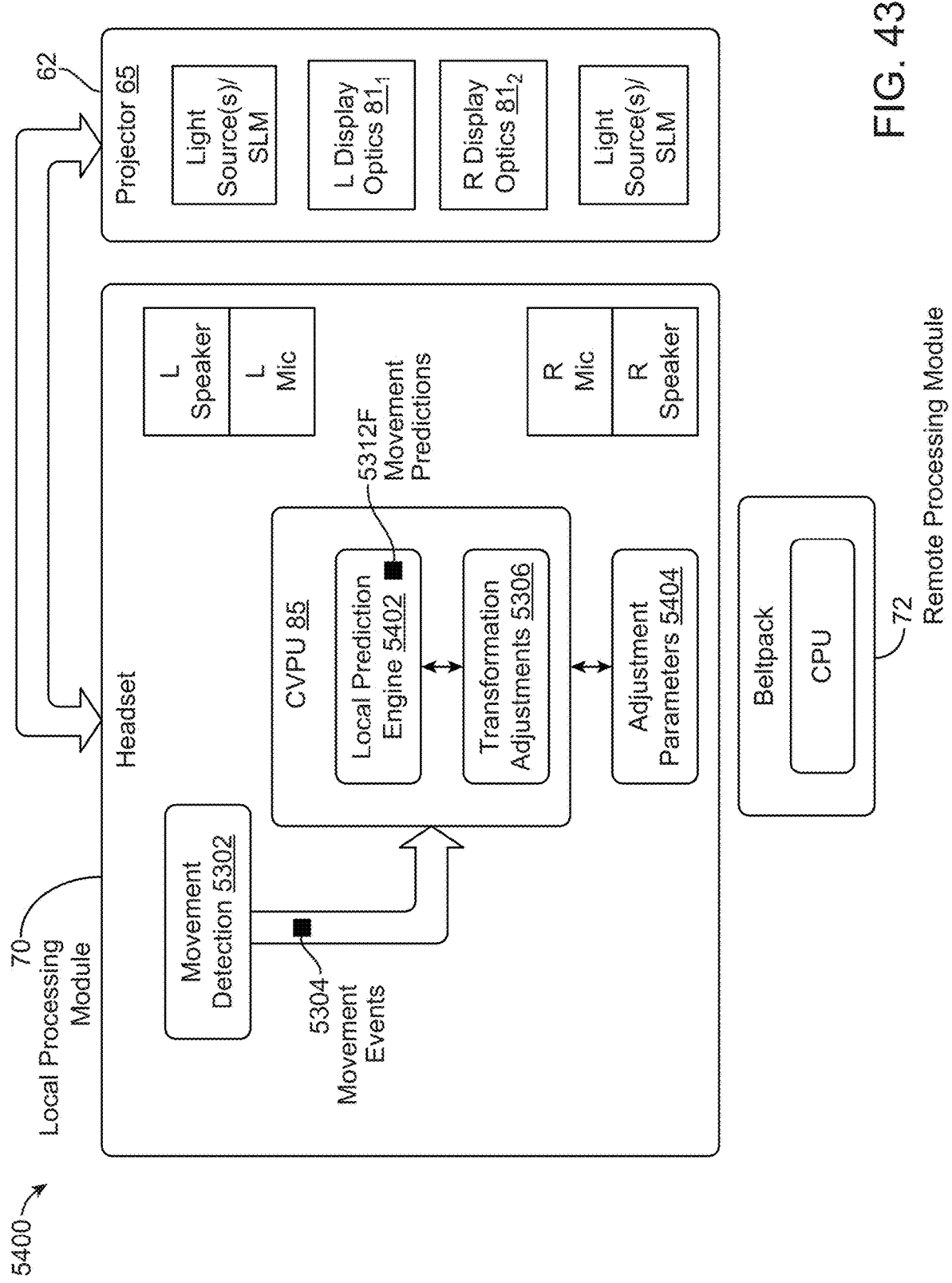
FIG. 43 schematically depicts a VR/AR/MR system having a local prediction engine in a headset component, according to one embodiment.

FIG. 43 is an VR/AR/MR system block diagram 5400 showing a local prediction engine in a headset component of a VR/AR/MR system. As an option, one or more variations of VR/AR/MR system block diagram 5400 or any aspect thereof may be implemented in the context of the architecture and functionality of the embodiments described herein. The VR/AR/MR system block diagram 5400, or any aspect thereof, may be implemented in any environment.

This embodiment detects movement events 5304 and delivers the movement events to a perception processor/CVPU 85 that is local to the headset. As shown, the perception processor/CVPU 85 includes a local prediction engine 5402. As such, the latency between a movement event and the beginning of a series of movement predictions that can be used to drive transformation adjustments is very short. A transformation adjustments 5306 can be made based on combinations of movement predictions 5312F and adjustment parameters 5404.

Figure 44:
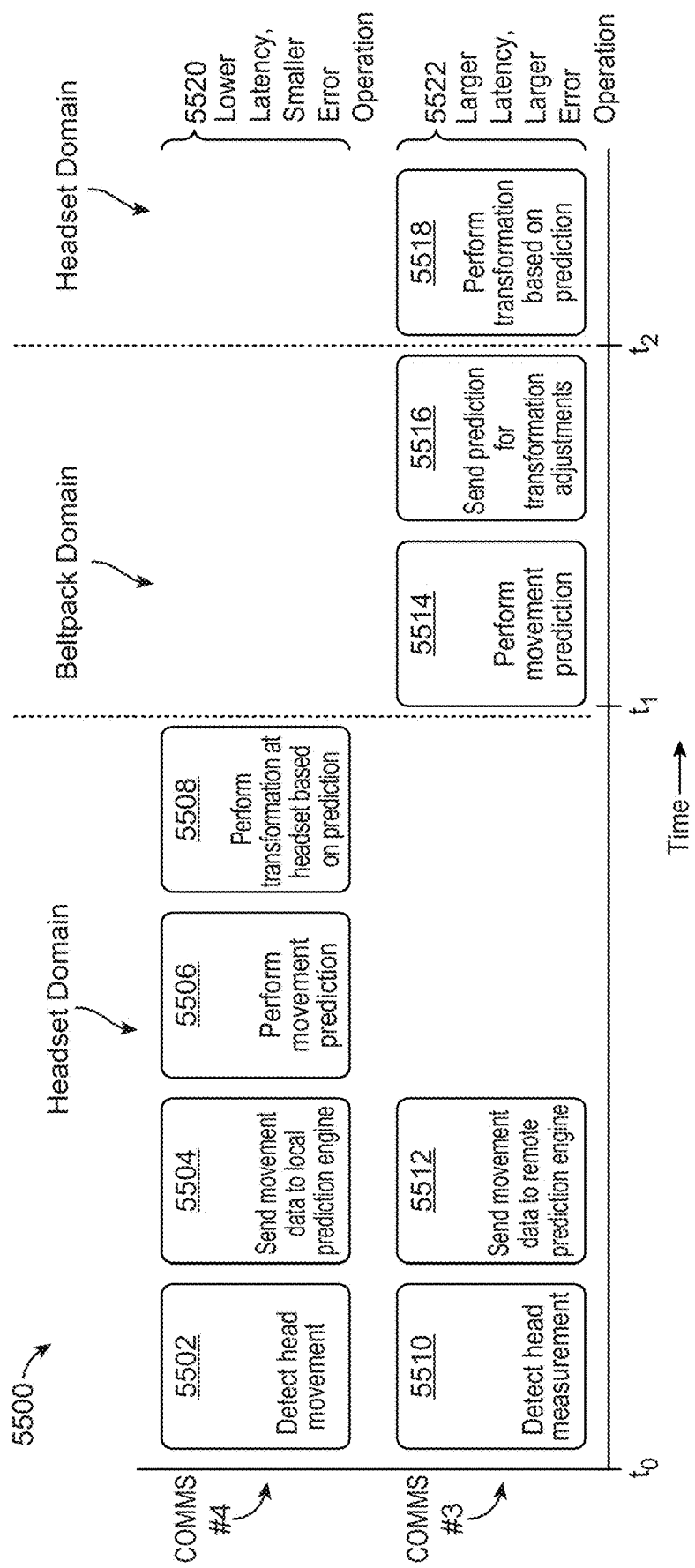
FIG. 44 is a chart comparing a low latency local prediction engine and a longer latency local prediction engine in VR/AR/MR systems, according to two embodiments.

FIG. 44 is a comparison chart 5500 for comparing performance of a local prediction engine as used in VR/AR/MR systems. As an option, one or more variations of comparison chart 5500, or any aspect thereof, may be implemented in the context of the architecture and functionality of the embodiments described herein. The comparison chart 5500, or any aspect thereof, may be implemented in any environment.

The comparison chart 5500 can be used to evaluate latency by comparing operations over a timescale. As shown, a third sequence (e.g., COMMS#3) of operations and decisions begins by detecting head movements (at step 5510), then sending movement data to the remote prediction engine (at step 5512). At the beltpack, movement predictions are made (at step 5514), and then sent to the headset (at step 5516) for transformation adjustments to be made at the headset (at step 5518).

Strictly as an example, the following table presents a selection of transformations and respective error types. Warping transformation/correction error types include vergence and accommodation across all display planes. Rotation transformation/correction error types include pan across all display planes. Elevation transformation/correction error types include vantage and accommodation across all display planes.

TABLE 1

Transformation Adjustments

| Correction Type | Error Type = f($\Box$t) |
|---|---|
| Warping | Vergence, Accommodation (all display planes) |
| Rotation | Pan (all display planes) |
| Elevation | Vantage, Accommodation (all display planes) |

For comparison, a fourth sequence (e.g., COMMS#40 of operations and decisions also commences with detection of head movements (at step 5502), which events are immediately available at the local prediction engine (at step 5504), at which time head movement predictions can be made by the local prediction engine (at step 5506), which in turn can initiate image transformations that are based on combinations of movement predictions 5312 and adjustment parameters 5404 (at step 5508).

The longer latency and larger error operation 5522 that characterizes the third sequence can be compared with the lower latency smaller error operation 5520 of the fourth sequence.

Color Correction

As earlier indicated, the transformation adjustments 5306 can be made based on combinations of the movement predictions 5312 and the adjustment parameters 5404. Further, the transformation adjustments 5306 can be made based on the movement predictions 5312 in combination with predicted color changes. For example, when producing scene augmentation over real-word imagery such as a scene within a room, the user might move their head to change focus from a relatively dark area of the room to a relatively lighter area of the room. Accordingly, the transformation adjustments 5306 can include lighting adjustments, contrast adjustments, color adjustments and so on such that the adjustments calculated are performed with respect to the predicted head movement and the lighting conditions of the real-world scene that would be in the frame at the time(s) of the predicted head position(s). Accurate predictions of user focus can facilitate accurate rendering, and/or eliminate erroneous/discarded lighting renderings, thus saving power without detracting from the user experience.

Other Embodiments

Accelerometers provide sensor fusion data into an embedded processor which can send movement updates to a local processor for sensor fusion, display adjustment, and the like. All of the foregoing can be done locally—right at the display/headset. Just as additional examples, the display adjustment can include warping, transformations, and the like, very close to the display (e.g., LCOS) (e.g., and without relying on participation from the distal beltpack). Such an approach reduces the latency to/from remote components. Latency is undesired and a way to improve that is to have an image processing block proximally located at the display/headset.

Low Power Side Channel

Figure 45:
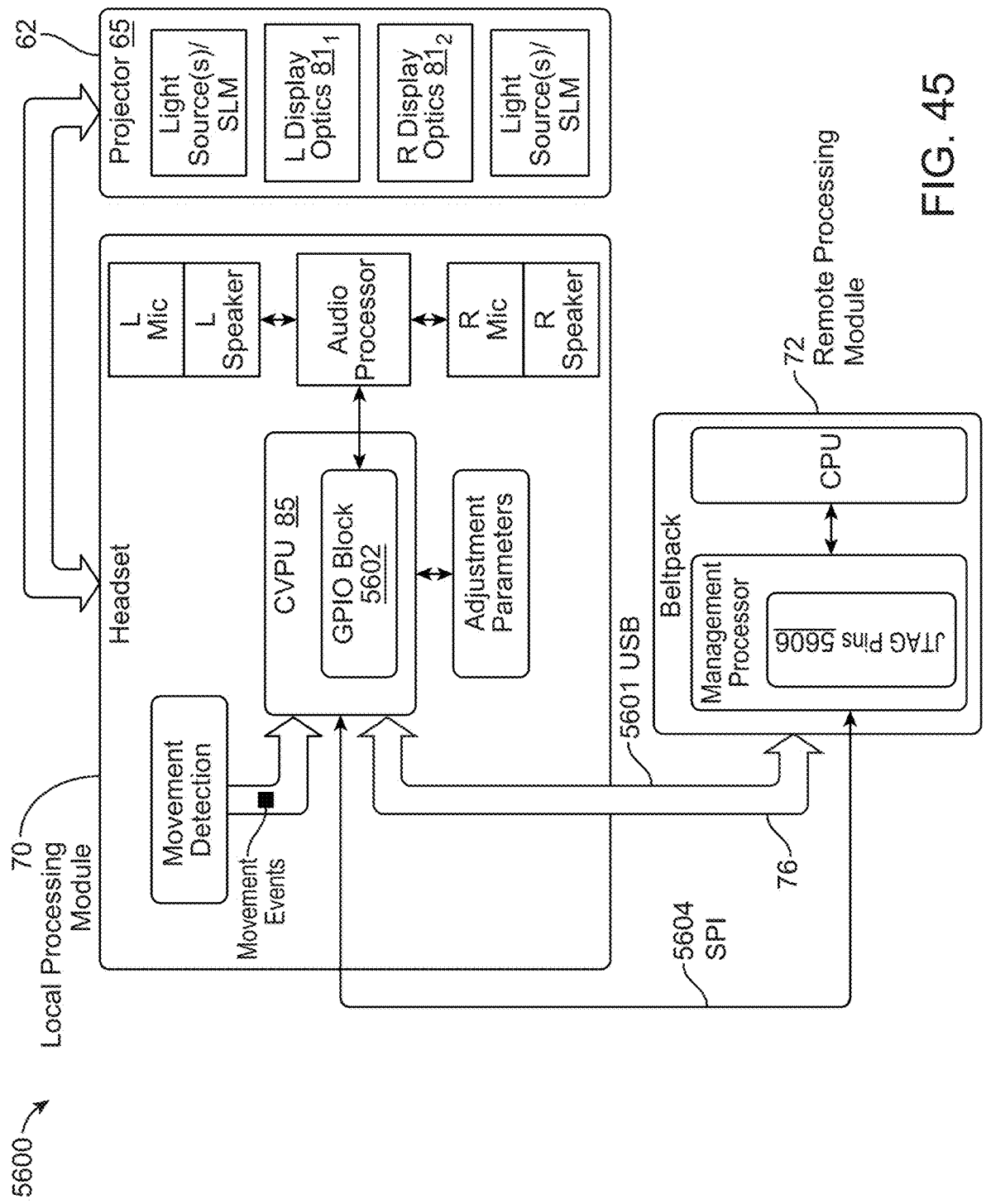
FIG. 45 schematically depicts a VR/AR/MR system having a low power side-channel, according to one embodiment.

FIG. 45 is a system block diagram 5600 showing a low power side-channel as used in VR/AR/MR systems. As an option, one or more variations of system block diagram 5600, or any aspect thereof, may be implemented in the context of the architecture and functionality of the embodiments described herein. The system block diagram 5600, or any aspect thereof, may be implemented in any environment.

As shown, a local processing module 70 can communicate with a remote processing module 72 over a path 76. In some embodiments, the path 76 is implemented as a universal serial bus (USB, USB2, USB3, PCIE, etc.), shown as USB 5601. The USB 5601 path provides high bandwidth, and as such is used by many constituent components of either the local processing module 70, the remote processing module 72, or both. Those of skill in the art will observe that USB 5601 path demands a relatively high amount of power. Also, those of skill in the art will observe that since USB is a priori known to be a high-bandwidth, it is often relied on to accommodate many uses, some of which cannot be accurately predicted. As such, the USB 5601 path may suffer from a traffic jam of data. In such situations (e.g., when large packets or large sequences of data are being transmitted over the USB 5601 path), other small but possibly high priority communications are jammed-up. In this embodiment, an alternate path is provided between the local processing module 70 and the remote processing module 72. Such an alternative path can be constructed using components that are connected respectively to the local processing module 70 and to the remote processing module 72. Specifically, an alternative path can be constructed using a small number of pins of the general purpose input/output (GPIO) block of the local processing module 70 and a few pins of the CPU or peripherals of the remote processing module 72. More specifically, an alternative path in the form of a serial peripheral interconnect (SPI) can be constructed using a small number of pins of the GPIO block of the local processing module 70 and a few JTAG pins of the CPU or peripherals of the remote processing module 72.

The existence of such an SPI 5604 means that neither the USB 5601 path nor the SPI 5604 path need to be at all times operational. The SPI 5604 and the USB 5601 can be multiplexed and/or each turned on or off in accordance with a one or more mode-based regimes. Such mode-based regimes can be implemented in logic flows, such as are shown and described hereunder.

Figure 46C:
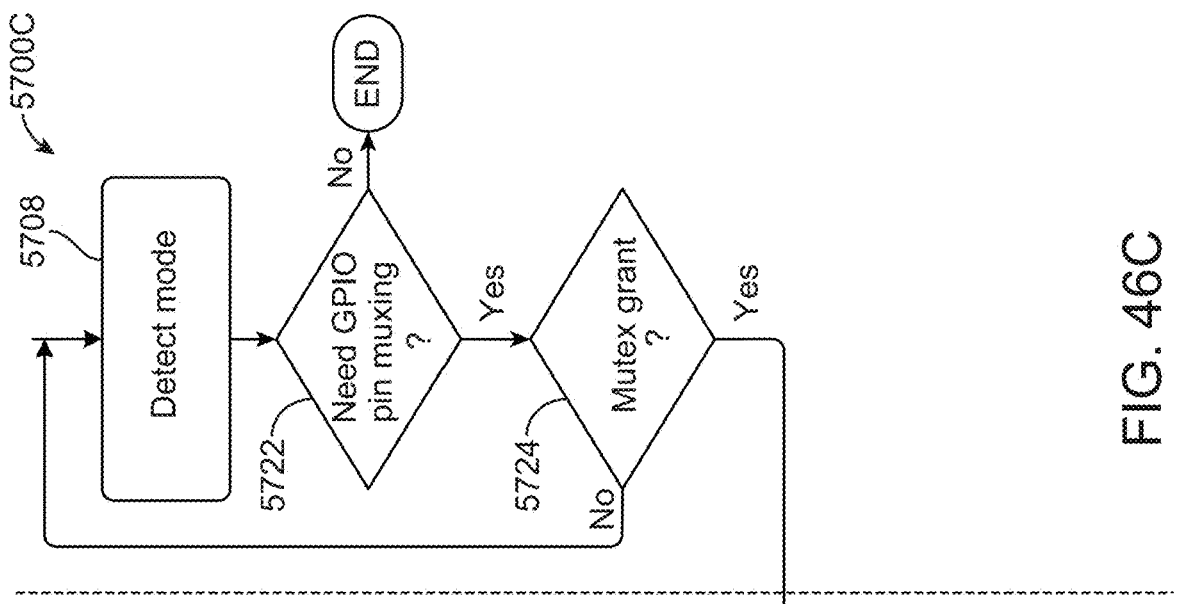
FIGS. 46A-46C are flowcharts depicting mode-based flows for using a low power side-channel in VR/AR/MR systems, according to various embodiments.
Figure 46B:
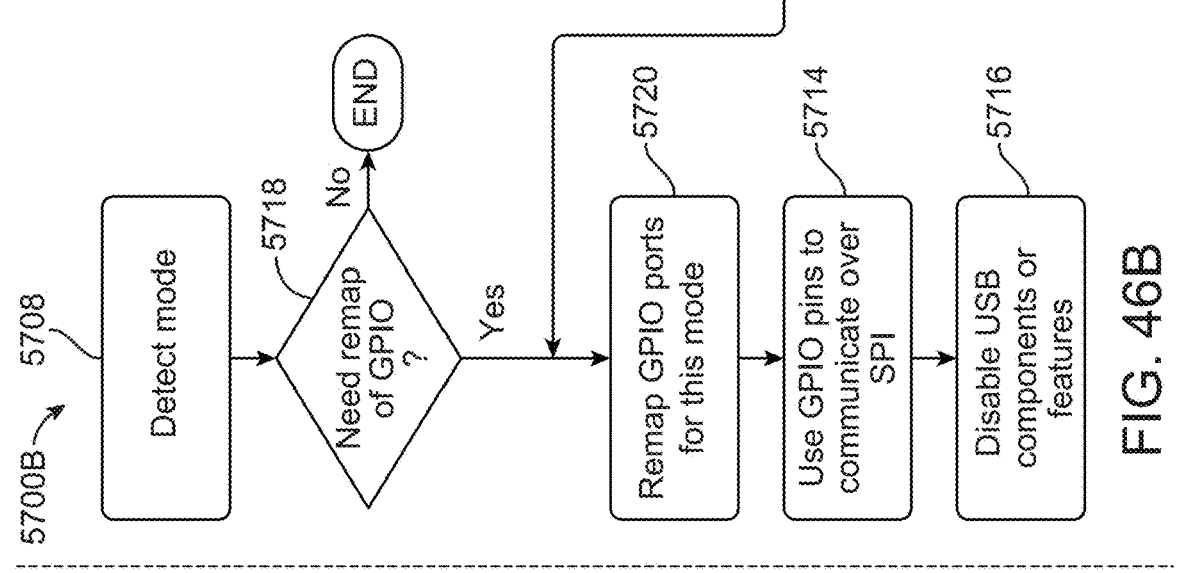
Figure 46A:
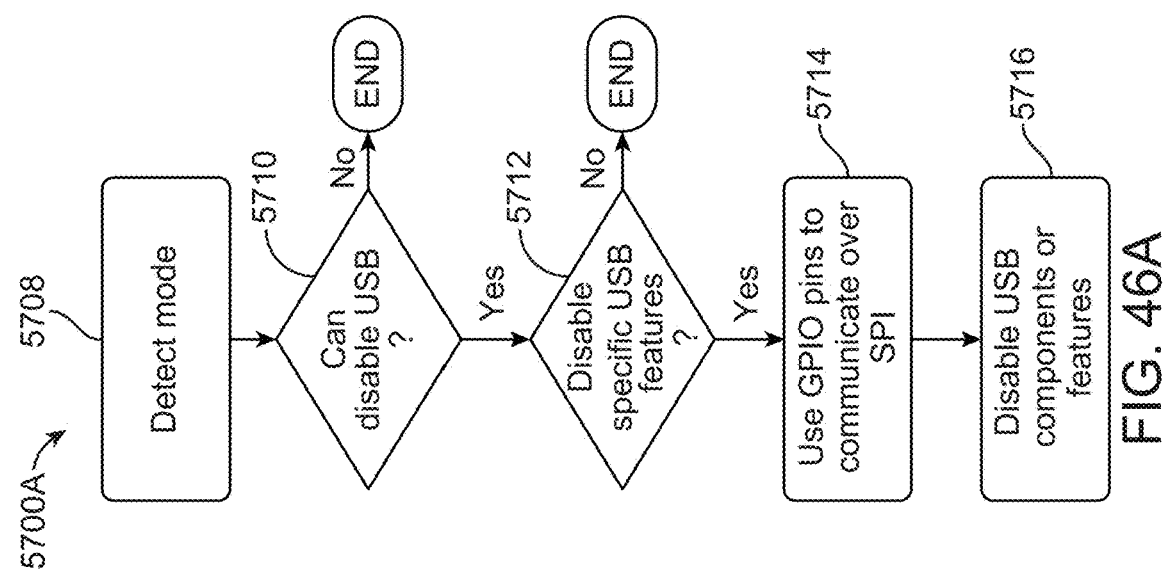

FIG. 46A, FIG. 46B and FIG. 46C depict mode-based flows 5700A, 5700B, 5700C, respectively, for using a low power side-channel in VR/AR/MR systems. As an option, one or more variations of mode-based flows 5700A, 5700B, 5700C, or any aspect thereof, may be implemented in the context of the architecture and functionality of the embodiments described herein. The mode-based flows 5700A, 5700B, 5700C, or any aspect thereof, may be implemented in any environment.

The flow 5700A of FIG. 46A commences by detecting a mode (at step S708). Based on the detected mode, a determination (at decision 5710) can be made if a USB path can be disabled in whole or in part. Next a determination (at decision 5712) can be made as to which capabilities of the USB path can be disabled. For example, certain aspects of USB operation can be disabled while others remain enabled. As one specific example, a USB path might include a repeater. It is possible (e.g., during periods of quiescence or low-bandwidth operation) that the repeater is unnecessary at the time, and thus can be considered for operation in a low-power repeater mode or in a pass-through mode.

When it is determined that at least some USB modes are to be disabled in observance of the mode-based regime, then GPIO pins (e.g., GPIO pins of the GPIO block 5602) and JTAG pins (e.g., JTAG pins 5606 of the management processor) can be used to perform serial communication (at step 5714) over a SPI path (e.g., SPI 5604 path). Once serial communication over the SPI 5604 path is confirmed to be possible, then the applicable USB modes are disabled. The USB path can be re-enabled at any point in time.

Referring now to flow 5700B of FIG. 47B, in some situations, it can happen that GPIO pins are already been in use for some other purpose. Accordingly, use of GPIO pins for serial communication might demand a remap of reconfiguration of pins. Such a determination can be made at step 5718, and then acted upon at step 5720. More specifically, when it is determined that at least some USB modes are to be disabled in observance of the mode-based regime, GPIO pins and JTAG pins can be configured to perform serial communication over a SPI path (e.g., SPI 5604 path). Once serial communication over the SPI 5604 path is confirmed to be possible, then the applicable USB modes are disabled (at step 5716). The USB path can be re-enabled at any point in time.

Referring now to flow 5700C of FIG. 47C, in some situations, it can happen that GPIO pins are currently in use for some other purpose, setting up the need for mutually-exclusive access to the GPIO pins. Accordingly, use of GPIO pins for serial communication might be managed for mutually-exclusive access. A MUTEX is provided (at step 5722). Access to such a MUTEX might result in a grant (at step 5724), after which the logic of FIGS. 46C and 46B can initiate a remap of reconfiguration of pins for the to-beentered operational regime of the detected mode. When it is determined that at least some USB modes are to be disabled in observance of the mode-based regime, GPIO pins and JTAG pins can be configured to perform serial communication over a SPI path (e.g., SPI 5604 path). Once serial communication over the SPI 5604 path is confirmed to be possible, then the applicable USB modes are disabled (at step 5716). The USB path can be re-enabled at any point in time.

The aforementioned management processor can be provided as an off-the-shelf processor with JTAG interfaces, or implemented in a field programmable gate array (FPGA). More specifically, the JTAG interfaces include signal pins such as are defined in JTAG (IEEE 1149.1). Such JTAG pins can include: TDI (Test Data In), TDO (Test Data Out), TCK (Test Clock), TMS (Test Mode Select), as well as optional pins such as TRST (Test Reset). The JTAG pins can be controlled by any known means, including controlling from known-in-the-art GPIO pins.

One specific implementation of a low power side-channel uses an FPGA and GPIO.

Multiple Implementation Configurations

The foregoing SPI connection can be used to disable all or portions of a USB on a beltpack processor, all or portions of a USB SS on a wearable processor, and all or portions of a USB redriver. The USB power consumption may be significant in the system, and this low power interface reduces the need of having a higher power interface (i.e., USB) enabled at all times.

Figure 47:
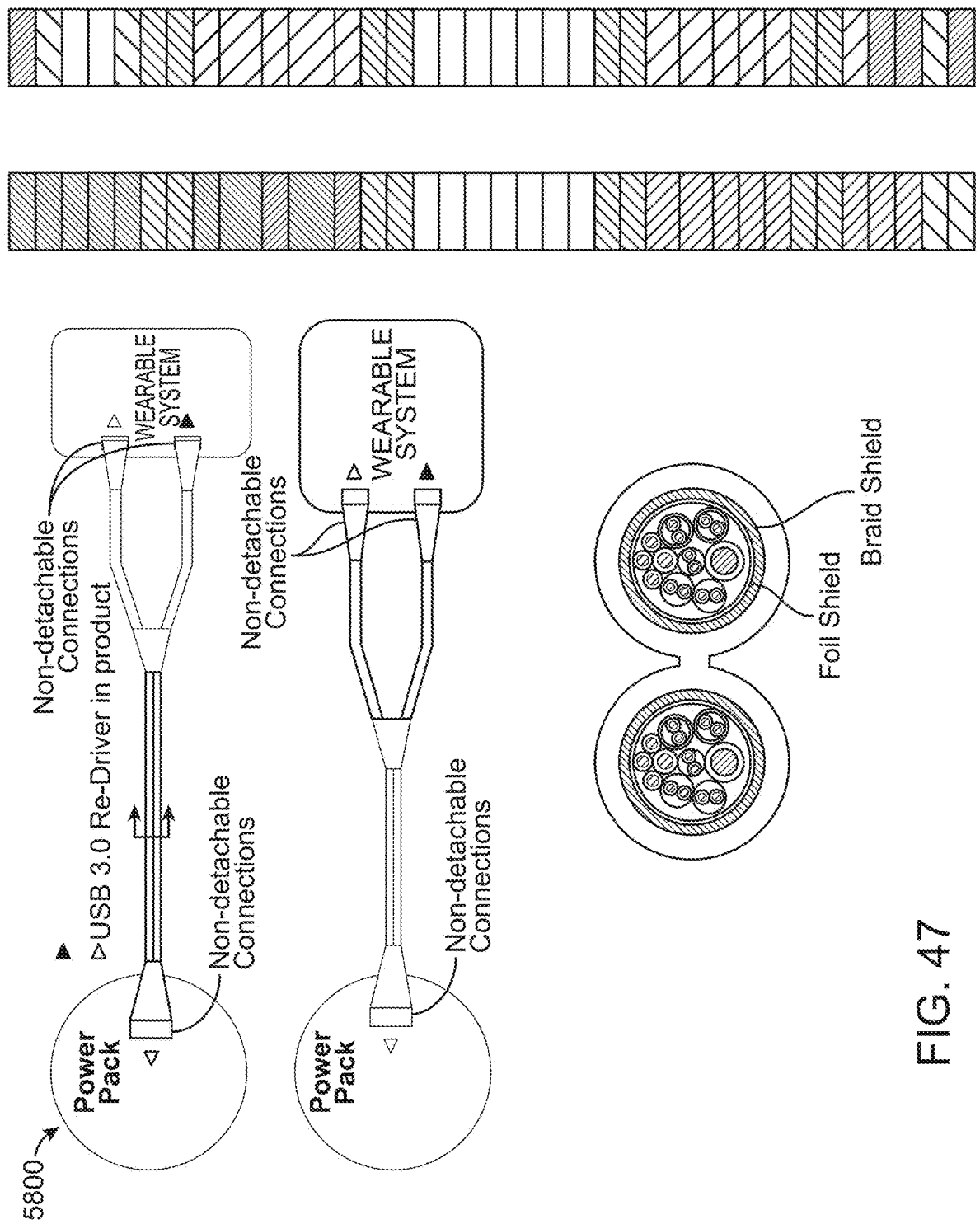
FIG. 47 schematically depicts a cable configuration for using a low power side-channel in a VR/AR/MR system, according to one embodiment.

FIG. 47 depicts a cable configuration 5800 for using a low power side-channel in VR/AR/MR systems. As an option, one or more variations of cable configuration 5800, or any aspect thereof, may be implemented in the context of the architecture and functionality of the embodiments described herein. The cable configuration 5800, or any aspect thereof, may be implemented in any environment.

The embodiment shown in FIG. 47 is merely one example of a cable that includes (1) electrical conductors to support USB communications and power distribution, and (2) electrical conductors (e.g., SPI conductors 528) for other communications (e.g., over SPI). Further, the low power mode-dependent flows of FIG. 46A, FIG. 46B, FIG. 46C, and FIG. 47 are merely some example flows for configuring lower power communication paths between a local processing module 70 and a remote processing module 72.

Multiple Component Low Power Modes

Further low power modes can be entered and exited when components cooperate among themselves. More specifically, components that are constituent to a local processing module 70 can communicate over a protocol to reach agreement as to which components that are constituent to a remote processing module 72 can be shut down, or brought down into a respective low power mode. In an alternative, components that are constituent to the remote processing module 72 can communicate over a protocol to reach agreement as to which components that are constituent to the local processing module 70 can be shut down, or brought down into a respective low power mode.

Cooperation protocols and flows, such as those depicted in the following figures, serve for detection of low power opportunities, negotiation of modes between components, relay of message between components in the process of prosecuting the cooperation protocol and determination of component-specific low power modes.

Figure 48:
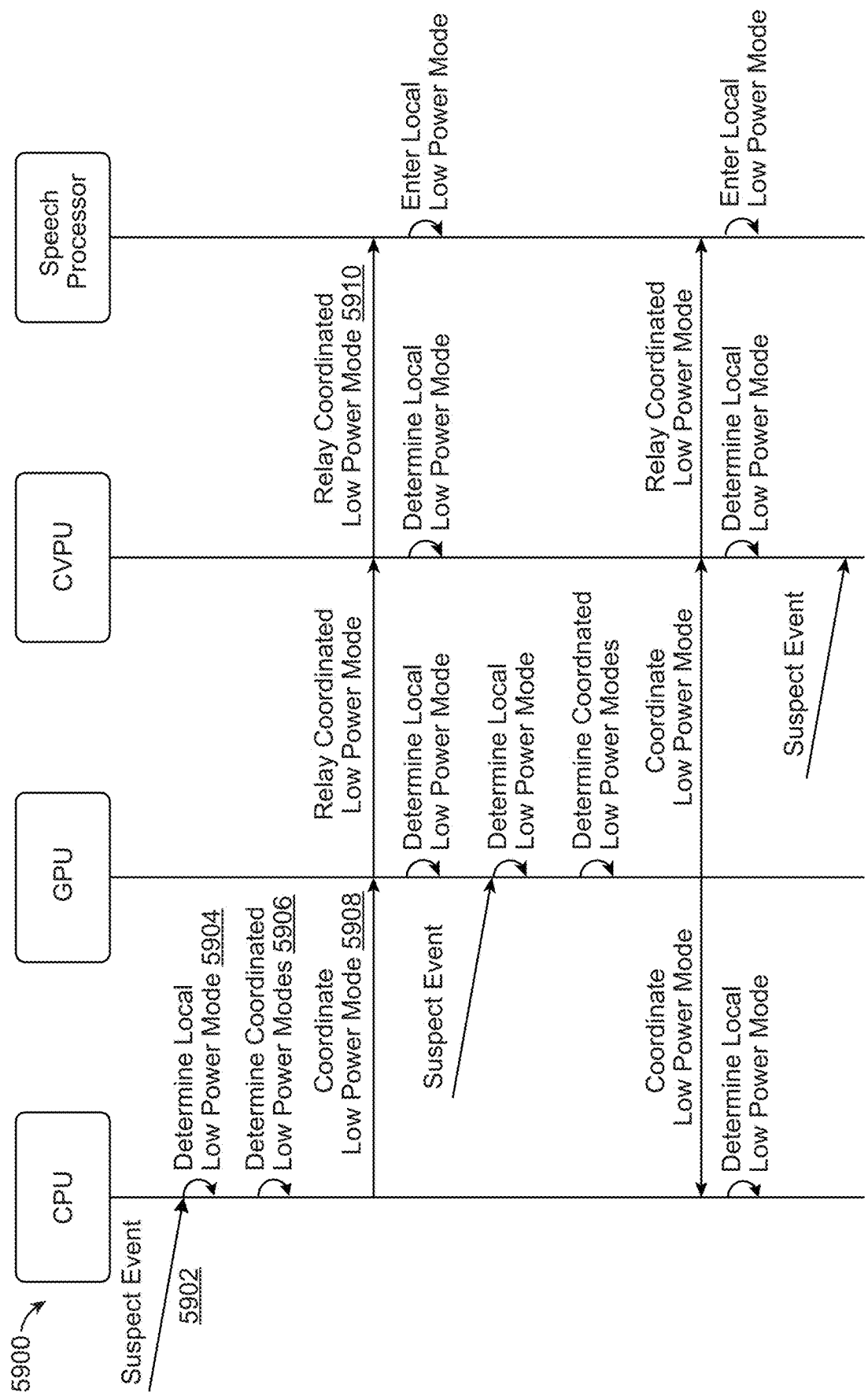
FIG. 48 schematically depicts a mode configuration protocol for implementing a low power side-channel communication between cooperating components in a VR/AR/MR system, according to one embodiment.

FIG. 48 depicts a mode configuration protocol 5900 for implementing a low power side-channel communication between cooperating components of VR/AR/MR systems. As an option, one or more variations of mode configuration protocol 5900, or any aspect thereof, may be implemented in the context of the architecture and functionality of the embodiments described herein. The mode configuration protocol 5900 or any aspect thereof may be implemented in any environment.

As illustrated, the protocol commences upon detection of a suspect event 5902. The event might result from a command or button push or any event in the VR/AR/MR system. At operation 5904, a determination of one or more local (e.g., self-initiating) low power modes that are applicable given the incoming event and the then-current state of the specific component. Additionally, at operation 5906, one or more coordinated low power modes can be determined, which can then be negotiated, possibly using inter-component signaling or messaging (e.g., using message 5908).

Any of the components of a VR/AR/MR system can receive a suspect event and initiate its own processing. In some cases, a peripheral might be a 'simple' peripheral that is unable to carry out messaging. In such cases, the peripheral might merely enter a low power mode based on a command. For example, and as shown, a perception processor/CVPU might detect a user button push to MUTE the microphones. At that time (subject to a mode) and until the MUTE is released, the speech processor might not be needed for speech processing. Accordingly, a command (e.g., message 5910) can cause the speech processor to enter into one of its low power modes. A command might be implemented merely by setting a value in a register (e.g., in the speech processor chip, or in another chip) or by pulling up (or down) a pin of the speech processor.

Figure 49:
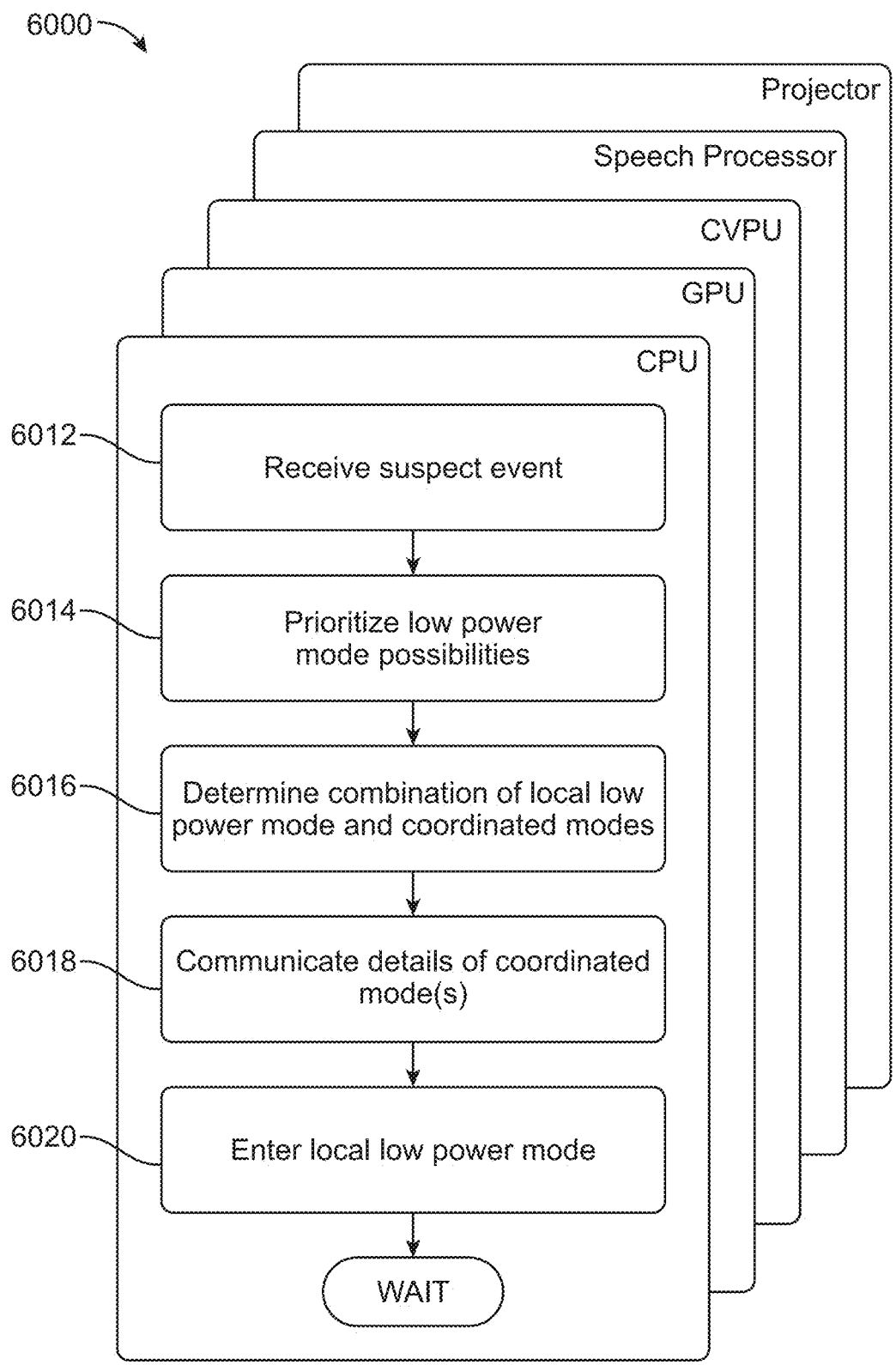
FIG. 49 schematically depicts a multiple component mode configuration flow for implementing low power side-channel communications between cooperating components in a VR/AR/MR system, according to one embodiment.

FIG. 49 depicts a multiple component mode configuration flow 6000 for implementing low power side-channel communications between cooperating components of VR/AR/MR systems. As an option, one or more variations of mode configuration flow 6000, or any aspect thereof may be implemented in the context of the architecture and functionality of the embodiments described herein. The mode configuration flow 6000, or any aspect thereof, may be implemented in any environment.

The figure depicts multiple concurrent flows of operations that are executable in parallel by any of the respective components. The components (e.g., CPU, GPU, Perception Processor/CVPU, etc.) are merely examples, and other components are possible.

The steps of the flow augment the foregoing protocol. The shown flow commences by receiving a suspect event (at step 6012), prioritizing from among two or more low power mode possibilities (at step 6014), then determining a set of combinations of local low power mode and coordinated modes as may be entered by other components in the system (at step 6016). The determination might then precipitate entry into a protocol (e.g., the foregoing protocol of FIG. 48) so as to engage other components in the negotiation (at step 6018). In the course of carrying-out such a negotiation, details pertaining to the low power mode (e.g., IDs, confirmation codes, timeout values, etc.) might be communicated to the other components involved in the negotiation, after which (at step 6020), a local low power mode (e.g., as was determined in the preceding step 6014 and step 6016) is entered.

Any combinations of the heretofore-described protocol messaging and/or the component mode configuration flows can be used to implement system-wide low power synchronization.

Figure 50:
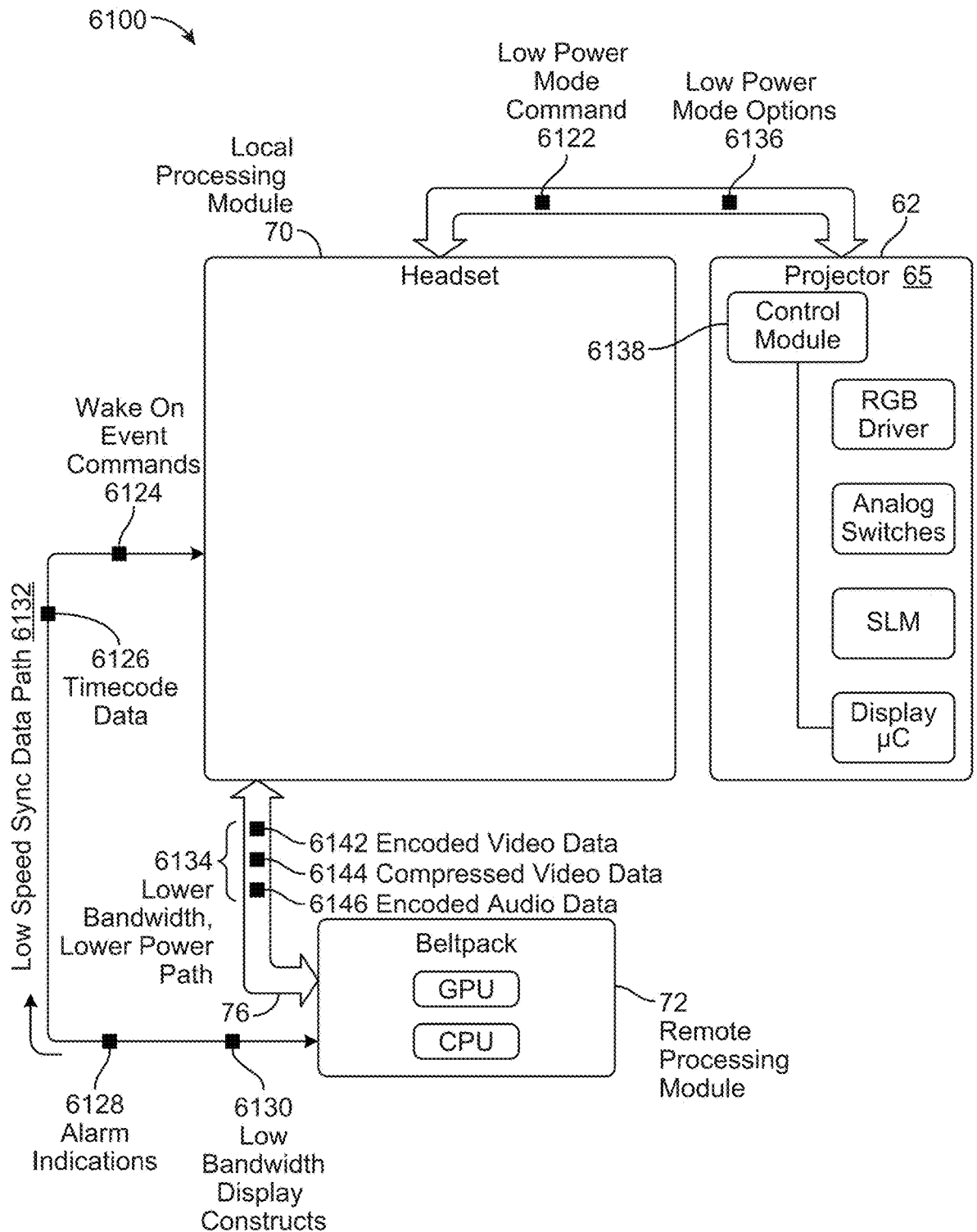
FIG. 50 schematically depicts a low power synchronization technique as used between cooperating components in a VR/AR/MR system, according to one embodiment.

Strictly as examples, a first set of low power techniques can be used between the headset and the beltpack, and a second set of low power techniques can be used between the headset and the projector. FIG. 50 provides details as follows.

Multiple Component Low Power Mode Synchronization

FIG. 50 depicts a low power synchronization technique 6100 as used between cooperating components of VR/AR/MR systems. As an option, one or more variations of low power synchronization technique 6100, or any aspect thereof, may be implemented in the context of the architecture and functionality of the embodiments described herein. The low power synchronization technique 6100, or any aspect thereof, may be implemented in any environment.

Many synchronization techniques can be applied and/or concurrently active during operation between the headset and the beltpack as shown in Table 2. In an example of low power ongoing synchronization technique, a headset and a beltpack communication over a low speed, low power side channel 6132 (e.g., SPI 5604 in FIG. 45). Small amounts of data (e.g., timecode data 6126 at each clock cycle) are communicated between the headset and the beltpack to maintain clock-by-clock synchronization under all operating conditions.

In an example of low power ongoing standby synchronization technique, a beltpack periodically receives timecode data from a headset, and the headset periodically receives timecode data from the beltpack. The timecodes are compared to assess drift. Alarm indications 6128 are sent from the beltpack to the headset. Wake-on event commands 6124 are sent from the headset to the beltpack.

In an example of low bandwidth display controls synchronization technique, low bandwidth display constructs 6130 are sent from a beltpack to a headset. The projector issues (e.g., from the display microprocessor) low power options 6136 to the headset. The headset relays low power commands (e.g., low power mode command 6122) to the projector. The projector loads control module 6138 with control values pertaining to the low power mode.

TABLE 2

Low power techniques between the headset, beltpack and projector

| Name | Functions |
|---|---|
| Low Power Ongoing Synchronization | (1) Communicate between the headset and the beltpack over a low speed, low power side channel 6132 (e.g., SPI 5604 in FIG. 45).<br>(2) Communicate small data (e.g., timecode data 6126 at each clock cycle) between the headset and the beltpack to stay in clock-by-clock synchronization under all operating conditions. |
| Low Power Ongoing Standby | (1) The beltpack periodically receives timecode data from the headset, and the headset periodically receives timecode data from the beltpack.<br>(2) The timecodes are compared to assess drift.<br>(3) Alarm indications 6128 are sent from the beltpack to the headset.<br>(4) Wake-on event commands 6124 are sent from the headset to the beltpack. |
| Low Bandwidth Display Controls | (1) Low bandwidth display constructs 6130 are sent from the beltpack to the headset.<br>(2) The projector issues(e.g., from the display microprocessor) low power options 6136 to the headset.<br>(3) Headset relays low power commands (e.g., low power mode command 6122) to the projector.<br>(4) The projector loads control module 6138 with control values pertaining to the low power mode. |

Still referring to FIG. 50, other low power techniques include reducing the amount of bandwidth for communications between a beltpack and a headset as shown in Table 2. Video data can be encoded 6142 and/or compressed 6144 before being sent. Video data can be encoded 6142 using compression techniques (e.g., MPEG) that are selected for the then-current system condition. Blank frames or series of blank frames can be encoded using run length encoding. Video data can be compressed 6144 before being sent. Video data can be compressed using compression parameters (e.g., 1080p, 720p, etc.) that are selected for the then-current condition.

Audio data can be encoded 6146 or compressed before being sent. Audio data can be encoded/compressed using compression techniques (e.g., MPEG) that are selected for the then-current condition. Non-audio data can be sent in the unused portion of the audio stream.

TABLE 3

Low power techniques between the beltpack and headset

| Name | Function |
|---|---|
| Send encoded video data 6142 | (1) Encode video data using compression techniques (e.g., MPEG) that are selected for the then-current condition.<br>(2) Encode blank frames or series of blank frames using run length encoding |
| Send compressed video data 6144 | (1) Encode video data using compression parameters (e.g., 1080p, 720p, etc.) that are selected for the then-current condition. |
| Send encoded audio data 6146 | (1) Encode audio data using compression techniques (e.g., MPEG) that are selected for the then-current condition.<br>(2) Send non-audio data in the unused portion of the audio stream. |

Time Division Multiplexing of Data

In some cases, communication of audio data is performed over a USB bus in a manner that emulates isochronous data transmission. For example, speech might be sent in stereo (e.g., left channel and right channel) or quadrophonic data formats. Ongoing speech might be sent in an ongoing stream of stereo or quadrophonic packages of data. In some cases, peripheral chips send streams of speech or audio data, or automatic speech recognition ASR data in small bursts of data. Further, in some cases, the formatting of the bursts of data is fixed by the configuration (e.g., stereo configuration, quadrophonic configuration) of the peripheral chip. Still further, there may be moments when one channel (e.g., a right channel) of a stereo transmission might not be needed.

In many such cases, data other than sound data can be packed into the unused portions of the stereo of quadrophonic stream. The figures and discussion of FIGS. 51 and 52 present several techniques for packing and/or multiplexing data to be communicated between cooperating components.

Figure 51:
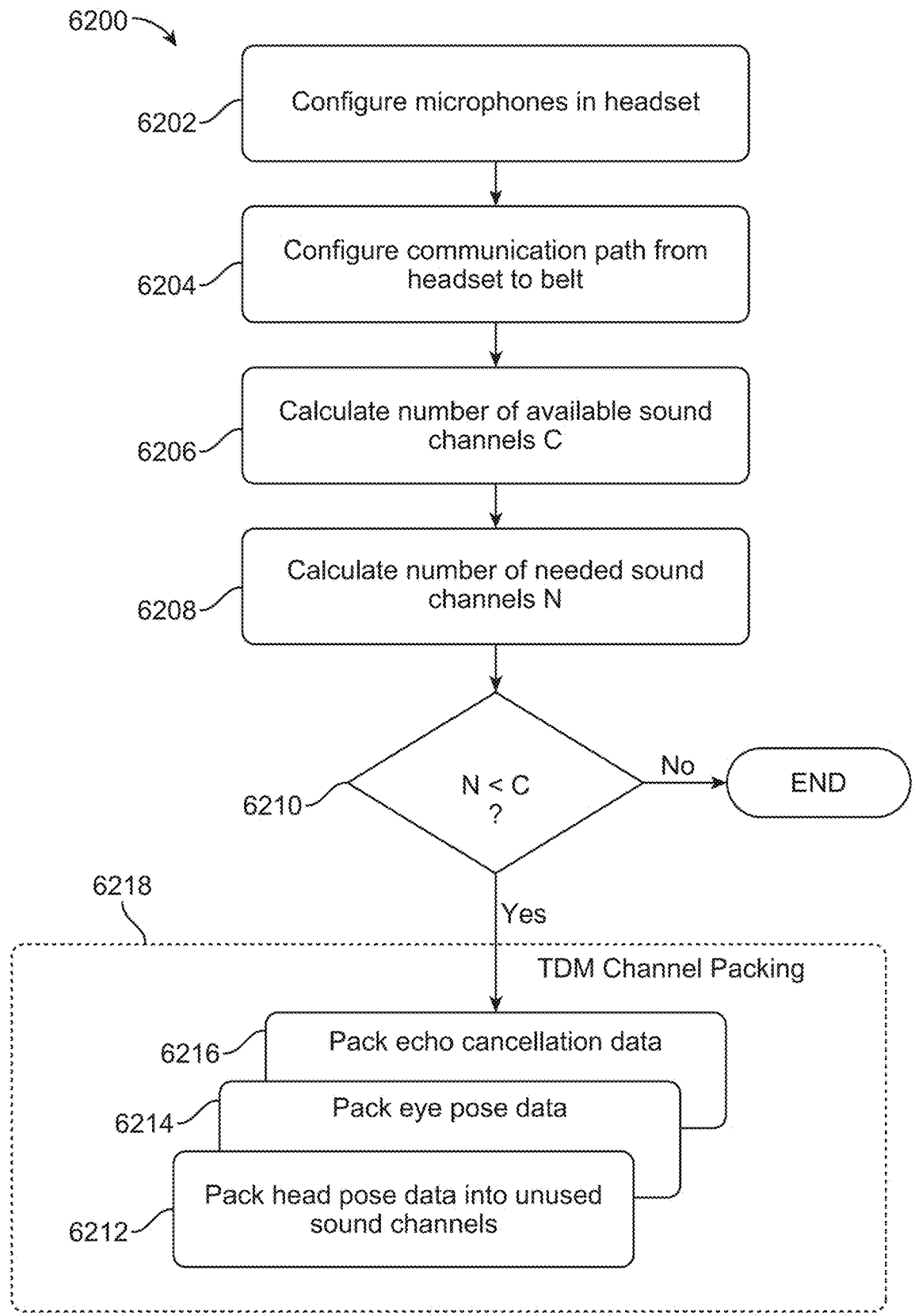
FIG. 51 is a flowchart depicting implementation of time division multiplexing of data to be communicated between cooperating components in a VR/AR/MR system, according to one embodiment.
Figure 52:
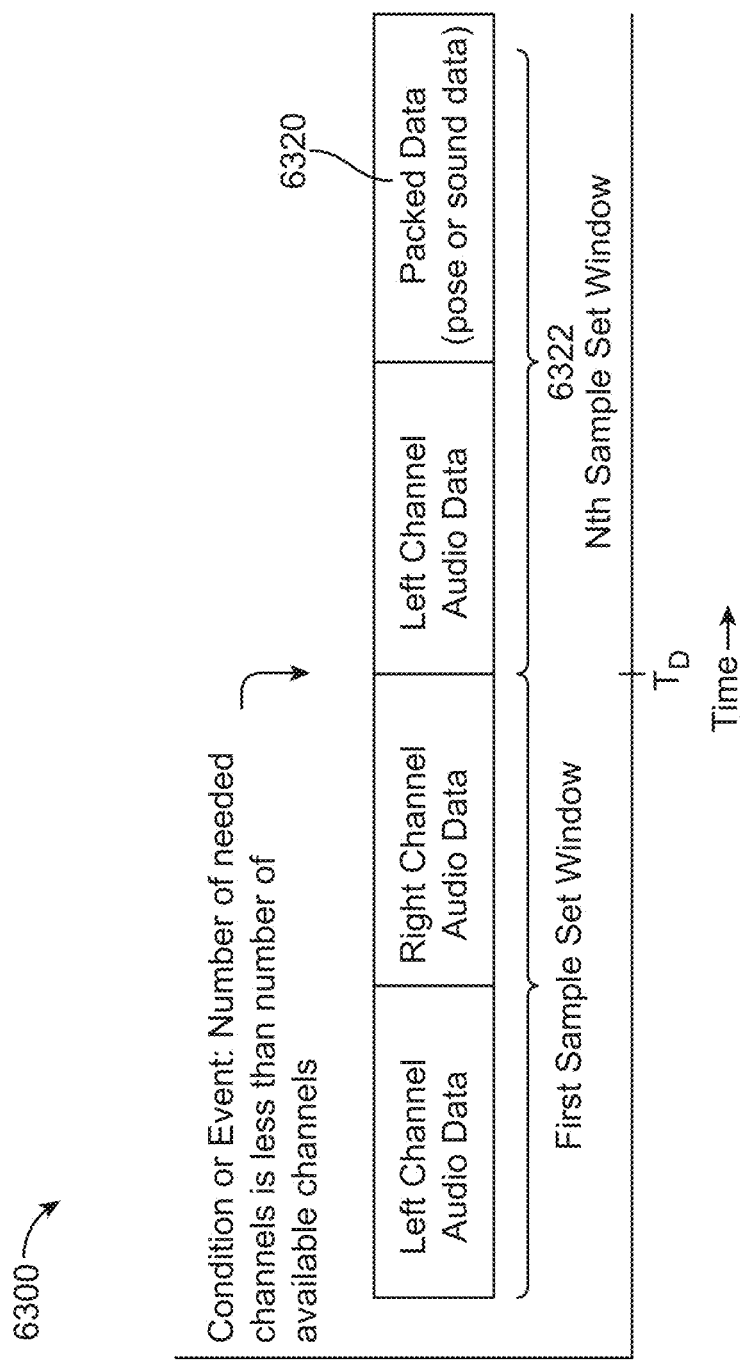
FIG. 52 illustrates data packing for implementing time division multiplexing of data to be communicated between components in a VR/AR/MR system, according to one embodiment.

FIG. 51 is a flow chart 6200 depicting implementation of time division multiplexing of data to be communicated between cooperating components of a VR/AR/MR system. As an option, one or more variations of flow chart 6200, or any aspect thereof, may be implemented in the context of the architecture and functionality of the embodiments described herein. The flow chart 6200, or any aspect thereof, may be implemented in any environment.

As shown, the flow begins (at step 6202) by configuring microphones in a headset, and configuring one or more communication paths from the headset to the beltpack (at step 6204). A processor (e.g., the perception processor/CVPU) calculates a number 'C' (e.g., two for stereo, four for quadrophonic, etc.) of available sound channels (at step 6206). Also, the number of needed sound channels 'N' is calculated (at step 6208). The number of needed sound channels is dynamic. For example, even if a sound chip is configured to quadrophonic sound, it is often the case that only stereophonic material is available. At some moments only one channel of sound is employed (e.g., for an audio alert). If 'N' (e.g., the number of needed channels) is less than 'C' (e.g., the number of available channels), then a path is taken (at step 6210) so that the available and unused channel can be packed into the available channel(s) to be used for purposes other than sending audio.

Strictly as examples, a current head pose (at step 6212) or eye pose data (at step 6214) can be packed into the available channels. As another example, echo cancellation data can be packed into the available channels (at operation 6216). The foregoing are merely examples of use of time division multiplexing with data packing, which techniques are indicated in FIG. 51 as TDM channel packing 6218.

FIG. 52 depicts a data packing technique 6300 for implementing time division multiplexing of data to be communicated between components of a VR/AR/MR system. As an option, one or more variations of data packing technique 6300, or any aspect thereof, may be implemented in the context of the architecture and functionality of the embodiments described herein. The data packing technique 6300, or any aspect thereof, may be implemented in any environment.

TDM channel packing can be performed dynamically on the basis of then-current real-time conditions in combination with then-current real-time availabilities. At any moment in time, presence of a condition or occurrence of an event can be checked. If there is an event that at least potentially frees up channels, or an event that would be subject to TDM channel packing, then upon detection of that condition or event, the flow of FIG. 51, or portion thereof, can execute.

The example of FIG. 52 shows a first sample window of time including audio data pertaining to a left channel and audio data pertaining to a right channel. At time TD an event occurs. The determinations made by the flow of FIG. 51 or portion thereof execute and the determination results in packing pose or sound data into the right channel of the next sample window (at step 6320). This can continue through N sample windows 6322, or until another condition or event causes dynamic reassessment of the channel usage.

Battery Boost System

Figure 53:
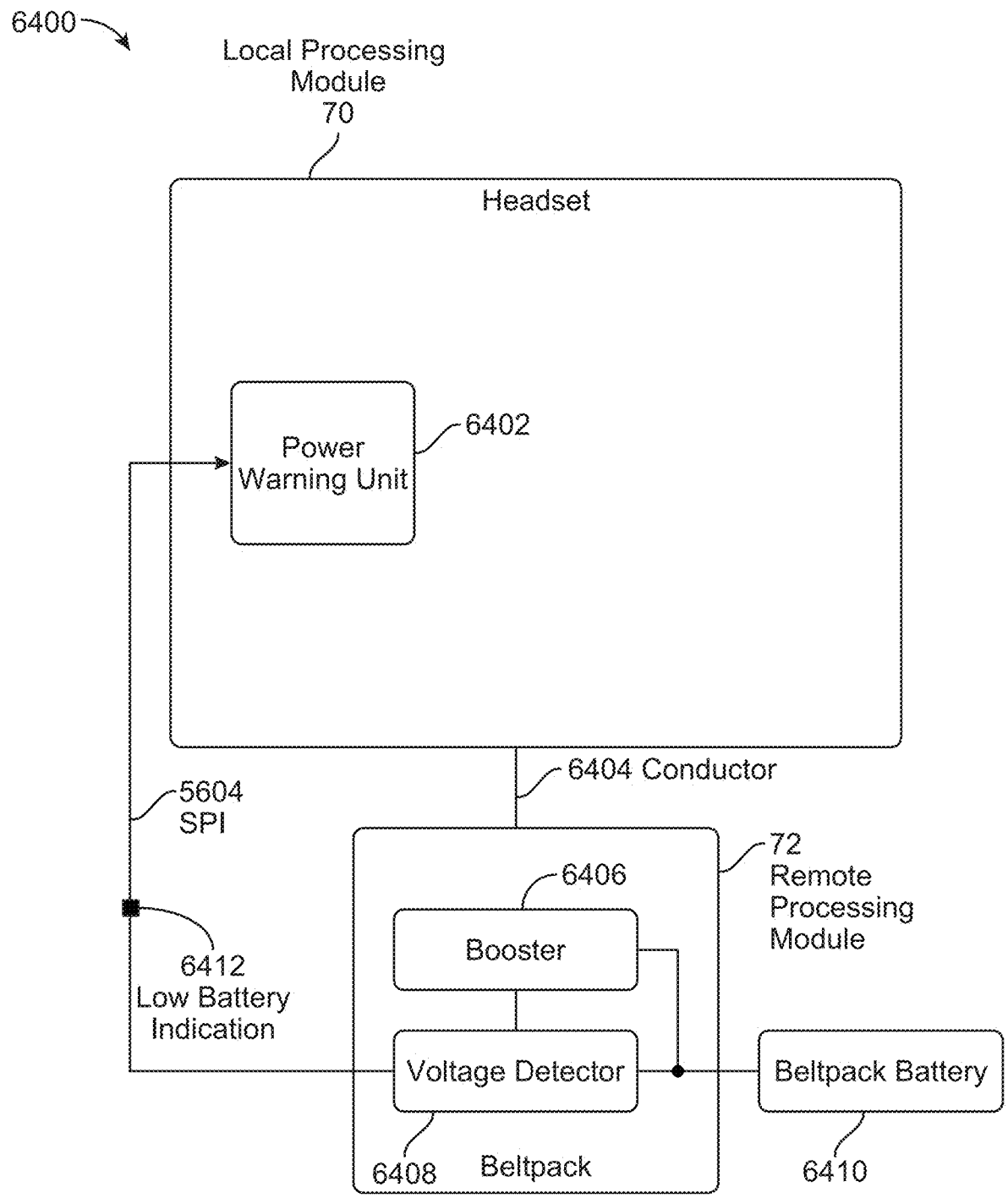
FIG. 53 schematically depicts a battery boost system for a VR/AR/MR system, according to one embodiment.

FIG. 53 depicts a battery boost system 6400 for communicating battery lifetime information between cooperating components of VR/AR/MR systems. As an option, one or more variations of battery boost system 6400, or any aspect thereof, may be implemented in the context of the architecture and functionality of the embodiments described herein. The battery boost system 6400, or any aspect thereof, may be implemented in any environment.

Some embodiments include a low power side-channel. Such a channel (or any other channel) can be used to communicate a low battery indication to the headset. The headset in turn might alert the user to the condition of the battery.

In the embodiment shown, a beltpack has a beltpack battery 6410, which is connected to a voltage detector 6408 and a booster 6406. During periods when the battery is operating normally, current is carried to the headset over conductor 6404. When the battery is low, however, the voltage detector 6408 will send a low battery indication 6412 to a headset, possibly using a low power side-channel SPI 5604. A power warning unit 6402 in the headset receives the low battery indication and alerts the user. In addition to sending a low battery indication to the headset, the voltage detector 6480 will invoke the booster 6406 to begin to operate by lifting the voltage (and decreasing maximum current). Such a low voltage indication can be used in conjunction with any of the herein-described low power techniques.

System Component Connections

Figure 54:
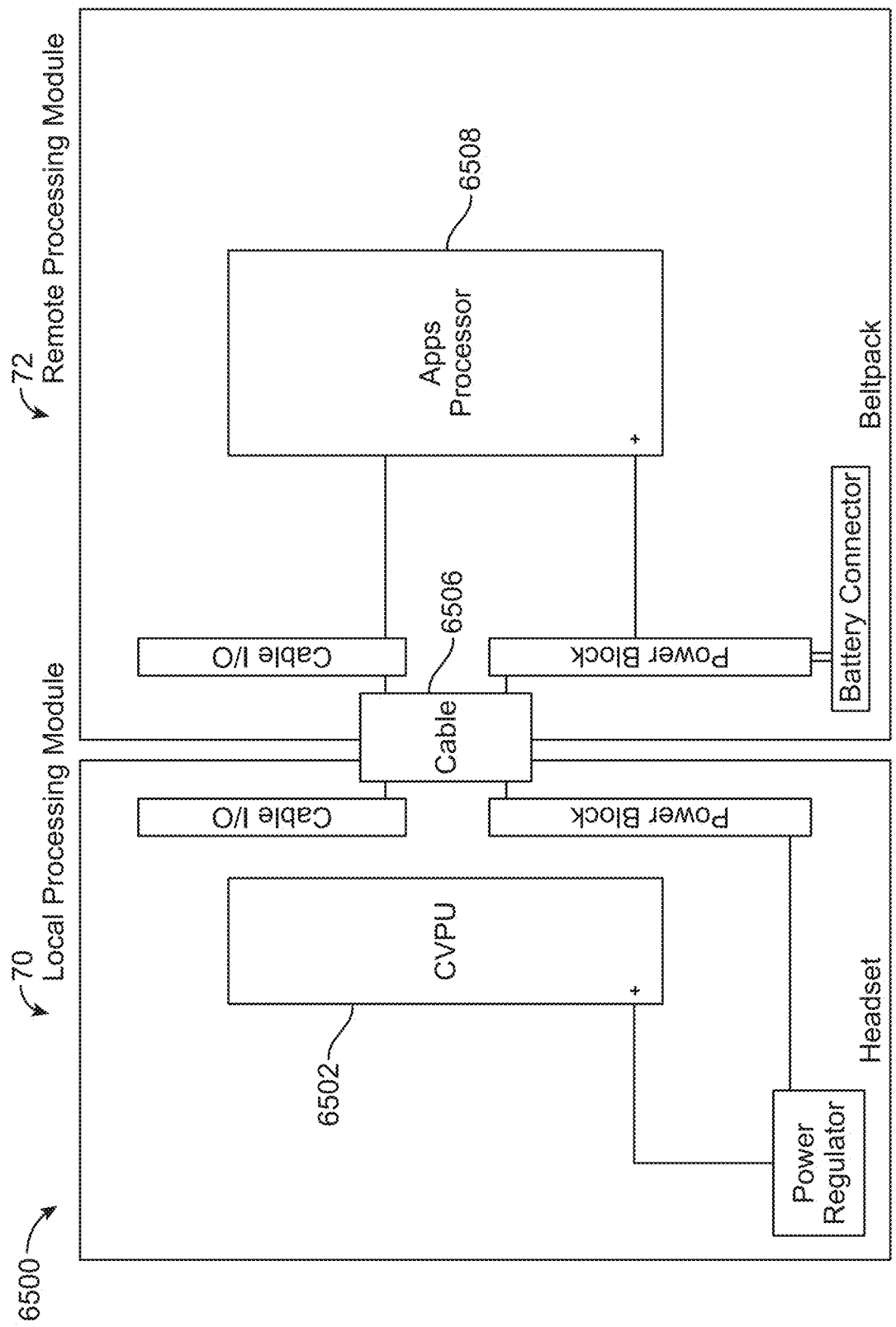
FIG. 54 schematically depicts a cable-connected system including cooperating components of a VR/AR/MR system, according to one embodiment.

FIG. 54 depicts a cable-connected system 6500 including cooperating components of a VR/AR/MR system. As an option, one or more variations of the cable-connected system 6500, or any aspect thereof, may be implemented in the context of the architecture and functionality of the embodiments described herein. The cable-connected system 6500, or any aspect thereof, may be implemented in any environment.

The embodiment shown in FIG. 54 is merely one example. As shown, the cable-connected system 6500 includes a headset (left side) and a beltpack (right side). The headset is connected to the beltpack using a cable 6506. The cable 6506 provides for data communication between the headset and the beltpack. The beltpack includes a battery connector to provide an electrical connection to an external battery. The external battery provides electrical current to power the apps processor 6508 and other components of the beltpack. The cable 6506 includes electrical conductors to carry current from the beltpack to the headset. As such, the external battery of the beltpack provides electrical current to power a CVPU processor 6502 and other components of the headset. In some embodiments, the apps processor 6508 can access a temperature sensor so as to self-regulate power consumption within prescribed temperature ranges.

In some situations it is felicitous to untether the headset from the beltpack by eliminating the cable.

Figure 55:
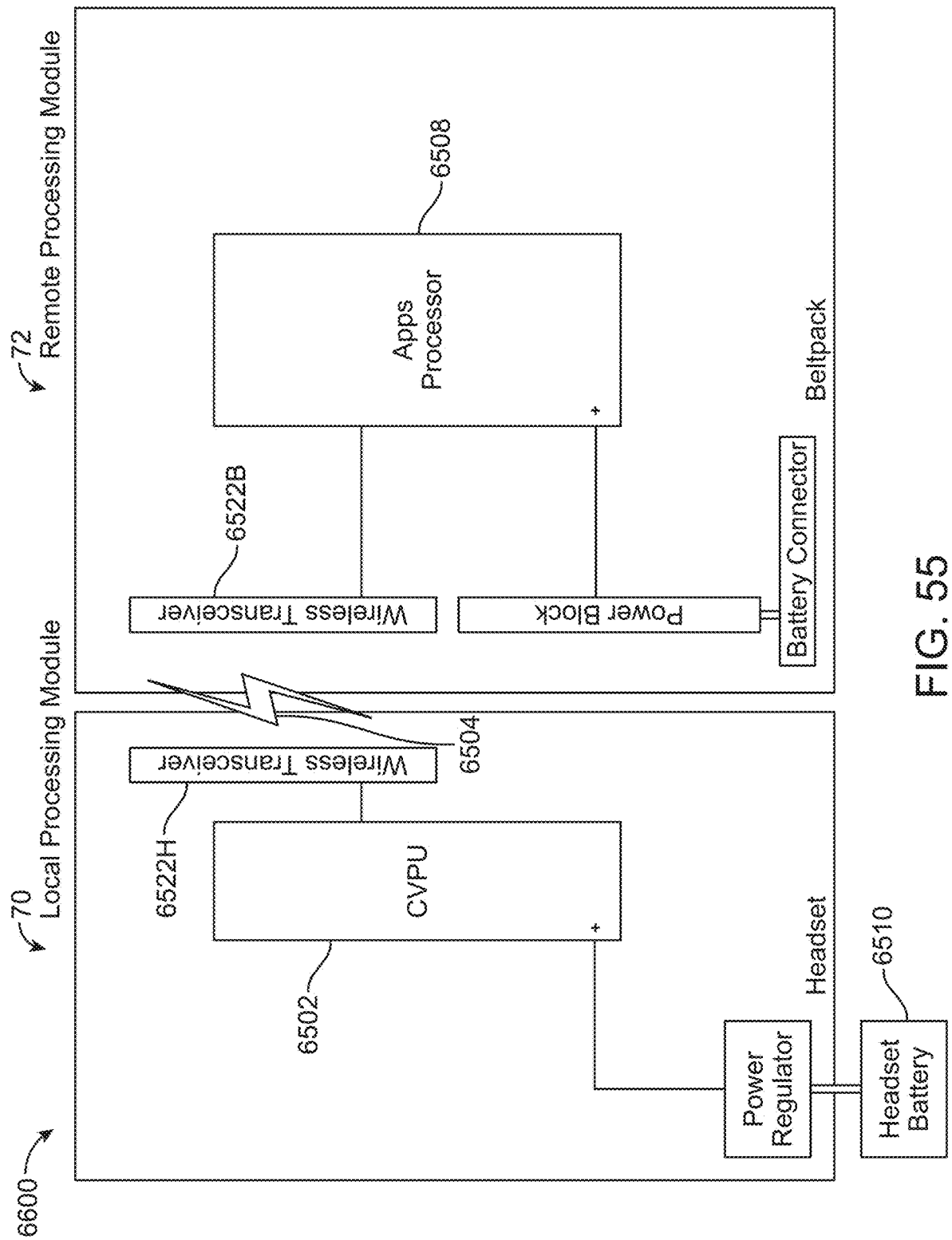
FIG. 55 schematically depicts a wirelessly-connected system including cooperating components of a VR/AR/MR system, according to one embodiment.

FIG. 55 depicts a wirelessly-connected system 6600 including cooperating components of a VR/AR/MR system. As an option, one or more variations of wirelessly-connected system 6600, or any aspect thereof, may be implemented in the context of the architecture and functionality of the embodiments described herein. The wirelessly-connected system 6600, or any aspect thereof, may be implemented in any environment.

Communication formerly provided by a cable can be provided wirelessly over a wireless connection 6504. Transceivers (e.g., transceiver 6522H and transceiver 6522B) are used to support one or more wireless communication facilities. In some cases, and as shown, the wireless communication is configured to support multiple wireless communication standards and/or multiple proprietary wireless communication protocol stacks.

Strictly as examples, the shown wireless communication facilities include Bluetooth (e.g., 802.15x), WiFi (e.g., 802.11x), Bluetooth Near Field Communications, Bluetooth Low Energy, and/or one or more proprietary wireless facilities for communications between the beltpack and headset.

Exemplary System Architecture

Figure 56:
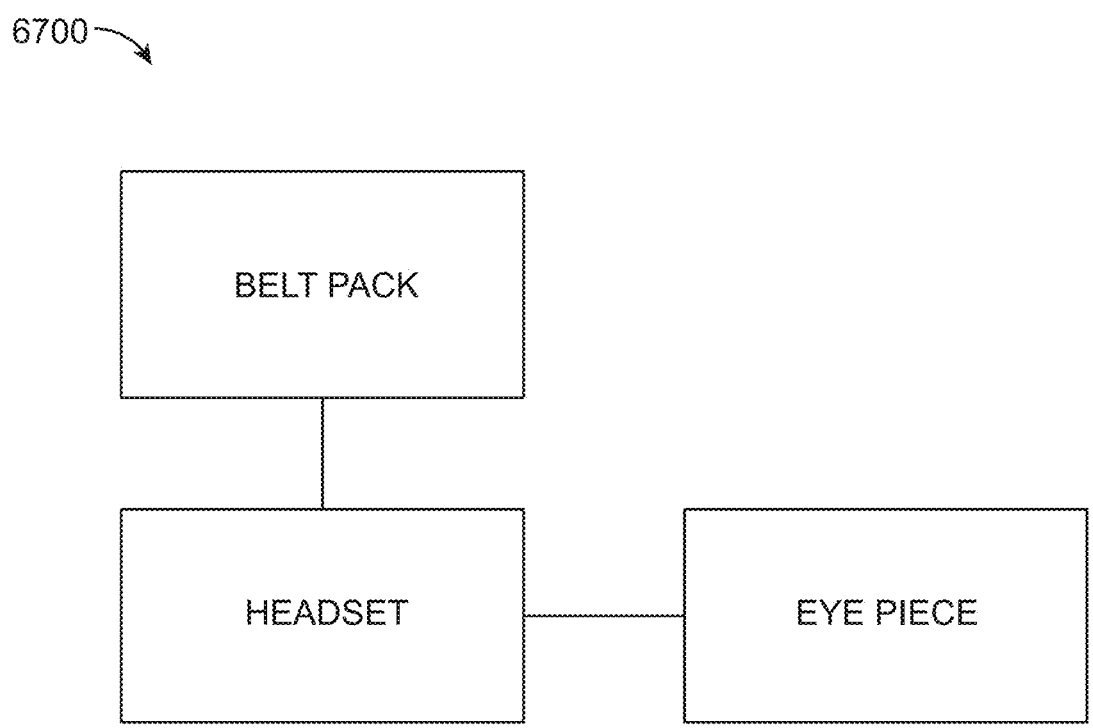
FIG. 56 schematically depicts a system component partitioning including multiple cooperating components of VR/AR/MR system, according to one embodiment.

FIG. 56 depicts a system component partitioning 6700 including multiple cooperating components of VR/AR/MR systems. As an option, one or more variations of system component partitioning 6700, or any aspect thereof, may be implemented in the context of the architecture and functionality of the embodiments described herein. The system component partitioning 6700, or any aspect thereof, may be implemented in any environment.

The embodiment shown in FIG. 56 is merely one example. As shown, the system component partitioning includes an eyepiece that is connected to headset components including an eyepiece. Moreover the embodiment shown in FIG. 56 is suited to implement any or all or portions of the functions described in the following FIG. 57 and FIG. 58.

Figure 57:
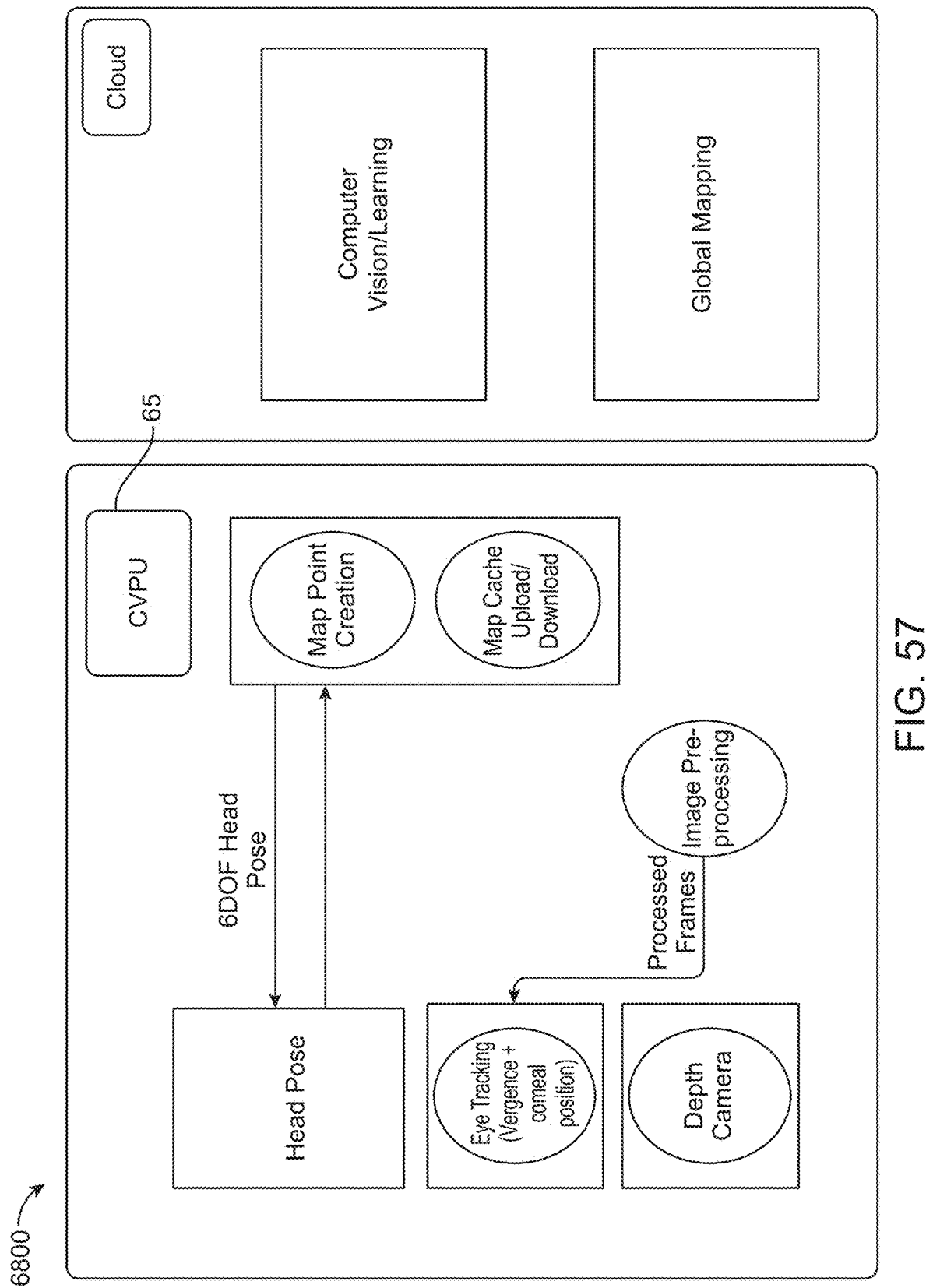
FIG. 57 schematically depicts a system function partitioning for implementation on cooperating components of a VR/AR/MR system, according to one embodiment.

FIG. 57 depicts a system function partitioning 6800 for implementation on cooperating components of a VR/AR/MR system. As an option, one or more variations of system function partitioning 6800, or any aspect thereof, may be implemented in the context of the architecture and functionality of the embodiments described herein. The system function partitioning 6800, or any aspect thereof, may be implemented in any environment.

A perception processor (CVPU 85) serves many purposes related to the user and the user's interaction with the VR/AR/MR system. One group of functions that can be mapped to a perception processor/CVPU pertain to poses. In particular, eye poses can include vergence, head poses can include vertical inertial geometries, and totem poses can include aspects of depth. Information from cameras, in combination with calibration information can be processed by the perception processor/CVPU so as to manipulate imagery that is presented to the user via the projector. In particular, depth information as sensed by the totem position and/or depth information as sensed by any inertial measurement devices can be combined by the perception processor/CVPU to manipulate presentation of depth planes.

Many of the shown functions can be mapped into a perception processor/CVPU, and then into a system such as the system of FIG. 56 or FIG. 2G. A system function partitioning 6800 depicts a cloud and functions pertaining to cloud resources, namely voice recognition functions, geometry recognition, as well as macro positioning (e.g., global positioning, user orientation with respect to a global position or volume, etc.). Such functions can be provided by, or in conjunction with any forms of a remote data repository 74. Strictly as one example, a remote data repository (e.g., the remote data repository 74) can be implemented by cloud-based computing infrastructure.

Figure 58:
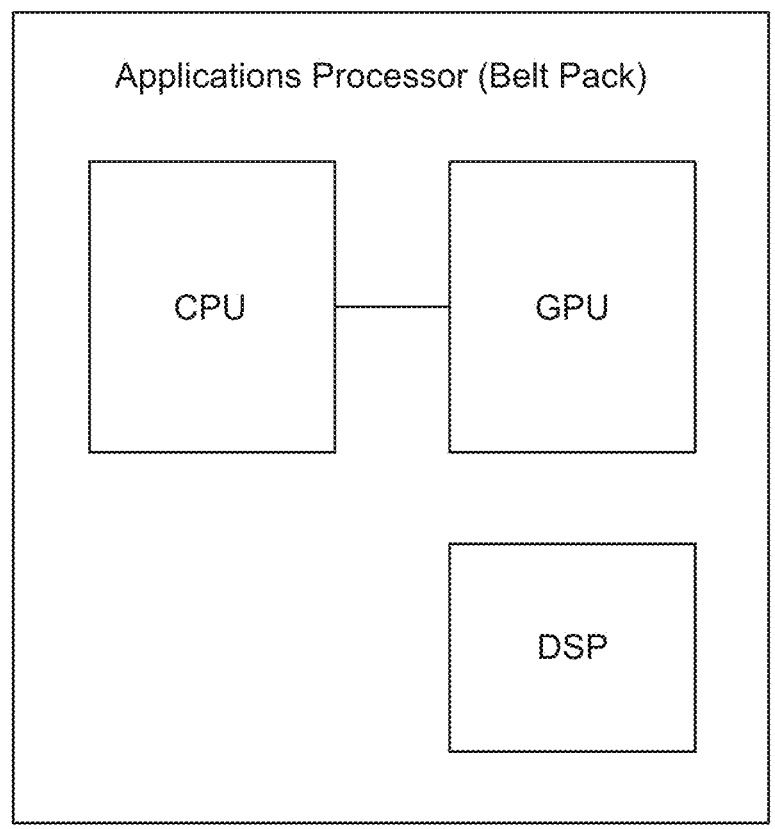
FIG. 58 schematically depicts a system function partitioning for implementation on cooperating components of a VR/AR/MR system, according to one embodiment.

FIG. 58 depicts a system function partitioning 6900 for implementation on cooperating components of a VR/AR/MR system. As an option, one or more variations of system function partitioning 6900, or any aspect thereof, may be implemented in the context of the architecture and functionality of the embodiments described herein. The system function partitioning 6900, or any aspect thereof, may be implemented in any environment.

Many of the shown functions can be mapped onto a system such as the system of FIG. 56. More specifically, and as shown, a frame composition set of functions is mapped onto a GPU, an audio-related set of functions can be mapped onto a digital signal processor (DSP), and a set of applications can be mapped onto a CPU. The CPU may be provided with an operating system, possibly with built-in services such as mesh construction for generating CGI imagery, and hand/gesture recognition, as well as services for access to remote data repositories and/or cloud-based services.

As shown, the GPU performs scene rendering as well as certain image transformations (e.g., for color correction, etc.).

The DSP can perform any/all forms of speech and/or audio processing, such as microphone signal conditioning, speaker panning, 3D sound shaping, and the like. The DSP can perform with or without a speech or other audio-related co-processor. In some cases, processing that could be assigned to the perception processor/CVPU can also be assigned, in whole or in part, to the DSP. In some cases, processing that could be assigned to the audio-related co-processor can also be assigned, in whole or in part, to the DSP.

Raw Photonic Events

For realism, operations such as compression and blanking tend to be eschewed. Capture, retention (e.g., recording) and rendering/display of raw photonic events often bring realism to the experience. Recording raw events in a large range of a three-dimensional space demands a large memory. There is a tradeoff along a spectrum of working in the raw photonic event domain versus realism, and there is a point of diminishing returns. Processing in the aforementioned systems considers tradeoffs between realism and system effects such as, for example, instantaneous bandwidth requirements, impact to other operations (e.g., non-imaging operations) of the VR/AR/MR system, instantaneous foveation, system constraints such as frames-per-second, number of planes to show in a frame or sequence, and the like. Splitting into smaller subset of planes is merely one technique that can be used to meet instantaneously measured or predicted bandwidth availabilities.

Further to handling photonic events, determining which photonic events derive from a farther away depth plane as compared to other photonic events is often dependent on eye position. Specifically, with two eyes viewing from two (slightly) different perspectives, the various depth planes need to line up in space relative to each eye. As an example, if the scene has one object at 8" and an adjacent object of the same size at a depth of 16", then with left head movement, realistically there will be more overlap of the two objects in the XY plane. However, given right head movement, realistically, there may be a gap developing in the XY plane. One technique involves combining the eye position and/or head position with the scene data so as to do shifting of the planes (e.g., to produce overlap or gap) in tandem with changes in eye positions and/or changes in head position. Another technique is to render volumetrically so the rendered images for both left and right eye come from the (slightly different) perspectives of the left and right eye.

Sub-Block Processing

The identification of the aforementioned sub-blocks facilitates use of various techniques to illuminate (or not illuminate) the planes on the device for the eye to receive. For example if a character is within a particular sub-block, and there is a blocking object (e.g., in a closer depth plane) in the same sub-block, then one technique to enhance realism is to not illuminate the portion of the character that is occluded by the object.

When rendering translucent objects, rather than sending one flat image across the interface to the display, an improved technique for sending data would be to divide the scene into "sub-blocks", for example the sub-blocks that are processed by GPU. Once so divided, determinations can be made as to send or not send, merge or not merge, color compress or not to color compress, and the like. For example, an example set of steps include identifying an alpha-region, sending the data pertinent to those alpha regions in groups (e.g., sub-blocks for multiple planes in one group), and having the display controller or its co-processors tasked to handle the groups.

As another example, if there is a translucent object in front of an opaque object, subtractive or multiplicative blending mode techniques can be applied. Consider the case of a translucent window (like a glass window) with a virtual character partially behind that translucent window. Further suppose the head is above the translucent window but the body is within the frame of the translucent window. Further consider if the window has a blueish tint. In such a case, the character's body is going to have some blue tint influence. A multiplicative blending can be used for rendering this effect. The renderer will recognize (e.g., through attributes of the window) that the window is only going to allow certain wavelength of light to pass through it, therefore whatever light is coming through the window, can be blended for realism. Using sub-blocks, it is possible to process the window with all of its color information separately from the character, then also separately send the background character with all of its color information. The actual display system will add the bluish light into the display. The display system will first load in the blue-tint window, and then will load in the character. The separation at the GPU into multiple sets of data (e.g., sub-blocks), and sending out separately to the display system is fast and efficient.

Light Maps

Optical systems such as VR, AR, or MR systems render and display virtual objects in combination with the real physical environment. Illuminating these virtual objects with natural appearing light can be difficult.

The embodiments described herein address this problem using a light map that stores information relating to the light in a real physical environment.

A light map is a data structure that includes information related to the light in a room. Light related information includes, but is not limited to, colors (e.g., detected by color sensors on MR systems), illumination levels and light directions (e.g., detected by light sensors on MR systems).

Figure 59:
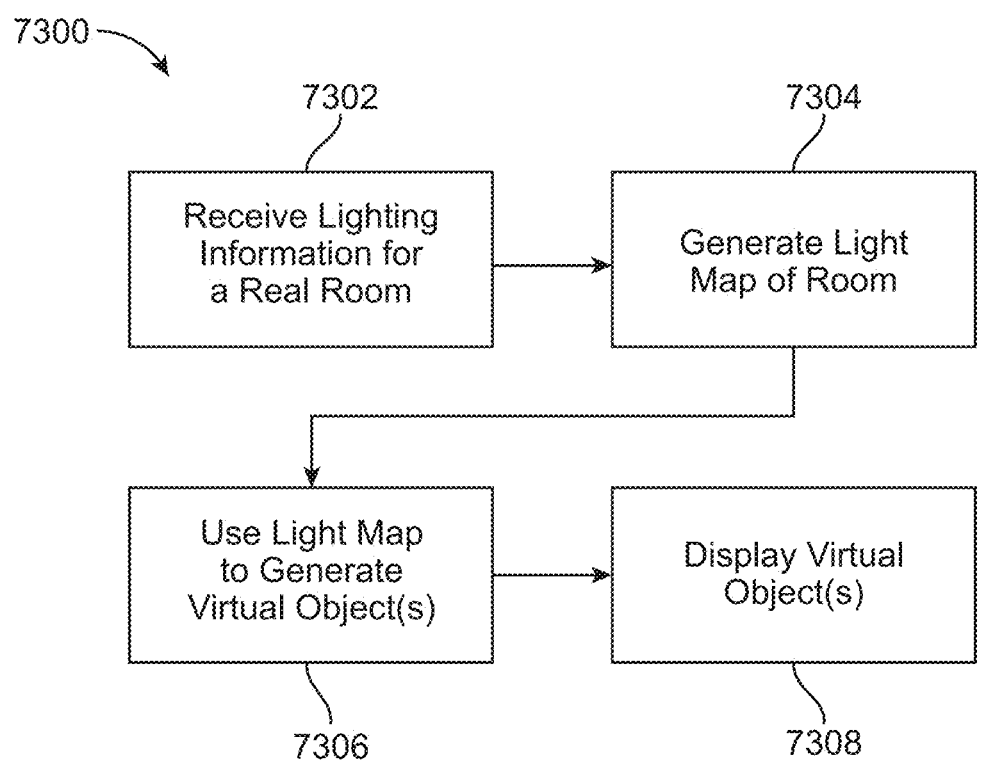
FIG. 59 is a flowchart illustrating a method of generating accurately illuminated virtual objects for display in a real physical room, according to one embodiment.

FIG. 59 is a flowchart illustrating a method 7300 of generating accurately illuminated virtual objects for display in a real physical room, according to one embodiment. At step 7302, the MR system receives lighting information for a real physical room. For instance, color information may be detected by color sensors on the MR system or the MR systems of other users in the real physical room. In addition, illumination levels and light directions may be detected by light sensors on the MR system or the MR systems of other users in the real physical room.

At step 7304, the MR system and/or a server connected thereto generates a light map of the real physical room based on the lighting information received from the one or more MR systems in the real physical room. The light map is a model of the lighting sources in the real physical room, including light that is transmitted, diffuse, reflected, diffracted, and the like.

At step 7306, the MR system and/or the server uses the light map to generate virtual objects that are more accurately illuminated based on the model of the light sources in the real physical room and the location of the virtual objects therein.

At step 7308, the MR displays the virtual objects to the user. In AR scenarios, for example, the virtual objects are more believable because they are more accurately illuminated. For instance, the real physical room could have overhead white lights or yellow lights, and the color of the virtual objects can be modified to match the room lights. This may be important because advertisers use very specific colors in their campaigns and brands (e.g., INTEL blue, YAHOO! purple, and the like) Further, the light direction information in the lighting information can be used to more accurately generate shadows related to (e.g., on or generated by) the virtual objects (e.g., by ray tracing).

The use of information from one or more users to build a light map results in privacy issues. For instance, one user's field of view (FOV) may include some private information (including images) in addition to lighting information. If an image of the user's FOV is transmitted to a public server, the private information (including images) may be unintentionally made publically available. Examples of private information include private financial information displayed on the screen of a desktop or mobile computer, and images include some images of children.

Figure 60:
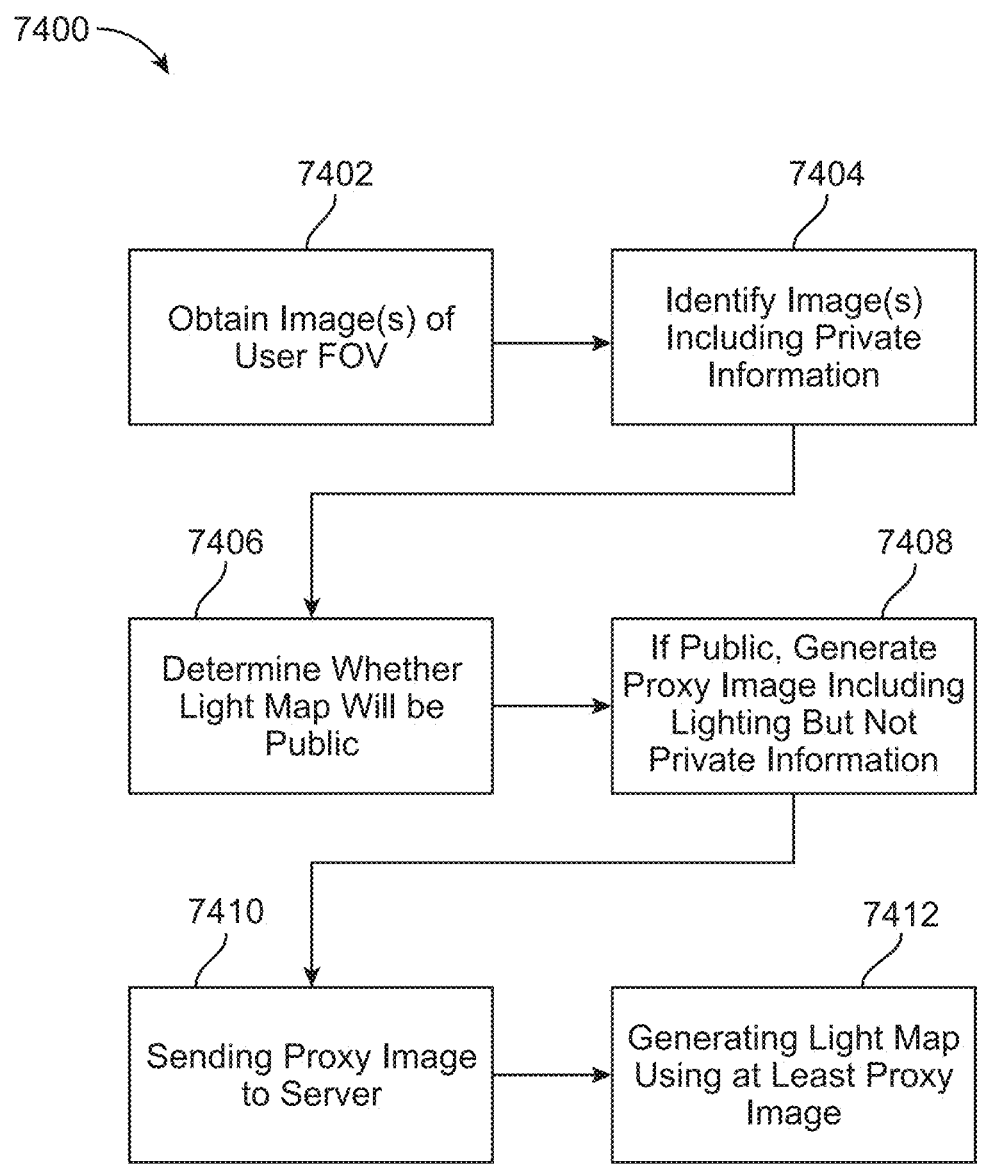
FIG. 60 is a flowchart illustrating a method of using images including private information to generate a publicly available light map, according to one embodiment.

FIG. 60 is a flowchart illustrating a method 7400 of using images including private information to generate a publicly available light map while minimizing exposure of the private information, according to one embodiment. Light maps facilitate accurate rendering of virtual images such that lighting scheme of the virtual images matches that of a real physical room in which they are to be displayed. Further, increasing the amount of light information by collecting such information for multiple users in a real physical room can increase the accuracy of light maps generated there from.

At step 7402, a MR system obtains one or more images of a user's FOV. Front facing cameras of the MR system make collecting images of a user's FOV relatively easy.

At step 7404, the MR system analyzes the one or more images to identify images including private information.

At step 7406, the MR system determines whether a light map will be used locally and therefore private, or use by other users connected to a server and therefore public. Publicly available light maps may either include images from which the light maps were generated or may include information from which such images may be reverse engineered.

At step 7408, when the MR system determines that the light map is public, it generates a proxy image including the lighting information but not the private information. For instance, the surface of a smart phone including private information may be replaced in the proxy image with a smart phone having the same reflectiveness, but without the private information.

At step 7410, the MR system sends the proxy image to the server for use in constructing light maps. At step 7412, the server generates the light map using at least the proxy image.

As such, lighting information can be extracted from the one or more images including private information to generate accurate light maps without exposing the private information.

The MR system can have a handle that links to both the real image including the private information and the proxy image with the anonymized or redacted information. The MR system can be configured such that the handle calls the real image when the light map is determined to be private. Otherwise, the handle will call the proxy image.

Certain aspects, advantages and features of the disclosure have been described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, and the like described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can include computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media that, when read by a computer or other processing device, cause it to carry out the method.

While certain embodiments have been explicitly described, other embodiments will become apparent to those of ordinary skill in the art based on this disclosure.

The various processors and other electronic components described herein are suitable for use with any optical system for projecting light. The various processors and other electronic components described herein are also suitable for use with any audio system for receiving voice commands.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art, each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A virtual, augmented, or mixed reality display system comprising:
   a display configured to display distortion-corrected image data, the display comprising one or more optical components which introduce optical distortions or aberrations to the distortion-corrected image data, wherein the display comprises a plurality of at least partially distinct optical paths; and
   a display controller configured to provide the distortion-corrected image data to the display, the display controller comprising:
      memory for storing optical distortion correction information, wherein the optical distortion correction information comprises separate optical distortion correction information for respective colors of the optical paths of the display, and
      one or more processing elements to at least partially correct non-distortion-corrected image data for the optical distortions or aberrations using the optical distortion correction information;
   wherein the display controller is configured to pre-distort the non-distortion-corrected image data to obtain the distortion-corrected image data by determining a distortion-corrected pixel at a first location (x, y) for the distortion-corrected image data based on one or more non-distortion-corrected pixels near a different second location (x', y') in the non-distortion-corrected image data received by the display controller; and
   wherein the display controller is configured to use the optical distortion correction information to determine the second location (x', y') in the non-distortion-corrected image data.

2. The system of claim 1, wherein the optical distortion correction information is used by the display controller to pre-distort the non-distortion-corrected image data in a way that is at least partially inversely related to the optical distortions or aberrations.

3. The system of claim 1, wherein the (x', y') coordinates of the second location are fractional numbers.

4. The system of claim 3, wherein the display controller is configured to determine the distortion-corrected pixel at the first location (x, y) by interpolating between a plurality of non-distortion-corrected pixels surrounding the second location (x', y').

5. The system of claim 4, wherein the display controller uses bilinear interpolation.

6. The system of claim 1, wherein the optical distortion correction information is stored in the form of one or more lookup tables.

7. The system of claim 6, wherein the one or more lookup tables are stored in a compressed format, and wherein the display controller is configured to expand the one or more lookup tables before correcting for the optical distortions or aberrations using the optical distortion correction information.

8. The system of claim 1, wherein the optical distortion correction information further comprises information for performing one or more image warp operations, and wherein the display controller is further configured to perform the one or more image warp operations on the non-distortion-corrected image data.

9. The system of claim 1, wherein the display is configured to display the colors sequentially.

10. A method in a virtual, augmented, or mixed reality display system, the method comprising:
    providing distortion-corrected image data to be shown on a display, the display comprising one or more optical components which introduce optical distortions or aberrations to the distortion-corrected image data, wherein the display comprises a plurality of at least partially distinct optical paths;
    storing optical distortion correction information, wherein the optical distortion correction information comprises separate optical distortion correction information for respective colors of the optical paths of the display;
    at least partially correcting non-distortion-corrected image data for the optical distortions or aberrations using the optical distortion correction information; and
    displaying the distortion-corrected image data to the user with the display;
    wherein the act of at least partially correcting the non-distortion-corrected image data comprises:
       pre-distorting the non-distortion-corrected image data to obtain the distortion-corrected image data by determining a distortion-corrected pixel at a first location (x, y) for the distortion-corrected image data based on one or more non-distortion-corrected pixels near a different second location (x', y') in the non-distortion-corrected image data; and
       using the optical distortion correction information to determine the second location (x', y') in the non-distortion-corrected image data.

11. The method of claim 10, further comprising using the optical distortion correction information to pre-distort the non-distortion-corrected image data in a way that is at least partially inversely related to the optical distortions or aberrations.

12. The method of claim 10, wherein the (x', y') coordinates of the second location are fractional numbers.

13. The method of claim 12, further comprising determining the distortion-corrected pixel at the first location (x, y) by interpolating between a plurality of non-distortion-corrected pixels surrounding the second location (x', y').

14. The method of claim 13, further comprising using bilinear interpolation.

15. The method of claim 10, further comprising storing the optical distortion correction information in the form of one or more lookup tables.

16. The method of claim 15, further comprising storing the one or more lookup tables in a compressed format, and expanding the one or more lookup tables before correcting for the optical distortions or aberrations using the optical distortion correction information.

17. The method of claim 10, wherein the optical distortion correction information further comprises information for performing one or more image warp operations, and further comprising performing the one or more image warp operations on the non-distortion-corrected image data.

18. The method of claim 10, wherein the display is configured to display the colors sequentially.

* * * * *

(12) EX PARTE REEXAMINATION CERTIFICATE (12509th)
United States Patent
Rodriguez et al.

(10) Number: US 10,529,063 C1
(45) Certificate Issued: Feb. 2, 2024

(54) VIRTUAL, AUGMENTED, AND MIXED REALITY SYSTEMS AND METHODS

(71) Applicant: MAGIC LEAP, INC., Plantation, FL (US)

(72) Inventors: Jose Felix Rodriguez, Plantation, FL (US); Ricardo Martinez Perez, Plantation, FL (US)

(73) Assignee: MAGIC LEAP, INC., Plantation, FL (US)

Reexamination Request:
No. 90/019,122, Oct. 14, 2022

Reexamination Certificate for:
Patent No.: 10,529,063
Issued: Jan. 7, 2020
Appl. No.: 15/683,677
Filed: Aug. 22, 2017

Related U.S. Application Data

(60) Provisional application No. 62/462,279, filed on Feb. 22, 2017, provisional application No. 62/377,829, filed on Aug. 22, 2016, provisional application No. 62/377,804, filed on Aug. 22, 2016.

(51) Int. Cl.
*G06T 5/00* (2006.01)
*G06F 1/3203* (2019.01)
*G06F 3/14* (2006.01)
*G06T 3/00* (2006.01)
*G06T 3/40* (2006.01)

(52) U.S. Cl.
CPC ............ *G06T 5/006* (2013.01); *G06F 1/3203* (2013.01); *G06F 3/14* (2013.01); *G06T 3/0093* (2013.01); *G06T 3/4007* (2013.01); *G06T 2207/10024* (2013.01); *G06T 2210/44* (2013.01); *G09G 2330/021* (2013.01); *G09G 2370/04* (2013.01)

(58) Field of Classification Search
None
See application file for complete search history.

(56) References Cited

To view the complete listing of prior art documents cited during the proceeding for Reexamination Control Number 90/019,122, please refer to the USPTO's Patent Electronic System.

*Primary Examiner* — Peng Ke

(57) ABSTRACT

A virtual, augmented, or mixed reality display system includes a display configured to display virtual, augmented, or mixed reality image data, the display including one or more optical components which introduce optical distortions or aberrations to the image data. The system also includes a display controller configured to provide the image data to the display. The display controller includes memory for storing optical distortion correction information, and one or more processing elements to at least partially correct the image data for the optical distortions or aberrations using the optical distortion correction information.

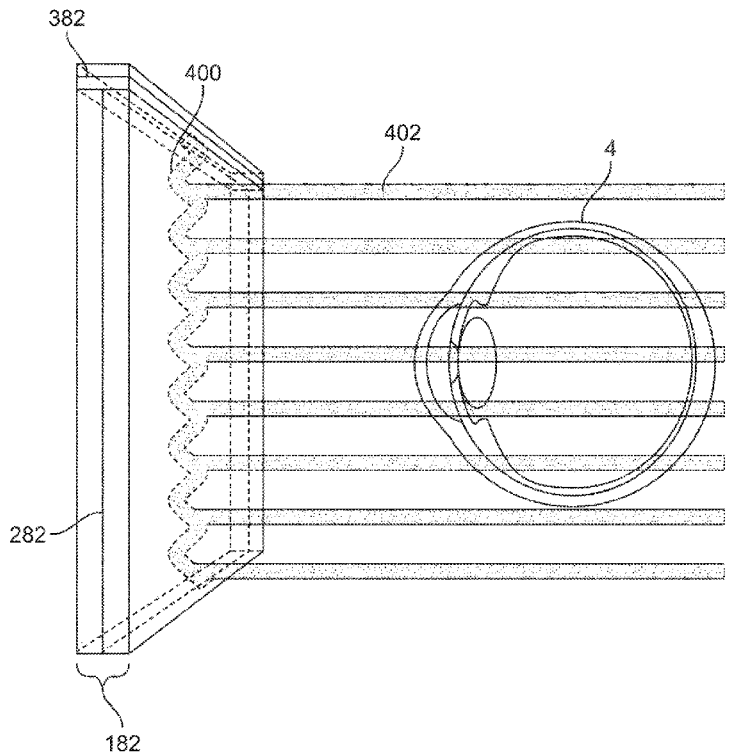

US 10,529,063 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2-9 and 11-18, dependent on an amended claim, are determined to be patentable.

New claims 19-30 are added and determined to be patentable.

1. A virtual, augmented, or mixed reality display system comprising:
   a display configured to display distortion-corrected image data, the display comprising *a waveguide and* one or more optical components which introduce optical distortions or aberrations to the distortion-corrected image data, wherein the display comprises a plurality of at least partially distinct optical paths;
   a light source to generate light corresponding to the distortion-corrected image data; and
   a display controller configured to provide the distortion-corrected image data to the display, the display controller comprising:
      memory for storing optical distortion correction information, wherein the optical distortion correction information comprises separate optical distortion correction information for respective colors of the optical paths of the display, and
      one or more processing elements to at least partially correct non-distortion-corrected image data for the optical distortions or aberrations using the optical distortion correction information[;],
   wherein the display controller is configured to pre-distort the non-distortion-corrected image data to obtain the distortion-corrected image data by determining a distortion-corrected pixel at a first location (x, y) for the distortion-corrected image data based on one or more non-distortion-corrected pixels near a different second location (x', y') in the non-distortion-corrected image data received by the display controller[; and],
   wherein the display controller is configured to use the optical distortion correction information to determine the second location (x', y') in the non-distortion-corrected image data, *and*
   *wherein the light enters the waveguide at a first portion thereof, propagates through the waveguide via total internal reflection, and exits the waveguide at a second portion thereof.*

10. A method in a virtual, augmented, or mixed reality display system, the method comprising:
   providing distortion-corrected image data to be shown on a display, the display comprising *a waveguide and* one or more optical components which introduce optical distortions or aberrations to the distortion-corrected image data, wherein the display comprises a plurality of at least partially distinct optical paths;
   storing optical distortion correction information, wherein the optical distortion correction information comprises separate optical distortion correction information for respective colors of the optical paths of the display;
   at least partially correcting non-distortion-corrected image data for the optical distortions or aberrations using the optical distortion correction information;
   generating light corresponding to the distortion-corrected image data; and
   displaying the distortion-corrected image data to *a* user with the display[;],
   wherein the act of at least partially correcting the non-distortion-corrected image data comprises:
      pre-distorting the non-distortion-corrected image data to obtain the distortion-corrected image data by determining a distortion-corrected pixel at a first location (x, y) for the distortion-corrected image data based on one or more non-distortion-corrected pixels near a different second location (x', y') in the non-distortion-corrected image data; and
      using the optical distortion correction information to determine the second location (x', y') in the non-distortion-corrected image data, *and*
   *wherein the light enters the waveguide at a first portion thereof, propagates through the waveguide via total internal reflection, and exits the waveguide at a second portion thereof.*

*19. The system of claim 1, wherein the waveguide comprises a diffractive optical element (DOE).*

*20. The system of claim 19, wherein the DOE is configured such that, when the light intersects the DOE, a portion of the light is deflected away toward an eye of a user and a remainder of the light continues to move through the waveguide via total internal reflection.*

*21. The system of claim 1, wherein the display comprises a plurality of waveguides including the waveguide.*

*22. The system of claim 21, wherein the plurality of at least partially distinct optical paths propagates through respective ones of the plurality of waveguides.*

*23. The method of claim 10, wherein the waveguide comprises a diffractive optical element (DOE).*

*24. The method of claim 23, further comprising, when the light intersects the DOE, a portion of the light is deflected away toward an eye of the user and a remainder of the light continues to move through the waveguide via total internal reflection.*

*25. The method of claim 10, wherein the display comprises a plurality of waveguides including the waveguide.*

*26. The method of claim 25, further comprising the plurality of at least partially distinct optical paths propagating through respective ones of the plurality of waveguides.*

*27. The system of claim 1, wherein the optical distortion correction information comprises separate optical distortion correction information for respective colors and respective depth planes of the optical paths of the display.*

*28. The system of claim 6, wherein the one or more lookup tables are dynamic.*

*29. The method of claim 10, wherein the optical distortion correction information comprises separate optical distortion correction information for respective colors and respective depth planes of the optical paths of the display.*

*30. The method of claim 15, further comprising dynamically updating the one or more lookup tables.*

\* \* \* \* \*